US012698444B2

(12) United States Patent
Laut et al.

(10) Patent No.: US 12,698,444 B2
(45) Date of Patent: Aug. 4, 2026

(54) LIQUID-CRYSTALLINE MEDIUM

(71) Applicant: Merck Patent GmbH, Darmstadt (DE)

(72) Inventors: Sven Christian Laut, Darmstadt (DE); Hee-Kyu Lee, Pudong New Area (CN); Jing Wang, Pudong New Area (CN)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 18/819,388

(22) Filed: Aug. 29, 2024

(65) Prior Publication Data

US 2025/0136868 A1 May 1, 2025

(30) Foreign Application Priority Data

Aug. 29, 2023 (CN) ......................... 202311100965.3
Sep. 28, 2023 (CN) ......................... 202311267978.X

(51) Int. Cl.

| | |
|---|---|
| ***G02F 1/1333*** | (2006.01) |
| ***C09K 19/30*** | (2006.01) |
| ***C09K 19/34*** | (2006.01) |
| ***C09K 19/52*** | (2006.01) |

(52) U.S. Cl.

CPC ...... *C09K 19/3491* (2013.01); *C09K 19/3003* (2013.01); *C09K 19/3028* (2013.01); *C09K 19/3066* (2013.01); *C09K 19/3098* (2013.01); *C09K 19/3402* (2013.01); *C09K 19/52* (2013.01); *C09K 2019/3004* (2013.01); *C09K 2019/3006* (2013.01); *C09K 2019/3031* (2013.01); *C09K 2019/3422* (2013.01); *C09K 2219/15* (2013.01); *C09K 2219/17* (2013.01)

(58) Field of Classification Search

CPC ............ C09K 19/3491; C09K 19/3003; C09K 19/3028; C09K 19/3066; C09K 19/3098; C09K 19/3402; C09K 19/52; C09K 2019/3004; C09K 2019/3006; C09K 2019/3031; C09K 2019/3422; G02F 1/1333

See application file for complete search history.

(56) References Cited

U.S. PATENT DOCUMENTS

| | | | | |
|---|---|---|---|---|
| 4,398,803 | A | 8/1983 | Pohl et al. | |
| 6,027,665 | A | 2/2000 | Pausch et al. | |
| 6,146,720 | A | 11/2000 | Pausch et al. | |
| 6,522,380 | B2 | 2/2003 | Lee et al. | |
| 11,168,255 | B2 * | 11/2021 | Manabe | C09K 19/586 |
| 11,359,142 | B2 * | 6/2022 | Manabe | C09K 19/12 |
| 12,104,109 | B2 * | 10/2024 | Huang | C09K 19/3497 |
| 2006/0066793 | A1 | 3/2006 | Ohmuro et al. | |
| 2025/0136868 | A1 * | 5/2025 | Laut | C09K 19/52 |

FOREIGN PATENT DOCUMENTS

| | | | | |
|---|---|---|---|---|
| DE | 3022818 | A1 | 1/1982 | |
| DE | 19528106 | A1 | 8/1996 | |
| DE | 19509410 | A1 | 9/1996 | |
| DE | 19528107 | A1 | 9/1996 | |
| DE | 19528104 | A1 | 2/1997 | |
| DE | 19824137 | A1 | 7/1999 | |
| EP | 0588568 | A2 | 3/1994 | |
| EP | 0667555 | A1 | 8/1995 | |
| EP | 0673986 | A2 | 9/1995 | |
| EP | 3 763 802 | A1 | 1/2021 | |
| EP | 3 839 009 | A1 | 6/2021 | |
| JP | H07181439 | A | 7/1995 | |
| WO | 9110936 | A1 | 7/1991 | |
| WO | WO-2022068499 | A1 * | 4/2022 | C09K 19/3491 |

OTHER PUBLICATIONS

Jung, S.H., et al., "Analysis of Optimal Phase Retardation of a Fringe Field-Driven Homogeneously Aligned Nematic Liquid Crystal Cell", Japanese Journal of Applied Physics, 2004 (month unknown), vol. 43, No. 3, pp. 1028-1031. (4 pages).
Soref, R.A., "Field Effects in Nematic Liquid Crystals Obtained with Interdigital Electrodes", Journal of Applied Physics, Dec. 1974, vol. 45, No. 12, pp. 5466-5468.
Haller, I., et al., "Crown Ether Complex Salts as Conductive Dopants for Nematic Liquids", Molecular Crystals and Liquid Crystals, 1973 (month unknown), vol. 24, Issue 3-4, pp. 249-258.
Extended European Search Report issued Jan. 13, 2025, by the European Patent Office in corresponding European Patent Application No. 24194021.2-1014. (6 pages).

* cited by examiner

*Primary Examiner* — Geraldina Visconti
(74) *Attorney, Agent, or Firm* — Buchanan Ingersoll & Rooney PC

(57) ABSTRACT

Liquid-crystalline (LC) media containing a combination of 2-phenylthiophene derivatives of formula G and formula U or LC materials and energy saving liquid-crystal displays (LCDs) containing these media, especially gaming displays and AR/VR headsets addressed by an active matrix and in particular to LC displays of the TN, PS-TN, STN, TN-TFT, OCB, IPS, PS-IPS, FFS, HB-FFS, XB-FFS, PS-FFS, SA-HB-FFS, SA-XB-FFS, polymer stabilised SA-HB-FFS, polymer stabilised SA-XB-FFS, positive VA or positive PS-VA type.

19 Claims, No Drawings

LIQUID-CRYSTALLINE MEDIUM

CROSS-REFERENCE TO RELATED APPLICATIONS

This application is a U.S. national application filed under 35 U.S.C. § 111(a), claiming benefit and priority under 35 U.S.C. § 119(a) of and to Chinese (CN) Application No. 202311100965.3, filed Aug. 29, 2023 and Chinese (CN) Application No. 202311267978.X, filed Sep. 28, 2023, the disclosures of which are incorporated herein each in their entirety and for all purposes.

FIELD OF THE INVENTION

The present invention relates to liquid-crystalline (LC) media and to energy saving liquid-crystal displays (LCDs) containing these media, especially to high contrast gaming displays and AR/VR headsets addressed by an active matrix and in particular to LC displays of the TN, PS-TN, STN, TN-TFT, OCB, IPS, PS-IPS, FFS, HB-FFS, XB-FFS, PS-FFS, SA-HB-FFS, SA-XB-FFS, polymer stabilised SA-HB-FFS, polymer stabilised SA-XB-FFS, positive VA or positive PS-VA type. In a preferred embodiment, the LC media have positive dielectric anisotropy.

BACKGROUND OF THE INVENTION

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which generated substantially perpendicular to the substrates and the LC layer.

Besides these modes, there are also electro-optical modes that utilise an electric field which is substantially parallel to the substrates or the LC layer. For example, WO 91/10936 discloses a LC display in which the electric signals are generated in such a way that the electric fields have a significant component parallel to the LC layer, and which has since then become known as "in-plane switching" (IPS) display. The principles of operating such a display are described, for example, by R. A. Soref in Journal of Applied Physics, Vol. 45, No. 12, pp. 5466-5468 (1974).

IPS displays contain an LC layer between two substrates with planar orientation, where the two electrodes are arranged on only one of the two substrates and preferably have interdigitated, comb-shaped structures. On application of a voltage to the electrodes an electric field with a significant component parallel to the LC layer is generated between them. This causes realignment of the LC molecules in the layer plane.

EP 0 588 568, for example, discloses various possibilities for the design of the electrodes and for addressing an IPS display. DE 198 24 137 likewise describes various embodiments of such IPS displays.

Liquid-crystalline materials for IPS displays of this type are described, for example, in DE 195 28 104.

Furthermore, so-called "fringe-field switching" (FFS) displays have been reported (see, inter alia S. H. Jung et al., Jpn. J. Appl. Phys., Volume 43, No. 3, 2004, 1028), which contain two electrodes on the same substrate, one of which is structured in a comb-shaped manner and the other is unstructured. A strong, so-called "fringe field" is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

Liquid-crystal displays of the IPS and FFS electro-optical mode are in particular suitable for use in modern desktop monitors, TV sets and multimedia applications. The LC media according to the present invention are preferably used in displays of this type. In general, dielectrically positive LC media having rather lower values of the dielectric anisotropy are used in FFS displays, but in some cases LC media having a dielectric anisotropy of only about 3 or even less are also used in IPS displays.

A further improvement has been achieved by the HB-FFS mode. One of the unique features of the HB-FFS mode in contrast to the traditional FFS technology is that it enables higher transmittance which allows operation of the panel with less energy consumption.

Another recently developed mode is the XB-FFS mode, wherein the LC medium additionally contains a polar liquid crystal compound with low dielectric anisotropy.

Liquid-crystal compositions which are suitable for LCDs and especially for FFS and IPS displays are known in prior art, for example, from JP 07-181 439 (A), EP 0 667 555, EP 0 673 986, DE 195 09 410, DE 195 28 106 and DE 195 28 107. However, these compositions have certain disadvantages. Amongst other deficiencies, most of them result in disadvantageously long addressing times, have inadequate values of the resistivity and/or require excessively high operating voltages. Both an improvement in the operating properties and also in the shelf life are necessary here.

FFS and IPS displays can be operated as active-matrix displays (AMD) or passive-matrix displays (PMD). In the case of active-matrix displays individual pixels are usually addressed by integrated, non-linear active elements such as, for example, thin-film transistors (TFTs), while in the case of passive-matrix displays individual pixels are usually addressed by the multiplex method as known from the prior art.

SUMMARY OF THE INVENTION

The displays according to the present invention are preferably addressed by an active matrix, preferably by a matrix of TFT. However, the LC media according to the invention can also advantageously be used in displays having other known addressing means.

Typical applications of IPS and FFS technologies are monitors, notebooks, televisions, mobile telephones, tablet PCs, etc. Both the IPS and the FFS technology have certain advantages over other LCD technologies, such as, for example, the vertical alignment (VA) technology, e.g. a broad viewing angle dependency of the contrast.

The provision of further LC media and the use thereof in a display having high transmission, a good black state and a high contrast ratio is a central challenge for modern FFS and IPS applications. In addition, modern applications also require good low-temperature stability and fast addressing times.

Until now, it was not possible to design suitable LC media having a high contrast ratio e.g. high elastic constants $K_1$ and $K_{av}$, low temperature stability and low response times.

Therefore, the overall picture quality in such devices still requires a further improvement. In particular, in the area of gaming applications, for the purpose of achieving fast switching speed other parameters, which are relevant for the image quality, have been often sacrificed.

The present invention has the object of providing LC media, in particular for energy saving gaming FFS and IPS displays and AR/VR headsets, but also for TN, positive VA or STN displays, and in particular for active-matrix displays like those addressed by TFTs, which have a high average elastic constant $K_{av}$ in combination with a low response time parameter ($\gamma_1/K_1$) and a low rotational viscosity and a relatively low birefringence $\Delta n$. Additionally, they need to have a high specific resistance, low threshold voltage, high dielectric anisotropy, a good low temperature stability (LTS), fast response times, and enable high brightness. In case of FFS displays there is a need for further optimization of response time, contrast, brightness and reliability. However, it was found that the LC materials of the prior art do often not achieve all these requirements at the same time.

Surprisingly, the above technical problem was solved by providing LC media as described and claimed hereinafter.

It has now been surprisingly found that LC media according to the present invention which contain a combination of compounds of the Formula G and U

G

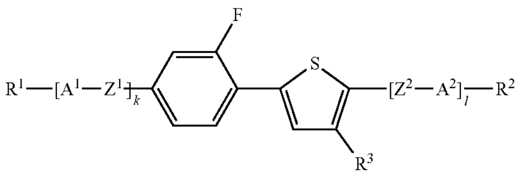

U

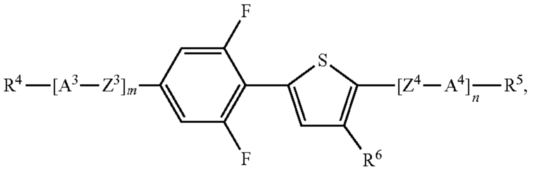

in which the individual substituents are specified in the detailed description and claims that follow, show several remarkable improvements, especially when being used in FFS mode displays, like a high average elastic constant $K_{av}$, a low response time parameter ($\gamma_1/K_1$) in combination with a low rotational viscosity as well as a good solubility, and enable fast response times. The compounds of formulae G and U as such have been known in the prior art.

Additionally, the LC media according to the present invention have high clearing points, an excellent low temperature stability (LTS) and provide a best motion picture quality and an improved overall image quality, in particular a high contrast.

DETAILED DESCRIPTION OF THE INVENTION

The present invention relates to a LC medium, characterised in that it comprises one or more compounds of the Formula G

G

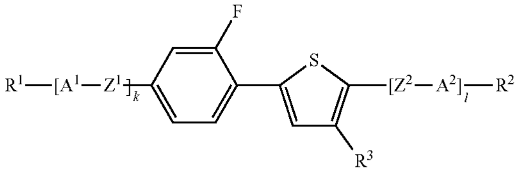

and one or more compounds of the Formula U

U

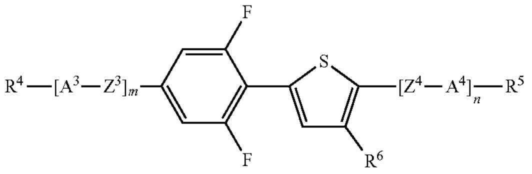

in which the individual substituents, on each occurrence identically or differently, and each, independently of one another, have the following meanings:

$R^1$, $R^4$ each, independently of one another, denote a H atom, a halogen and $R^5$ atom, —CN, —SCN, —NCS, an alkyl or an alkoxy group having 1 to 12 C atoms or an alkenyl or an alkenyloxy group having 2 to 12 C atoms in which one or more non-adjacent $CH_2$ groups are optionally substituted by —C≡C—, —$CF_2O$—, —$OCF_2$—, —CH=CH—,

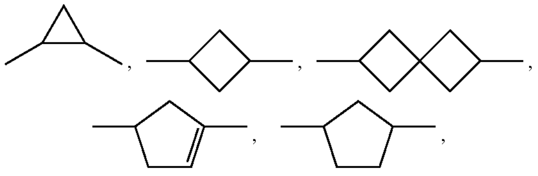

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms, in which one or more H atoms may be replaced by a halogen atom;

$R^2$ an alkyl or an alkoxy group having 1 to 12 C atoms or an alkenyl or an alkenyloxy group having 2 to 12 C atoms in which one or more non-adjacent $CH_2$ groups are optionally substituted by —C≡C—, —$CF_2O$—, —$OCF_2$—, —CH=CH—,

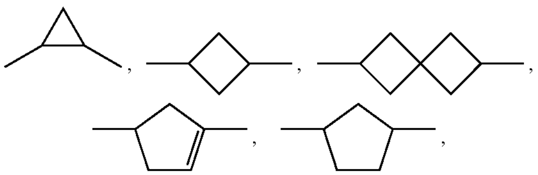

—O—, —CO—O— or —O—CO— in such a way that O atoms are not linked directly to one another, and in which one or more H atoms may be replaced by a cycloalkyl or a cycloalkoxy group having 3 to 12 C atoms;

$R^3$ and $R^6$ each, independently of one another, denote a H atom, an alkyl group having 1 to 3 C atoms or an alkenyl group having 2 to 3 C atoms in which one or more non-adjacent $CH_2$ groups are optionally substituted by —C≡C—, —$CF_2O$—, —$OCF_2$—, —CH═CH—, —O—, —CO—O— or —O—CO— in such a way that O atoms are not linked directly to one another;

$A^1$, $A^2$, each, independently of one another, denote phenylene-1,4-diyl, in $A^3$ and $A^4$ which, in addition, one or two CH groups may be replaced by N and one or more H atoms may be replaced by halogen, CN, $CH_3$, $CHF_2$, $CH_2F$, $CF_3$, $OCH_3$, $OCHF_2$ or $OCF_3$, cyclohexane-1,4-diyl, in which, in addition, one or two non-adjacent $CH_2$ groups may be replaced, independently of one another, by O and/or S and one or more H atoms may be replaced by F, cyclohexene-1,4-diyl, bicyclo-[1.1.1]pentane-1,3-diyl, bicyclo[2.2.2]octane-1,4-diyl, spiro[3.3]-heptane-2,6-diyl, tetrahydropyran-2,5-diyl or 1,3-dioxane-2,5-diyl;

$Z^1$, $Z^2$, each, independently of one another, denote —$CF_2O$—, —$OCF_2$—, $Z^3$ and $Z^4$ —$CH_2O$—, —$OCH_2$—, —CO—O—, —O—CO—, —$C_2H_4$—, —$C_2F_4$—, —$CF_2CH_2$—, —$CH_2CF_2$—, —CFHCFH—, —$CFHCH_2$—, —$CH_2CFH$—, —$CF_2CFH$—, —$CFHCF_2$—, —CH═CH—, —CF═CH—, —CH═CF—, —CF═CF—, —C≡C— or a single bond;

k, l, m, n each, independently of one another, denote 0, 1, 2 or 3.

The LC media according to the present invention are especially suitable for use in energy saving LC displays for gaming of the FFS, HB-FFS, XB-FFS and IPS mode and AR/VR headsets based on dielectrically positive liquid crystals, and polymer stabilised variants thereof.

The invention further relates to the use of a LC medium as described above and below for electro-optical purposes, in particular for the use in LC displays, shutter glasses, LC windows, 3D applications, preferably in TN, PS-TN, STN, TN-TFT, OCB, IPS, PS-IPS, FFS, HB-FFS, XB-FFS, PS-HB-FFS, PS-XB-FFS, SA-HB-FFS, SA-XB-FFS, polymer stabilised SA-HB-FFS, polymer stabilised SA-XB-FFS, positive VA and positive PS-VA displays, very preferably in FFS, HB-FFS, IPS, PS-HB-FFS and PS-IPS displays.

The invention further relates to an electro-optical LC display containing a LC medium as described above and below, in particular a TN, PS-TN, STN, TN-TFT, OCB, IPS, PS-IPS, FFS, HB-FFS, XB-FFS, PS-HB-FFS, PS-XB-FFS, SA-HB-FFS, SA-XB-FFS, polymer stabilised SA-HB-FFS, polymer stabilised SA-XB-FFS, positive VA or positive PS-VA display, preferably a FFS, HB-FFS, IPS, PS-HB-FFS or PS-IPS display.

In the present application, all atoms also include their isotopes. In some embodiments, one or more hydrogen atoms (H) may be optionally replaced by deuterium (D); a high degree of deuteration enables or simplifies analytical determination of compounds, in particular in the case of low concentrations.

In the Formulae G and U, if $R^1$, $R^2$, $R^3$, $R^4$, $R^5$ or $R^6$ denote an alkyl group and/or an alkoxy group, this may be straight-chain or branched. It is preferably straight-chain, has 2, 3, 4, 5, or 6 C atoms and preferably denotes ethyl, propyl, butyl, pentyl, hexyl, ethoxy, propoxy, butoxy, pentoxy, or hexyloxy, furthermore methyl, methoxy. $R^0$ preferably denotes straight-chain alkyl having 1 to 6 C atoms or an alkenyl group having 2 to 6 C atoms.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl.

If $R^1$, $R^2$, $R^3$, $R^4$, $R^5$ or $R^6$ denotes an alkoxy or oxaalkyl group it may also contain one or more additional oxygen atoms, provided that oxygen atoms are not linked directly to one another.

In another preferred embodiment, one or more of $R^1$, $R^2$, $R^4$ or $R^5$ are selected from the group consisting of

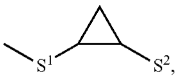, 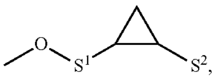,
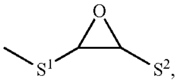, 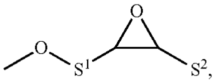,
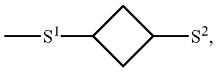, 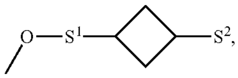,
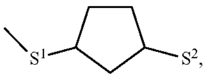, 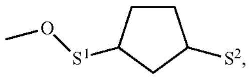, —$S^1$—F, —O—$S^1$—F, —O—$S_1$—O—$S_2$, wherein $S^1$ is $C_{1-12}$-alkylene or $C_{2-12}$-alkenylene and $S^2$ is H, $C_{1-12}$-alkyl or $C_{2-12}$-alkenyl, and very preferably one or more of $R^1$, $R^2$, $R^4$ or $R^5$ are selected from the group consisting of

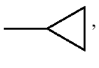, 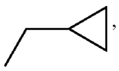, 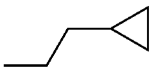,
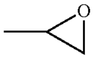, 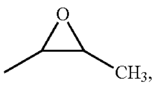, 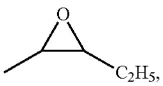,
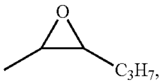, 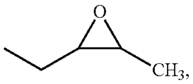,
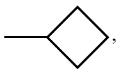, 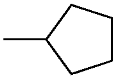, 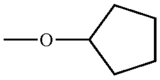,
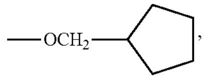, 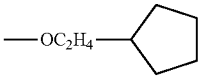, —$OCH_2OCH_3$, —$O(CH_2)_2OCH_3$, —$O(CH_2)_3OCH_3$, —$O(CH_2)_4OCH_3$, —$O(CH_2)_2F$, —$O(CH_2)_3F$, —$O(CH_2)_4F$.

If $R^1$, $R^2$, $R^3$, $R^4$, $R^5$ or $R^6$ denotes an alkenyl group, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If $R^1$, $R^2$, $R^3$, $R^4$, $R^5$ or $R^6$ denotes an alkyl or alkenyl group which is at least monosubstituted by halogen, this group is preferably straight-chain, and halogen is preferably F or Cl. In the case of polysubstitution, halogen is preferably F. The resultant groups also include perfluorinated groups. In the case of mono-substitution, the fluorine or chlorine substituent may be in any desired position, but is preferably in the ω-position.

$A^1$ and $A^2$ in Formula G and $A^3$ and $A^4$ in Formula U particularly preferably denote phenylene-1,4-diyl, which may also be mono- or polysubstituted by F, furthermore cyclohexane-1,4-diyl, cyclohexenylene-1,4-diyl, tetrahydropyran-2,5-diyl or 1,3-dioxane-2,5-diyl.

$A^1$ and $A^3$ in Formulae G and U particularly preferably denote

,
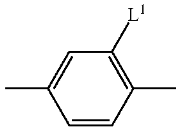
,
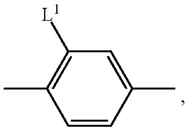
, or
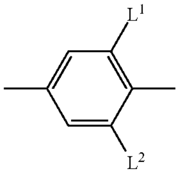
, in which $L^1$ and $L^2$ denotes halogen, $CF_3$ or CN, preferably F;

$A^1$ and $A^3$ are preferably unsubstituted 1,4-phenylene.

$Z^1$ and $Z^2$ in Formula G and $Z^3$ and $Z^4$ in Formula U particularly preferably denote —$CF_2O$—, —$OCF_2$— or a single bond, wherein a single bond is mostly preferred.

Preference is furthermore given to compounds of the Formulae G and U in which $R^1$, $R^4$ and $R^5$ each, independently of one another, denote H or alkyl, alkenyl or alkynyl having up to 8, preferably up to 5 C atoms, each of which is optionally substituted by halogen, in particular by F.

Particularly preferred groups $R^1$, $R^4$ and $R^5$ in Formulae G and U denote alkyl, alkenyl, alkynyl or alkoxy having up to 12, preferably up to 8 C atoms, each of which is optionally substituted by halogen, in particular by F, particularly preferred are H, F, alkyl, alkenyl or alkynyl having up to 8 C atoms. Preferably, at least one of the groups $R^1$ and $R^2$ and $R^4$ and $R^5$, respectively, is not H, particularly preferably none of the groups $R^1$, $R^2$, $R^4$ and $R^5$ is represented by a H atom. $R^1$ and $R^4$ are very particularly preferably equal to alkyl. Very particularly preferably, $R^1$ and $R^4$ are alkyl. $R^1$, $R^2$, $R^4$ and $R^5$ each, independently of one another, very particularly preferably denote unbranched alkyl having 1 to 5 C atoms. If $R^1$, $R^2$, $R^4$ and $R^5$ denote substituted alkyl, alkoxy, alkenyl or alkynyl, the total number of C atoms in the two groups $R^1$ and $R^2$ or $R^4$ and $R^5$, respectively, is preferably less than 10.

Preferred groups $R^3$ and $R^6$ in Formulae G and U denote an H atom, or alkyl or alkenyl group having up to 3 C atoms. Very particularly preferably, $R^3$ and $R^6$ are a methyl group or an H atom.

Preferred alkyl groups are, for example, methyl, ethyl, n-propyl, n-butyl, n-pentyl, n-hexyl, n-heptyl and n-octyl.

Preferred alkenyl groups are, for example, ethenyl, propenyl, butenyl and pentenyl.

Preferred alkynyl groups are, for example, ethynyl, propynyl, butynyl, pentynyl, hexynyl, heptynyl and octynyl.

Preferred alkoxy groups are, for example, methoxy, ethoxy, n-propoxy, n-butoxy, n-pentoxy, n-hexoxy, n-heptoxy, n-octoxy.

Halogen preferably denotes F or Cl, F being mostly preferred.

Particularly preferred compounds of the Formulae G and U are those selected from the following sub-formulae:

G-10

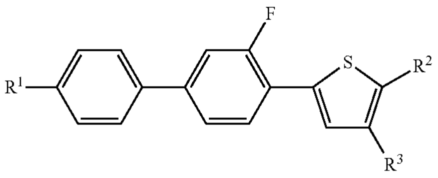

G-2

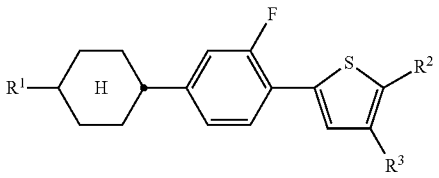

G-3

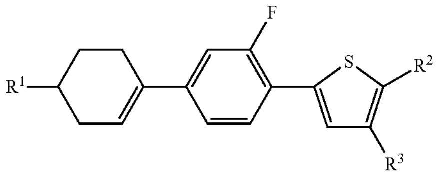

G-4

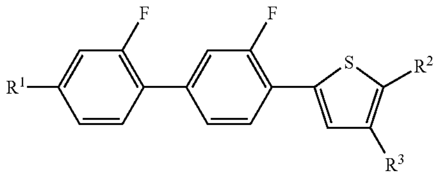

G-5

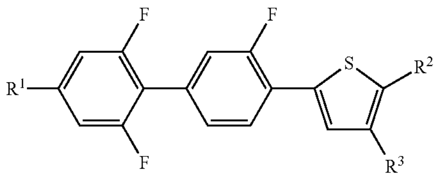

G-6

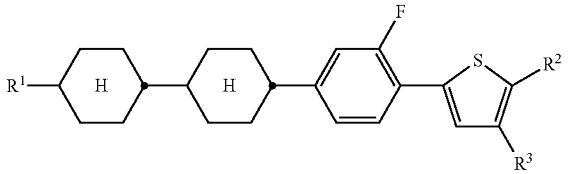

G-7

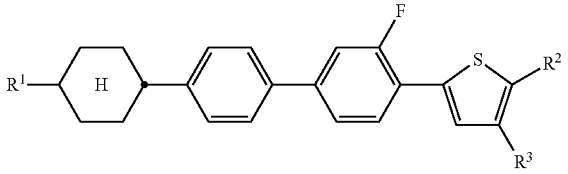

G-8

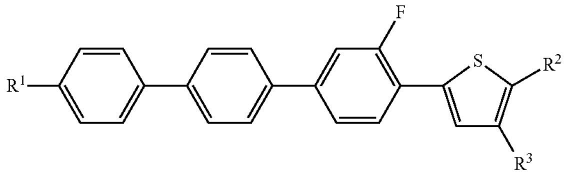

-continued
G-9
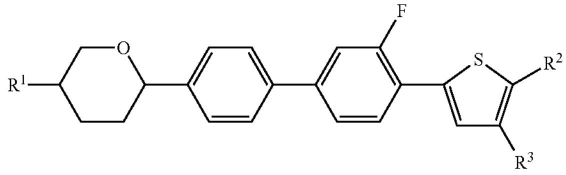
G-10
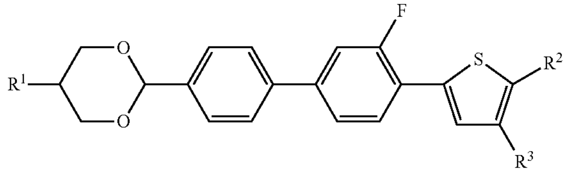
G-11
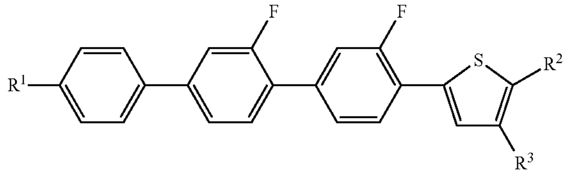
G-12
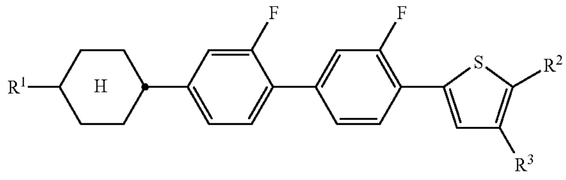
U-1
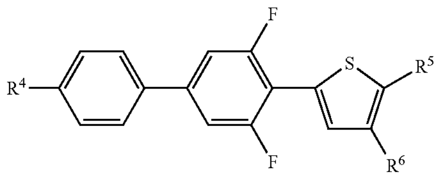
U-2
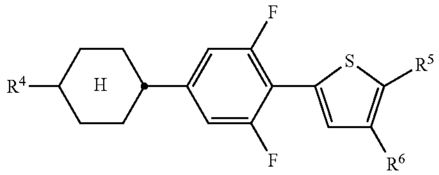
U-3
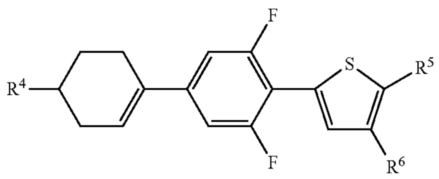
U-4
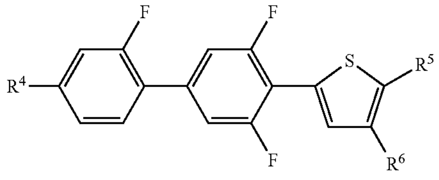
-continued
U-5
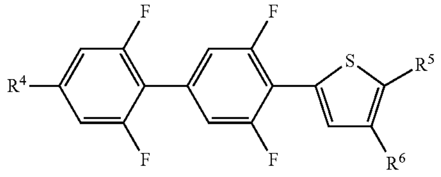
U-6
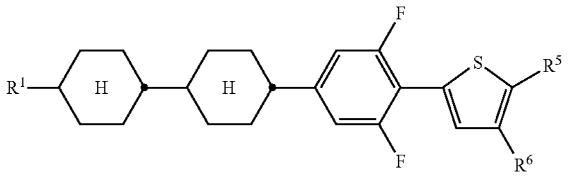
U-7
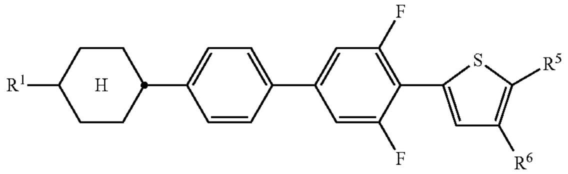
U-8
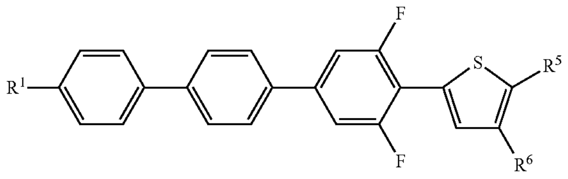
U-9
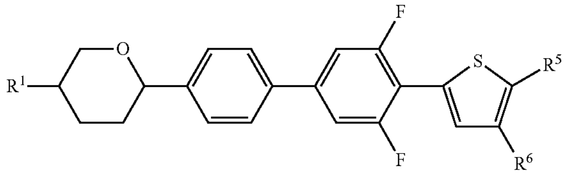
U-10
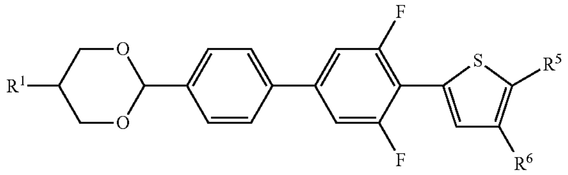
U-11
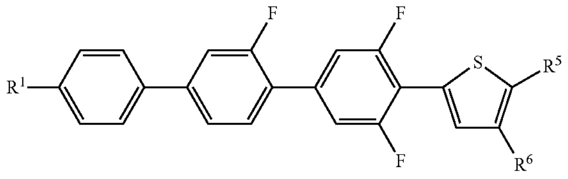
U-12
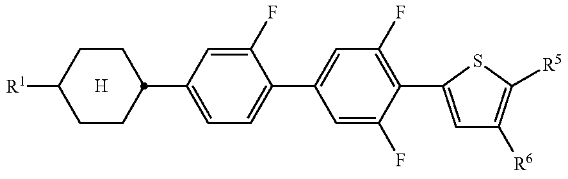

in which $R^1$, $R^2$, $R^3$, $R^4$, $R^5$ and $R^6$ have the meanings indicated in general Formulae G and U. In a particularly preferred embodiment, the compounds of Formulae G and U are selected from the structures G-1 and U-1, wherein a combination of the compounds described by formulae G-1 and U-1 is mostly preferred.

Particularly preferred compounds of the general Formulae G and U are as follows:

G-1-1

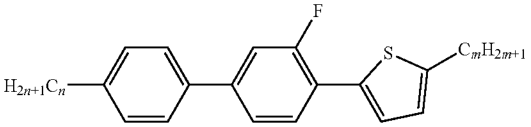

G-1-2

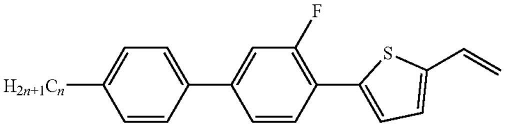

G-1-1a

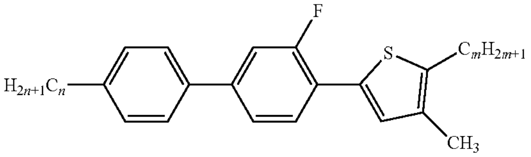

G-1-2a

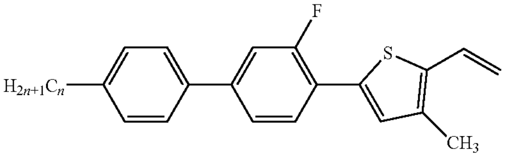

G-4-1

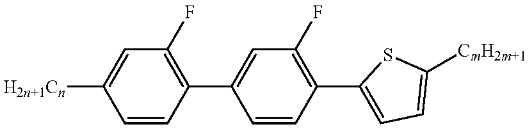

G-4-1a

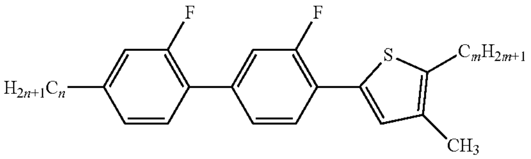

U-1-1

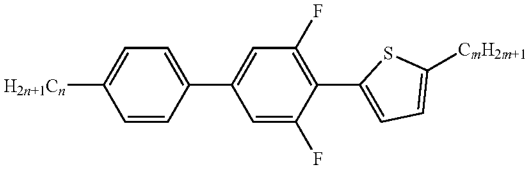

-continued

U-1-2

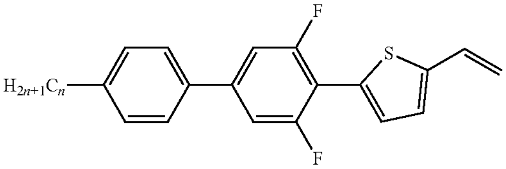

U-1-3

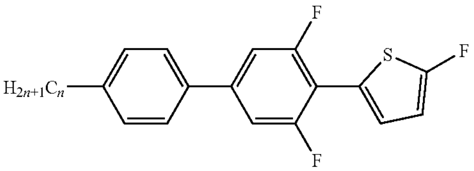

U-1-4

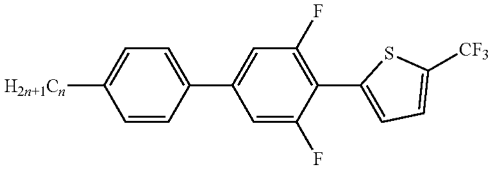

U-1-5

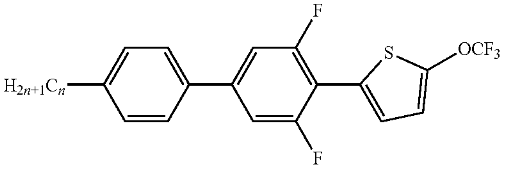

U-1-1a

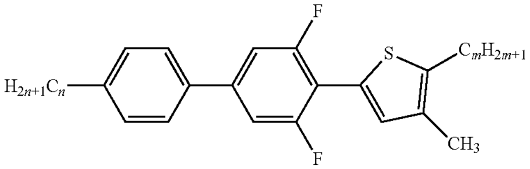

U-1-2a

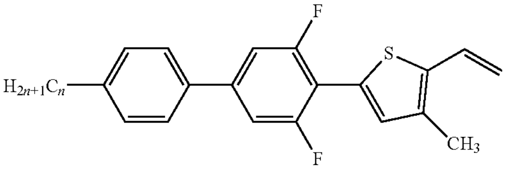

U-1-3a

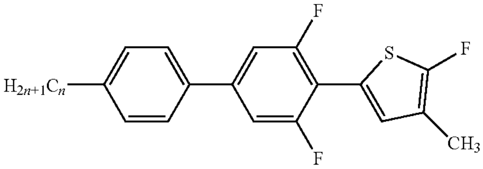

U-1-4a

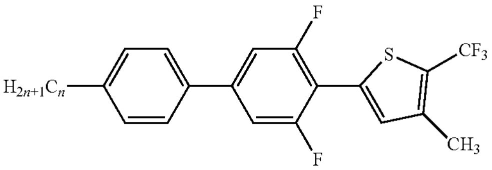

-continued
U-1-5a
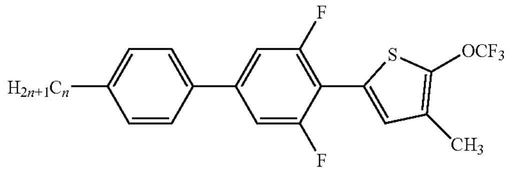
U-2-1
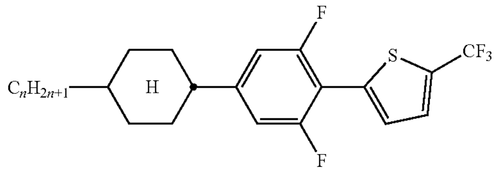
U-2-1a
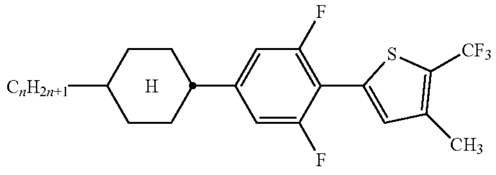
U-3-1
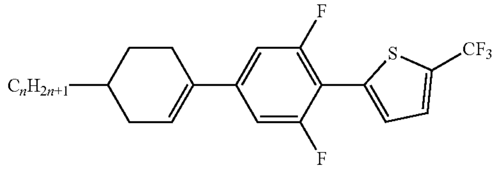
U-3-1a
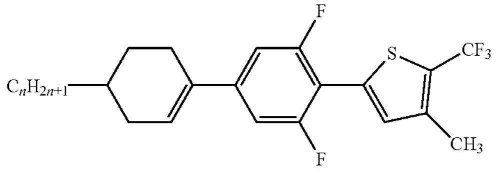
U-4-1
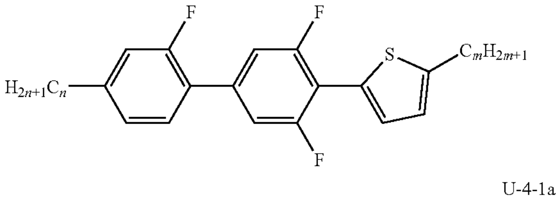
U-4-1a
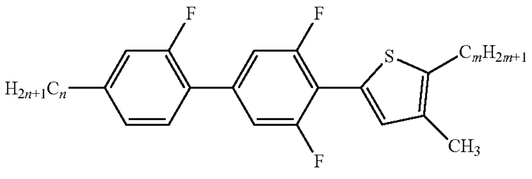
wherein n and m each, independently of one another, denote 0, 1, 2, 3, 4, 5, 6, 7, 8, 9, 10, 11 or 12.
Mostly preferred compounds of Formula G include, in particular, one or more of the following:
G-1-3
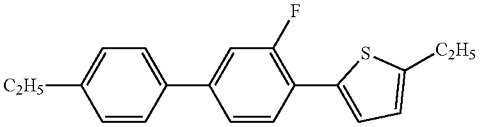
G-1-3a
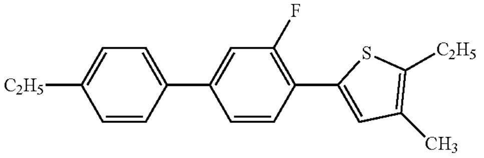
G-1-4
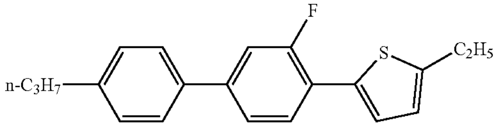
G-1-4a
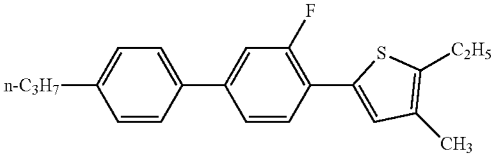
G-1-5
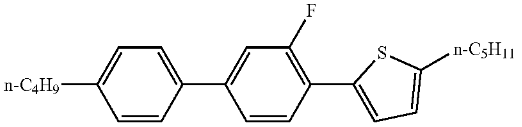
G-1-6
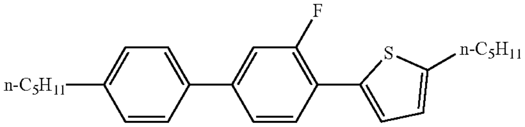
G-1-7
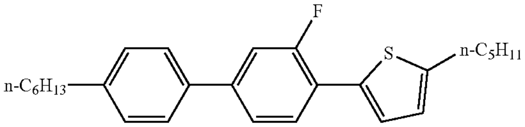
G-1-8
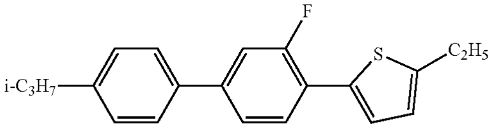
G-1-9
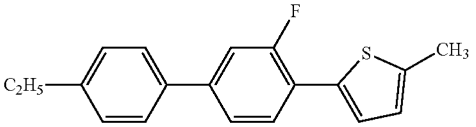
G-1-9a
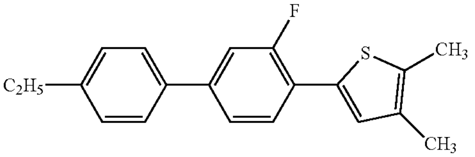

-continued
U-1-6
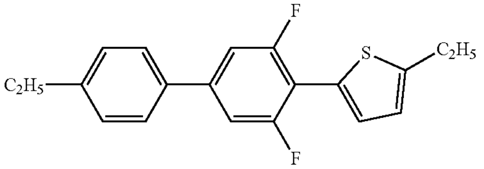
U-1-6a
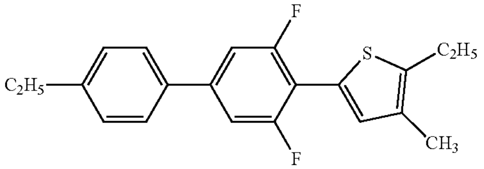
U-1-7
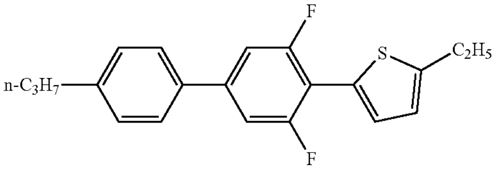
U-1-7a
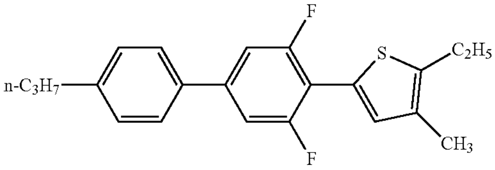
U-1-8
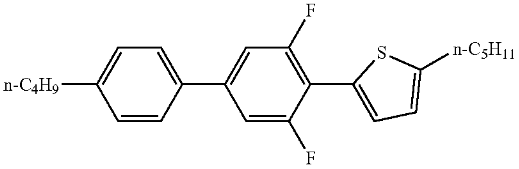
U-1-9
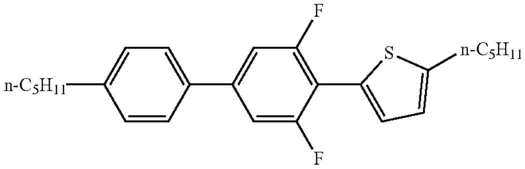
U-1-10
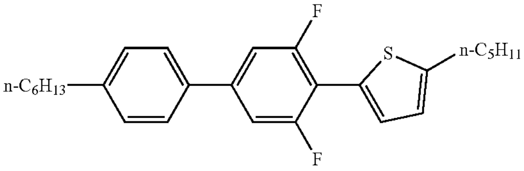
U-1-11
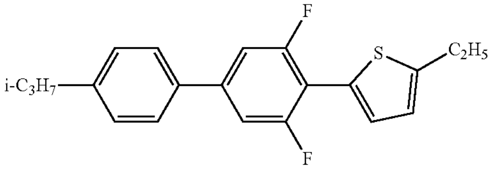
In a further preferred embodiment, the following compounds of Formulae G can be used:
G-1-9
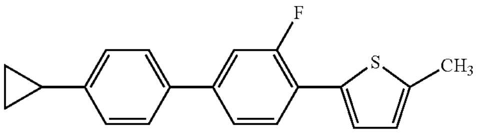
G-1-10
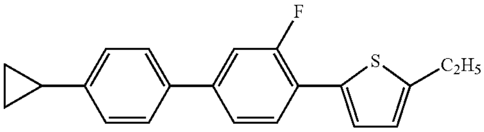
G-1-11
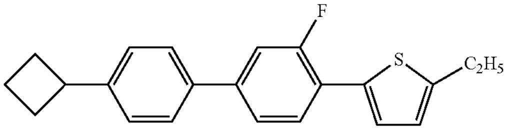
G-1-12
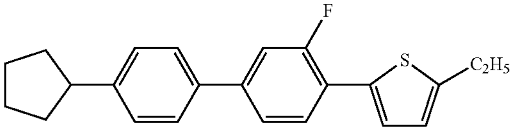
G-1-13
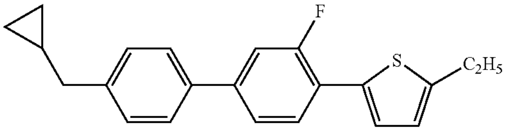
G-1-14
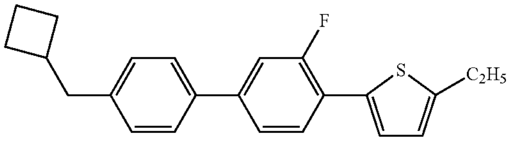
G-1-15
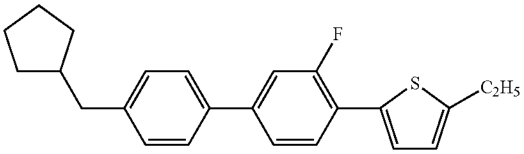
G-1-16
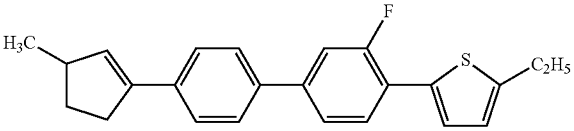
G-1-17
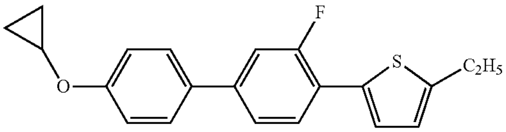

-continued
G-1-18
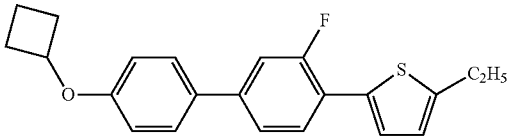
G-1-19
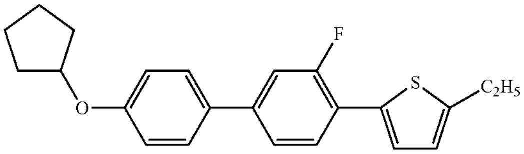
G-1-20
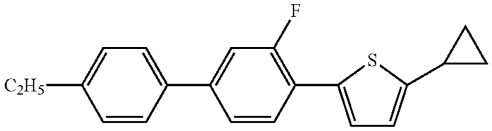
G-1-21
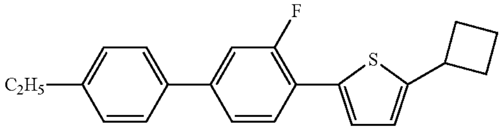
G-1-22
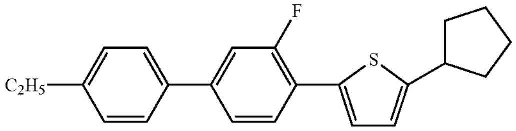
G-1-23
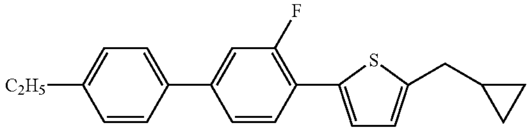
G-1-24
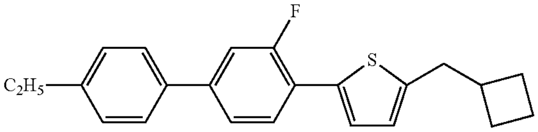
G-1-25
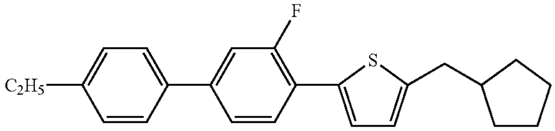
G-1-26
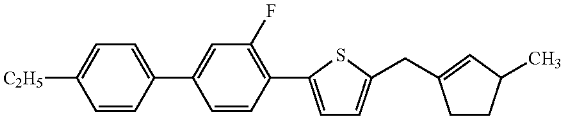
-continued
G-1-27
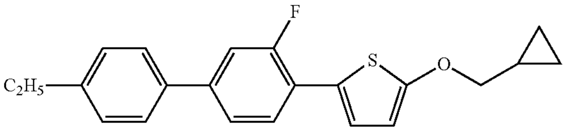
G-1-28
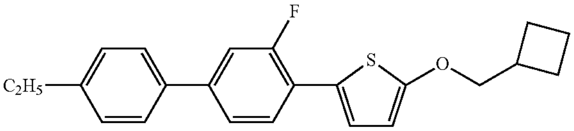
G-1-29
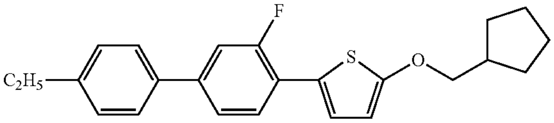
G-1-30
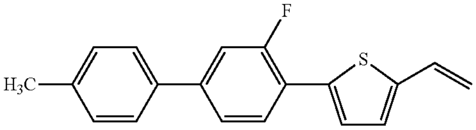
G-1-31
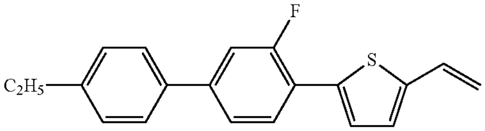
G-1-32
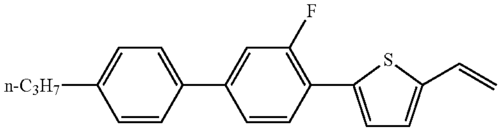
G-1-33
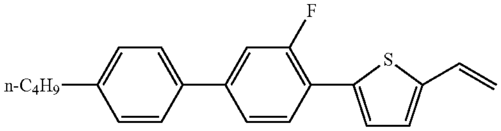
G-1-34
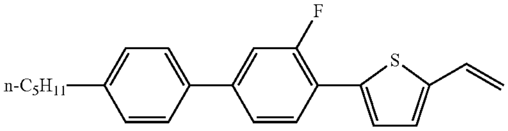
G-1-35
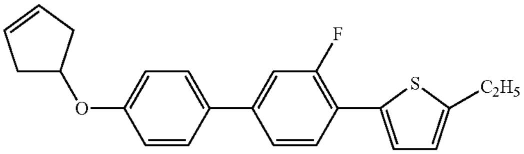
In a further preferred embodiment, the following compounds of Formulae U can be used:

U-1-12
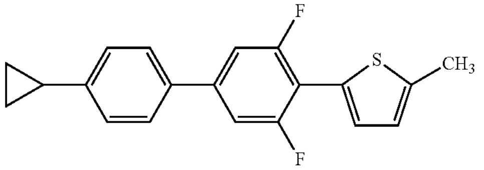
U-1-13
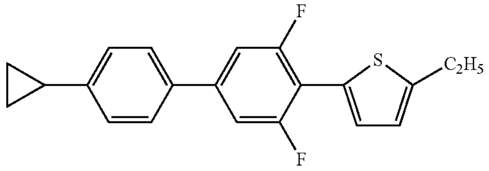
U-1-14
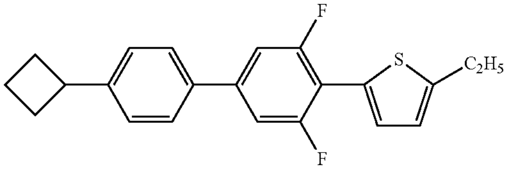
U-1-15
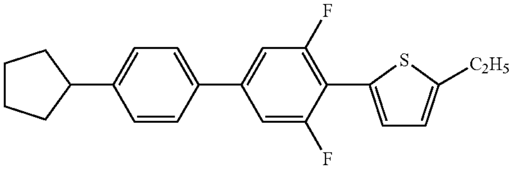
U-1-16
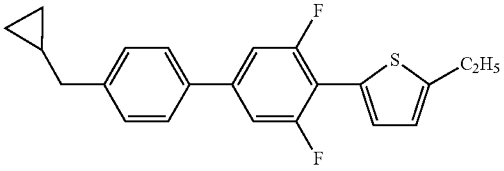
U-1-17
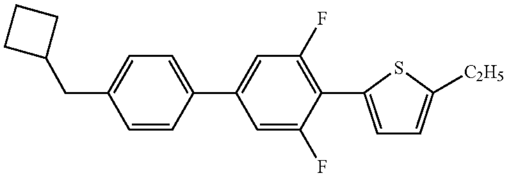
U-1-18
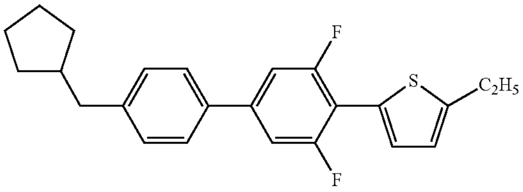
U-1-19
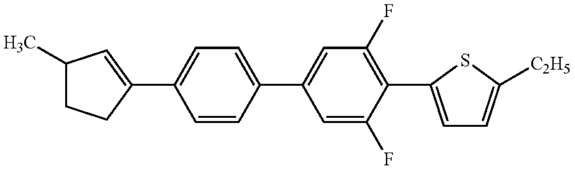
-continued
U-1-20
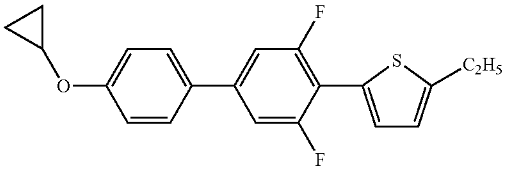
U-1-21
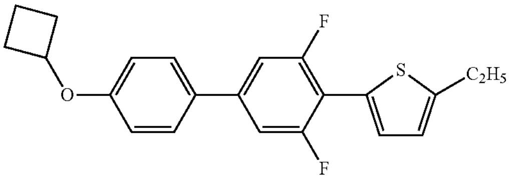
U-1-22
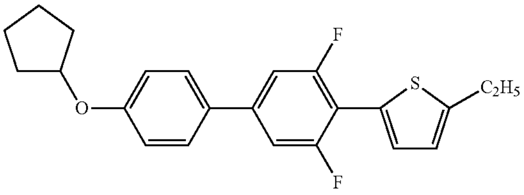
U-1-23
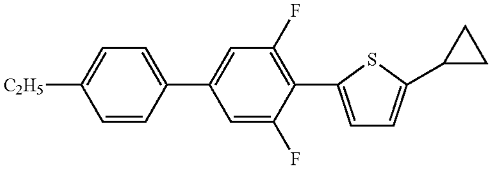
U-1-24
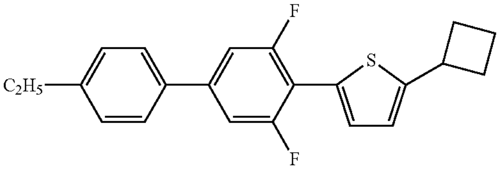
U-1-25
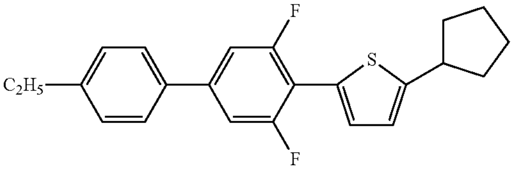
U-1-26
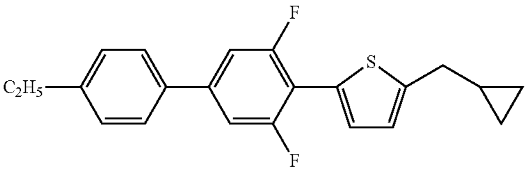
U-1-27
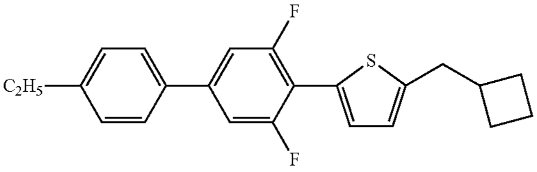

-continued

U-1-28

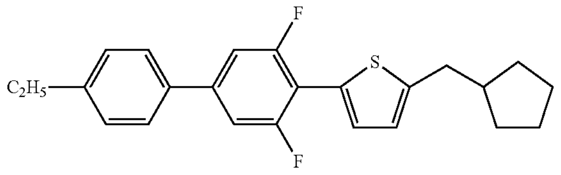

U-1-29

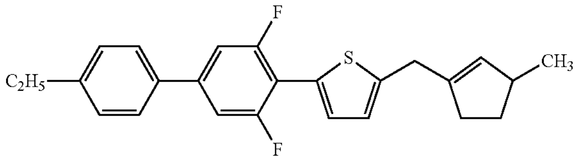

U-1-30

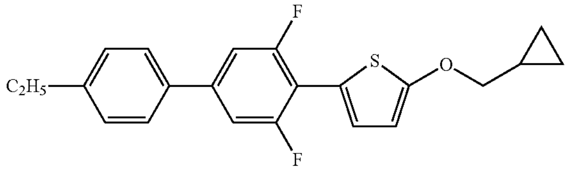

U-1-31

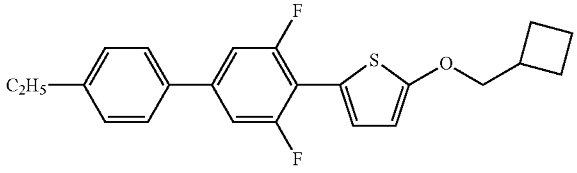

U-1-32

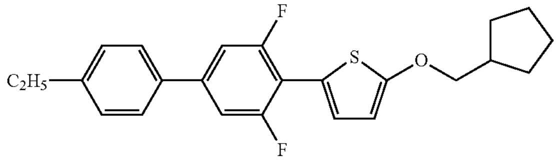

U-1-33

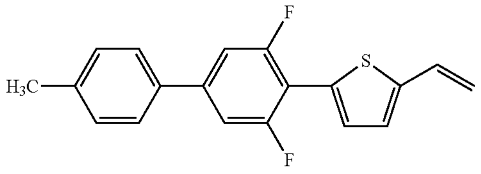

U-1-34

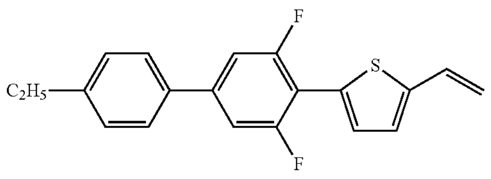

U-1-35

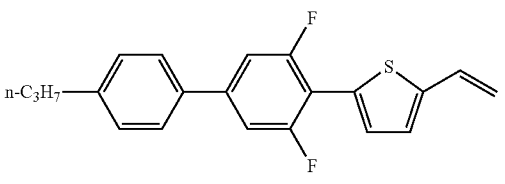

-continued

U-1-36

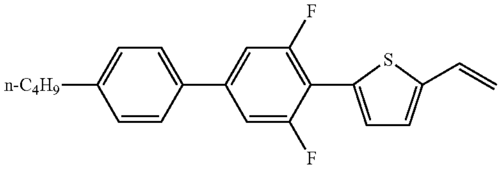

U-1-37

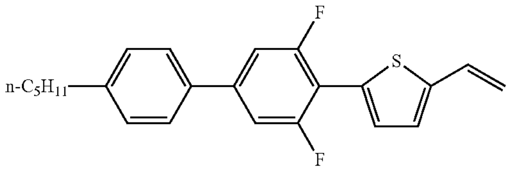

The compounds of the Formulae G and U can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

The proportion of compounds of the Formula G $\omega_G$ or, preferably, their subformulae G-1-1, in the LC medium is preferably from 0.5 to 20%, very preferably from 1 to 15%, most preferably from 2 to 10% by weight. The proportion of compounds of the Formula U $\omega_U$ or, preferably, their subformulae U-1-1, in the LC medium is preferably from 0.5 to 20%, very preferably from 1 to 15%, most preferably from 2 to 10% by weight. Furthermore, the proportion of compounds of the Formula G in the LC medium $\omega_G$ is typically higher than the proportion the compounds of the Formula U in the LC medium $\omega_U$. In a particularly preferred embodiment, $\omega_G \geq 1.5*\omega_U$, even more preferably, $\omega_G \geq 2.0*\omega_U$. The cumulative proportion of compounds of the Formulae G and U ($\omega_G+\omega_U$) in the LC medium is preferably from 2.0 to 30%, very preferably from 2 to 30%, most preferably from 5 to 20% by weight.

Further Components

In one preferred embodiment, the LC medium may additionally comprise one or more compounds selected from the following Formulae II and III:

II

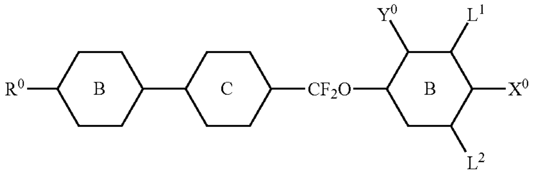

III

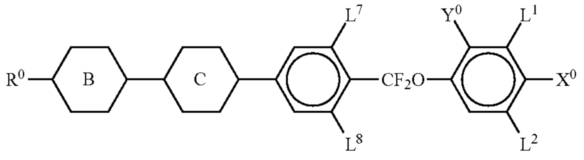

wherein the individual substituents, independently of each other and on each occurrence identically or differently, have the following meanings:

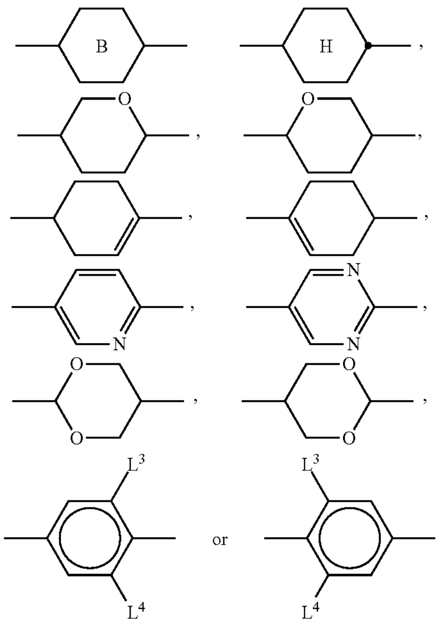

or

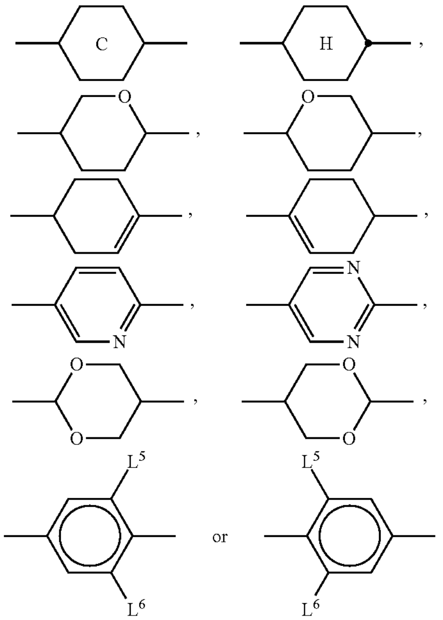

or $R^0$ one of the meanings given for $R^1$ in Formula G, $X^0$ independently of one another F, Cl, a halogenated alkyl group, a halogenated alkenyl group, a halogenated alkoxy group or a halogenated alkenyloxy group having up to 6 C atoms, $L^{1-8}$ independently of one another H, F or Cl, and $Y^0$ H or $CH_3$.

Preferred compounds of the Formula II and III are those wherein $Y^0$ is H.

Further preferred compounds of the Formula II and III are those wherein $R^0$ denotes alkyl having 1 to 6 C atoms or cycloalkyl having 3 to 6 C atoms, very preferably ethyl, propyl, butyl or pentyl and $X^0$ denotes F, $CF_3$ or $OCF_3$, furthermore $OCF{=}CF_2$, $OCHFCF_3$ or Cl, very preferably F.

In a preferred embodiment, the LC medium comprises one or more compounds of the Formula II selected from the following subformulae:

II-1

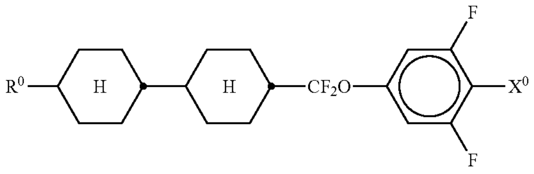

II-2

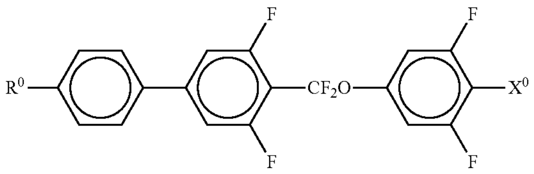

II-3

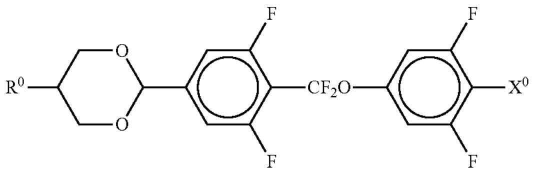

II-4

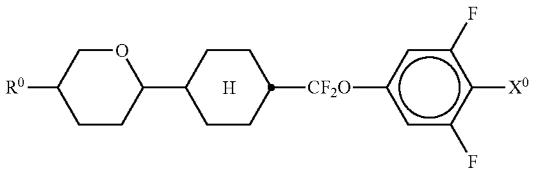

II-5

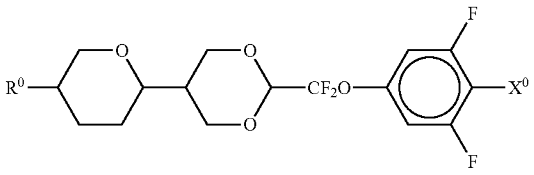

II-6

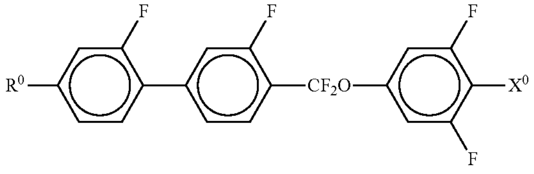

II-7

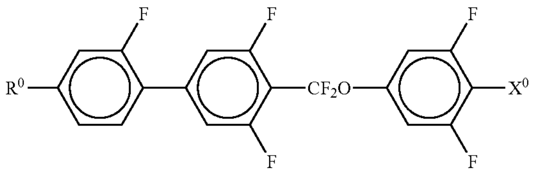

in which $R^0$ and $X^0$ have the meanings given in the Formula II.

Preferred compounds are those of the Formula II-1, II-2 and II-3, very preferred those of the Formula II-1 and II-2.

In the compounds of the Formulae II-1 to II-7 $R^0$ preferably denotes $R^0$ denotes alkyl having 1 to 6 C atoms or cycloalkyl having 3 to 6 C atoms, very preferably ethyl, propyl, butyl or pentyl and $X^0$ denotes F, $CF_3$ or $OCF_3$, furthermore $OCF{=}CF_2$, $OCHFCF_3$ or Cl, very preferably F.

In one embodiment, the LC medium contains one or more compounds of the Formula II or their subformulae as described above and below, wherein $Y^0$ is $CH_3$. Very preferably, the LC medium according to this preferred embodiment comprises one or more compounds of the Formula II selected from the following subformulae:

IIA-1

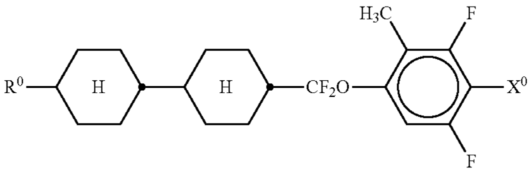

IIA-2

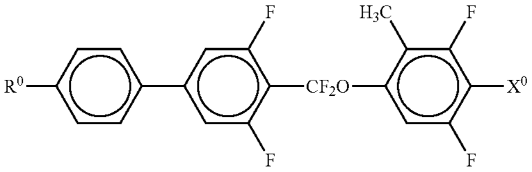

IIA-3

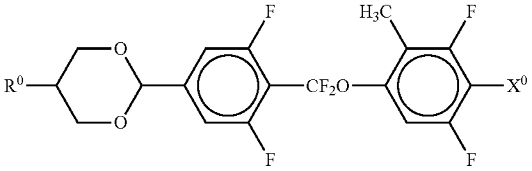

IIA-4

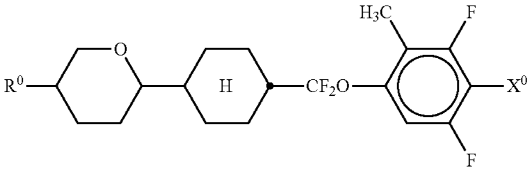

IIA-5

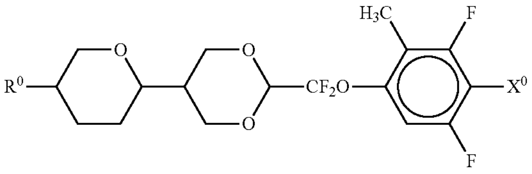

IIA-6

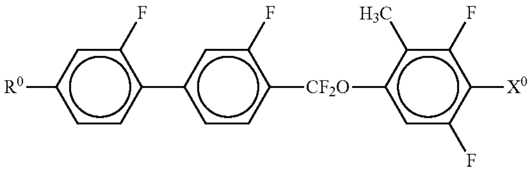

IIA-7

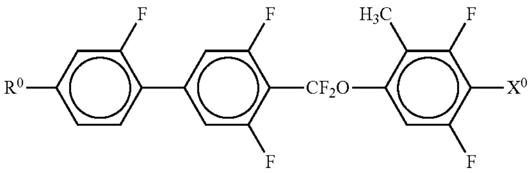

in which $R^0$ and $X^0$ have the meanings given in the Formula II.

Preferred compounds are those of the Formula IIA-1, IIA-2 and IIA-3, very preferred are those of Formula IIA-1 and IIA-2.

In the compounds of the Formulae IIA-1 to IIA-7 $R^0$ preferably denotes alkyl having 1 to 6 C atoms or cycloalkyl having 3 to 6 C atoms, very preferably ethyl, propyl, butyl or pentyl and $X^0$ denotes F, $CF_3$ or $OCF_3$, furthermore $OCF{=}CF_2$, $OCHFCF_3$ or Cl, very preferably F.

The proportion of the compounds of the Formula II in the LC medium is typically from 0 to 20%, very preferably from 1 to 15%, most preferably from 2 to 10% by weight.

In a further preferred embodiment, the LC medium comprises one or more compounds of the Formula III selected from the following subformulae:

III-1

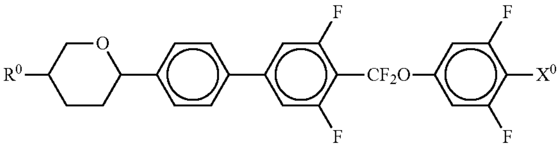

III-2

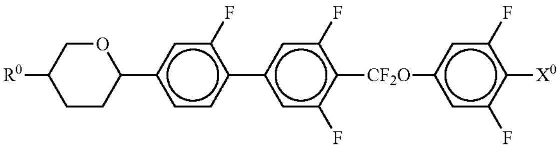

III-3

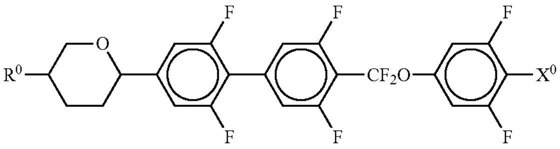

III-4

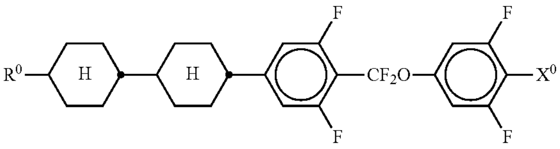

III-5

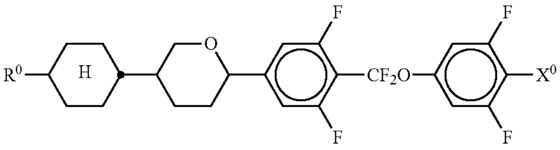

III-6

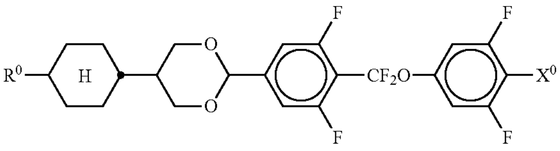

III-7

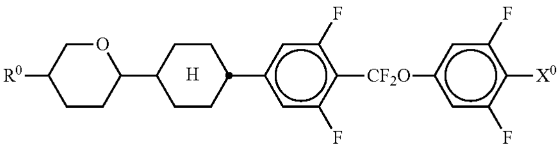

-continued

III-8

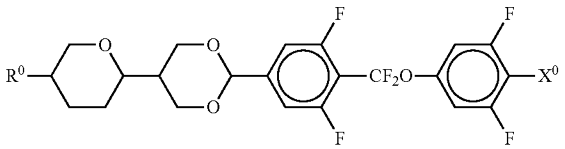

III-9

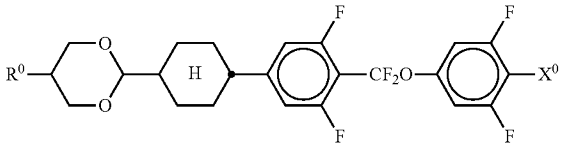

III-10

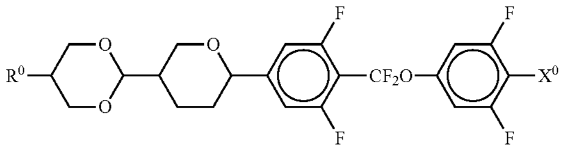

III-11

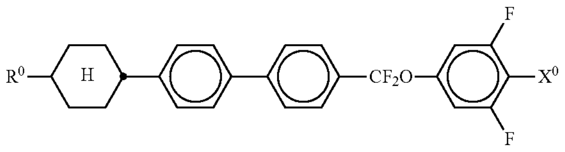

III-12

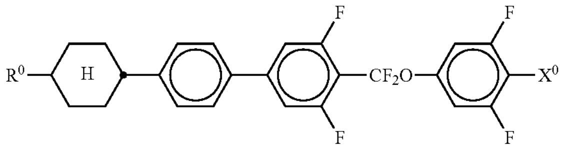

III-13

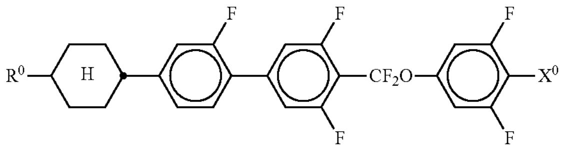

III-14

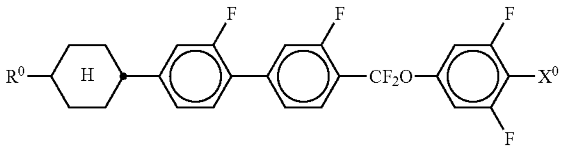

III-15

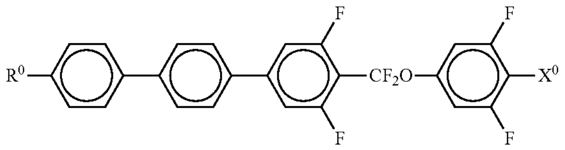

III-16

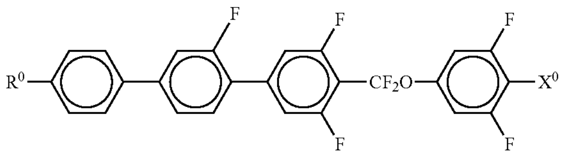

-continued

III-17

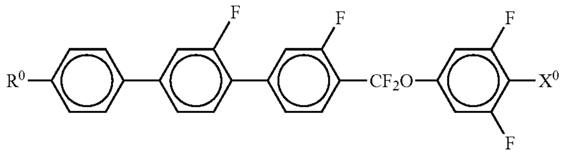

III-18

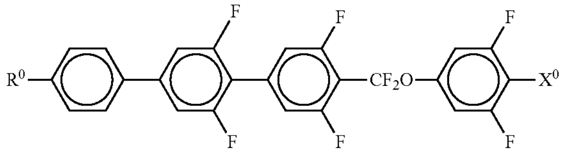

III-19

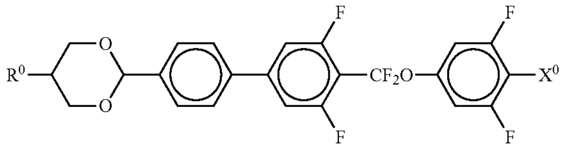

III-20

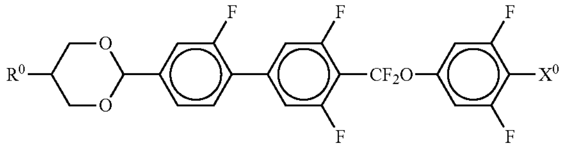

III-21

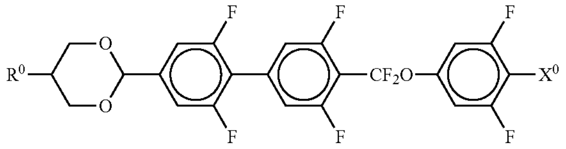

III-22

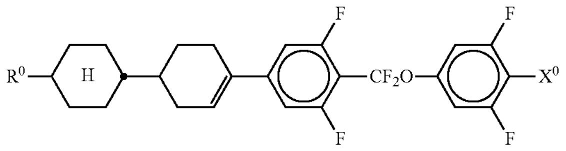

in which $R^0$ and $X^0$ have the meanings given in the Formula II.

Preferred compounds are those of the Formula III-1, III-4, III-6, III-16, III-19 and III-20.

In the compounds of the Formulae III-1 to III-21 $R^0$ denotes alkyl having 1 to 6 C atoms or cycloalkyl having 3 to 6 C atoms, very preferably ethyl, propyl, butyl or pentyl and $X^0$ denotes F, $CF_3$ or $OCF_3$, furthermore $OCF{=}CF_2$, $OCHFCF_3$ or Cl, very preferably F, and $Y^0$ preferably denotes H.

The LC medium may contain one or more compounds of the Formula III or their subformulae as described above and below wherein $Y^0$ is $CH_3$. Very preferably, the medium according to this preferred embodiment comprises one or more compounds of the Formula III selected from the following subformulae:

IIIA-1
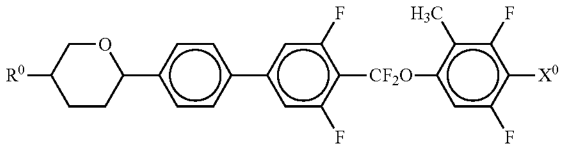
IIIA-2
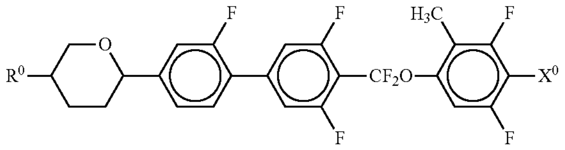
IIIA-3
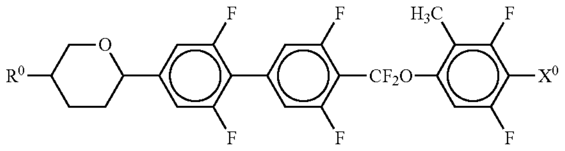
IIIA-4
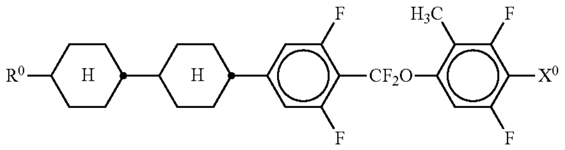
IIIA-5
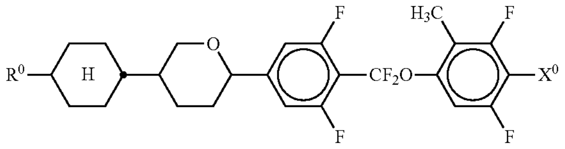
IIIA-6
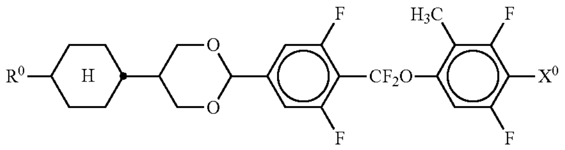
IIIA-7
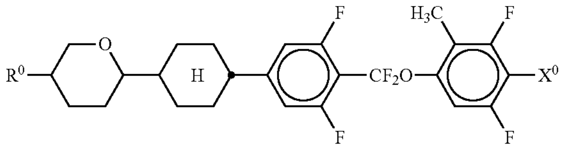
IIIA-8
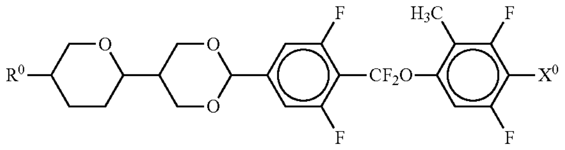
IIIA-9
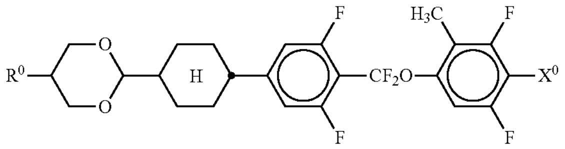
-continued
IIIA-10
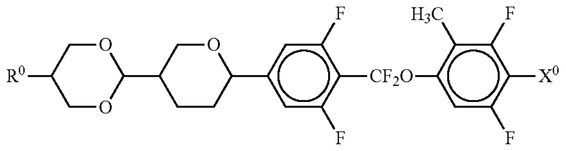
IIIA-11
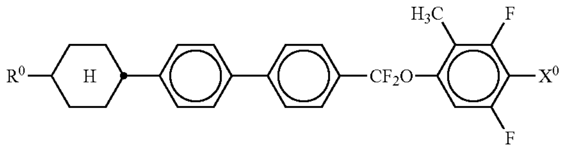
IIIA-12
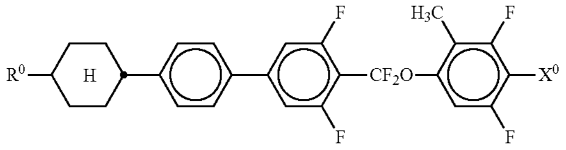
IIIA-13
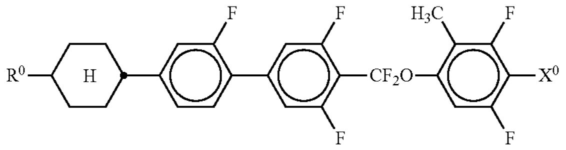
IIIA-14
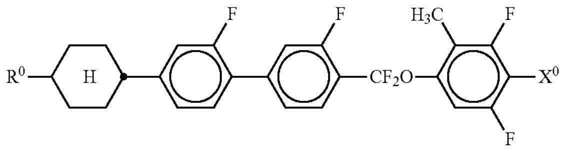
IIIA-15
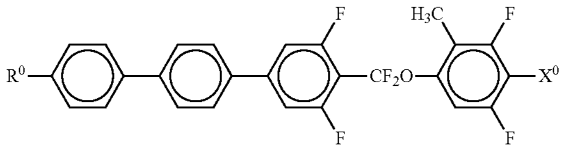
IIIA-16
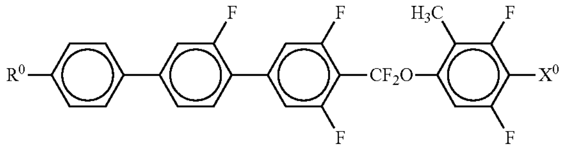
IIIA-17
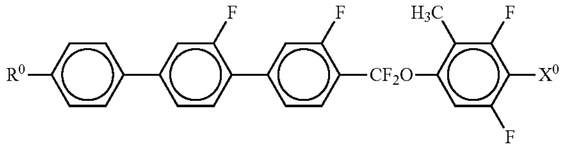
IIIA-18
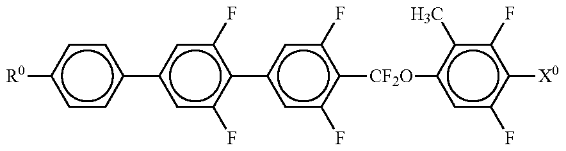

-continued

IIIA-19

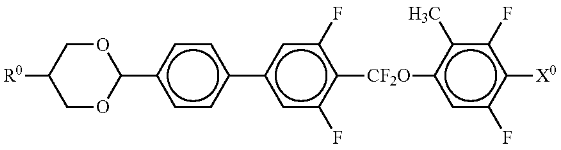

IIIA-20

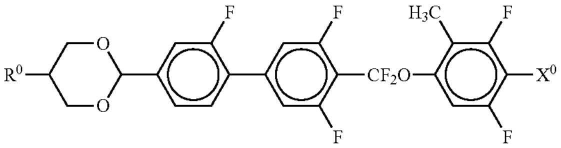

IIIA-21

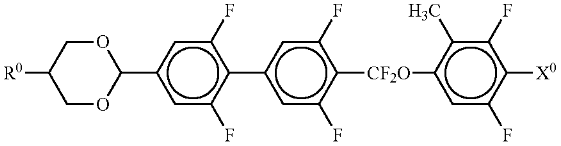

in which $R^0$ and $X^0$ have the meanings given in the Formula III.

Preferred compounds are those of the Formula IIIA-1, IIIA-4, IIIA-6, IIIA-16, IIIA-19 and IIIA-20.

In the compounds of the Formulae IIIA-1 to IIIA-21 $R^0$ denotes alkyl having 1 to 6 C atoms or cycloalkyl having 3 to 6 C atoms, very preferably ethyl, propyl, butyl or pentyl and $X^0$ denotes F, $CF_3$ or $OCF_3$, furthermore $OCF{=}CF_2$, $OCHFCF_3$ or Cl, very preferably F.

The proportion of the compounds of the Formula III in the LC medium is preferably from 5 to 60%, very preferably from 10 to 50%, most preferably from 20 to 40% by weight.

In a further preferred embodiment, the LC medium may additionally comprise one or more compounds selected from the following formulae:

IV

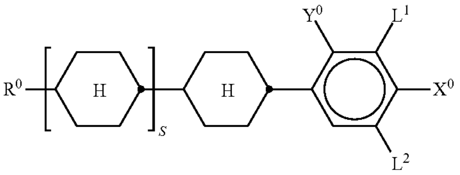

V

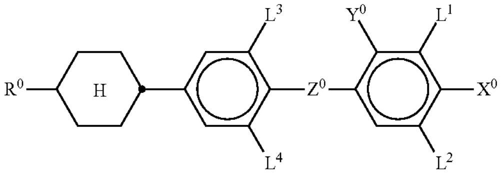

VI

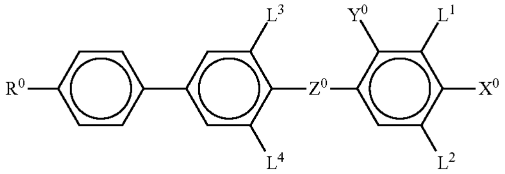

-continued

VII

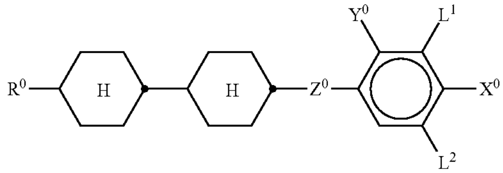

VIII

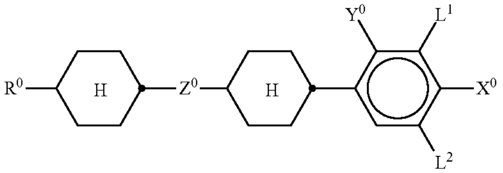

in which $R^0$, $X^0$, $L^{1-4}$ and $Y^0$ have the meanings indicated in the Formulae II and III, $Z^0$ denotes $-C_2H_4-$, $-(CH_2)_4-$, $-CH{=}CH-$, $-CF{=}CF-$, $-C_2F_4-$, $-CH_2CF_2-$, $-CF_2CH_2-$, $-CH_2O-$, $-OCH_2-$, $-COO-$, $-CF_2O-$, or $-OCF_2-$, in the Formulae V and VI also a single bond; and s denotes 0 or 1.

The compounds of the Formula IV are preferably selected from the following formulae:

IVa

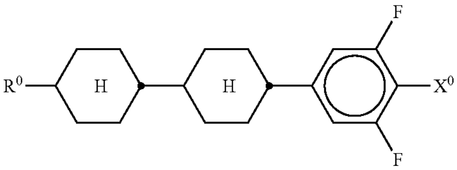

IVb

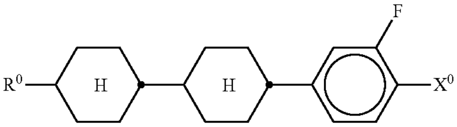

IVc

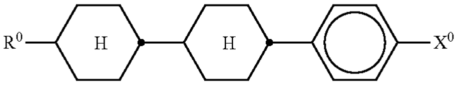

IVd

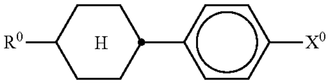

in which $R^0$ and $X^0$ have the meanings indicated in the Formulae II and III.

$R^0$ preferably denotes alkyl having 1 to 6 C atoms or cycloalkyl having 3 to 6 C atoms, very preferably ethyl, propyl, butyl or pentyl. $X^0$ preferably denotes F or $OCF_3$, furthermore $OCF{=}CF_2$, $OCHFCF_3$ or Cl.

The compounds of the Formula IVa are preferably represented by the following subformula:

IVa-1

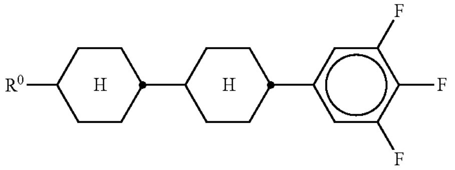

IVb-1

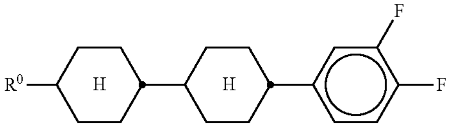

The compounds of the Formula IVb are preferably represented by the following formula:

IVb-1

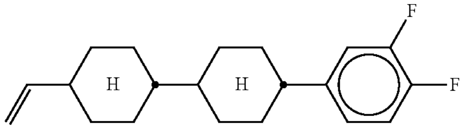

IVb-2

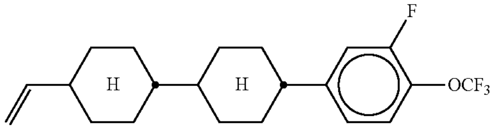

The compounds of the Formula IVc are preferably represented by the following subformula:

IVc-1

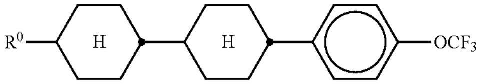

in which $R^0$ has the meanings indicated in the Formula II and is preferably alkyl having 1 to 6 C atoms or cycloalkyl having 3 to 6 C atoms, very preferably ethyl, propyl, butyl or pentyl.

The compound(s) of the Formula IVc, in particular of the Formula IVc-1, is (are) preferably employed in the LC media according to the invention in amounts of 1-20% by weight, particularly preferably 2-15% by weight.

The compounds of the Formula V are preferably selected from the following subformulae:

Va

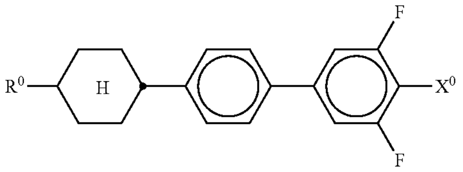

-continued

Vb

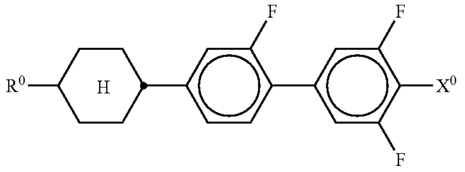

Vc

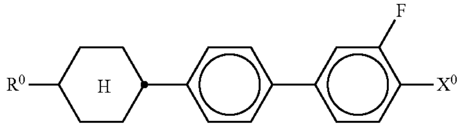

Vd

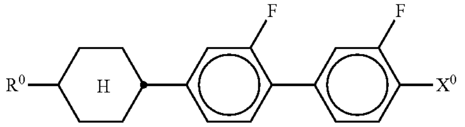

Ve

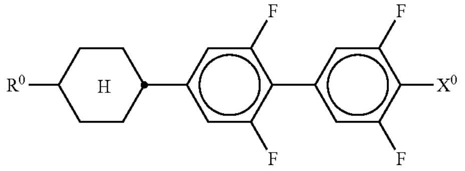

Vf

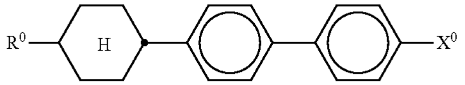

Vg

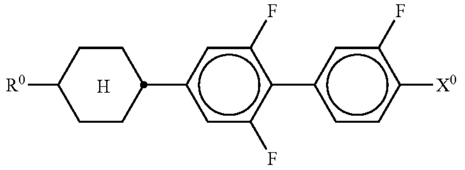

Vh

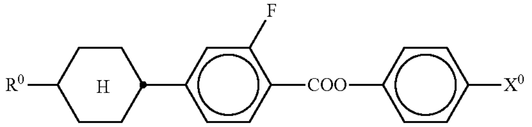

in which $R^0$ and $X^0$ have the meanings indicated in the Formula II.

$R^0$ preferably denotes alkyl having 1 to 6 C atoms or cycloalkyl having 3 to 6 C atoms, very preferably ethyl, propyl, butyl or pentyl. $X^0$ preferably denotes F and $OCF_3$, furthermore $OCHF_2$, $CF_3$, $OCF{=}CF_2$, $OCHFCF_3$ and $OCH{=}CF_2$.

The compounds of the Formula VI are preferably selected from the following subformulae:

VIa

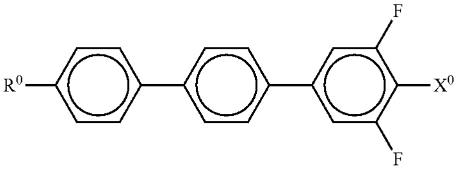

-continued

VIb

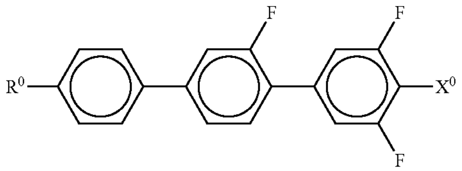

VIc

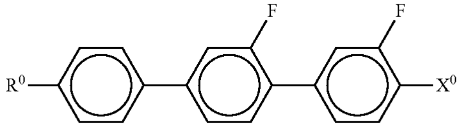

VId

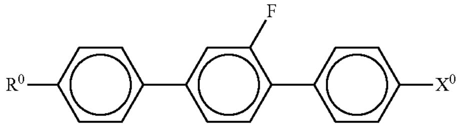

VIe

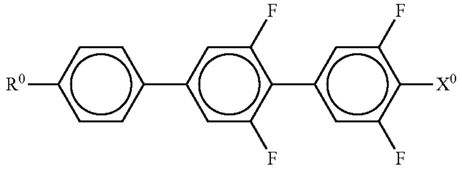

in which $R^0$ and $X^0$ have the meanings indicated in the Formula II.

$R^0$ preferably denotes alkyl having 1 to 6 C atoms or cycloalkyl having 3 to 6 C atoms, very preferably ethyl, propyl, butyl or pentyl. $X^0$ preferably denotes F, furthermore $OCF_3$, $CF_3$, $CF{=}CF_2$, $OCHF_2$, $OCHFCF_3$ and $OCH{=}CF_2$;

The compounds of the Formula VII are preferably selected from the following subformulae:

VIIa

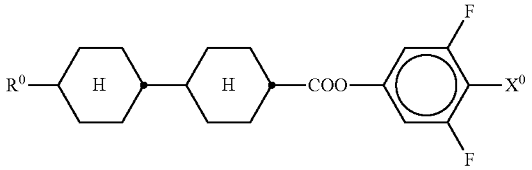

VIIb

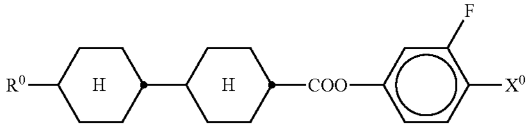

in which $R^0$ and $X^0$ have the meanings indicated in the Formula II.

$R^0$ preferably denotes alkyl having 1 to 6 C atoms or cycloalkyl having 3 to 6 C atoms, very preferably ethyl, propyl, butyl or pentyl. $X^0$ preferably denotes F, furthermore $OCF_3$, $OCHF_2$, $OCHFCF_3$ and $OCH{=}CF_2$.

In some embodiments, the LC medium additionally comprises one or more compounds selected from the following formulae:

XVIII

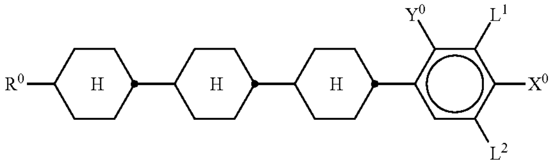

XIX

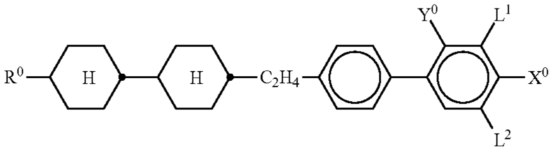

XX

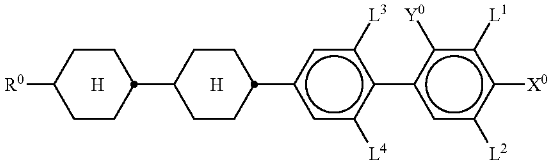

XXI

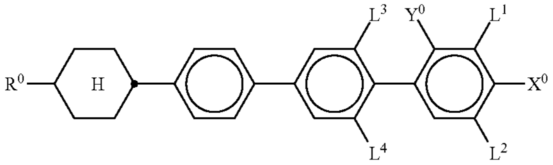

XXII

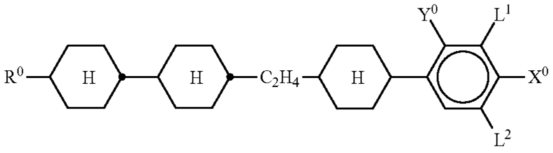

XXIII

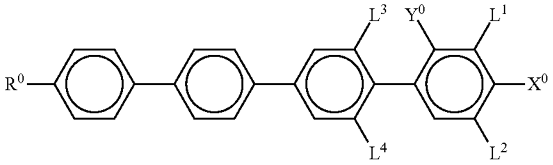

in which $R^0$ and $X^0$ each, independently of one another, have one of the meanings indicated in the Formula II, $L^{1-4}$ each, independently of one another, denote H or F, $Y^0$ denotes H or $CH_3$, preferably H, $X^0$ is preferably F, Cl, $CF_3$, $OCF_3$ or $OCHF_2$, $OCF{=}CF_2$, $OCHFCF_3$ $R^0$ preferably denotes alkyl, alkoxy, oxaalkyl, cycloalkyl, fluoroalkyl or alkenyl, each having up to 6 C atoms.

Very preferably, the LC medium according to the invention comprises one or more compounds of the Formula XXa:

XXa

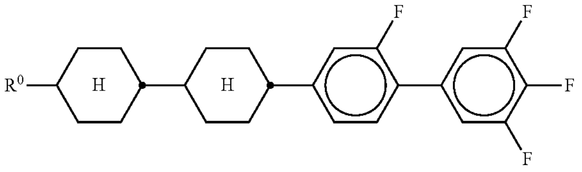

in which $R^0$ denotes alkyl having 1 to 6 C atoms or cycloalkyl having 3 to 6 C atoms, very preferably ethyl, propyl, butyl or pentyl and $X^0$ denotes F, $CF_3$ or $OCF_3$, furthermore $OCF{=}CF_2$, $OCHFCF_3$ or Cl, very preferably F. $R^0$ preferably denotes straight-chain alkyl, in particular ethyl, n-propyl, n-butyl or n-pentyl and very particularly preferably n-propyl.

The compound(s) of the Formula XX, in particular of the Formula XXa, is (are) preferably employed in the LC media according to the invention in amounts of 0-15% by weight, particularly preferably 1-10% by weight.

Very preferably, the LC medium according to the invention comprises one or more compounds of the Formula XXIa:

XXIa

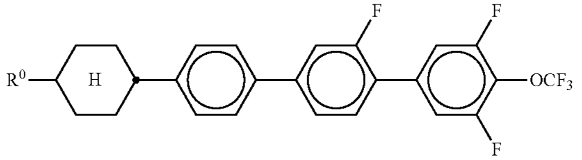

in which $R^0$ denotes alkyl having 1 to 6 C atoms or cycloalkyl having 3 to 6 C atoms, very preferably ethyl, propyl, butyl or pentyl. $R^0$ preferably denotes straight-chain alkyl, in particular ethyl, n-propyl, n-butyl or n-pentyl and very particularly preferably n-propyl.

The compound(s) of the Formula XXI, in particular of the Formula XXIa, is (are) preferably employed in the LC media according to the invention in amounts of 1-15% by weight, particularly preferably 2-10% by weight.

Further preferably, the LC medium according to the invention comprises one or more compounds of the Formula XXIIIa:

XXIIIa

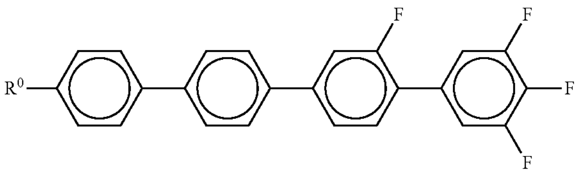

in which $R^0$ denotes alkyl having 1 to 6 C atoms or cycloalkyl having 3 to 6 C atoms. $R^0$ preferably denotes straight-chain alkyl, in particular ethyl, n-propyl, n-butyl or n-pentyl and very particularly preferably n-propyl or cycloalkyl, in particular cyclopentyl.

Preferred specific compounds of Formula XXIIIa include, in particular

XXIIIa-1

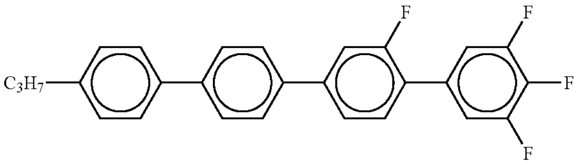

XXIIIa-2

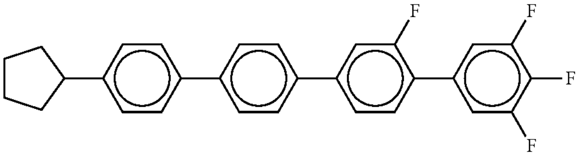

The compound(s) of the Formula XXIII, in particular of the Formula XXIIIa, is (are) preferably employed in the LC media according to the invention in amounts of 0.5-5% by weight, particularly preferably 0.5-2% by weight.

The LC medium may additionally comprise one or more compounds of the Formula XXIV:

XXIV

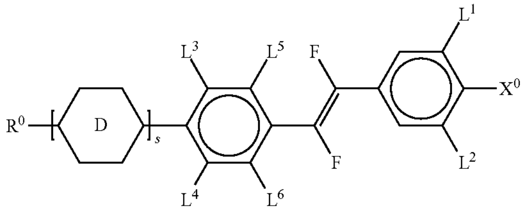

in which $R^0$, $X^0$ and $L^{1-6}$ have the meanings indicated in the Formula III, s denotes 0 or 1, and

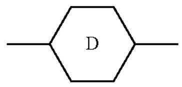 denotes 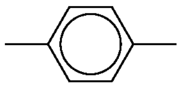,

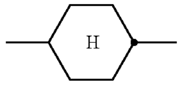 or 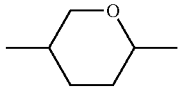.

In the Formula XXIV, $X^0$ may also denote an alkyl group having 1 to 6 C atoms or an alkoxy group having 1 to 6 C atoms. The alkyl or alkoxy group is preferably straight-chain.

$R^0$ preferably denotes alkyl having 1 to 6 C atoms. $X^0$ preferably denotes F;

The compounds of the Formula XXIV are preferably selected from the following subformulae:

XXIVa

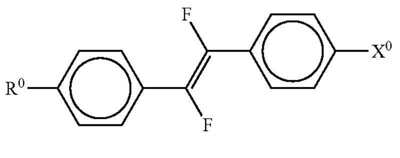

-continued

XXIVb

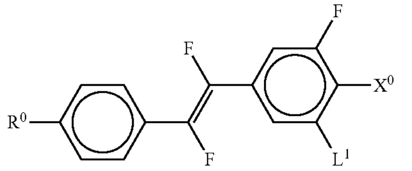

XXIVc

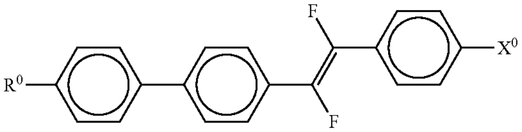

XXIVd

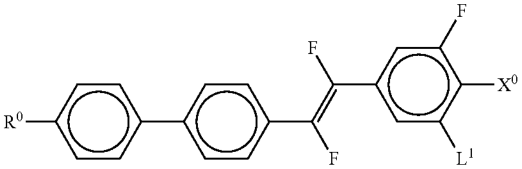

XXIVe

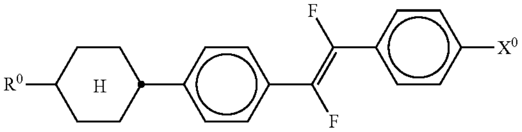

XXIVf

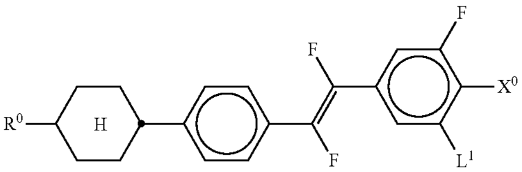

XXIVg

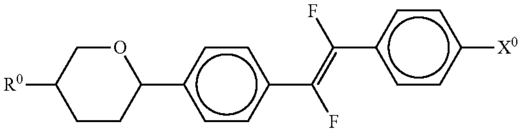

XXIVh

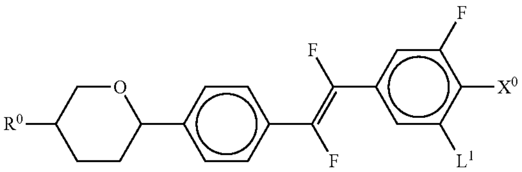

in which $R^0$, $X^0$ and $L^1$ have the meanings indicated in the Formula III. $R^0$ preferably denotes alkyl having 1 to 6 C atoms. $X^0$ preferably denotes F, and $L^1$ is preferably F;

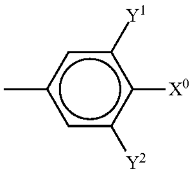

is preferably

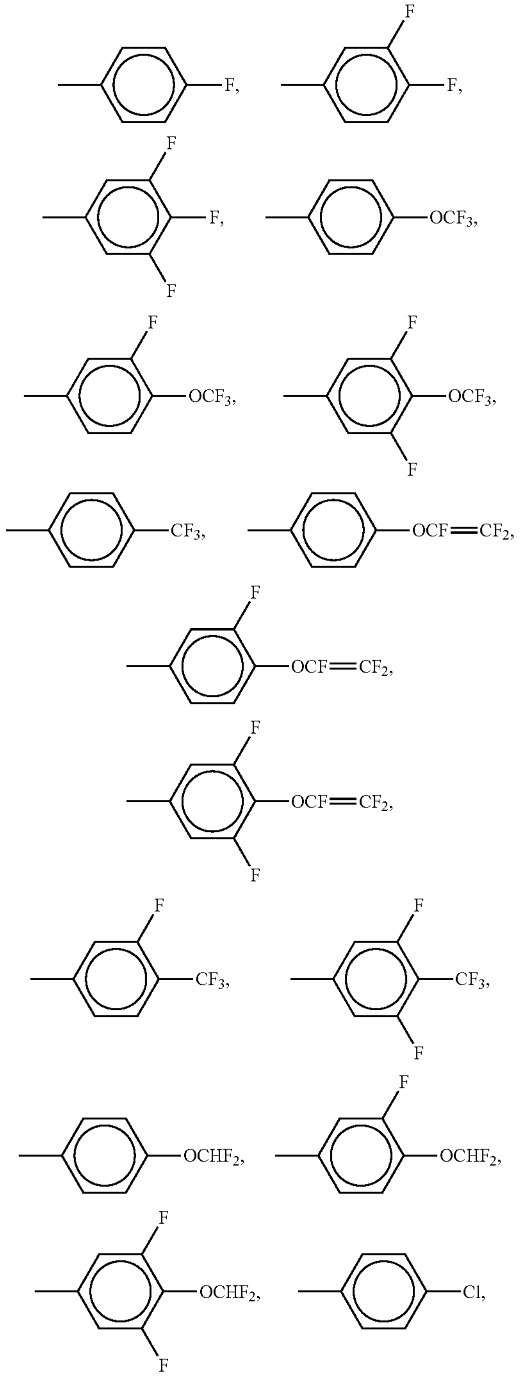

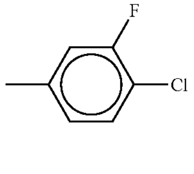

or

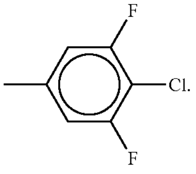

$R^0$ is straight-chain alkyl or alkenyl having 2 to 6 C atoms;

The LC medium may further comprise one or more compounds of the following formulae:

XXV

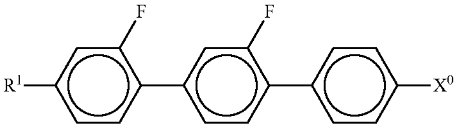

XXVI

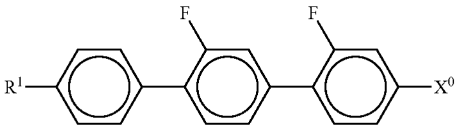

in which $R^1$ and $X^0$ have the meanings indicated in the Formula II for $R^0$ and $X^0$, respectively. $R^1$ preferably denotes alkyl having 1 to 6 C atoms or cycloalkyl having 3 to 6 C atoms, very preferably ethyl, propyl, butyl or pentyl. $X^0$ preferably denotes F, $CF_3$ or $OCF_3$, furthermore $OCF{=}CF_2$, $OCHFCF_3$ or Cl, very preferably F. In the Formula XXIV, $X^0$ very particularly preferably denotes Cl.

The LC medium may further optionally comprise one or more compounds of the following formulae:

XXVII

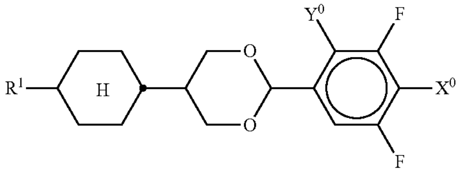

XXVIII

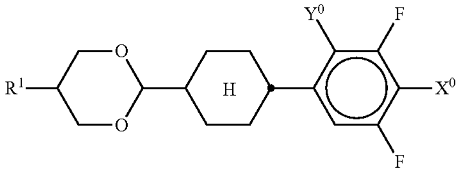

XXIX

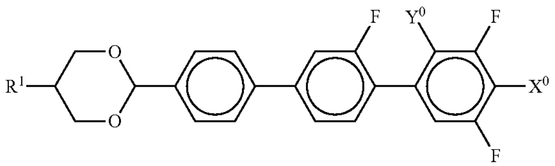

XXX

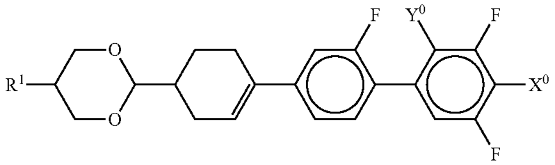

in which

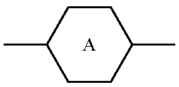 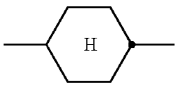,

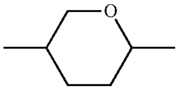, 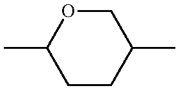,

-continued

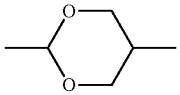 or 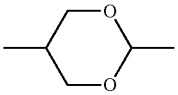

and and $R^1$, $X^0$ and $Y^0$ have the meanings indicated in the Formula II for $R^0$, $X^0$ and $Y^0$, respectively. $R^1$ preferably denotes alkyl having 1 to 6 C atoms or cycloalkyl having 3 to 6 C atoms, very preferably ethyl, propyl, butyl or pentyl. $X^0$ preferably denotes F, $CF_3$ or $OCF_3$, furthermore $OCF{=}CF_2$, $OCHFCF_3$ or Cl, very preferably F, and $Y^0$ preferably denotes H. The LC medium according to the invention particularly preferably comprises one or more compounds of the Formula XXIX in which $X^0$ preferably denotes F.

The compound(s) of the Formulae XXVII-XXX is (are) preferably employed in the LC media according to the invention in amounts of 1-20% by weight, particularly preferably 1-15% by weight. Particularly preferred LC media comprise at least one compound of the Formula XXIX and/or the Formula XXX.

Very preferably, the LC medium according to the invention comprises one or more compounds of the Formulae XXIXa or XXXa:

XXIXa

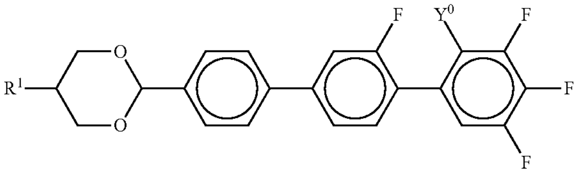

XXXa

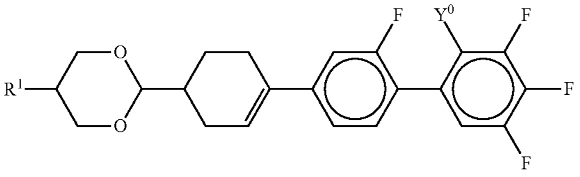

in which $R^1$ and $Y^0$ have the meanings indicated for $R^0$ and $Y^0$ in the Formula II, and preferably $R^1$ denotes alkyl having 1 to 6 C atoms or cycloalkyl having 3 to 6 C atoms, very preferably ethyl, propyl, butyl or pentyl.

The compound(s) of the Formulae XXIXa and/or XXXa is/are preferably employed in the LC media according to the invention in amounts of 1-15% by weight, particularly preferably 2-10% by weight.

The LC medium may further comprise one or more compounds of the following pyrimidine or pyridine compounds of the following formulae:

XXXI-1

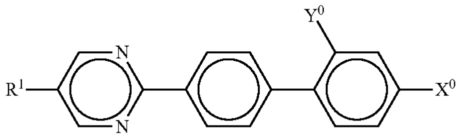

-continued

XXXI-2

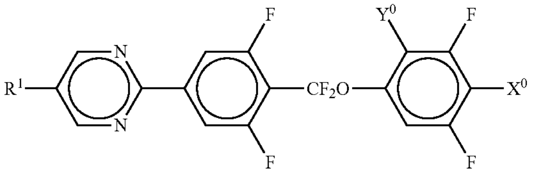

XXXI-3

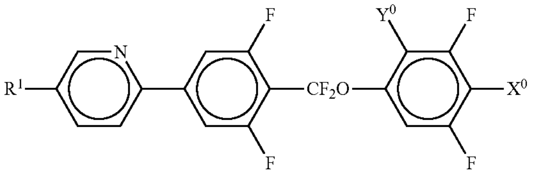

in which $R^1$, $X^0$ and $Y^0$ have the meanings indicated in the Formula II for $R^0$, $X^0$ and $Y^0$, respectively. $R^1$ preferably denotes alkyl having 1 to 6 C atoms or cycloalkyl having 3 to 6 C atoms, very preferably ethyl, propyl, butyl or pentyl. $X^0$ preferably denotes F, $CF_3$ or $OCF_3$, furthermore $OCF{=}CF_2$, $OCHFCF_3$ or Cl, very preferably F and $Y^0$ preferably denotes H. The medium according to the invention particularly may optionally comprise one or more compounds of the Formula XXXI-1, in which $X^0$ preferably denotes F. The compound(s) of the Formulae XXXI-1 to XXXI-3 may be employed in the LC media according to the invention in amounts of 1-20% by weight, particularly preferably 1-15% by weight.

Preferably, in addition to the compounds of the Formulae G and U, and, optionally, II and/or III, the LC medium contains one or more compounds selected from the following formulae:

Z1

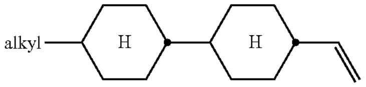

Z2

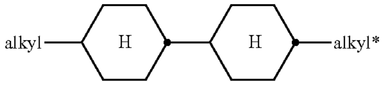

Z2'

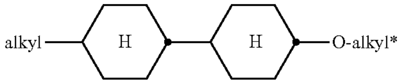

Z3

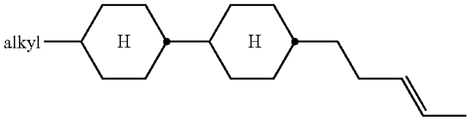

Z3'

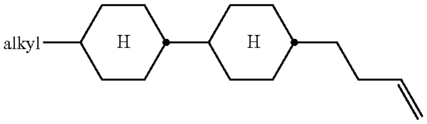

Z4

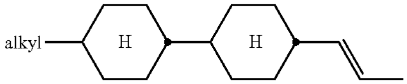

-continued

Z5

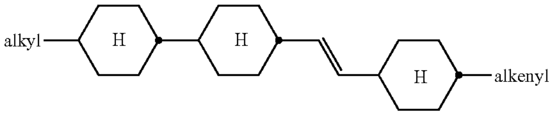

Z6

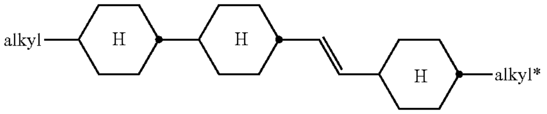

Z7

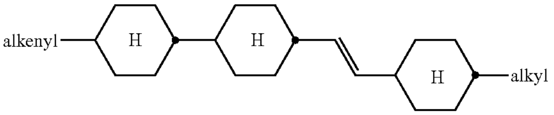

Z8

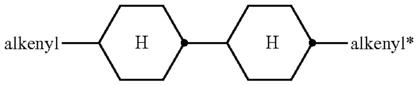

Z9

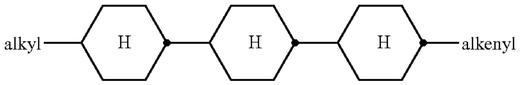

Z10

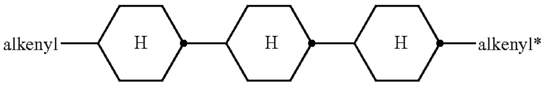

wherein

"alkyl" and "alkyl*" each, independently from one another, denote an alkyl group having 1 to 6 C atoms;

"alkenyl" and "alkenyl*" each, independently of one another, denote an alkenyl group having 2 to 6 C atoms.

Very preferred are compounds of the Formula Z1 and Z2.

Preferred compounds of the Formulae Z1 to Z6 are those selected from the following subformulae:

Z1-1

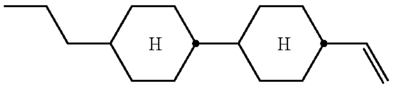

Z1-2

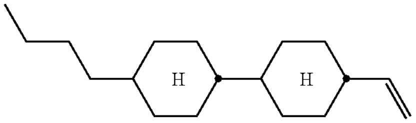

Z1-3

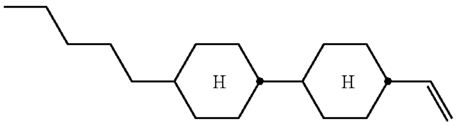

Z2-1

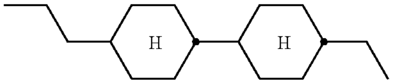

-continued

Z2-2

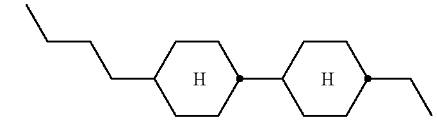

Z2-3

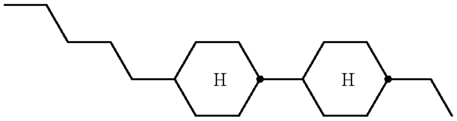

Z2-4

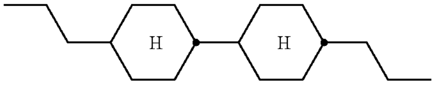

Z2-5

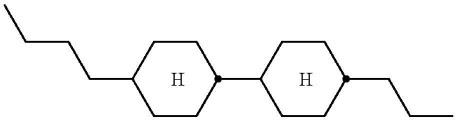

Z2-6

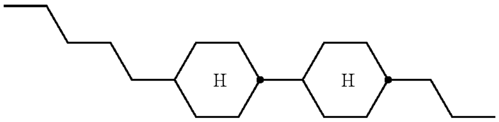

Z3-1

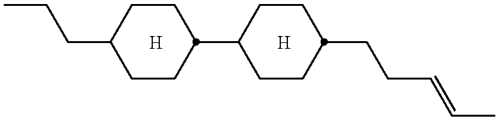

Z3-2

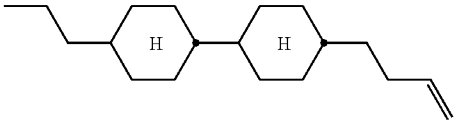

Z4-1

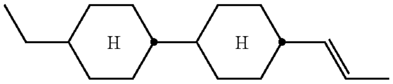

Z4-2

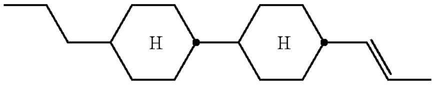

Z4-3

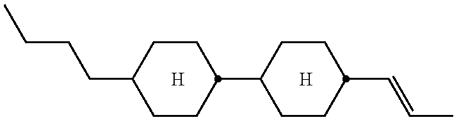

Z4-4

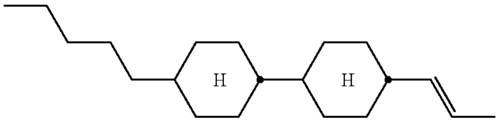

Z7-1

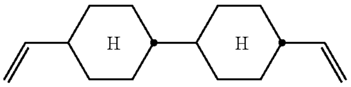

Z7-2

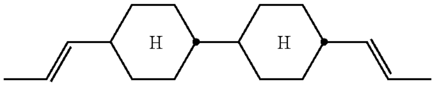

-continued

Z7-3

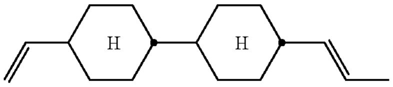

Z9-1

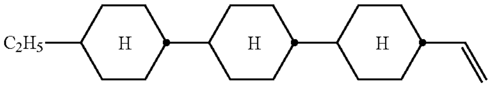

Z9-2

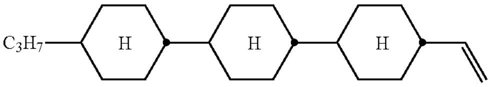

Z9-3

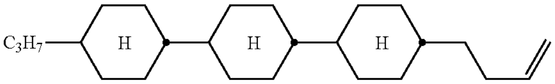

Z10-1

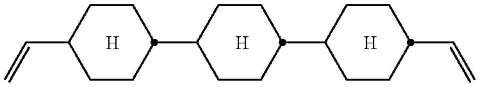

In another preferred embodiment, the LC medium contains one or more compounds of the Formula Z1 or its preferred subformulae and/or one or more compounds selected from the Formulae Z2, Z3, Z4 and Z5 or their preferred subformulae.

Preferably, the total proportion of compounds of the Formula Z1, Z2, Z3, Z4, Z5 and Z6 or their subformulae, such as CC-3-V in the medium is from 10 to 65%, very preferably from 20 to 60%, most preferably from 25 to 55% by weight. In yet a more preferred embodiment, the compound of the Formula Z1-1 is used in concentrations ranging from 10 wt.-% to 60 wt.-%, more preferably 25 wt.-% to 50 wt.-%, based on the total weight of the LC medium. In a further preferred embodiment, the LC medium comprises 50 wt.-% to 70 wt.-% of compounds represented by the Formulae Z1-1 and Z4-2 in total.

Preferably, the medium contains 1, 2 or 3 compounds selected from the Formulae Z1, Z2, Z3 and Z4 or their subformulae.

The LC medium may additionally comprise one or more compounds of the following general formulae:

XII

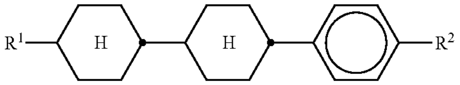

in which $R^1$ and $R^2$ each, independently from one another, denote $C_{1-6}$-alkyl, $C_{1-6}$-alkoxy or $C_{2-6}$-alkenyl.

The compounds of the Formula XII are preferably selected from the following subformulae:

XIIa

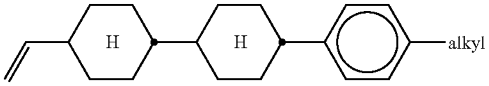

-continued

XIIb

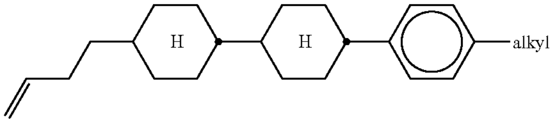

XIIc

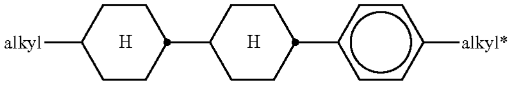

wherein "alkyl" and "alkyl*" each, independently from one another, denote methyl, ethyl, propyl, butyl, pentyl or hexyl.

Particular preference is given to the compounds of the Formulae XIIa and XIIc. In the Formula XIIb, "alkyl" preferably, independently of one another, denotes n-$C_3H_7$, n-$C_4H_9$ or n-$C_5H_{11}$, in particular n-$C_3H_7$. In the Formula XIIc, "alkyl" preferably denotes n-$C_3H_7$ and "alkyl" is preferably $CH_3$ or n-$C_3H_7$.

Particularly preferred compounds of the Formula XII are described by the following structures:

XIIa-1

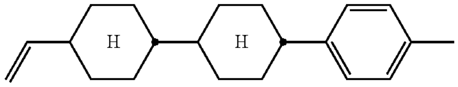

XIIc-1

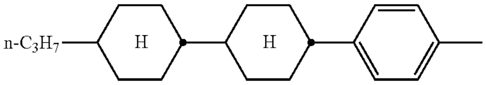

XIIc-3

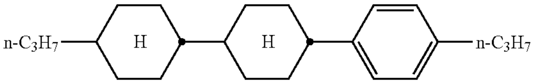

The LC medium may additionally comprise one or more compounds selected from the following formulae:

XIV

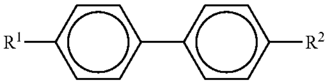

XV

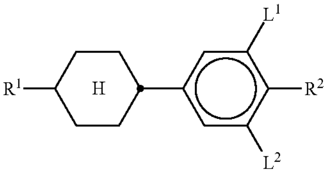

in which $L^1$ and $L^2$ have the meanings indicated in the Formula III, and $R^1$ and $R^2$ each, independently of one another, denote n-alkyl, cycloalkyl, alkoxy, oxaalkyl, fluoroalkyl or alkenyl, each having up to 6 C atoms, and preferably each, independently of one another, denote alkyl having 1 to 6 C atoms; in the compound of the Formula XIV, at least one of the substituents $R^1$ and $R^2$ preferably denotes alkenyl having 2 to 6 C atoms.

The LC medium may further optionally comprise one or more compounds of the Formula XIV in which at least one of the substituents $R^1$ and $R^2$ denotes alkenyl having 2 to 6 C atoms, preferably those selected from the following subformulae:

XIVa

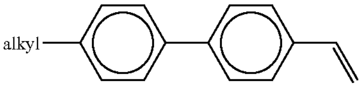

XIVb

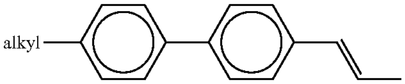

XIVc

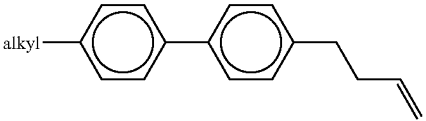

XIVd

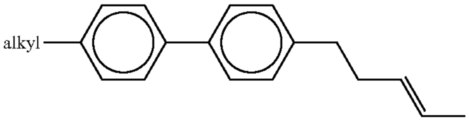

XIVe

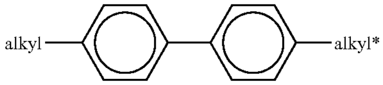

in which "alkyl" and "alkyl*" have the meaning indicated above, and each, independently of one another, preferably denote methyl, ethyl or propyl.

The compounds of the Formulae XIV are preferably selected from the following subformulae:

XIVc-1

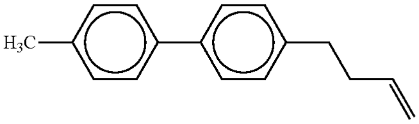

XIVd-1

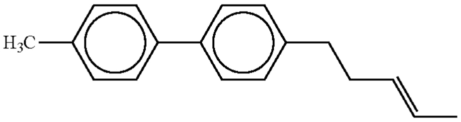

XIVd-2

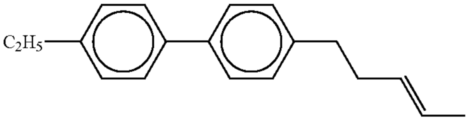

XIVe-1

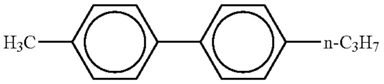

XIVe-2

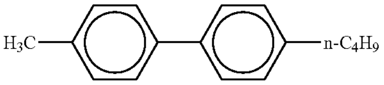

-continued

XIVe-3

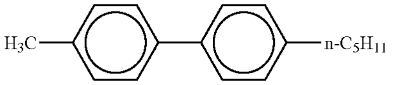

Very preferred are compounds of the Formulae XIVd-1, XIVe-1, XIVe-2 and XIVe-3.

The LC medium may further optionally comprise one or more compounds of the Formula XV in which at least one of the substituents $R^1$ and $R^2$ denotes alkyl or alkoxy having 2 to 6 C atoms, preferably those selected from the following subformulae:

XVa

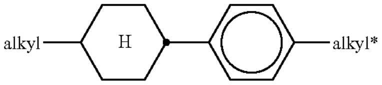

XVb

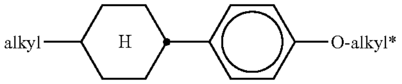

in which "alkyl" and "alkyl*" has the meaning indicated above, and each, independently of one another, preferably denote methyl, ethyl or propyl.

In yet a further embodiment, the LC medium comprises one or more compounds of the Formula XVI:

XVI

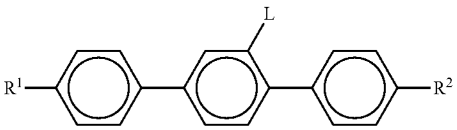

in which $R^1$ and $R^2$ have the meanings indicated for $R^0$ in the Formula II, and preferably each, independently of one another, denote alkyl having 1 to 6 C atoms. L denotes H or F.

Particularly preferred compounds of the Formula XVI are those of the subformulae:

XVIa

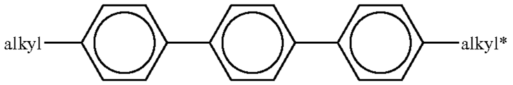

XVIb

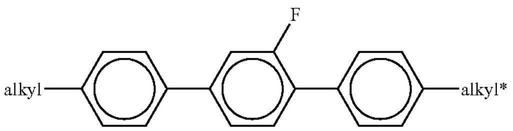

XVIc

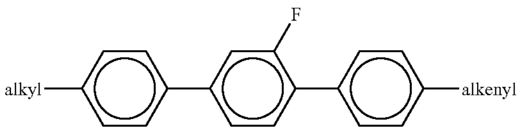

-continued

XVId

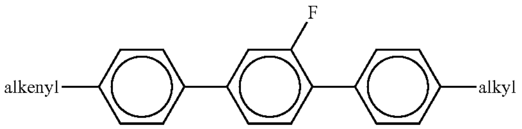

XVIe

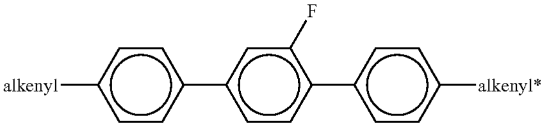

XVIf

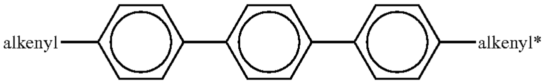

in which

"alkyl" and "alkyl*" each, independently of one another, denote a straight-chain alkyl group having 1 to 6 C atoms, in particular ethyl, propyl or pentyl, and "alkenyl" and "alkenyl*" each, independently of one another, denote a straight-chain alkenyl group having 2 to 6 C atoms, in particular $CH_2{=}CHC_2H_4$, $CH_3CH{=}CHC_2H_4$, $CH_2{=}CH$ and $CH_3CH{=}CH$.

Particular preference is given to the compounds of the Formulae XVIb and XVIc. Very particular preference is given to the compounds of the following subformulae:

XVIb-1

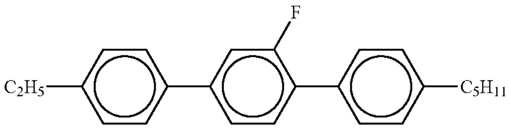

XVIb-2

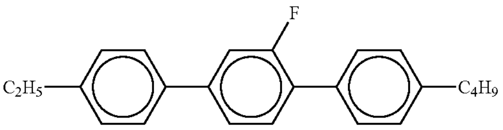

XVIb-3

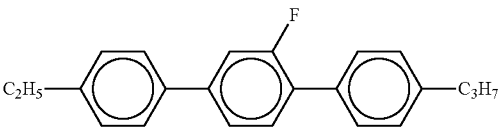

XVIc-1

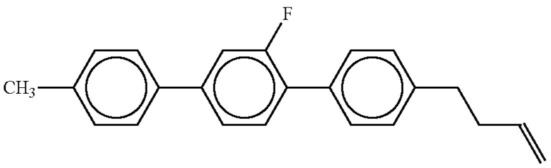

-continued

XVIc-2

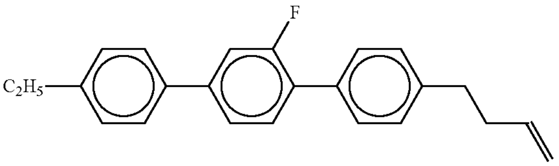

XVIc-3

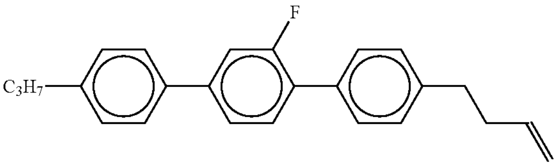

In yet a further embodiment, the LC medium comprises one or more compounds of the Formula XIII:

XIII

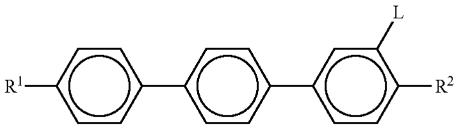

in which $R^1$ and $R^2$ have the meanings indicated for $R^0$ in the Formula II, and preferably each, independently of one another, denote alkyl having 1 to 6 C atoms. L denotes H, F or Cl.

Particularly preferred compounds of the Formula XIII are those of the subformulae:

XIIIa

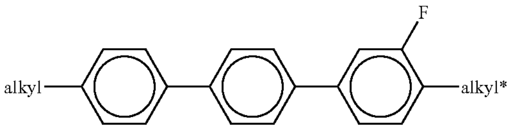

XIIIb

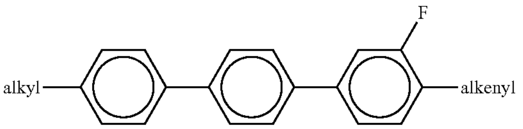

XIIIc

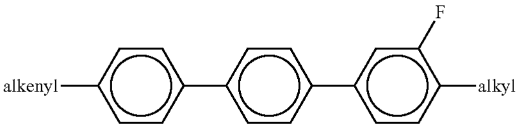

XIIId

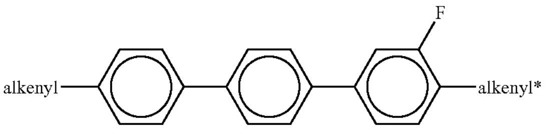

in which

"alkyl" and "alkyl*" each, independently of one another, denote a straight-chain alkyl group having 1 to 6 C atoms, in particular ethyl, propyl or pentyl, and "alkenyl" and "alkenyl*" each, independently of one another, denote a straight-chain alkenyl group having 2 to 6 C atoms, in particular $CH_2{=}CHC_2H_4$, $CH_3CH{=}CHC_2H_4$, $CH_2{=}CH$ and $CH_3CH{=}CH$.

Particular preference is given to the compounds of the Formulae XIIIa and XIIIb. Very particular preference is given to the compounds of the following subformulae:

XIIIa-1

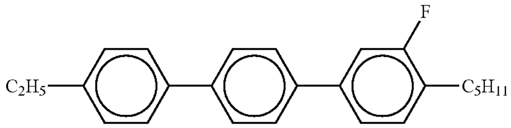

XIIIa-2

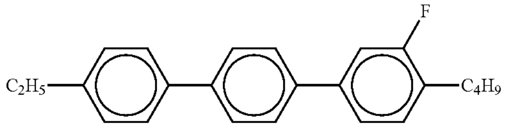

XIIIa-3

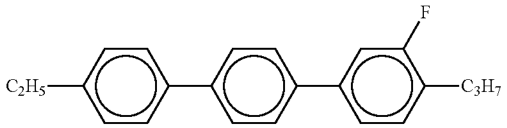

XIIIb-1

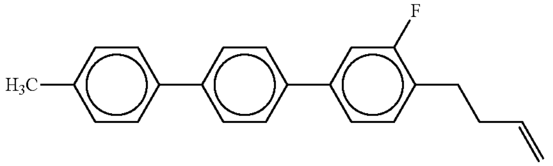

XIIIb-2

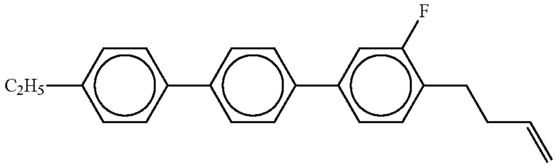

XIIIb-3

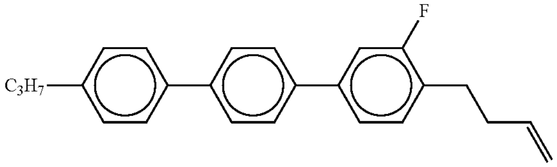

In yet a further embodiment, the LC medium comprises one or more compounds of the Formula XIII':

XIII'

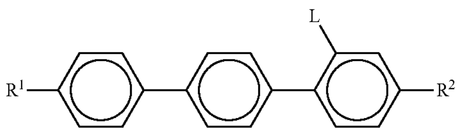

in which $R^1$ and $R^2$ have the meanings indicated for $R^0$ in the Formula II, and preferably each, independently of one another, denote alkyl having 1 to 6 C atoms. L denotes H, F or Cl.

Particularly preferred compounds of the Formula XIII' are those of the subformulae:

XIII'

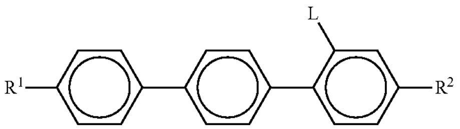

XIII'b

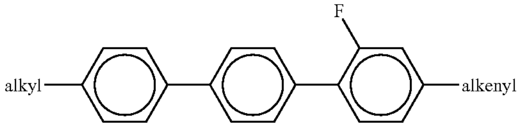

XIII'c

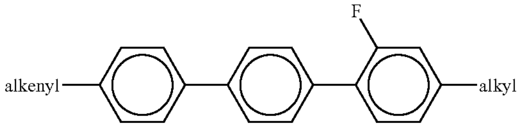

XIII'd

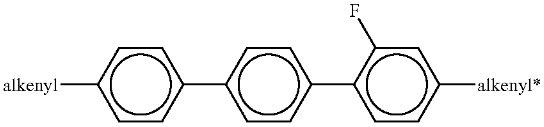

in which

"alkyl" and "alkyl*" each, independently of one another, denote a straight-chain alkyl group having 1 to 6 C atoms, in particular ethyl, propyl or pentyl, and "alkenyl" and "alkenyl*" each, independently of one another, denote a straight-chain alkenyl group having 2 to 6 C atoms, in particular $CH_2{=}CHC_2H_4$, $CH_3CH{=}CHC_2H_4$, $CH_2{=}CH$ and $CH_3CH{=}CH$.

Particular preference is given to the compounds of the Formulae XIII'a and XIII'b. Very particular preference is given to the compounds of the following subformulae:

XIII'a-1

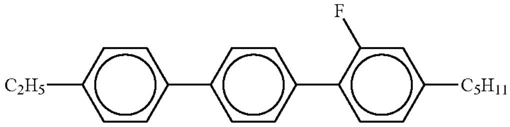

XIII'a-2

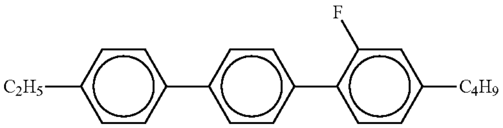

XIII'a-3

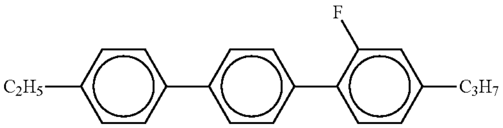

-continued

XIII'b-1

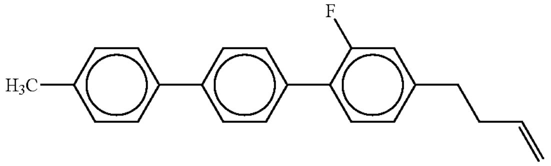

XIII'b-2

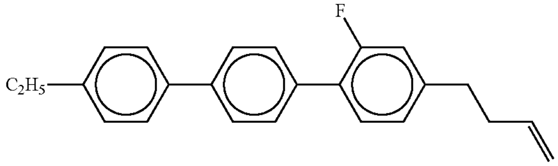

XIII'b-3

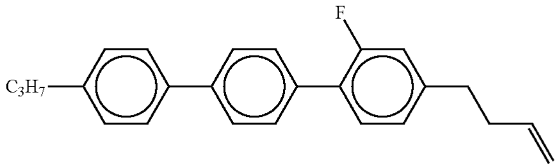

The LC medium may optionally comprise one or more compounds of the following formulae:

XVIIa

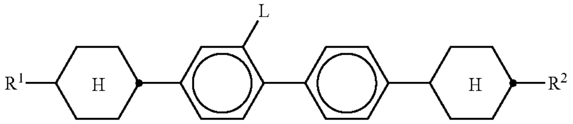

XVIIb

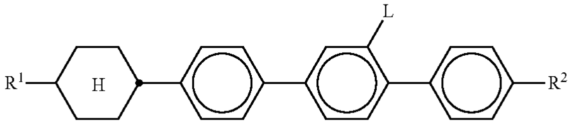

XVIIc

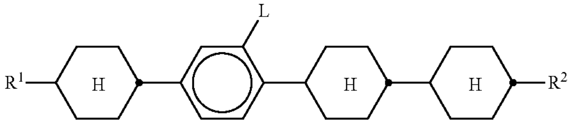

in which $R^1$ and $R^2$ have the meanings indicated in the Formula G, respectively, and preferably each, independently of one another, denote alkyl having 1 to 6 C atoms. L denotes H or F.

Very preferred are compounds of the Formula XVIIa, wherein L is H or F. Very preferred are compounds of the Formula XVIIb, wherein L is F.

The LC medium may additionally comprise one or more compounds of the following formula:

XXXII

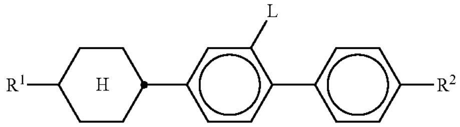

in which L, $R^1$ and $R^2$ have the meanings indicated in the Formula LP1 for $L^1$, and in the Formula U for $R^4$ and $R^5$, respectively. $R^1$ and $R^2$ preferably denote alkyl, alkoxy, oxaalkyl, fluoroalkyl or alkenyl, each having up to 6 C atoms.

Particularly preferred compounds of the Formula XXXII are those of the subformulae:

XXXIIa

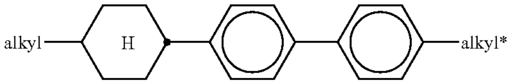

XXXIIb

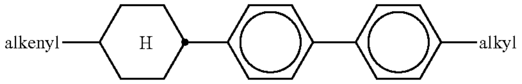

XXXIIc

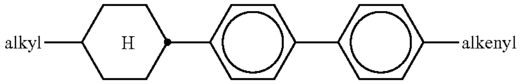

in which

"alkyl" and "alkyl*" each, independently of one another, denote a straight-chain alkyl group having 1 to 6 C atoms, in particular ethyl, propyl or pentyl, and "alkenyl" denotes a straight-chain alkenyl group having 2 to 6 C atoms, in particular $CH_2{=}CHC_2H_4$, $CH_3CH{=}CHC_2H_4$, $CH_2{=}CH$ and $CH_3CH{=}CH$.

Very particular preference is given to the compounds of the following subformulae:

XXXIIa-1

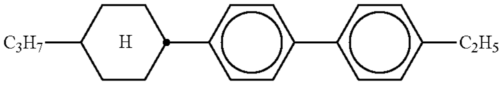

XXXIIa-2

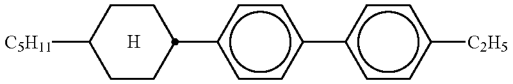

XXXIIb-1

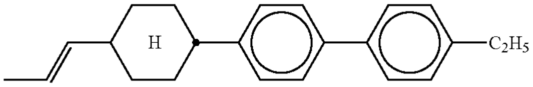

XXXIIb-2

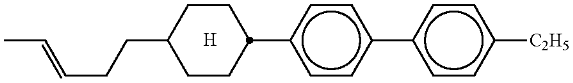

-continued

XXXIIb-3

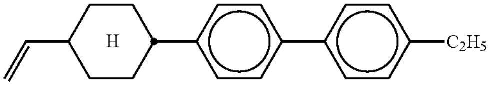

XXXIIc-1

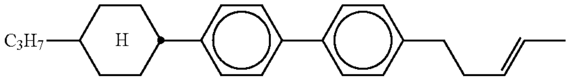

In some further embodiments, the LC medium comprises one or more compounds of the following formulae:

XXXV

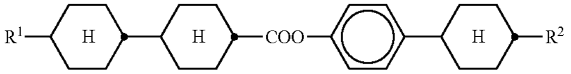

in which $R^1$ and $R^2$ have the meanings indicated in the Formula G, respectively, and preferably each, independently of one another, denote alkyl having 1 to 6 C atoms.

Advantageously, the LC medium of the present invention comprises one or more compounds of the Formulae LP1 and LP2

LP1

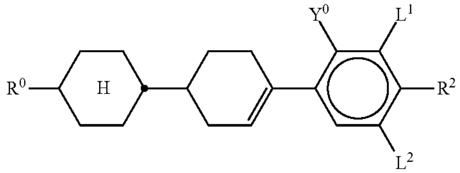

LP2

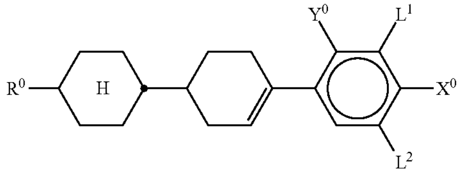

in which the individual substituents have the following meanings:

- $R^0$ has one of the meanings given in for $R^1$, $R^4$ and $R^5$ in the Formulae G and U;
- $R^2$ has one of the meanings given in for $R^2$ in the Formula U;
- $L^1$ and $L^2$ each, independently of one another, denote H, F or Cl;
- $Y^0$ has one of the meanings given in for $R^3$ and $R^6$ in the Formulae U and G, preferably H or $CH_3$;
- $X^0$ denotes a halogen atom, CN, SCN, NCS or an alkyl or an alkoxy group having 1 to 6 C atoms or an alkenyl or an alkenyloxy group having 2 to 6 C atoms in which one or more H atoms are replaced by a F atom.

The one or more compounds of the Formulae LP1 and LP2 may be preferably described by the following Formulae LP1-1 and LP2-1:

LP1-1

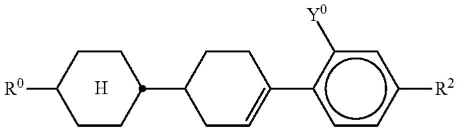

LP2-1

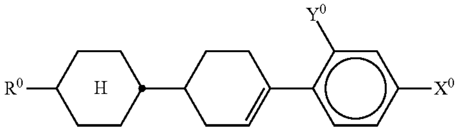

LP2-2

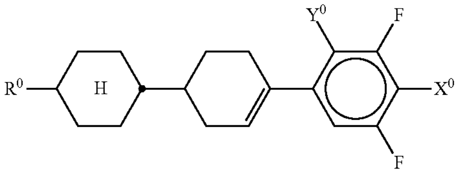

LP2-3

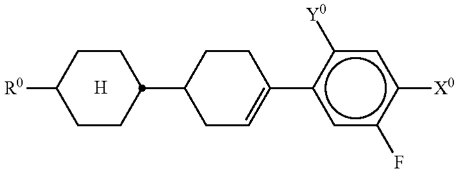

in which $R^0$ is an alkyl or an alkoxy group having 1 to 6 C atoms or an alkenyl group having 2 to 6 C atoms in which one or more $CH_2$ groups are optionally substituted by —C≡C—, —$CF_2$O—, —O$CF_2$—, —CH═CH—,

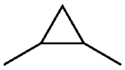, 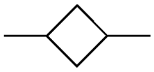, 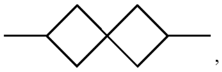, 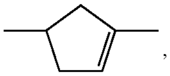, 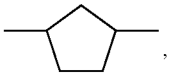,

—O—, —CO—O— or —O—CO— in such a way that O atoms are not linked directly to one another, and in which one or more H atoms may be replaced by a halogen atom;

$R^2$ is an alkyl group having 1 to 6 C atoms, in which one or more $CH_2$ groups are optionally substituted by —C≡C—, —$CF_2$O—, —O$CF_2$—, —CH═CH—,

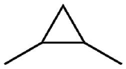, 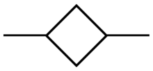, 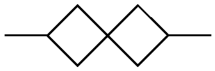, 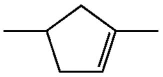, 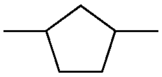,

—O—, —CO—O— or —O—CO— in such a way that O atoms are not linked directly to one another, and in which one or more H atoms may be replaced by a halogen atom;

$X^0$ a F atom or an alkyl or an alkoxy group having 1 to 3 C atoms or an alkenyl or an alkenyloxy group having 2 or 3 C atoms in which one or more H atoms are replaced by a F atom, and $Y^0$ H or $CH_3$.

The compounds of the general Formulae LP1 and LP2 can also be represented by one of the following:

LP1a

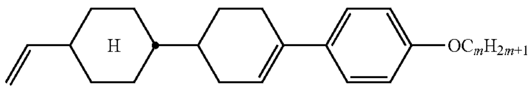

LP1b

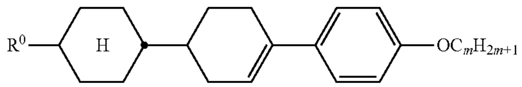

LP1c

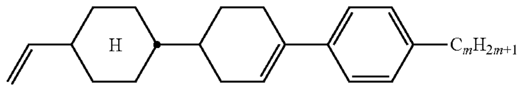

LP1d

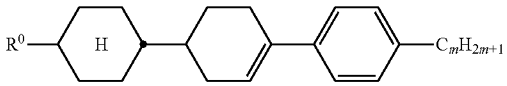

LP2a

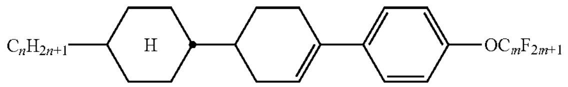

LP2b

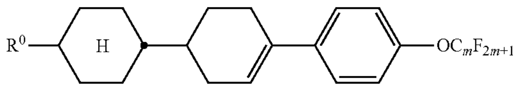

LP2c

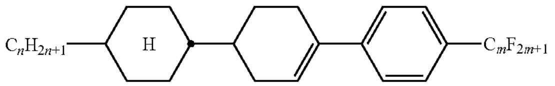

LP2d

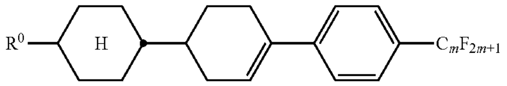

LP2e

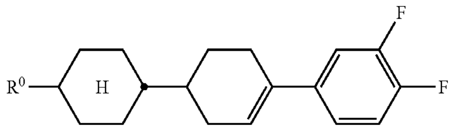

LP2f

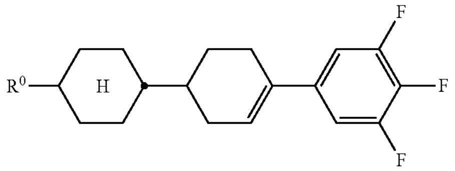

in which $R^0$ is an alkyl or an alkoxy group having 1 to 12 C atoms in which one or more $CH_2$ groups are optionally substituted by —C≡C—, —$CF_2$O—, —O$CF_2$—,

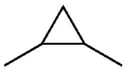, 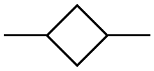, 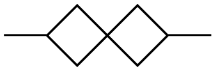, 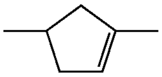, 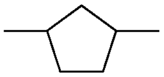,

—O—, —CO—O— or —O—CO— in such a way that O atoms are not linked directly to one another, and in which one or more H atoms may be replaced by a halogen atom, preferably an alkyl group having 1 to 4 C atoms, alkenyl or an alkenyloxy group having 2 to 6 C atoms or a cycloalkyl or a cycloalkyloxy group having 3 to 6 C atoms, wherein vinyl, allyl or cyclopentyl are particularly preferable;

n denotes 1, 2, 3, 4 or 5; and m denotes 1, 2, 3 or 4.

Particularly preferred compounds of the Formula LP1 are those selected from the group consisting of the following subformulae:

LP1-1a

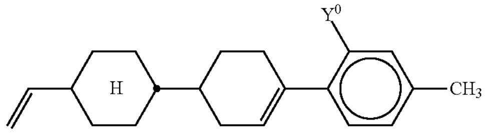

LP1-1b

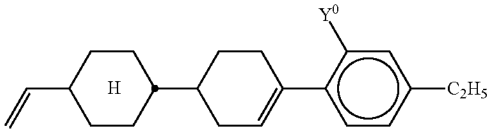

LP1-1c

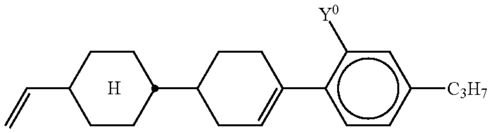

LP1-1d

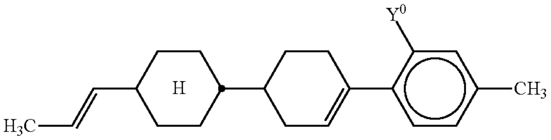

LP1-1e

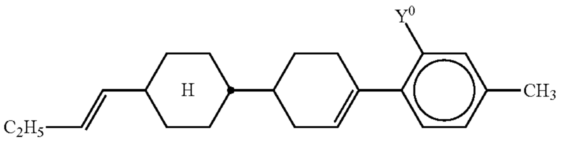

LP1-1f

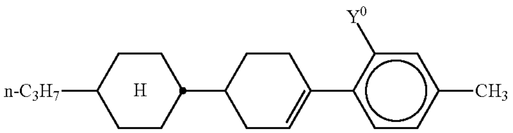

LP1-1g

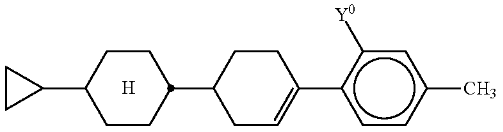

-continued

LP1-1h

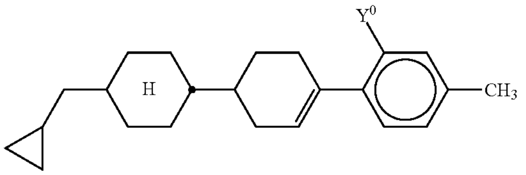

LP1-1i

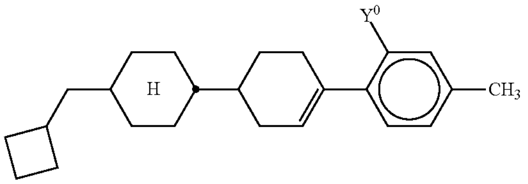

LP1-1j

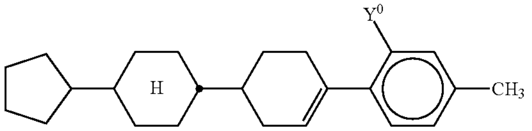

LP1-1k

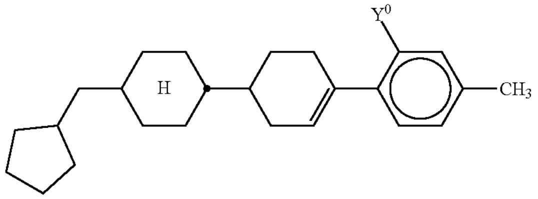

LP1-1l

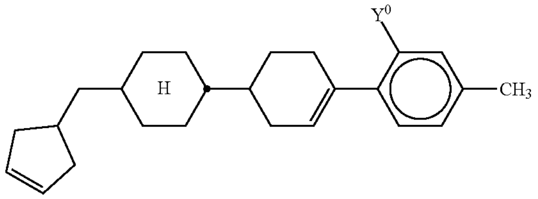

wherein $Y^0$ is H or $CH_3$, preferably H.

Very preferred are the compounds of the Formulae LP1-1a, LP1-1b and LP1-1c, most preferred is the compound Formula LP1-1a.

Particularly preferred compounds of the Formula LP2 are those selected from the group consisting of the following subformulae:

LP2-1a

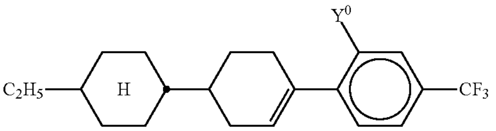

LP2-1b

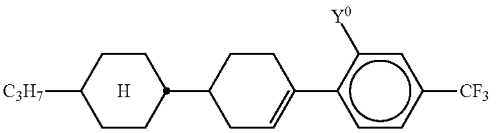

-continued

LP2-1c

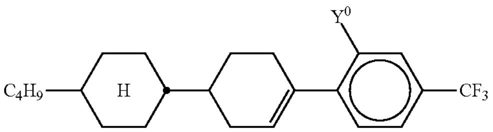

LP2-1d

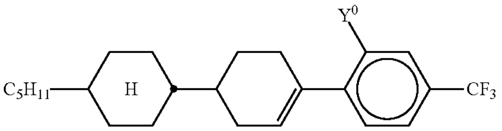

LP2-1e

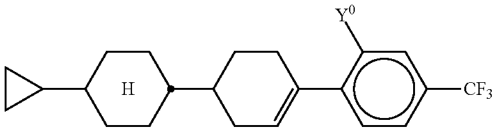

LP2-1f

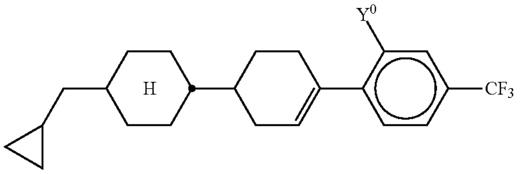

LP2-1g

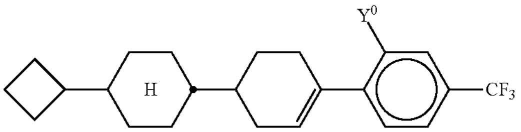

LP2-1h

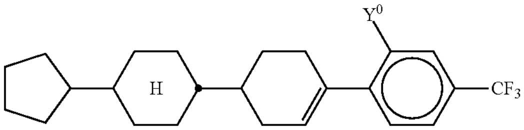

LP2-1i

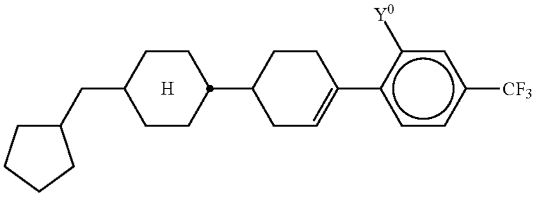

LP2-1k

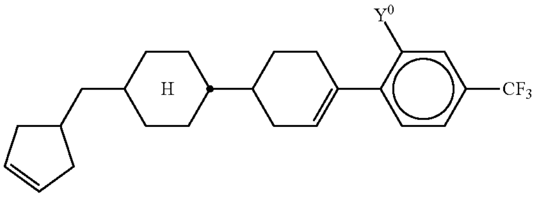

-continued

LP2-2a

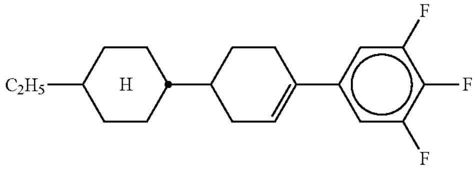

LP2-2b

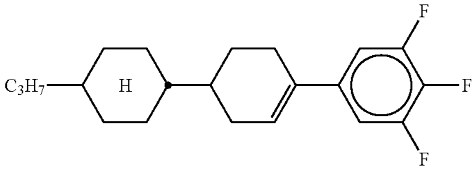

LP2-3a

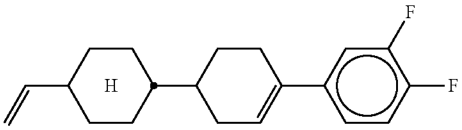

LP2-3b

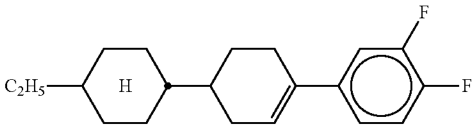

LP2-3c

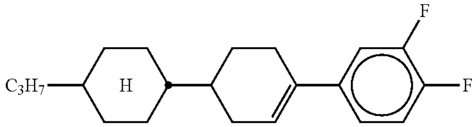

wherein $Y^0$ is H or $CH_3$, preferably H.

Very preferred are compounds of the Formulae LP2-1a, LP2-1b, LP2-1c, LP2-1d, and LP2-1i, LP2-2b, LP2-3a, LP2-3c mostly preferred is the compound Formula LP2-1b.

The total proportion of the compounds of the Formulae LP1 or LP2 or its subformulae in the LC medium is preferably from 2 to 35%, very preferably from 3 to 30%, most preferably from 4 to 20% by weight.

Preferably, the LC medium contains 1, 2 or 3 compounds of the Formulae LP1 or LP2 or their subformulae. In a particularly preferred embodiment, the LC medium comprises at least one compound of the Formula LP1 and at least one compound of the Formula LP2.

In addition to the compounds of the Formulae G, U, Z1 to Z12, II and/or III, the LC medium may optionally contain one or more compounds selected from the Formulae Y and B:

Y

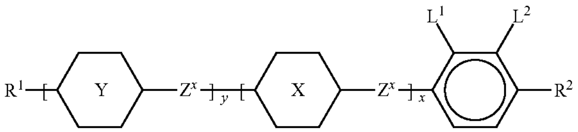

B

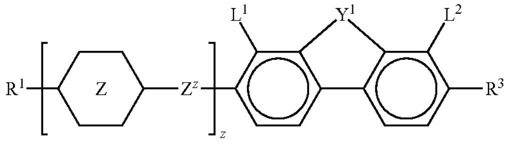

in which the individual substituents, on each occurrence identically or differently, and each, independently of one another, have the following meanings:

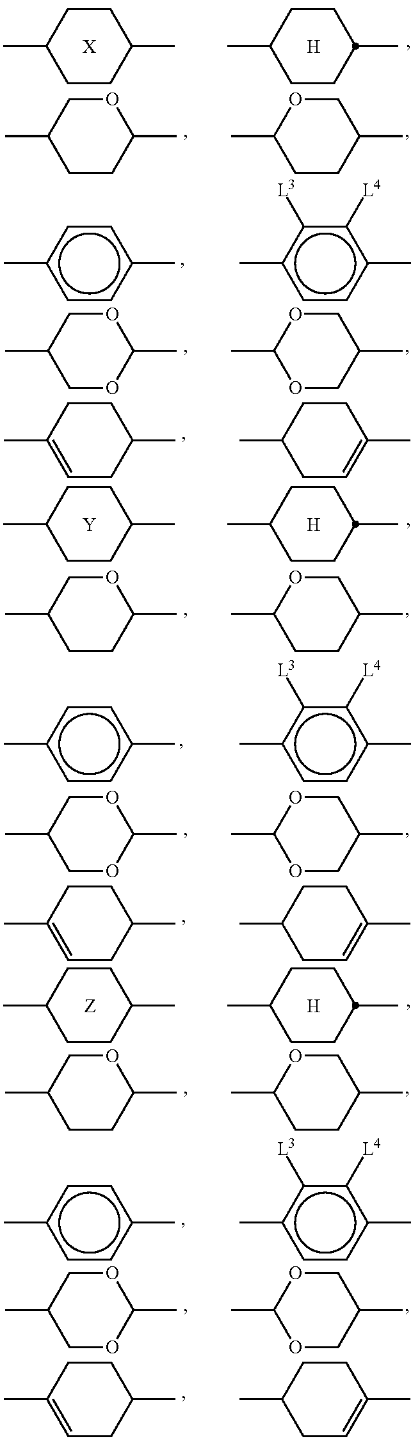

wherein $R^1$, $R^2$ one of the meanings given for $R^1$ and $R^2$ in the Formula G, $R^3$ one of the meanings given for $R^1$, $Z^x$, $Z^y$ —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$—, or a single bond, preferably a single bond, $Z^z$ —$CH_2O$—, —O—, —$C_2H_4$—, —$OCH_2$—, or a single bond, $Y^1$ —$CH_2$—, —O— or —S—, $L^{1-4}$ H, F or Cl, preferably H or F, very preferably F, x, y 0, 1 or 2, with x+y≤3, z 0 or 1, wherein in the Formula B the dibenzofuran or dibenzothiophene group may also be further substituted by a methyl or methoxy group, and wherein the compounds of the Formula Y contain at least one substituent $L^{1-4}$ that is F or Cl, preferably F.

The LC medium according to this first preferred embodiment may contain one or more compounds of the Formulae G, U, LP1 and/or LP2, II and/or III, one or more compounds selected from the Formulae Z1, Z2 and Z3, and one or more compounds selected from the Formulae Y and B.

The LC media according to this first preferred embodiment are especially suitable for use in LC displays of the HB-FFS or PS-HB-FFS mode.

In the compounds of the Formula Y and its subformulae, $R^1$ and $R^2$ preferably denote straight-chain alkyl or alkoxy having 1 to 6 C atoms, furthermore alkenyl having 2 to 6 C atoms, in particular vinyl, 1E-propenyl, 1E-butenyl, 3-butenyl, 1E-pentenyl, 3E-pentenyl or 4-pentenyl.

In the compounds of the Formula Y and its subformulae, preferably both substituents $L^1$ and $L^2$ denote F. In another preferred embodiment of the present invention, in the compounds of the Formula Y and its subformulae one of the substituents $L^1$ and $L^2$ denotes F and the other denotes Cl.

In a preferred embodiment of the present invention, the LC medium contains one or more compounds of the Formula Y selected from the following subformulae:

Y1

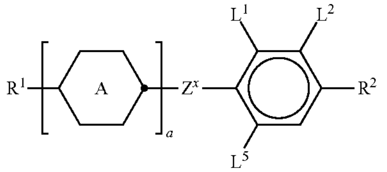

Y2

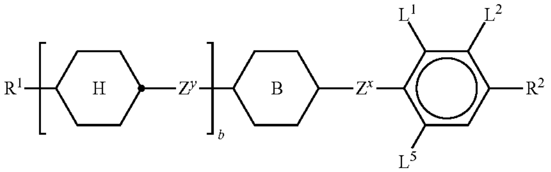

wherein $R^1$, $R^2$, $Z^x$ and $Z^y$ have the meanings given in the Formula Y or one of the preferred meanings given above in the Formula G, a denotes 1 or 2, b denotes 0 or 1, $L^1$, $L^2$ denote F or Cl, preferably F, and $L^5$ denotes a H atom or $CH_3$,

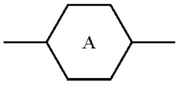 denotes 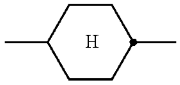 or

-continued

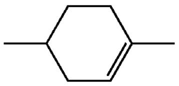 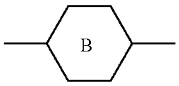 denotes

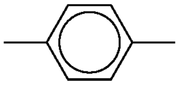 or 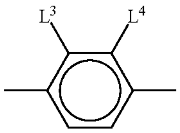

Preferably, in the compounds of the Formula Y1 and Y2 both $L^1$ and $L^2$ denote F or one of $L^1$ and $L^2$ denotes F and the other denotes Cl, or both $L^1$ and $L^2$ denote F or one of $L^1$ and $L^2$ denotes F and the other denotes Cl.

Preferably, the LC medium comprises one or more compounds of the Formula Y1 selected from the group consisting of the following subformulae:

Y1-1

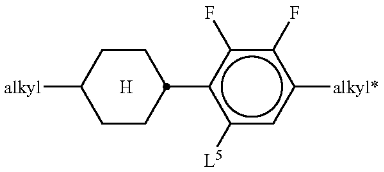

Y1-2

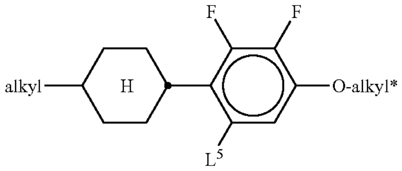

Y1-3

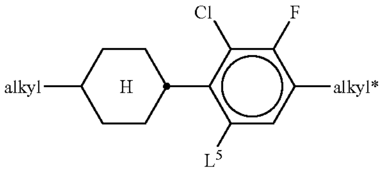

Y1-4

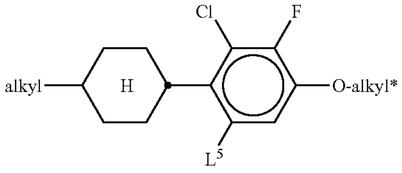

Y1-5

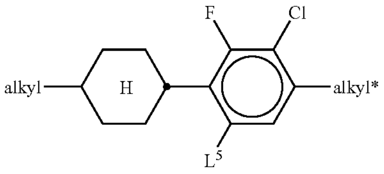

Y1-6

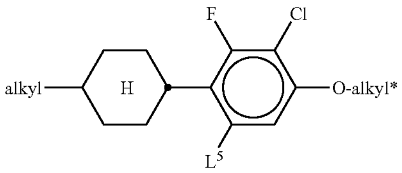

-continued

Y1-7

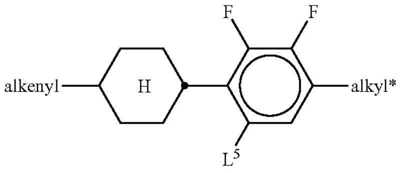

Y1-8

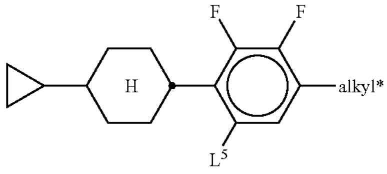

Y1-9

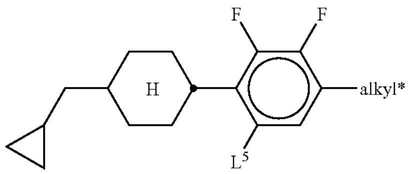

Y1-10

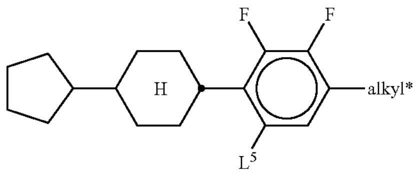

Y1-11

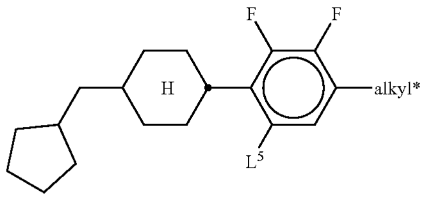

Y1-12

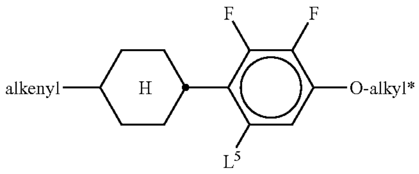

Y1-13

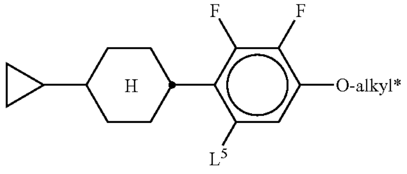

Y1-14

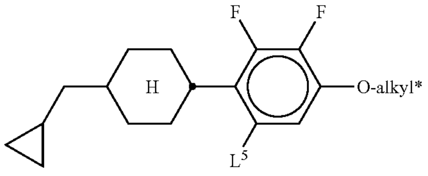

-continued
Y1-15
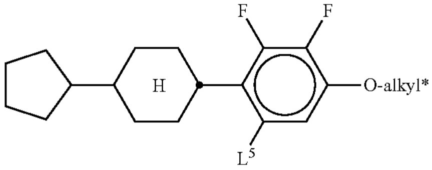
Y1-16
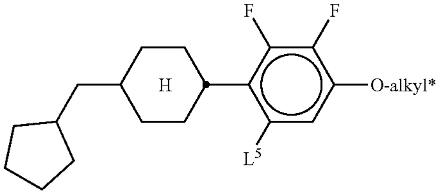
Y1-17
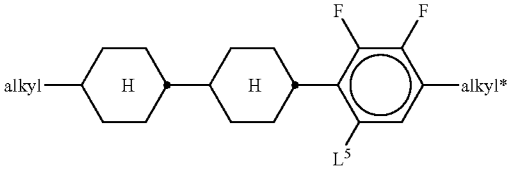
Y1-18
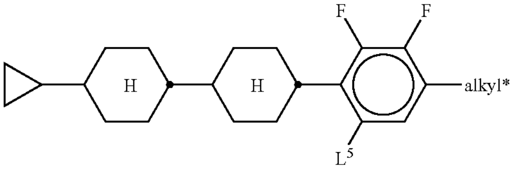
Y1-19
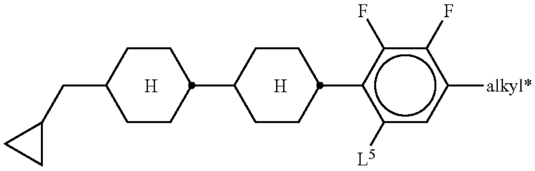
Y1-20
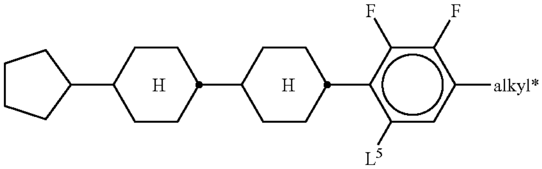
Y1-21
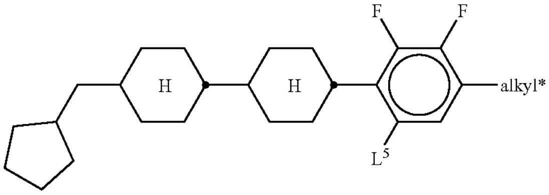
Y1-22
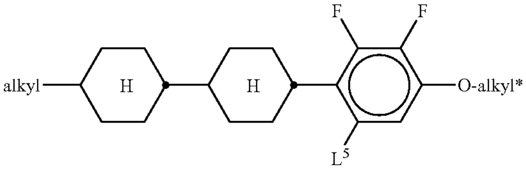
-continued
Y1-23
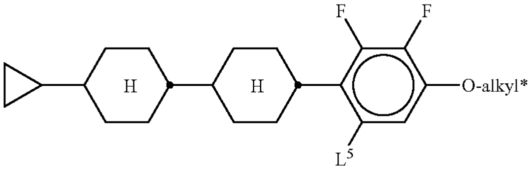
Y1-24
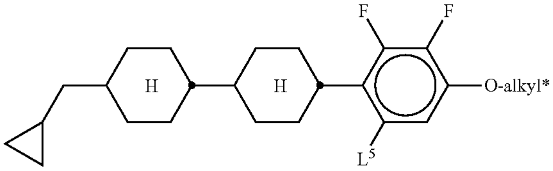
Y1-25
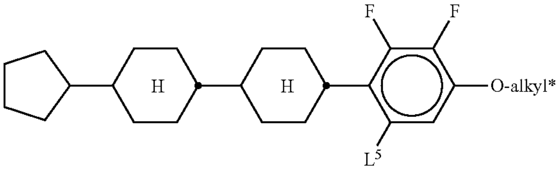
Y1-26
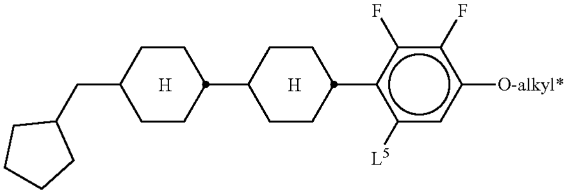
Y1-27
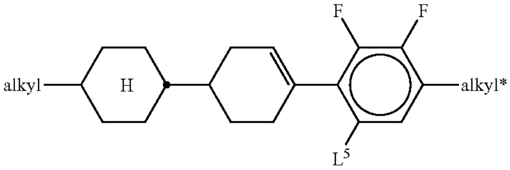
Y1-28
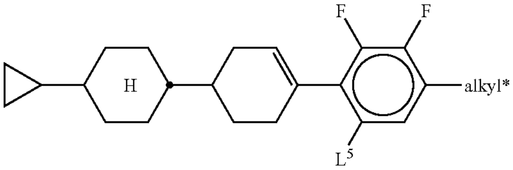
Y1-29
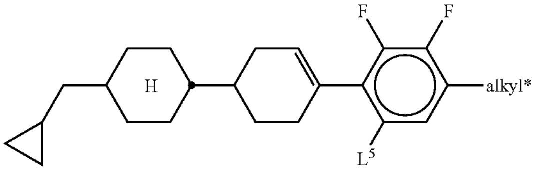

-continued
Y1-30
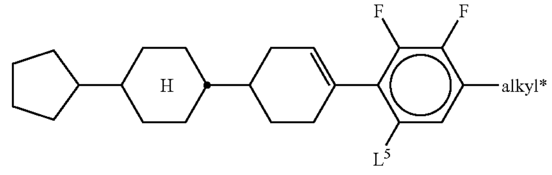
Y1-31
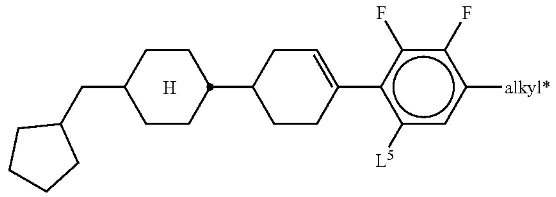
Y1-32
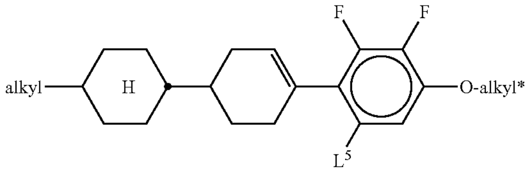
Y1-33
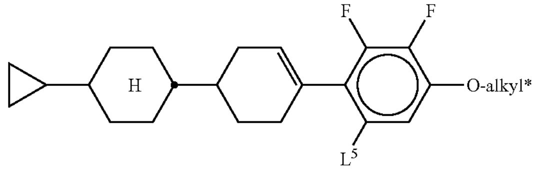
Y1-34
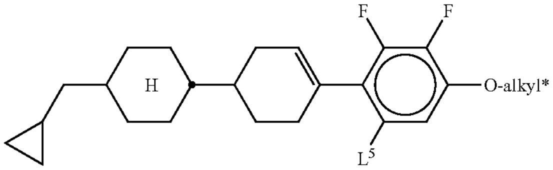
Y1-35
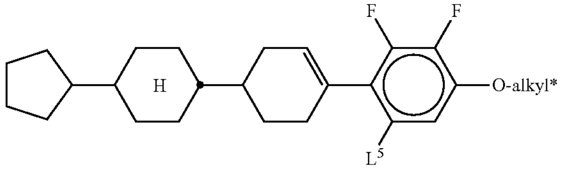
Y1-36
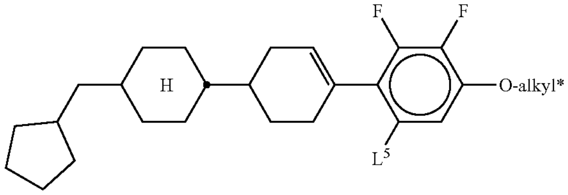
-continued
Y1-37
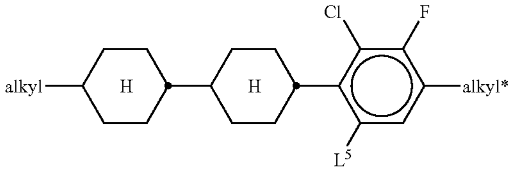
Y1-38
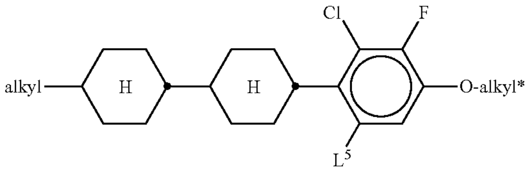
Y1-39
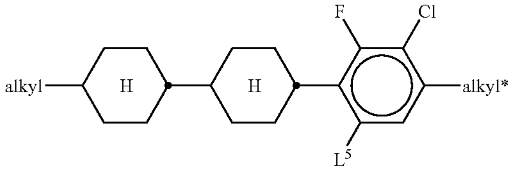
Y1-40
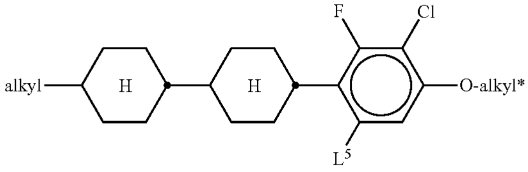
Y1-41
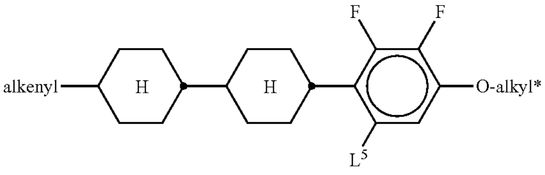
Y1-42
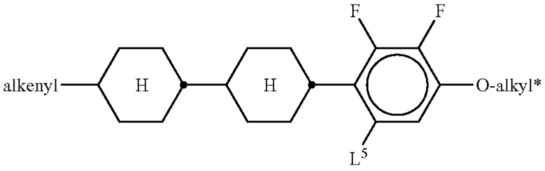
Y1-43
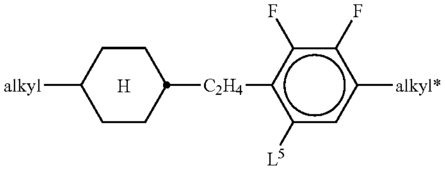
Y1-44
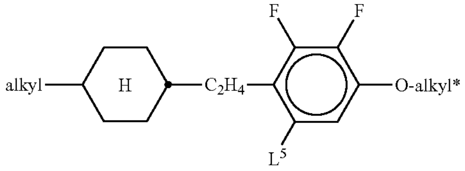

-continued
Y1-45
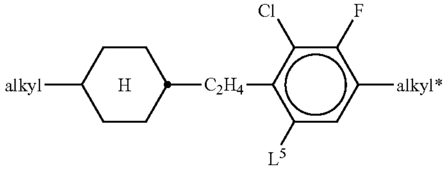
Y1-46
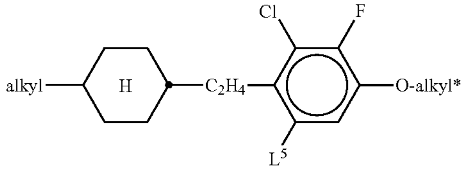
Y1-47
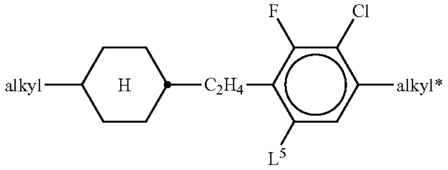
Y1-48
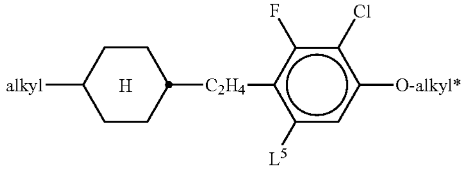
Y1-49
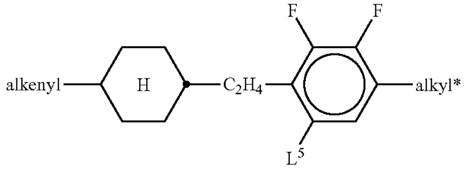
Y1-50
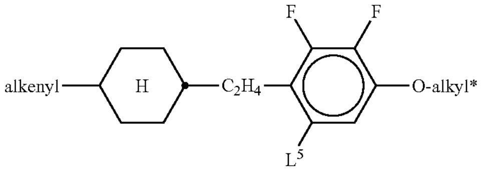
Y1-51
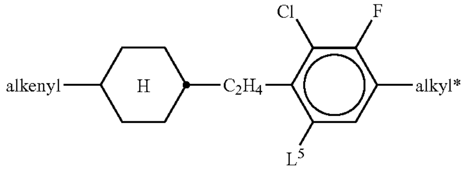
Y1-52
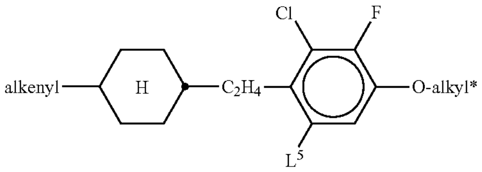
Y1-53
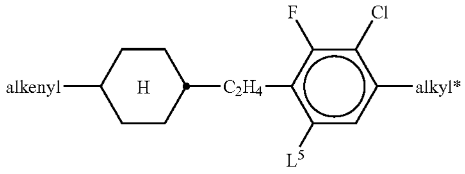
-continued
Y1-54
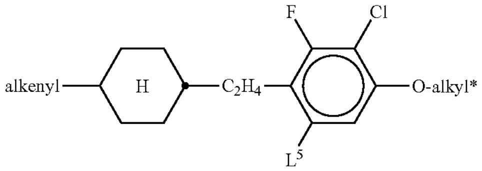
Y1-55
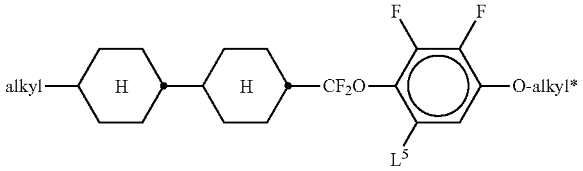
Y1-56
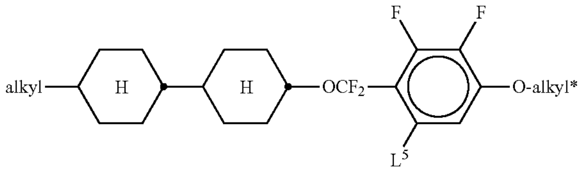
Y1-57
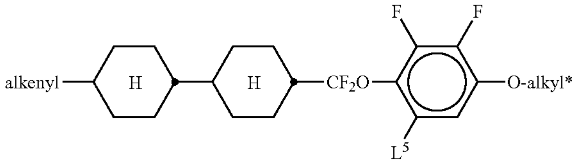
Y1-58
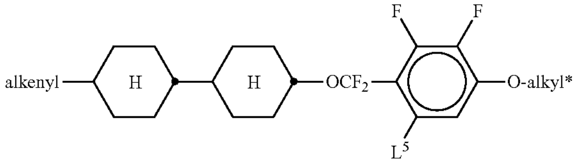
Y1-59
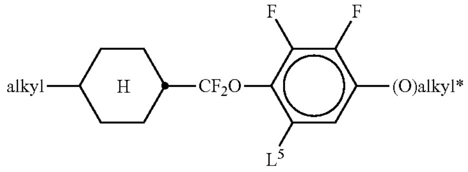
Y1-60
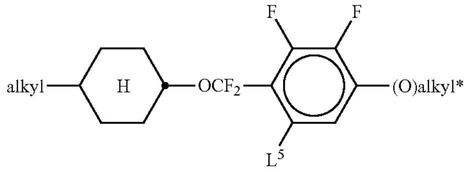

-continued
Y1-61
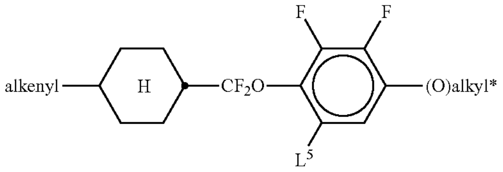
Y1-62
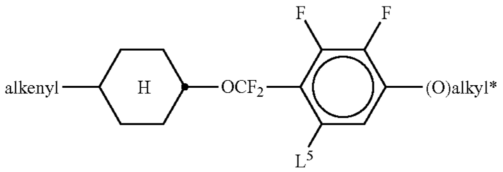
Y1-63
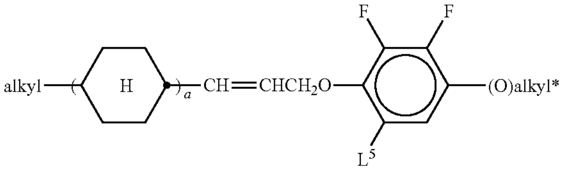
Y1-64
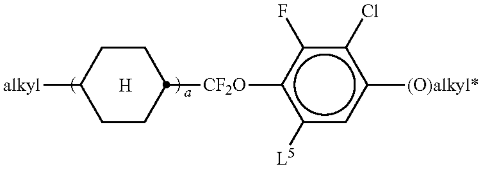
Y1-65
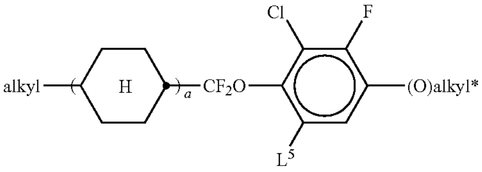
Y1-66
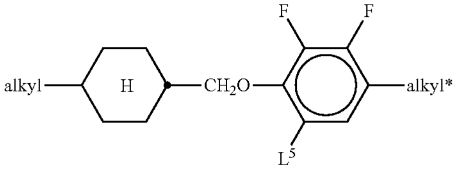
Y1-67
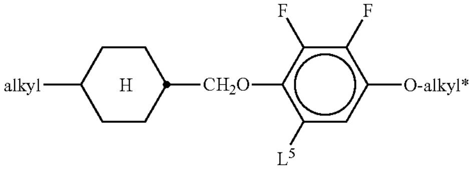
Y1-68
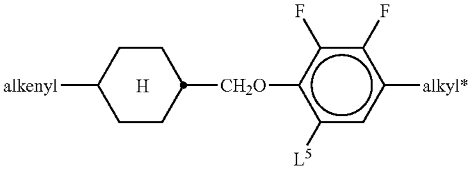
Y1-69
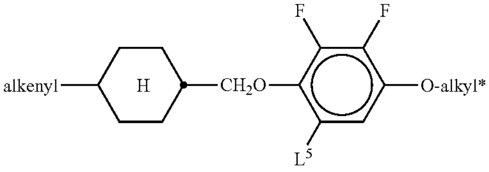
Y1-70
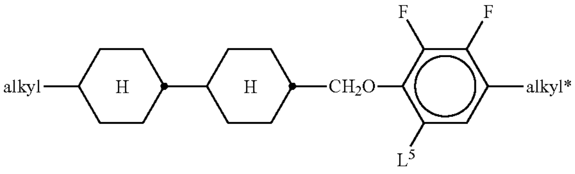
Y1-71
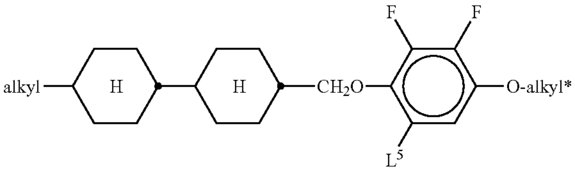
Y1-72
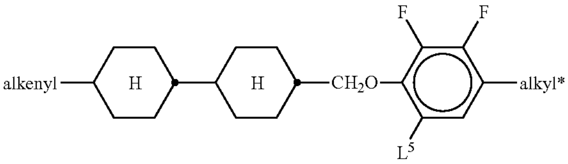
Y1-73
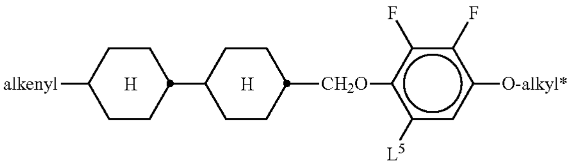
Y1-74
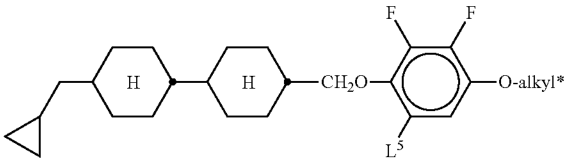
Y1-75
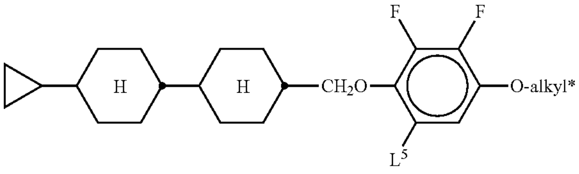
Y1-76
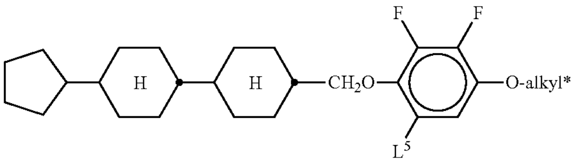

-continued

Y1-77

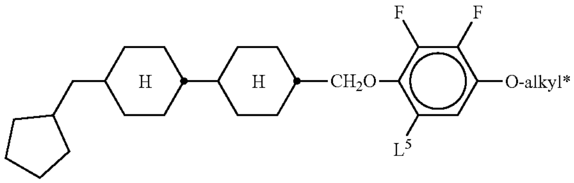

Y1-78

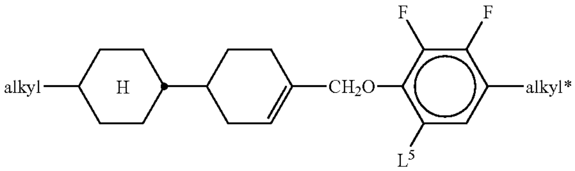

Y1-79

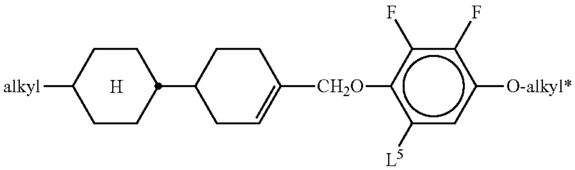

Y1-80

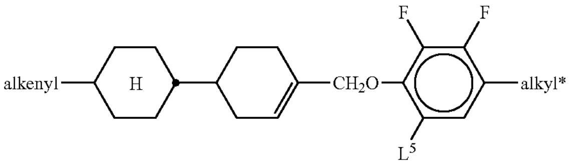

Y1-81

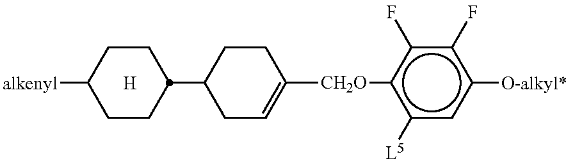

Y1-82

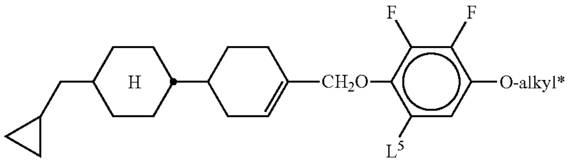

Y1-83

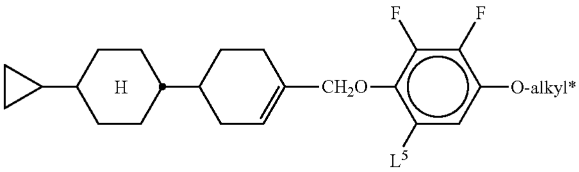

Y1-84

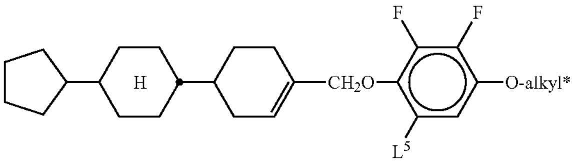

-continued

Y1-85

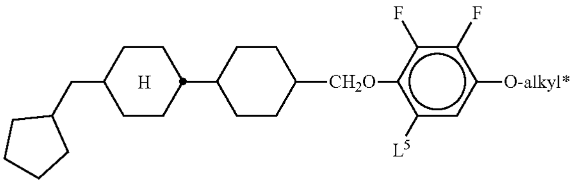

in which a denotes 1 or 2,

"alkyl" and "alkyl*" each, independently of one another, denote a straight-chain alkyl group having 1 to 6 C atoms, "alkenyl" denotes a straight-chain alkenyl group having 2 to 6 C atoms, and $L^5$ denotes a H atom or $CH_3$.

"alkenyl" preferably denotes $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

Very preferably, the LC medium contains one or more compounds of the Formula Y1 selected from the Formulae Y1-1, Y1-2, Y1-7, Y1-12, Y1-17, Y1-22, Y1-40, Y1-41, Y1-42, Y1-44, Y1-50 and Y1-68. $L^5$ preferably denotes a H atom.

Further preferably, the LC medium comprises one or more compounds of the Formula Y2 selected from the group consisting of the following subformulae:

Y2-1

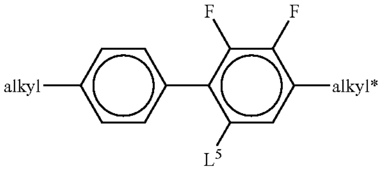

Y2-2

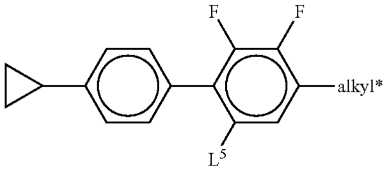

Y2-3

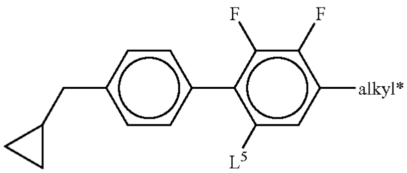

Y2-4

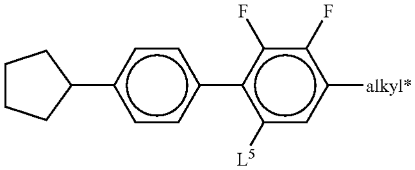

-continued
Y2-5
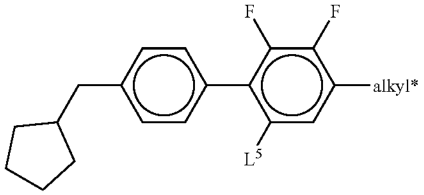
Y2-6
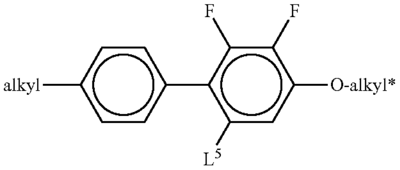
Y2-7
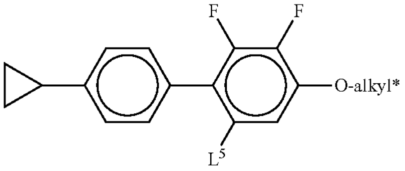
Y2-8
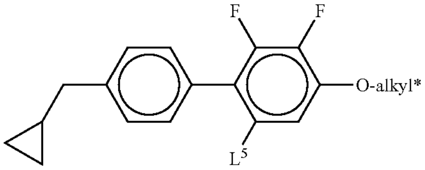
Y2-9
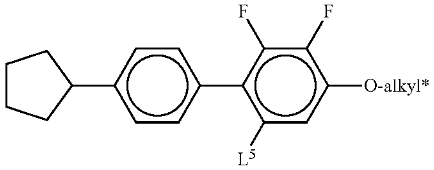
Y2-10
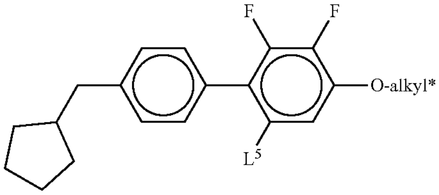
Y2-11
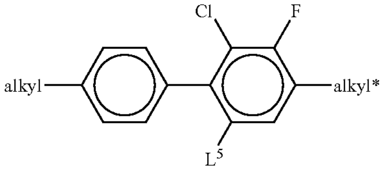
Y2-12
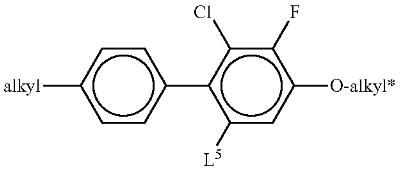
-continued
Y2-13
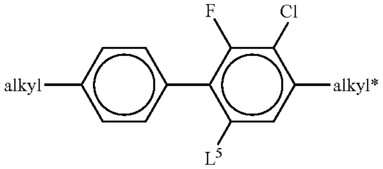
Y2-14
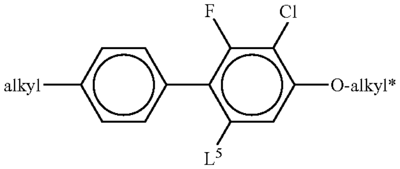
Y2-15
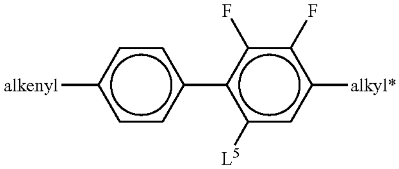
Y2-16
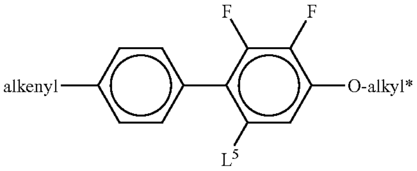
Y2-17
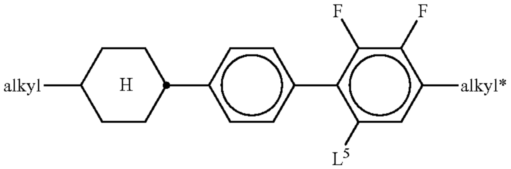
Y2-18
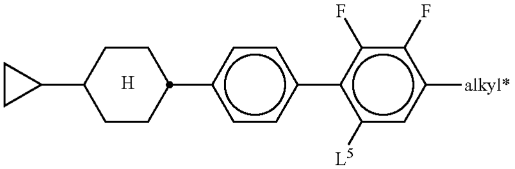
Y2-19
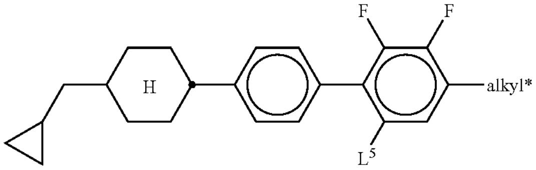
Y2-20
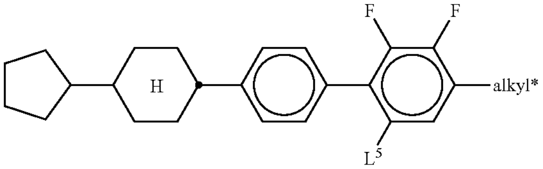

-continued
Y2-21
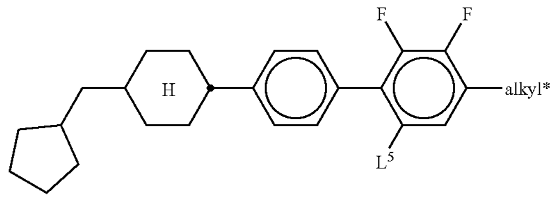
Y2-22
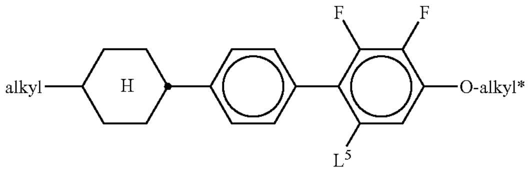
Y2-23
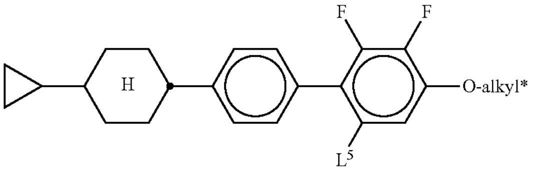
Y2-24
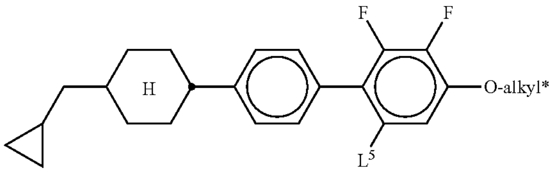
Y2-25
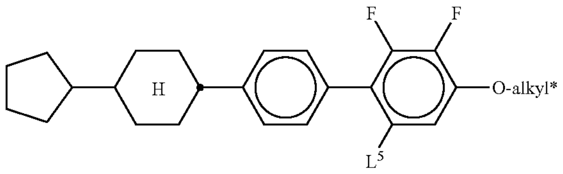
Y2-26
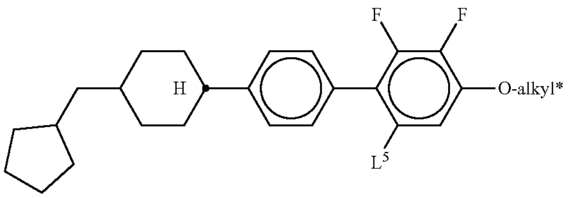
Y2-27
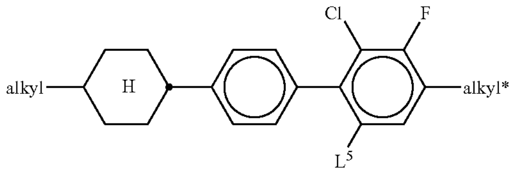
Y2-28
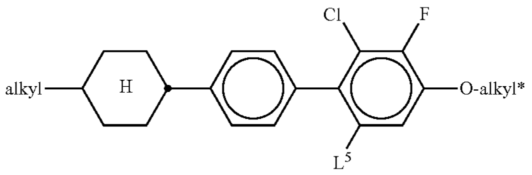
-continued
Y2-29
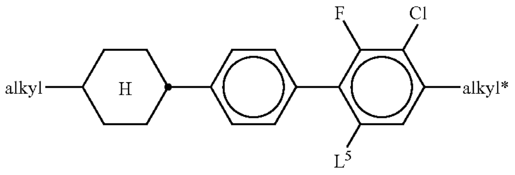
Y2-30
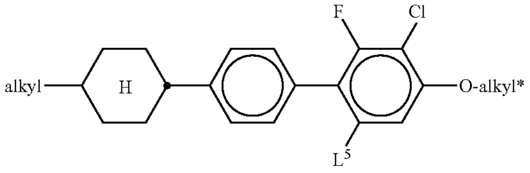
Y2-31
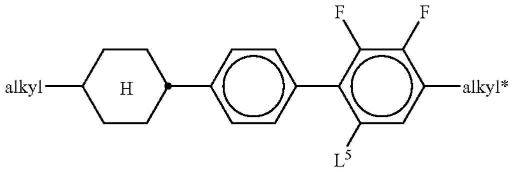
Y2-32
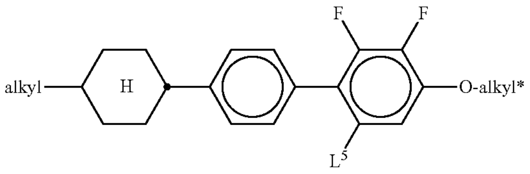
Y2-33
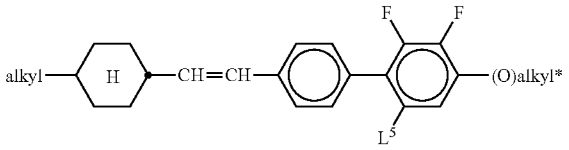
Y2-34
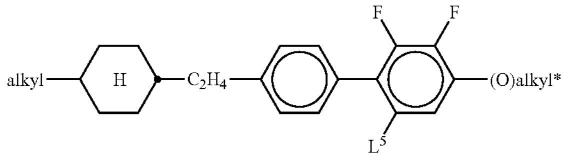
Y2-35
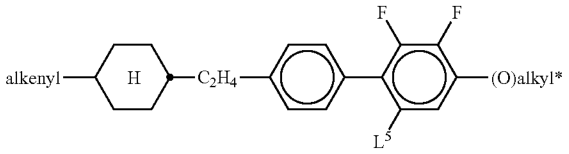
Y2-36
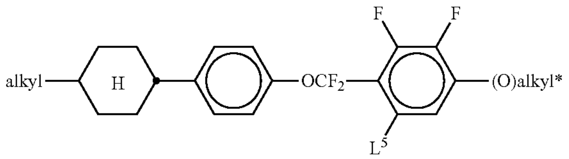

-continued

Y2-37

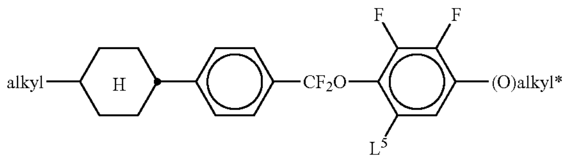

Y2-38

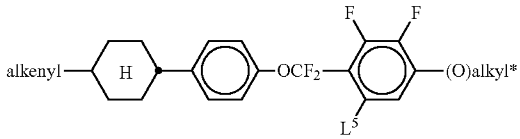

in

Y2-39

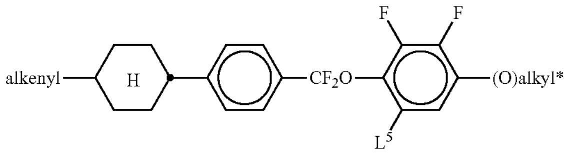

which

"alkyl" and "alkyl*" each, independently of one another, denote a straight-chain alkyl group having 1 to 6 C atoms, and "alkenyl" denotes a straight-chain alkenyl group having 2 to 6 C atoms, (O) denotes an oxygen atom or a single bond, and $L^5$ denotes a H atom or $CH_3$, preferably a H atom.

"alkenyl" preferably denotes $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Very preferably, the LC medium contains one or more compounds of the Formula Y2 selected from Formulae Y2-2 and Y2-10.

The proportion of the compounds of the Formula Y1 or its subformulae in the LC medium is preferably from 0 to 10% by weight.

The proportion of the compounds of the Formula Y2 or its subformulae in the LC medium is preferably from 0 to 10% by weight.

The total proportion of the compounds of the Formula Y1 and Y2 or their subformulae in the medium is preferably from 1 to 20%, very preferably from 2 to 15% by weight.

Preferably, the LC medium contains 1, 2 or 3 compounds of the Formula Y1 and Y2 or their subformulae, very preferably selected from the Formulae Y1-2, Y1-22, Y1-66, Y1-70, Y2-6 and Y2-22.

In another preferred embodiment of the present invention, the LC medium contains one or more compounds of the Formula Y of the following subformula:

Y3

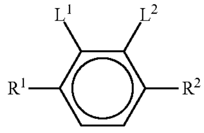

wherein $L^1$, $L^2$, $R^1$ and $R^2$ have one of the meanings given in the Formula Y or one of the preferred meanings as given in the Formulae G, LP1 and LP2.

Preferred compounds of the Formula Y3 are selected from the group consisting of the following subformulae:

Y3-1

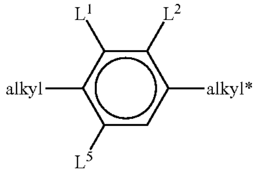

Y3-2

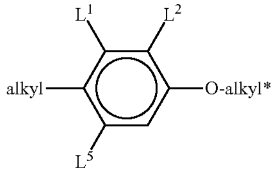

Y3-3

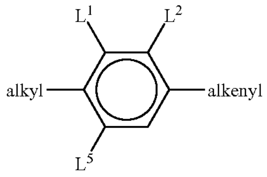

Y3-4

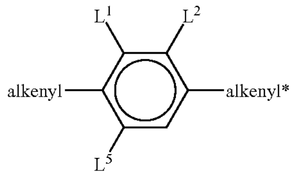

Y3-5

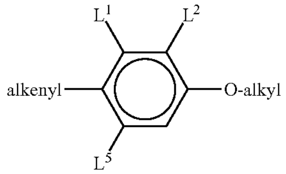

Y3-6

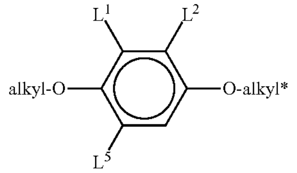

Y3-7

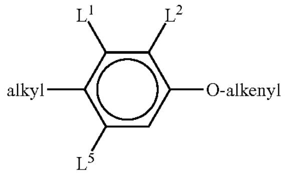

Y3-8

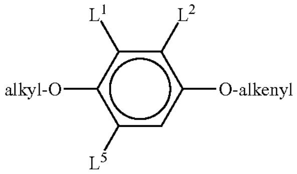

-continued

Y3-9

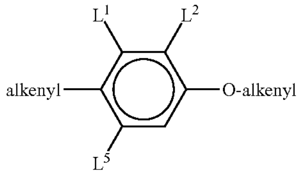

Y3-10

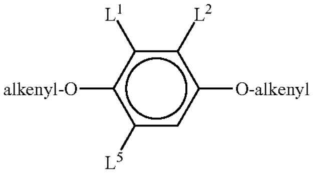

Y3-11

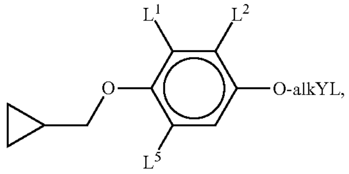

Y3-12

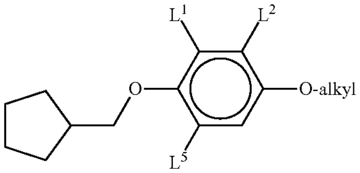

Y3-13

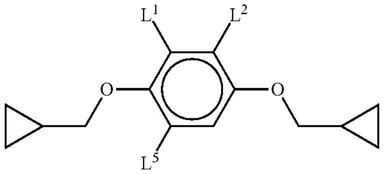

Y3-14

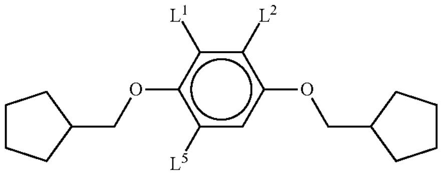

in which,

"alkyl" and "alkyl*" each, independently of one another, denote a straight-chain alkyl group having 1 to 6 C atoms;

"alkenyl" and "alkenyl*" each, independently of one another, denote a straight-chain alkenyl group having 2 to 6 C atoms; and (O) denotes an oxygen atom or a single bond.

"alkenyl" and "alkenyl*" preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred compounds of the Formula Y3 are selected from the group consisting of following subformulae:

Y3-6A

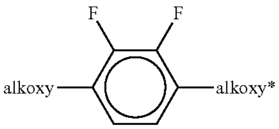

Y3-6B

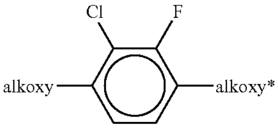

wherein "alkoxy" and "alkoxy*" each, independently of one another, preferably denote straight-chain alkoxy with 3, 4, or 5 C atoms.

Preferably, in the compounds of the Formula Y3 and its subformulae both $L^1$ and $L^2$ denote F. Further preferably in the compounds of the Formula Y3 one of the substituents $L^1$ and $L^2$ denotes F and the other denotes Cl.

The proportion of the compounds of the Formula Y3 or its subformulae in the LC medium is preferably from 0 to 10%, very preferably from 1 to 6% by weight.

Preferably, the LC medium contains 1, 2 or 3 compounds of the Formula Y3 or its subformulae, more preferably of the Formula Y3-6, very preferably of the Formula Y3-6A.

In yet another preferred embodiment of the present invention, the LC medium contains one or more compounds of the Formula Y of the subformula Y4:

Y4

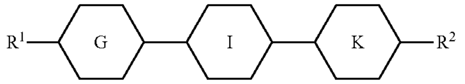

in which $R^1$ and $R^2$ each, independently of one another, have one of the meanings indicated above in the Formula Y, and

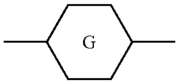 , 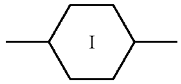 and 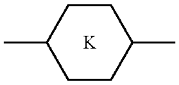

each, independently of one another, denote

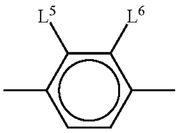 , 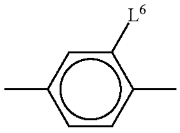 ,

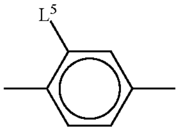 or 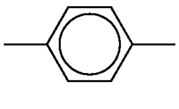

in which $L^5$ denotes F or Cl, preferably F, and $L^6$ denotes F, Cl, $OCF_3$, $CF_3$, $CH_3$, $CH_2F$ or $CHF_2$, preferably F, and preferably at least one of the rings G, I and K is different from unsubstituted benzene.

Mostly preferred compounds of the Formula Y4 are selected from the group consisting of the following subformulae:
Y4-1
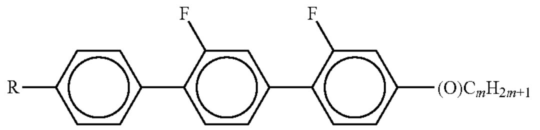
Y4-2
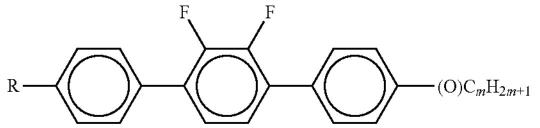
Y4-3
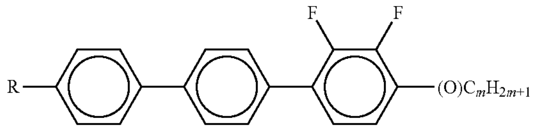
Y4-4
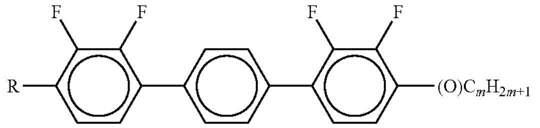
Y4-5
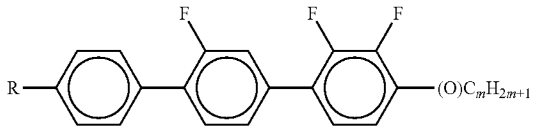
Y4-6
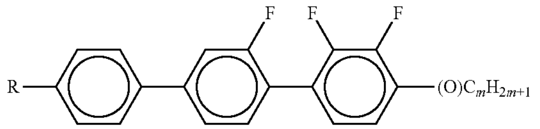
Y4-7
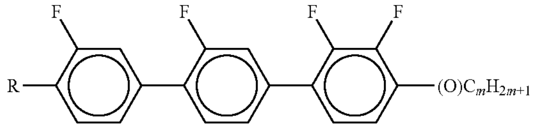
Y4-8
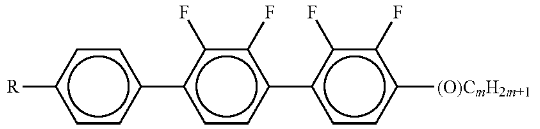
Y4-9
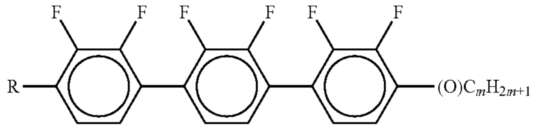
-continued
Y4-10
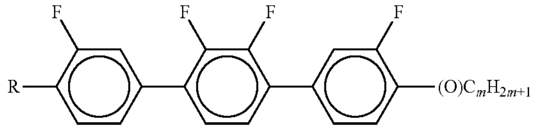
Y4-11
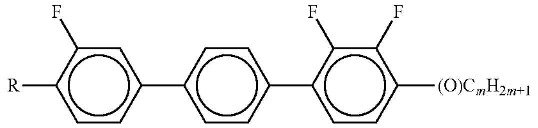
Y4-12
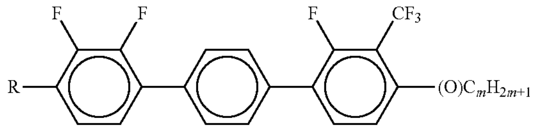
Y4-13
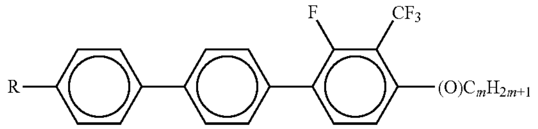
Y4-14
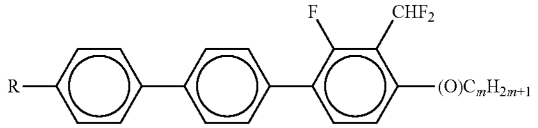
Y4-15
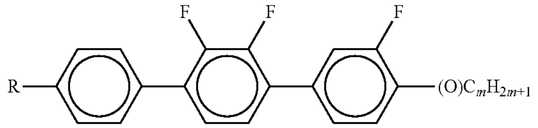
Y4-16
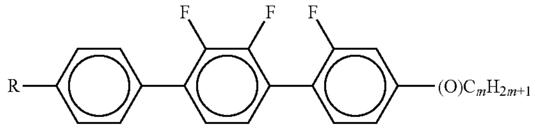
Y4-17
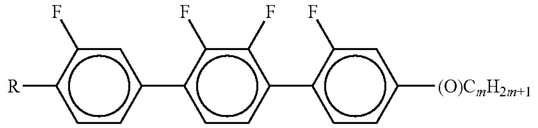
Y4-18
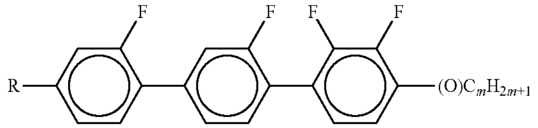
Y4-19
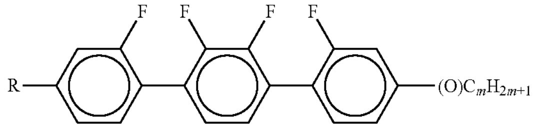

-continued

Y4-20

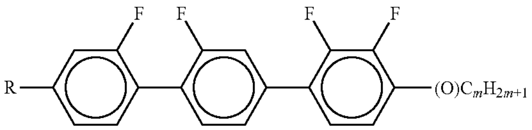

in which

R denotes a straight-chain alkyl or alkoxy group having 1-7 C atoms, (O) denotes an oxygen atom or a single bond, and m denotes an integer from 1 to 6.

R preferably denotes methyl, ethyl, propyl, butyl, pentyl, hexyl, methoxy, ethoxy, propoxy, butoxy or pentoxy.

The proportion of the compounds of the Formula Y4 or its subformulae in the medium is preferably from 0 to 10%, very preferably from 1 to 6% by weight.

Particularly preferred compounds are those of the subformulae

Y4-2a

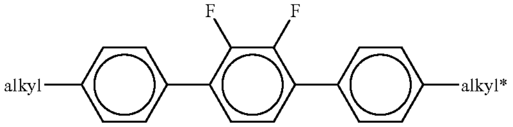

Y4-2b

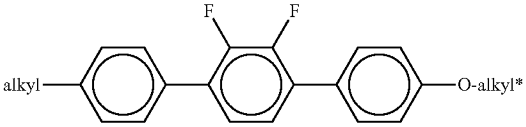

Y4-3a

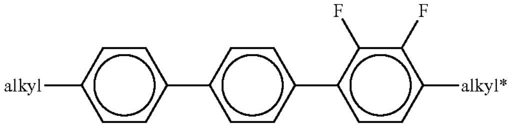

Y4-3b

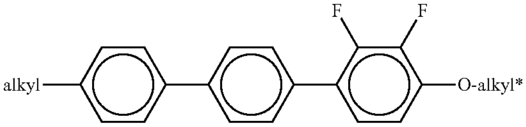

in which

"alkyl" and "alkyl*" each, independently of one another, denote a straight-chain alkyl group having 1 to 6 C atoms, in particular ethyl, propyl or pentyl.

Use of the following compounds is particularly advantageous:

Y4-2a-1

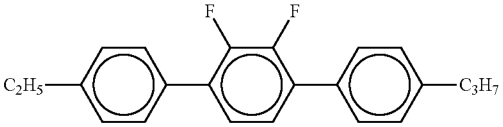

-continued

Y4-2a-2

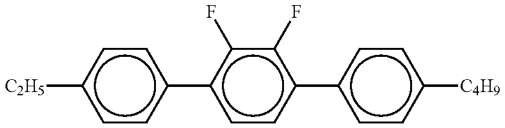

Y4-2a-3

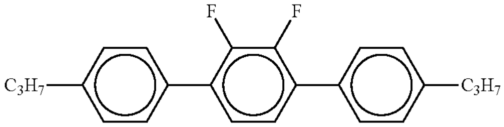

Y4-2a-4

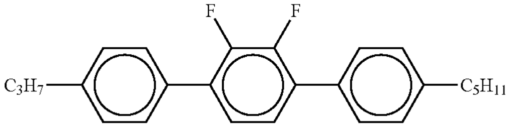

Y4-3a-1

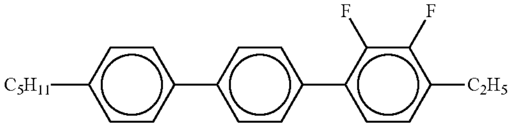

In another preferred embodiment of the present invention, the LC medium contains one or more compounds of the Formula Y selected from the group consisting of the following subformulae:

Y5

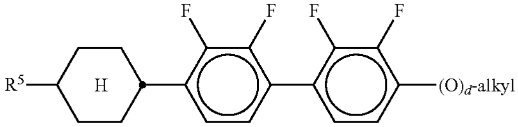

Y6

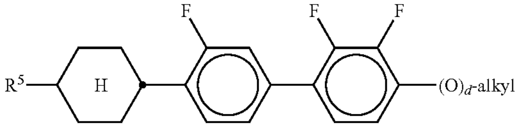

Y7

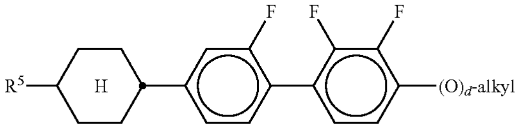

in which $R^5$ has one of the meanings indicated above in the Formula Y for $R^1$, "alkyl" denotes a straight-chain alkyl group having 1 to 6 C atoms, d denotes 0 or 1, and z and m each, independently of one another, denote an integer from 1 to 6.

$R^5$ in these compounds is particularly preferably $C_{2-6}$-alkyl or -alkoxy or $C_{2-6}$-alkenyl, d is preferably 1. The LC medium according to the invention preferably comprises one or more compounds of the above-mentioned formulae in amounts of ≥5% by weight.

Further preferred embodiments are indicated below:

The LC medium comprises one or more compounds of the Formula Y of the following subformula

LY

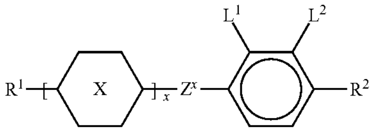

wherein $R^1$, $R^2$, $L^1$, $L^2$, X, x and $Z^x$ have the meanings given in the Formula Y, and wherein at least one of the rings X is cyclohexenylene.

Preferably, both substituents $L^1$ and $L^2$ denote F. Further preferably, one of the substituents $L^1$ and $L^2$ denotes F and the other denotes Cl.

The compounds of the Formula LY are preferably selected from the group consisting of the following subformulae:

LY1

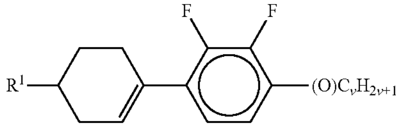

LY2

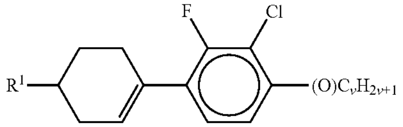

LY3

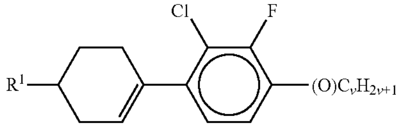

LY4

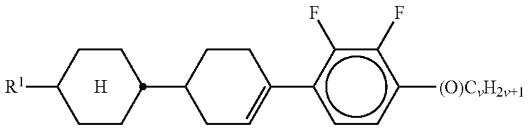

LY5

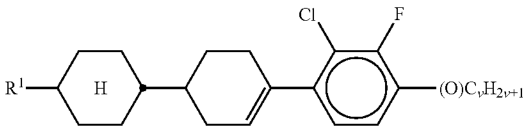

LY6

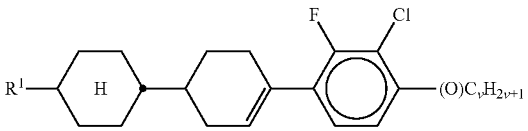

LY7

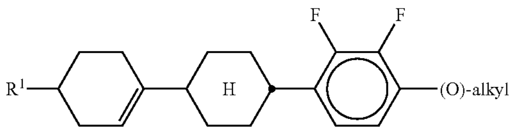

-continued

LY8

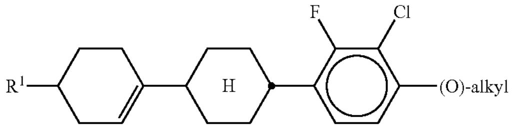

in which $R^1$ has the meaning indicated in the Formula Y above, (O) denotes an oxygen atom or a single bond, and v denotes an integer from 1 to 6.

$R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

Very preferred are compounds of the Formula LY4.

Preferably, the medium contains 1, 2 or 3 compounds of the Formula LY, very preferably of the Formula LY4.

The proportion of the compounds of the Formula LY or its subformulae in the medium is preferably from 1 to 10% by weight.

The medium comprises one or more compounds of the Formula Y represented by the following subformula:

AY

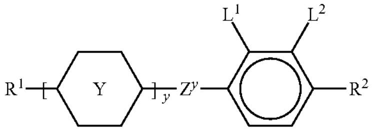

wherein $R^1$, $R^2$, $L^1$, $L^2$, Y, y and $Z^y$ have the meanings given in the Formula Y, and wherein at least one of the rings Y is tetrahydropyrane.

The compounds of the Formula AY are preferably selected from the group consisting of the following subformulae:

AY1

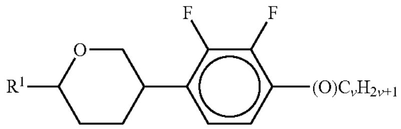

AY2

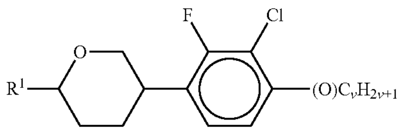

AY3

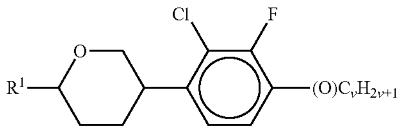

AY4

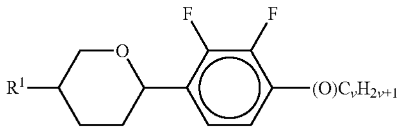

-continued

AY5

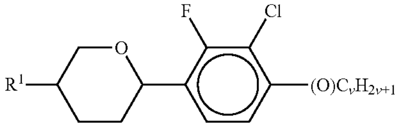

AY6

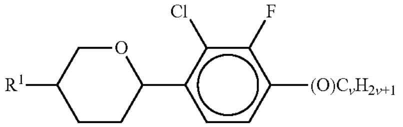

AY7

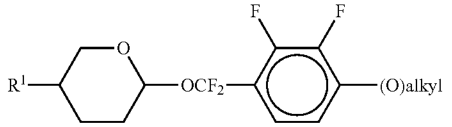

AY8

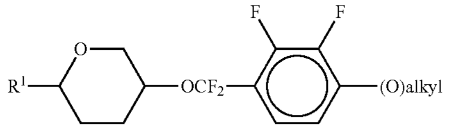

AY9

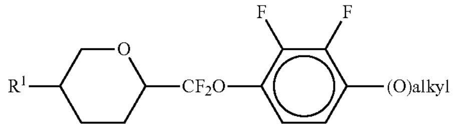

AY10

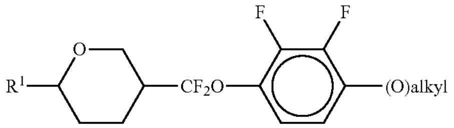

AY11

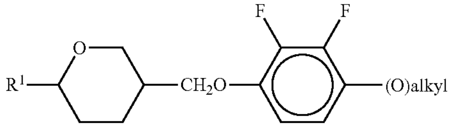

AY12

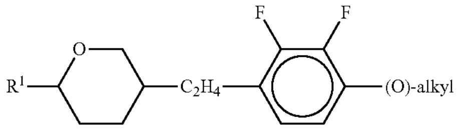

AY13

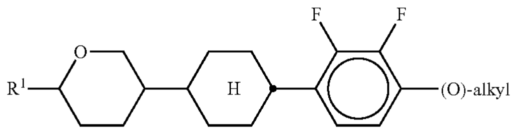

AY14

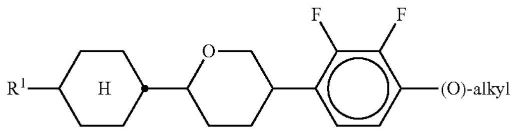

AY15

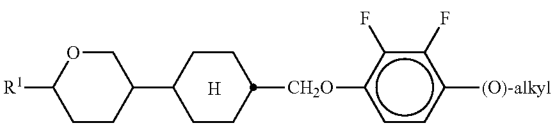

-continued

AY16

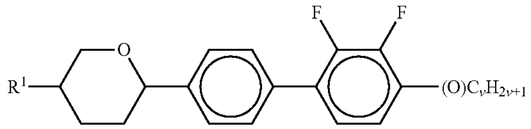

in which $R^1$ has the meaning indicated above,

"alkyl" denotes a straight-chain alkyl group having 1 to 6 C atoms, (O) denotes an oxygen atom or a single bond, and v denotes an integer from 1 to 6.

$R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

In the compounds of the Formula B and its subformulae, $R^1$ and $R^3$ preferably denote straight-chain alkyl or alkoxy having 1 to 6 C atoms, in particular methoxy, ethoxy, propoxy or butoxy, furthermore alkenyl having 2 to 6 C atoms, in particular vinyl, 1E-propenyl, 1E-butenyl, 3-butenyl, 1E-pentenyl, 3E-pentenyl or 4-pentenyl.

In a preferred embodiment of the present invention, the medium contains one or more compounds of the Formula B selected from the following subformulae:

B1

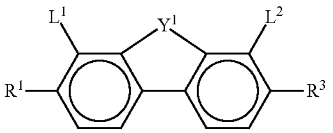

B2

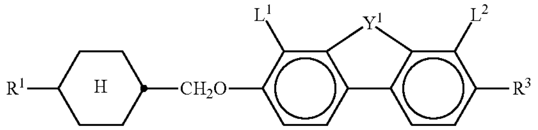

B3

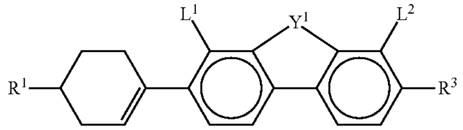

wherein $Y^1$, $L^1$, $L^2$, $R^1$ and $R^3$ have the meanings given in the Formula B.

Preferred compounds of the Formula B1 are selected from the following subformulae:

B1-1

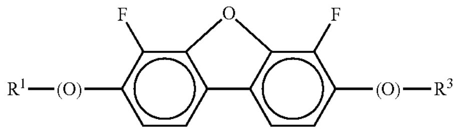

-continued

B1-2

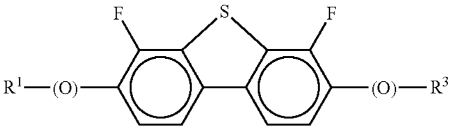

wherein $R^1$ and $R^3$ independently denote a straight-chain alkyl group having 1 to 6 C atoms, in which one or more $CH_2$ groups are optionally substituted by —C≡C—, —$CF_2$O—, —O$CF_2$—, —CH═CH—,

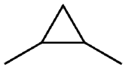, 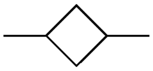, 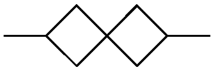, 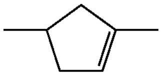, 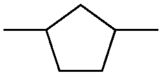,

—O—, —CO—O— or —O—CO— in such a way that O atoms are not linked directly to one another, and in which one or more H atoms may be replaced by a halogen atom.

Very preferred are compounds of the Formula B1-1 and B1-2 wherein both groups (O) denote an oxygen atom and $R^1$ and $R^3$ independently denote an alkyl group being methyl, ethyl, propyl, butyl, pentyl or hexyl, which are preferably straight-chained. Very preferably one "alkyl" is ethyl and the other "alkyl*" is n-pentyl.

Particularly preferred are compounds of the Formula B1-2.

Preferably, the compounds of the Formula B1-1 are selected from the group of compounds of the Formulae B1-1-1 to B1-1-11, preferably of the Formula B1-1-6:

B1-1-1

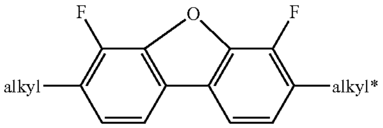

B1-1-2

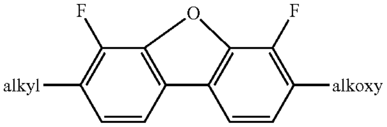

B1-1-3

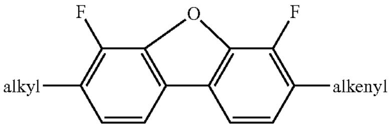

B1-1-4

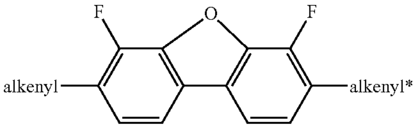

B1-1-5

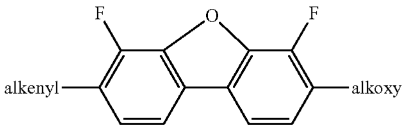

-continued

B1-1-6

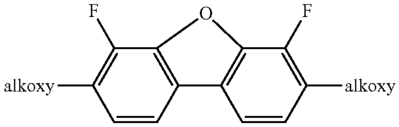

B1-1-7

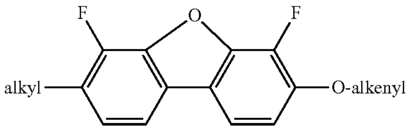

B1-1-8

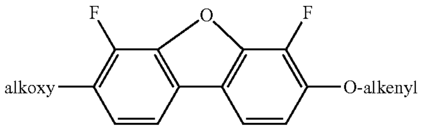

B1-1-9

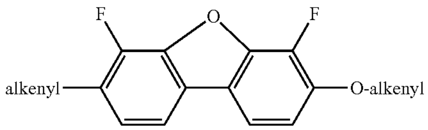

B1-1-10

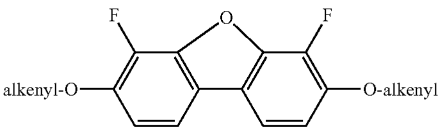

in which

"alkyl" and "alkyl*" each, independently of one another, denote a straight-chain alkyl group having 1 to 6 C atoms, "alkenyl" and "alkenyl*" each, independently of one another, denote a straight-chain alkenyl group having 2 to 6 C atoms, "alkoxy" and "alkoxy*" each, independently of one another, denote a straight-chain alkoxy group having 1 to 6 C atoms.

Preferably, the compounds of the Formula B1-2 are selected from the group of compounds of Formulae B1-2-1 to B1-2-10, preferably of Formula B1-2-6:

B1-2-1

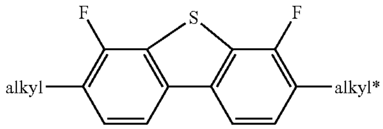

B1-2-2

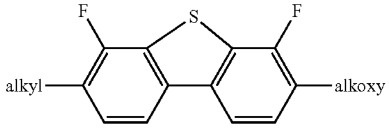

B1-2-3

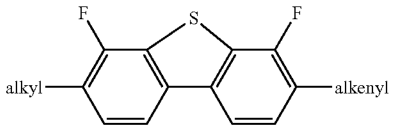

-continued

B1-2-4

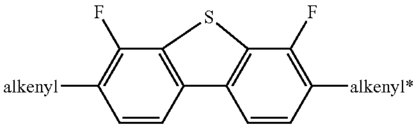

B1-2-5

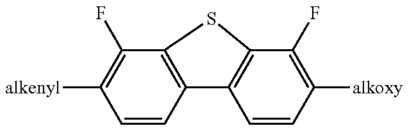

B1-2-6

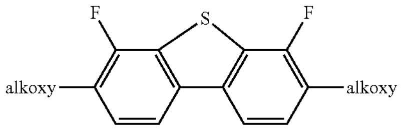

B1-2-7

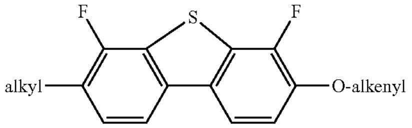

B1-2-8

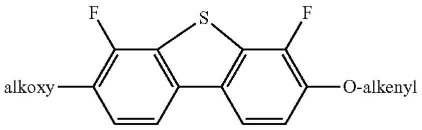

B1-2-9

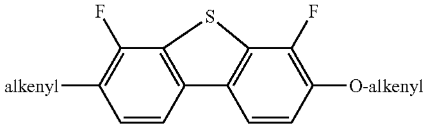

B1-2-10

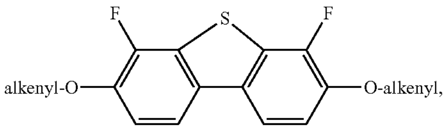

in which

"alkyl" and "alkyl*" each, independently of one another, denote a straight-chain alkyl group having 1 to 6 C atoms, "alkenyl" and "alkenyl*" each, independently of one another, denote a straight-chain alkenyl group having 2 to 6 C atoms, "alkoxy" and "alkoxy*" each, independently of one another, denote a straight-chain alkoxy group having 1 to 6 C atoms.

Optionally, the LC medium comprises one or more compounds of the Formula B1-1A and/or B1-2A:

B1-1A

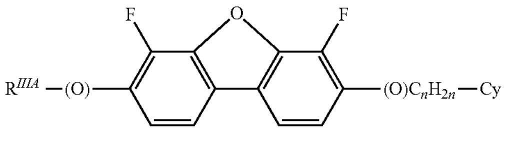

-continued

B1-2A

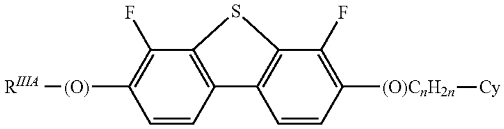

in which (O) denotes O or a single bond, $R^{IIIA}$ denotes alkyl or alkenyl having up to 7 C atoms or a group Cy-$C_mH_{2m+1}$—, m and n are, identically or differently, 0, 1, 2, 3, 4, 5 or 6, preferably 1, 2 or 3, very preferably 1, Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of the Formulae B1-1A and/or B1-2A are contained in the medium either alternatively or in addition to the compounds of the Formulae B1-1 and B1-2, preferably additionally.

Preferred compounds of the Formulae B1-1A and/or B1-2A are also the following:

B1-1A-1

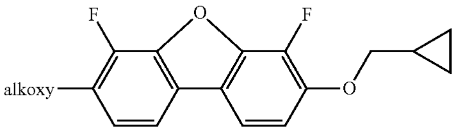

B1-1A-2

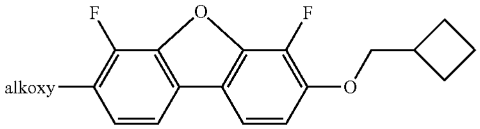

B1-1A-3

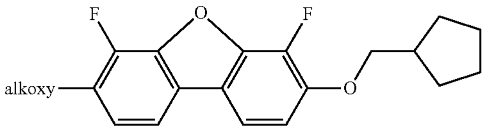

B1-2A-1

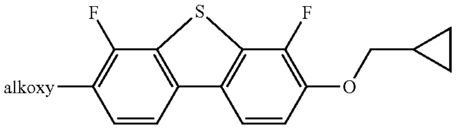

B1-2A-2

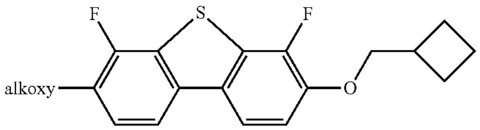

B1-2A-3

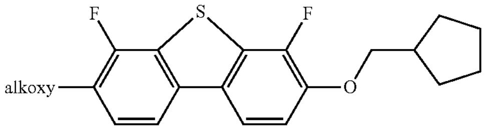

in which alkoxy denotes a straight-chain alkoxy group having 1 to 6 C atoms or alternatively —$(CH_2)_n$F in which n is 2, 3, 4, or 5, preferably $C_2H_4F$.

The proportion of the compounds of the Formula B1 or its subformulae in the LC medium is preferably from 1 to 20%, very preferably from 1 to 15% by weight.

Preferably, the LC medium contains 1, 2 or 3 compounds of the Formula B1 or its subformulae.

In a preferred embodiment of the present invention, the LC medium may comprise one or more compounds of the Formula B2-2

B2-2

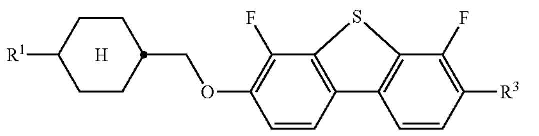

in which $R^1$, $R^3$ identically or differently, denote H, an alkyl or alkoxy group having 1 to 6 C atoms, in which one or more $CH_2$ groups in these groups are optionally replaced, independently of one another, by —C≡C—, —$CF_2$O—, —O$CF_2$—, —CH═CH—,

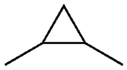 , 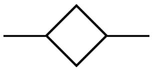 , 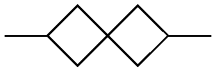 , 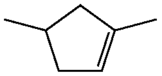 , 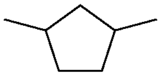 ,

—O—, —CO—O— or —O—CO— in such a way that O atoms are not linked directly to one another, and in which, in addition, one or more H atoms may be replaced by halogen.

The compounds of the Formula B2-2 are preferably selected from the group of compounds of the Formulae B2-2-1 to B2-2-10:

B2-2-1

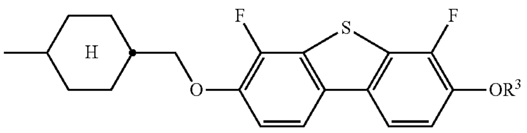

B2-2-2

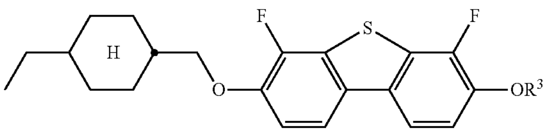

B2-2-3

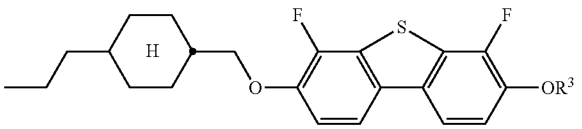

-continued

B2-2-4

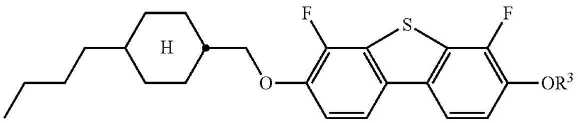

B2-2-5

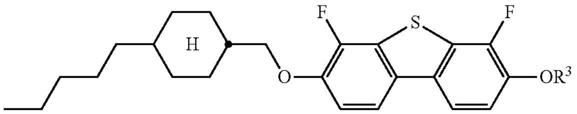

B2-2-6

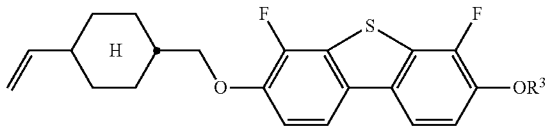

B2-2-7

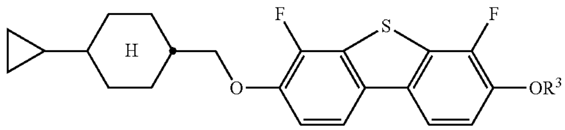

B2-2-8

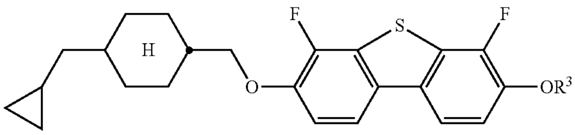

B2-2-9

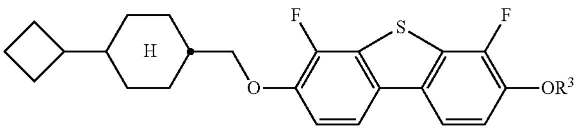

B2-2-10

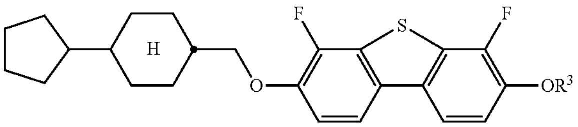

in which $R^3$ denotes alkyl having 1 to 6 C-atoms, preferably ethyl, n-propyl or n-butyl, or alternatively cyclopropylmethyl, cyclobutylmethyl or cyclopentylmethyl or alternatively —$(CH_2)_n$F in which n is 2, 3, 4, or 5, preferably $C_2H_4F$.

Particularly preferred compounds of the Formula B2 are selected from the following subformulae:

B2-2-11

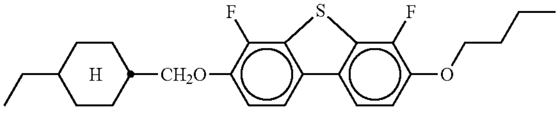

-continued

B2-2-12

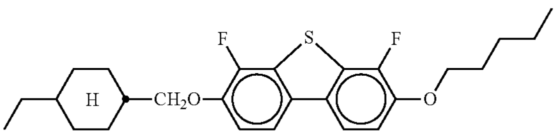

B2-2-13

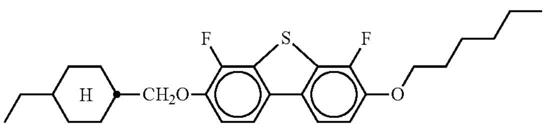

The proportion of the compounds of the Formula B2 or its subformulae in the LC medium is preferably from 1 to 20%, very preferably from 1 to 15% by weight.

Preferably, the LC medium contains 1, 2 or 3 compounds of the Formula B2 or its subformulae.

Preferred compounds of the Formula B3 are selected from the following subformulae:

B3-1

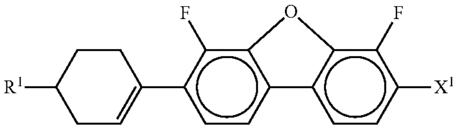

B3-2

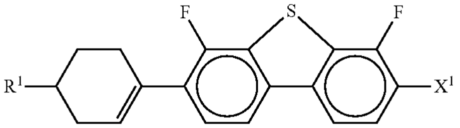

wherein $R^1$ has one of the meanings given in the Formula B3 and preferably denotes straight-chain alkyl having 1 to 6 C atoms, very preferably methyl, ethyl, propyl, butyl, pentyl or hexyl, more preferably ethyl or propyl, most preferably propyl, and $X^1$ has one of the meanings given in the Formula B3 and preferably denotes $CF_3$ or $OCF_3$.

Preferred compounds of the Formula B3 are selected from the following subformulae:

B3-1-1

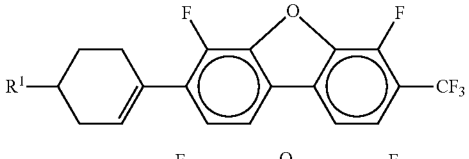

B3-1-2

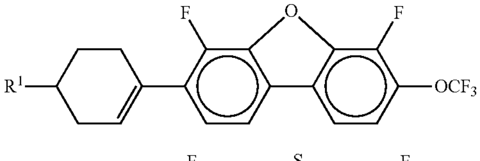

B3-2-1

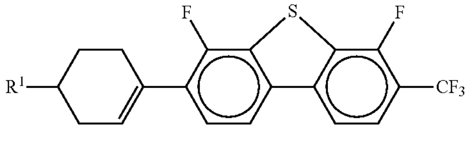

-continued

B3-2-2

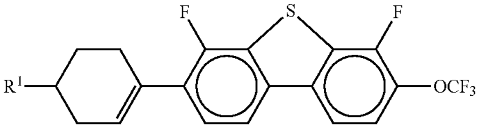

wherein $R^1$ has one of the meanings given in the Formula B3 and preferably denotes straight-chain alkyl having 1 to 6 C atoms, very preferably methyl, ethyl, propyl, butyl, pentyl or hexyl, more preferably ethyl or propyl, most preferably propyl.

Most preferred are compounds of the Formulae B3-1-1 and B3-2-2.

In a preferred embodiment, the LC medium contains one or more compounds of the Formula B or its subformulae B1, B2, B3, B1-1, B1-2, B2-1, B2-2, B2-3, B3-1, B3-2, B3-1-1, B3-1-2, B3-2-1 and B3-2-2 wherein the dibenzofuran or dibenzothiophene group is substituted by a methyl or methoxy group, preferably by a methyl group, preferably in p-position to the substituent F, very preferably in p-position to the substituent F (i.e. in m-position to the terminal group $R^2$ or $X^1$).

The proportion of the compounds of the Formula B3 or its subformulae in the LC medium is preferably from 1 to 20%, very preferably from 1 to 10% by weight.

Preferably, the LC medium contains 1, 2 or 3 compounds of the Formula B3 or its subformulae.

Preferably, the total proportion of compounds of the Formula Y and B or their subformulae in the LC medium is from 2 to 25%, very preferably from 3 to 20% by weight.

Compounds of Formula ST

In some preferred embodiments of the present invention, the LC medium may further comprise one or more compounds of the general Formula ST:

ST

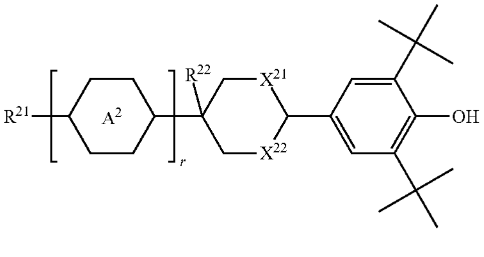

in which in which the individual substituents have the following meanings:

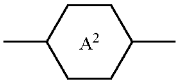 denotes 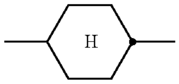, 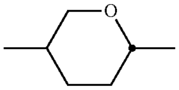 or 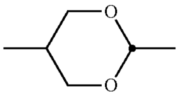;

$X^{21}$, $X^{22}$ each, independently of one another, denote —O—, —$CH_2$—, —$CHR^{23}$— or —N—$R^{23}$—, $R^{21}$ and $R^{22}$ each, independently of one another, denote a H atom or an alkyl- or alkoxy group having 1 to 12 C atoms, an alkenyl, alkynyl, alkenyloxy or alkoxyalkyl group having 2 to 12 C atoms or a cycloalkyl group having 3 to 12 C atoms, in which one or more non-adjacent $CH_2$ groups are optionally substituted by —C≡C—, —$CF_2O$—, —$OCF_2$—, —CH═CH—

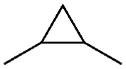, 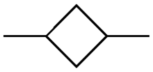, 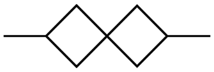,

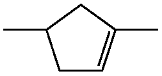, 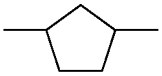,

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms, in which one or more H atoms may be replaced by a halogen atom, $R^{23}$ denotes a H atom, an alkyl or alkoxy group having 1 to 10 C atoms, r denotes 0 or 1.

LC media comprising compounds of the following sub-formulae ST-1, ST-2 and ST-3 showed a particularly high long-term thermal and UV stability:

ST-1

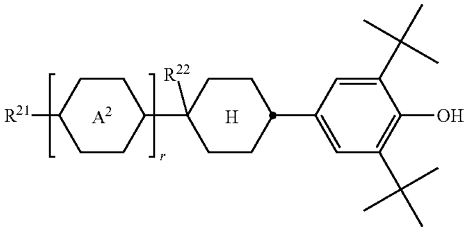

ST-2

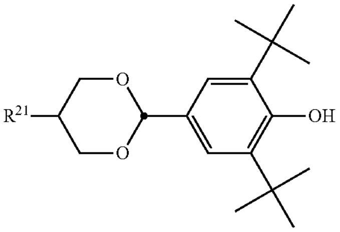

ST-3

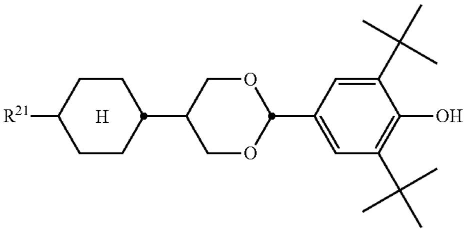

ST-4

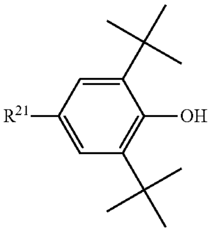

in which the individual substituents have the following meanings:

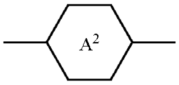 denotes 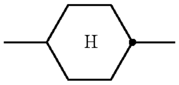,

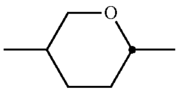 or 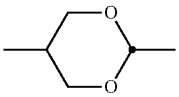;

$R^{21}$ and $R^{22}$ each, independently of one another, denote a H atom or an alkyl or alkoxy group having 1 to 7 C atoms, and r denotes 0 or 1.

In particularly preferred embodiments, the compounds of the general Formula ST can be selected from the following specific structures:

ST-1-1

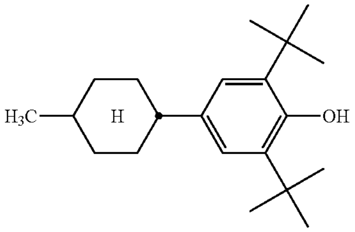

ST-1-2

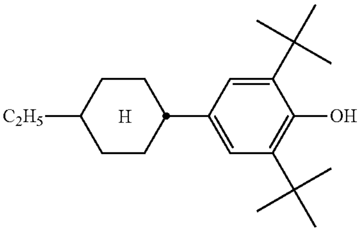

ST-1-3

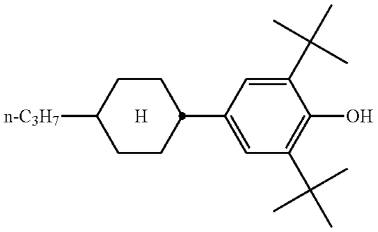

ST-1-4

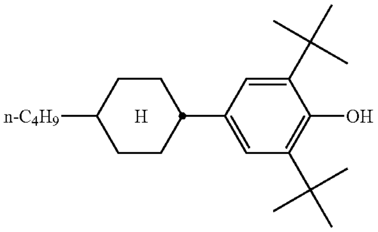

ST-1-5

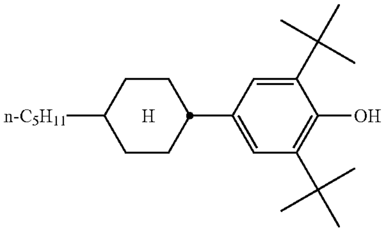

-continued
ST-1-6
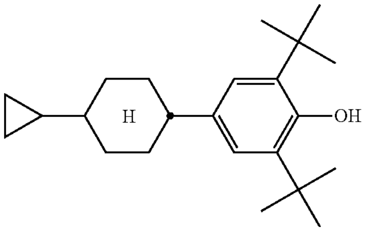
ST-1-7
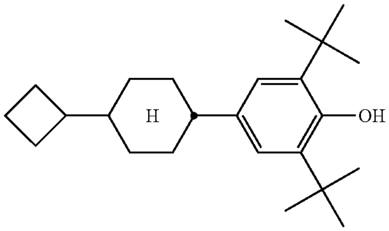
ST-1-8
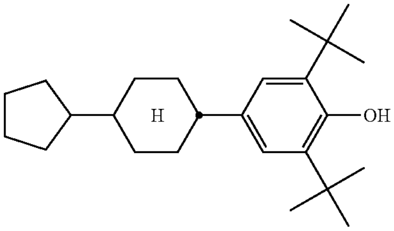
ST-2-1
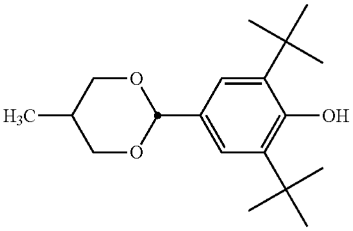
ST-2-2
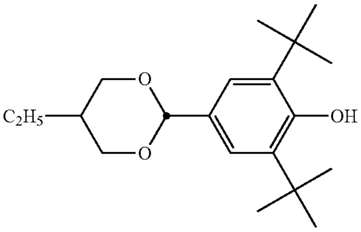
ST-2-3
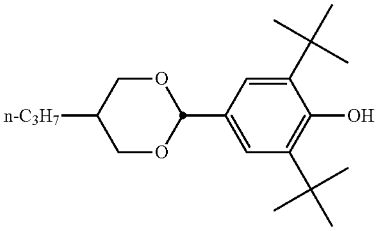
-continued
ST-2-4
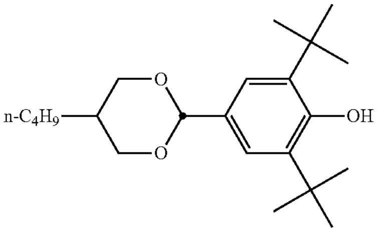
ST-2-5
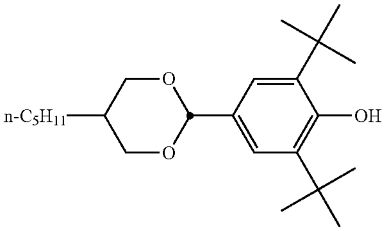
ST-2-6
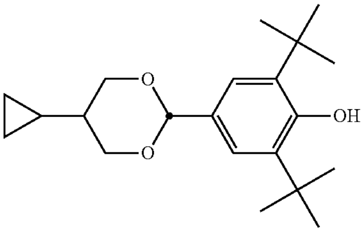
ST-2-7
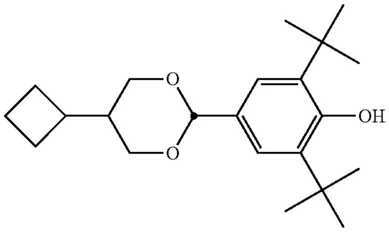
ST-2-8
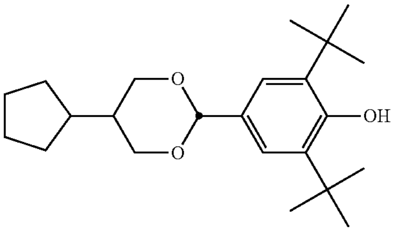
ST-2-9
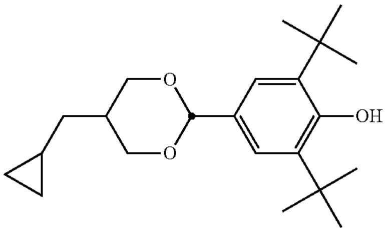

-continued

ST-2-10

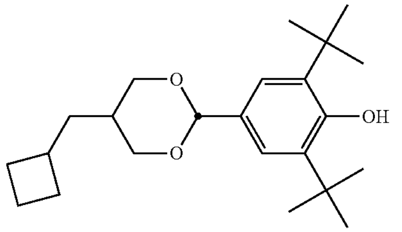

ST-4-1

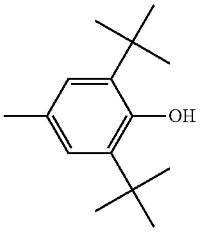

ST-4-2

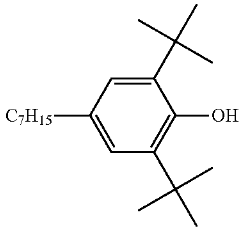

In a further preferred embodiment, the LC medium according to the present invention may comprise at least one further sterically hindered phenol, which is mentioned in Table B below.

Compounds of Formula H

The LC medium may optionally comprise one or more compounds of the Formula H

—O— or —C(═O)—, but two adjacent —$CH_2$— groups cannot be replaced by —O—, and in which one H atom or a plurality of H atoms may be replaced by F, $OR^{13}$, $N(R^{13})(R^{14})$ or $R^{15}$, or an aromatic or heteroaromatic hydrocarbon group, in which one H atom or a plurality of H atoms may be replaced by $OR^{13}$, $N(R^{13})(R^{14})$ or $R^{15}$, $R^{13}$ and $R^{14}$ each, independently of one another, denotes an alkyl or acyl group having 1 to 10 C atoms or an aromatic hydrocarbon or carboxylic acid group having 6 to 12 C atoms, $R^{15}$ each, independently of one another, denotes an alkyl group having 1 to 10 C atoms, in which one —$CH_2$— group or a plurality of —$CH_2$— groups may be replaced by —O— or —C(═O)—, but two adjacent —$CH_2$— groups cannot be replaced by —O—, $R^{16}$ each, independently of one another a H atom, an alkyl group or an alkoxy group having 1 to 10 C atoms, O-cycloalkyl group having 3 to 12 C atoms, O· or OH, $S^{11}$ and $S^{12}$ each, independently of one another, denote an alkylene group having 1 to 20 C atoms, in which one —$CH_2$— group or, if present, a plurality of —$CH_2$— groups may be replaced by —O— or —C(═O)—, but two adjacent —$CH_2$— groups cannot be replaced by —O—, and in which one H atom or a plurality of H atoms may be replaced by F, $OR^{13}$, $N(R^{13})(R^{14})$ or $R^{15}$, or denote a single bond, $Y^{11}$ to $Y^{14}$ each, independently of one another, denote methyl or ethyl, $X^{11}$ denotes C, $Z^{11}$ to $Z^{14}$ each, independently of one another, denote —O—, —(C═O)—, —O—(C═O)—, —(C═O)—O—, —O—(C═O)—O—, —(N—$R^{13}$)—, —N—$R^{13}$—(C═O)— or a single bond if $S^{11}$ is a single bond, both $Z^{11}$ and $Z^{12}$ do not simultaneously denote —O—; if $S^{12}$ is a single bond, both $Z^{13}$ and $Z^{14}$ do not simultaneously denote —O—; and, if q denotes 0, both $Z^{12}$ and $Z^{13}$ do not simultaneously denote —O—,

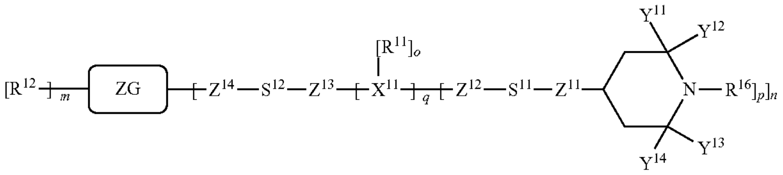

H in which $R^{11}$ each, independently of one another, denotes a H atom, F, an alkyl group having 1 to 20 C atoms, in which one —$CH_2$— group or, if present, a plurality of —$CH_2$— groups may be replaced by —O— or —C(═O)—, but two adjacent —$CH_2$— groups cannot be replaced by —O—, and one or, if present, a plurality of —$CH_2$— groups may be replaced by —CH═CH— or —C≡C—, and in which one H atom or a plurality of H atoms may be replaced by F, $OR^{13}$, $N(R^{13})(R^{14})$ or $R^{15}$, $R^{12}$ each, independently of one another, denotes a H atom, an alkyl group having 1 to 20 C atoms, in which one —$CH_2$— group or a plurality of —$CH_2$— groups may be replaced by —O— or —C(═O)—, but two adjacent —$CH_2$— groups cannot be replaced by —O—, a hydrocarbon group which contains a cycloalkyl or alkylcycloalkyl unit and in which one —$CH_2$— group or a plurality of —$CH_2$— groups may be replaced by p denotes 1 or 2, q denotes 0 or 1, o denotes (3−p), n denotes an integer from 1 to 10, m denotes an integer from 0 to 8, wherein n*p denotes an integer from 1 to 10, preferably from 3 to 8, and

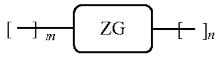

denotes an organic moiety having (m+n) bonding sites,

In some preferred embodiments of the present invention, in the compounds of the Formula H,

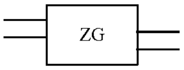
denotes
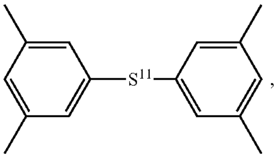
,

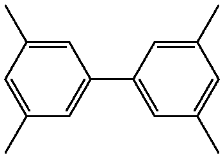
or
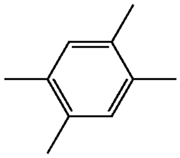

(biphenyl-1,1′,3,3′-tetrayl) (benzene-1,2,4,5-tetrayl)

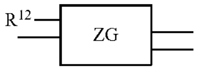
denotes
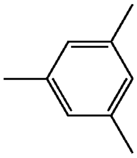
or (benzene-1,3,5-triyl)

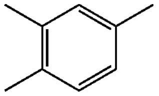

(benzene-1,2,4-triyl),

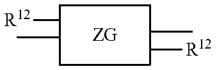

denotes $—(CH_2—)_2$, $—(CH_2—)_3$, $—(CH_2—)_4$, $—(CH_2—)_5$, $—(CH_2—)_6$, $—(CH_2—)_7$, $—(CH_2—)_8$, i.e. ethane-1,2-diyl, propane-1,3-diyl, butane-1,4-diyl, pentane-1,5-diyl, hexane-1,6-diyl, heptane-1,7-diyl, octane-1,8-diyl,

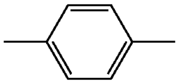
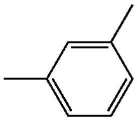
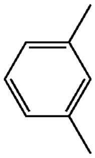

(1,4-phenylene) (1,3-phenylene)

, , (1,2-phenylene) or

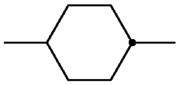

(trans-1,4-cyclohexylene)

and/or wherein $—Z^{12}—S^{11}—Z^{11}—$ on each occurrence, independently of one another, denotes —O—, $S^{11}$—O—, —O—$S^{11}$—O—, —(C═O)—O—$S^{11}$—O—, —O—(C═O)—$S^{11}$—O—, —O—(C═O)—$S^{11}$—(C═O)—O—, —O—$S^{11}$—(C═O)—O—, —(C═O)—O—$S^{11}$—C, —(C═O)—O—$S^{11}$—O—(C═O)— or —(N—$R^{13}$)—$S^{11}$—O—, —(N—$R^{13}$—C(═O)—$S^{11}$—(C═O)—O or a single bond, preferably —O—, —$S^{11}$—O—, —O—$S^{11}$—O—, —(C═O)—O—$S^{11}$—O—, —O—(C═O)—$S^{11}$—O— or —O—$S^{11}$—(C═O)—O—, and/or $S^{11}$ preferably denotes an alkylene group having 1 to 20 C atoms, and/or $R^{11}$ if present, denotes alkyl, alkoxy or H, preferably H or alkyl, and/or $R^{12}$ denotes H, methyl, ethyl, propyl, isopropyl or 3-heptyl, or cyclohexyl.

In a preferred embodiment of the present application, in the compounds of the Formula H,

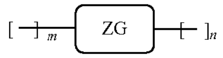

denotes a group selected from the group of the formulae:

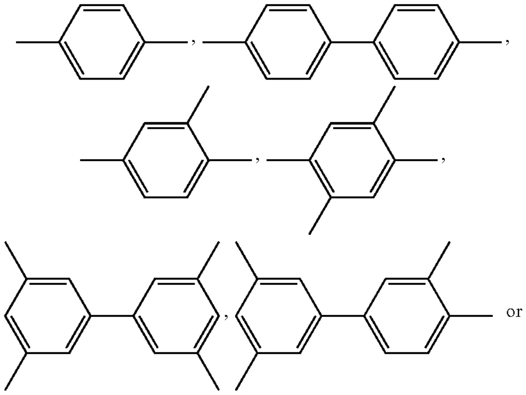
or

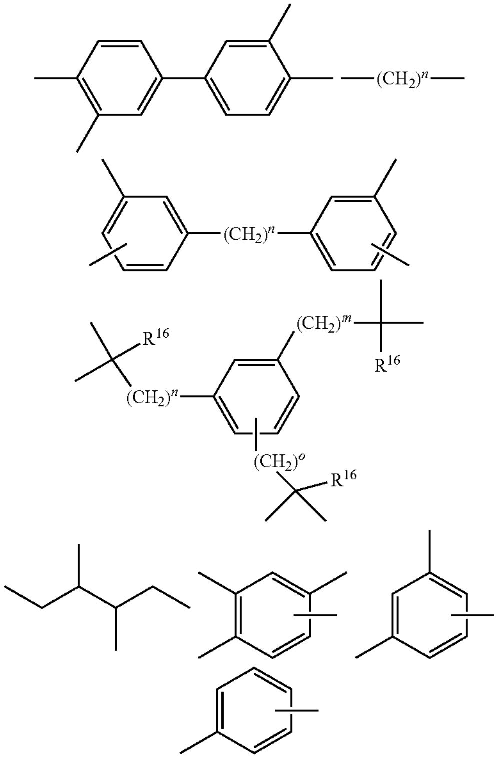

In a further preferred embodiment of the present application, in the compounds of the Formula H,

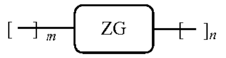

denotes a group selected from the group of the formulae

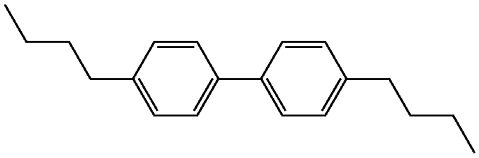

,

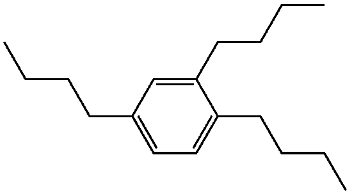

or

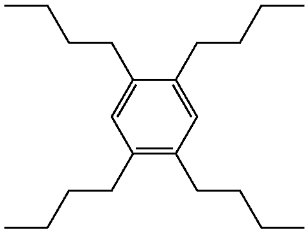

.

In yet a further preferred embodiment of the present invention, in the compounds of the Formula H in which p preferably denotes 1,

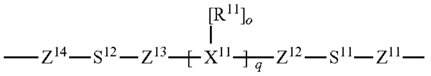

denotes $—Z^{12}—S^{11}—Z^{11}—$, preferably $—O—S^{11}—O—$, $—S^{11}—O—$ or $—O—S^{11}—$, particularly preferably $—O—S^{11}—O—$ or $—S^{11}—O—$.

In a further preferred embodiment of the present invention, in the compounds of the Formula H, the group

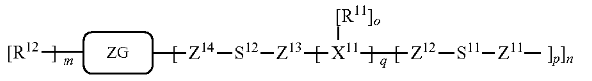

denotes a group selected from the group of the formulae

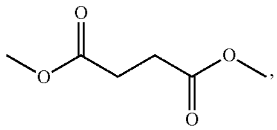

,

-continued

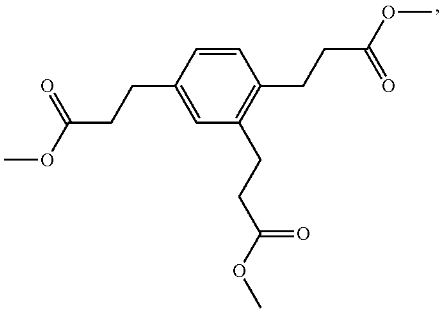

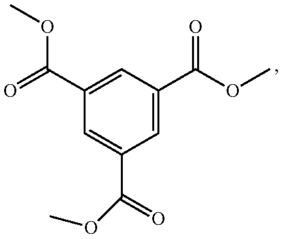

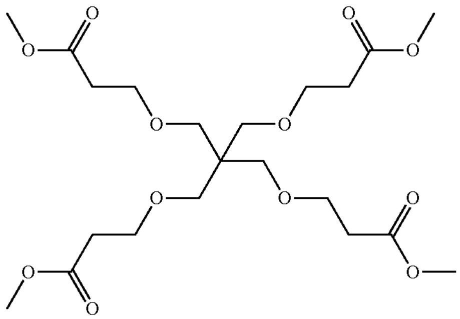

or

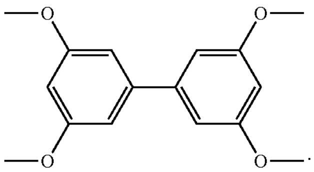

In a further preferred embodiment of the present invention, in which p is 2, which may be identical to or different from those described above, in the compounds of the Formula H,

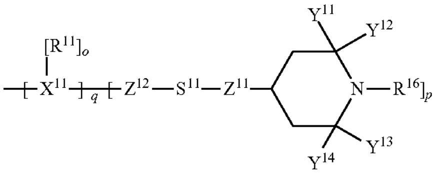

denotes a group selected from the group of the formulae

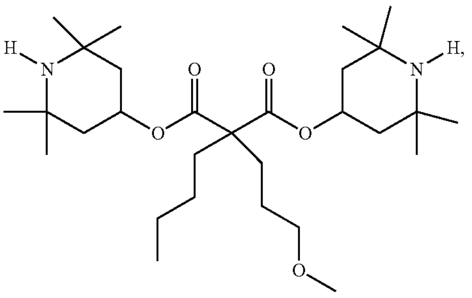

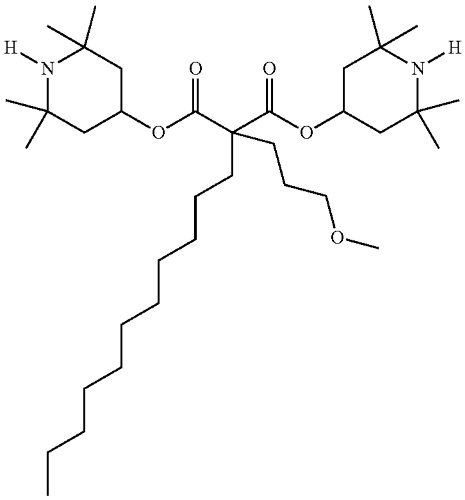

and

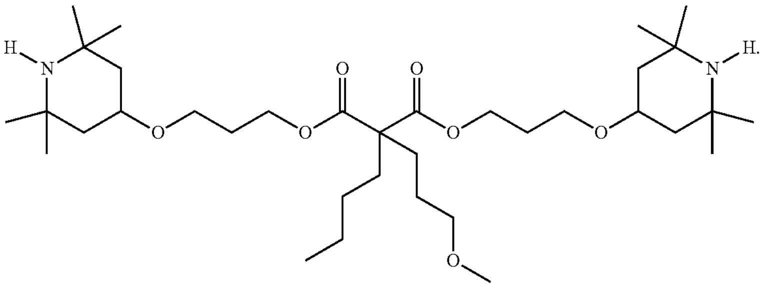

In yet a further preferred embodiment of the present invention, which may be identical to or different from those described above, in the compounds of the Formula H, the group

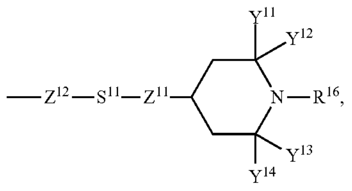

on each occurrence, independently of one another, denotes

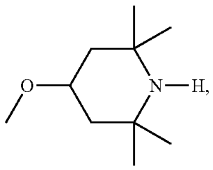

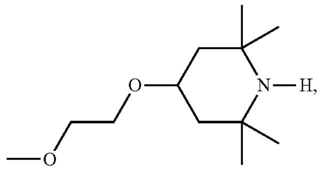

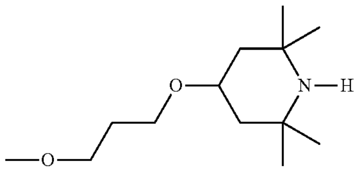

or

-continued

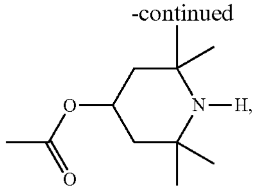

preferably

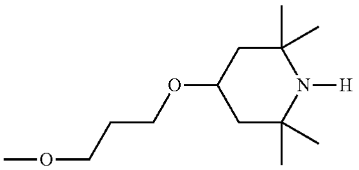

or

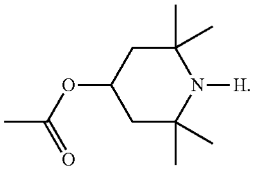

Compounds of the following general Formulae H-1-1, H-1-2 and H-1-3, showed to be particularly efficient UV stabilisers in LC mixtures, in particular, in terms of VHR stability:

H-1-1

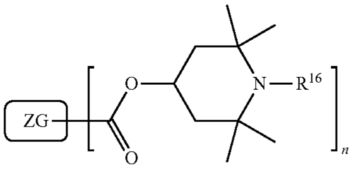

H-1-2

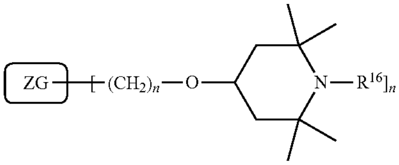

-continued

H-1-3

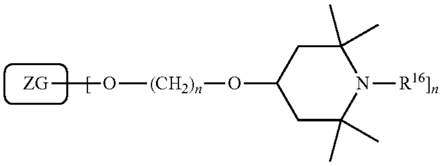

wherein ZG, $R^{16}$ and n are as defined above and n denotes an integer from 1 to 8. These compounds are highly suitable as stabilisers in LC mixtures and stabilise the VHR of the mixtures upon UV exposure.

In a particularly preferred embodiment, the one or more compounds of the Formula H may be selected from the group consisting of the compounds the following Formulae H-2-1 to H-2-6:

H-2-1

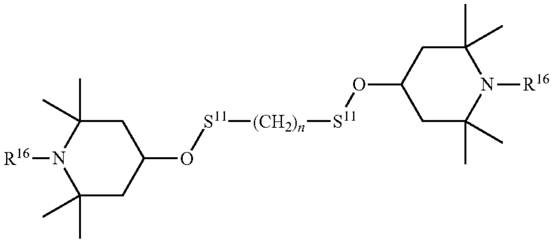

H-2-2

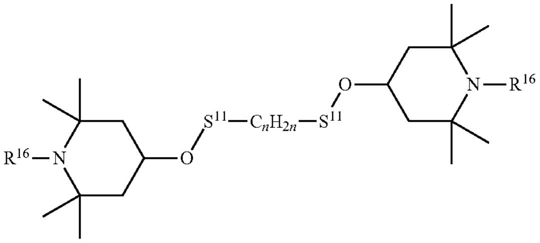

H-2-3

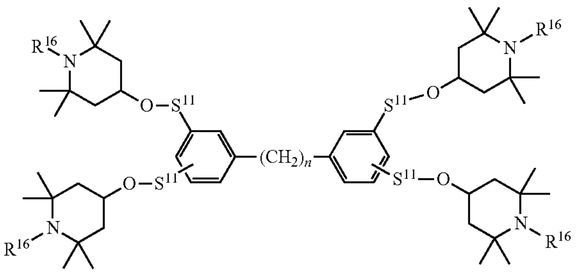

H-2-4

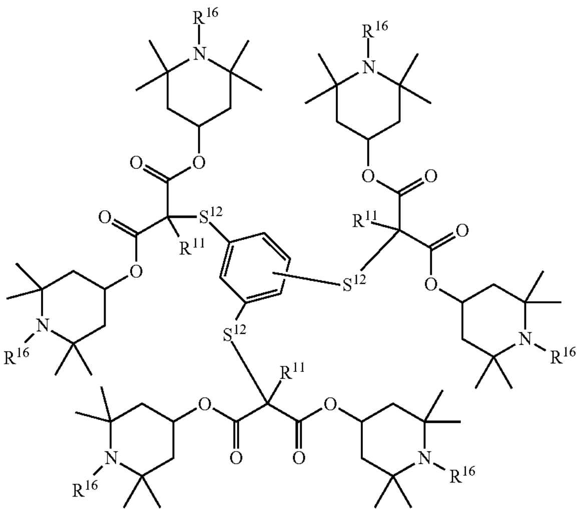

-continued

H-2-5

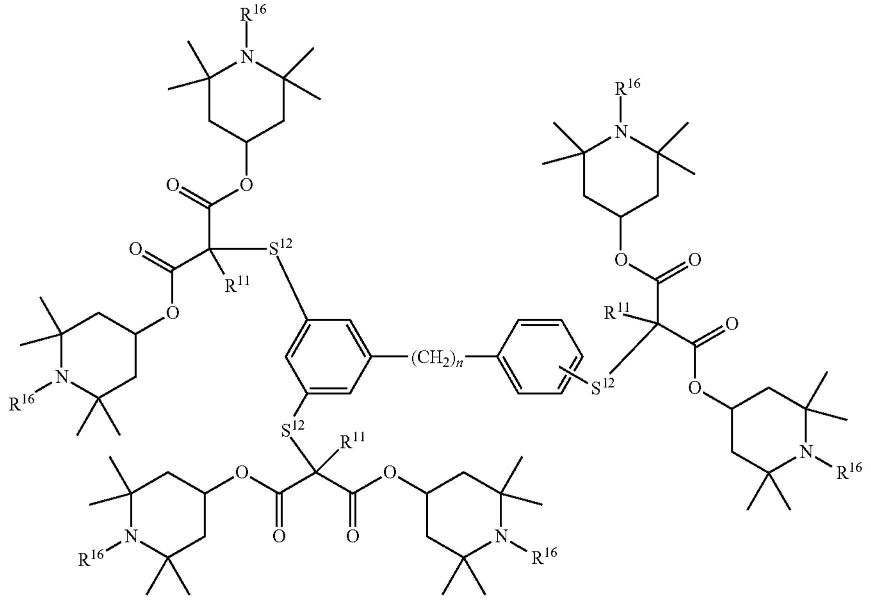

H-2-6

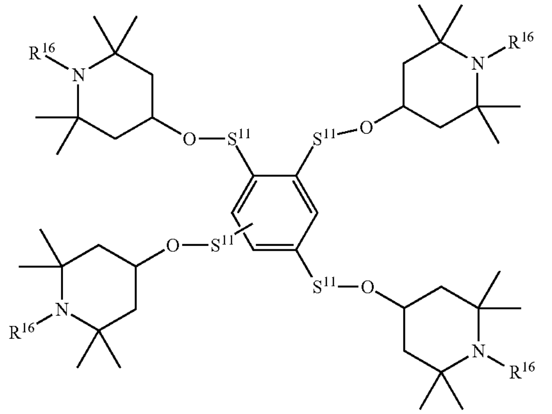

in which $R^{11}$ each, independently of one another, denotes an H atom, an alkyl group having 1 to 20 C atoms, in which one —$CH_2$— group or, if present, a plurality of —$CH_2$— groups may be replaced by —O— or —C(═O)—, but two adjacent —$CH_2$— groups cannot be replaced by —O—, and one or, if present, a plurality of —$CH_2$— groups may be replaced by —CH═CH— or —C≡C—, and in which one H atom or a plurality of H atoms may be replaced by F, $OR^{13}$, $N(R^{13})(R^{14})$ or $R^{15}$, $R^{16}$ denotes a H atom or O·, n denotes an integer from 0 to 12, and $S^{11}$ and $S^{12}$ each, independently of one another, denote an alkylene group having 1 to 20 C atoms, in which one —$CH_2$— group or, if present, a plurality of —$CH_2$— groups may be replaced by —O— or —C(═O)—, but two adjacent —$CH_2$— groups cannot be replaced by —O—, and in which one H atom or a plurality of H atoms may be replaced by F, $OR^{13}$, $N(R^{13})(R^{14})$ or $R^{15}$, or denote a single bond.

In a preferred embodiment of the present invention, the LC media according to the invention comprise in each case one or more compounds of the Formula H selected from the following group of the compounds of the formulae:

H-3-1
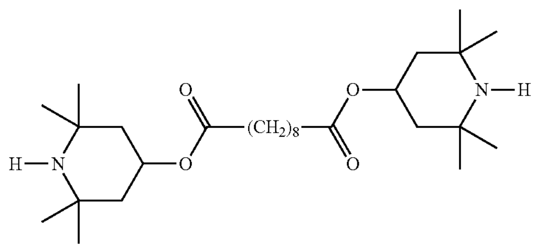
H-3-2
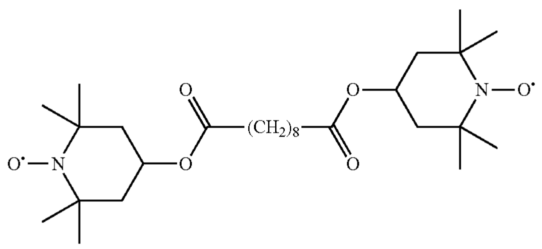
H-3-3
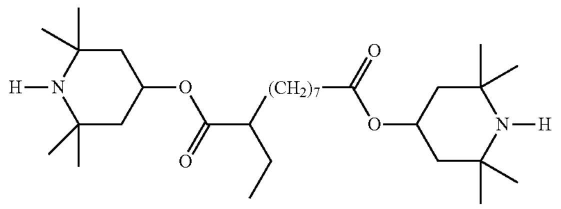
H-3-4
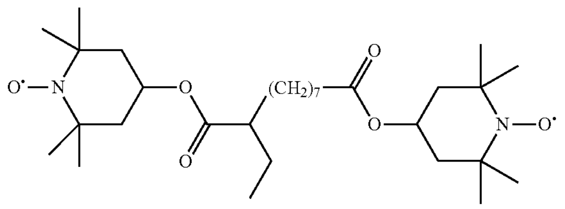
H-3-5
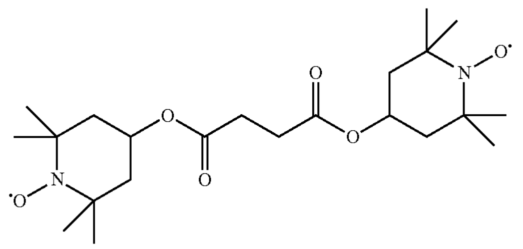
H-3-6
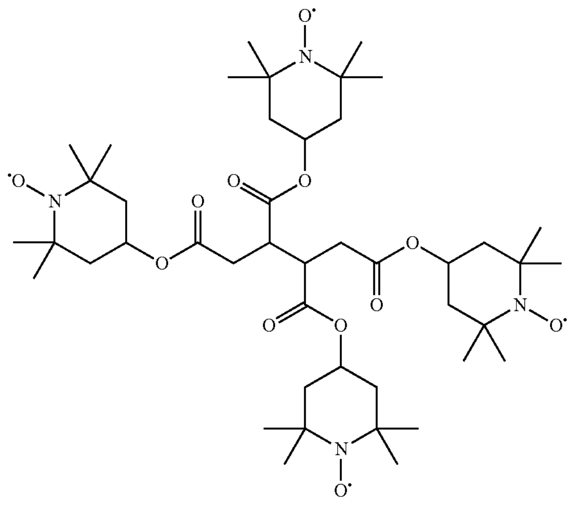
H-3-7
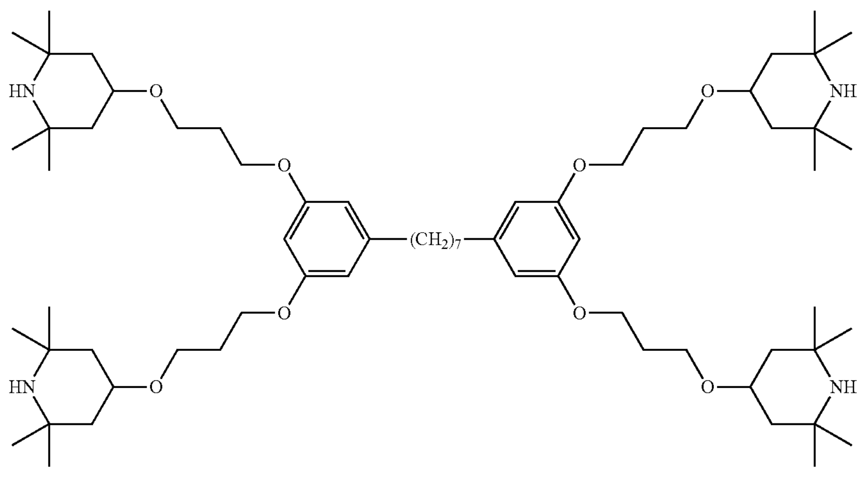

-continued
H-3-8
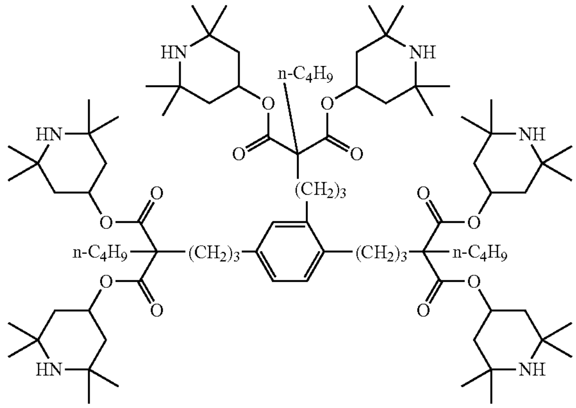
H-3-9
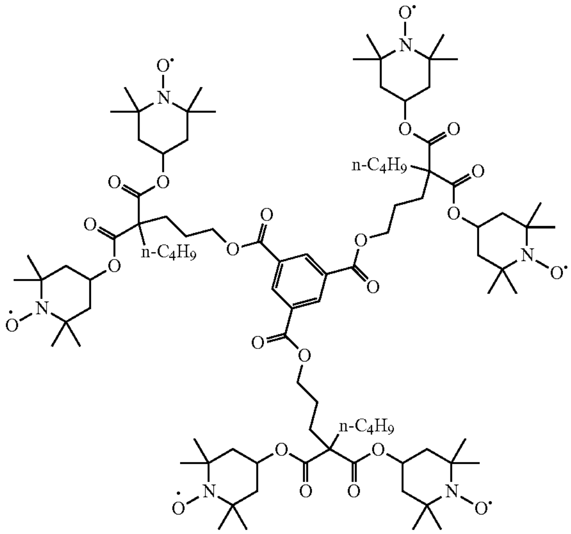
H-3-10
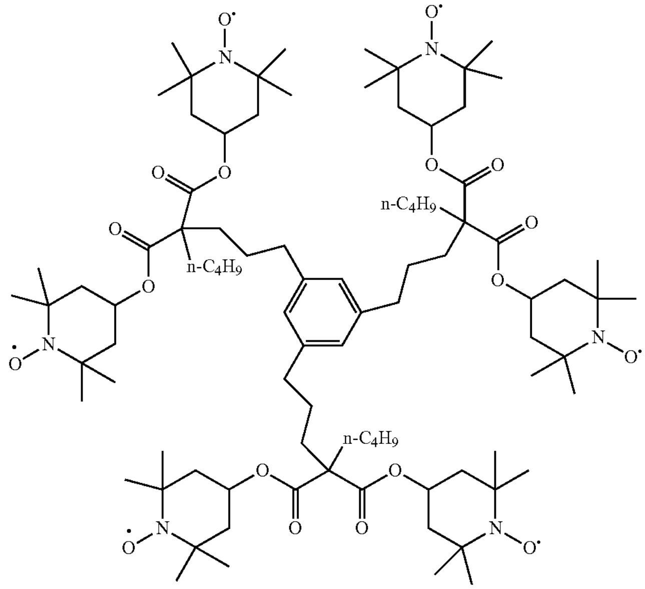

-continued
H-3-11
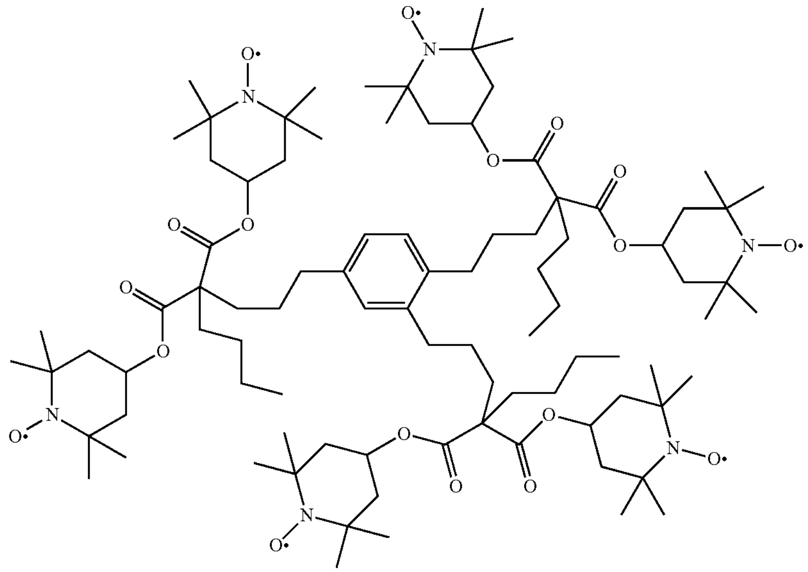
H-3-12
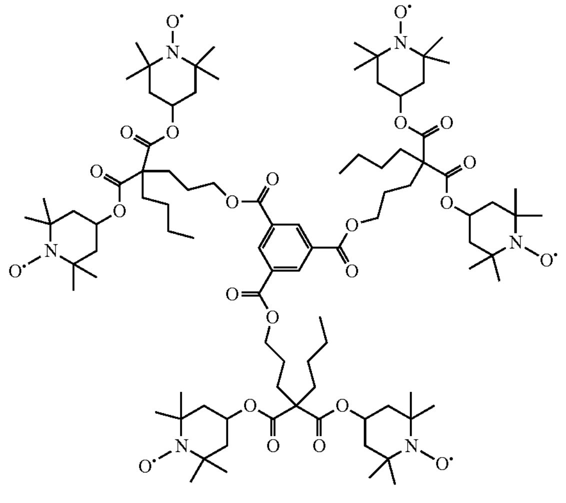
H-3-13
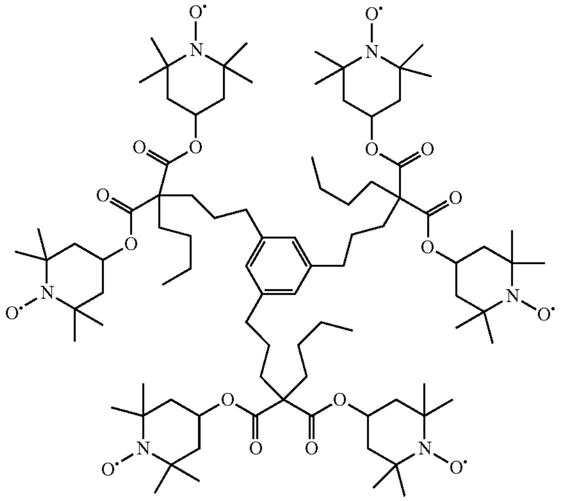

-continued
H-3-14
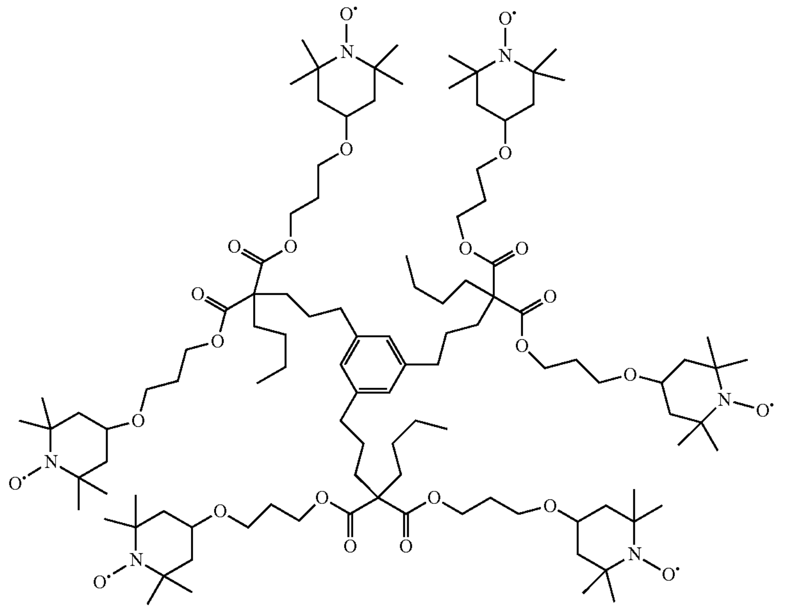
H-3-15
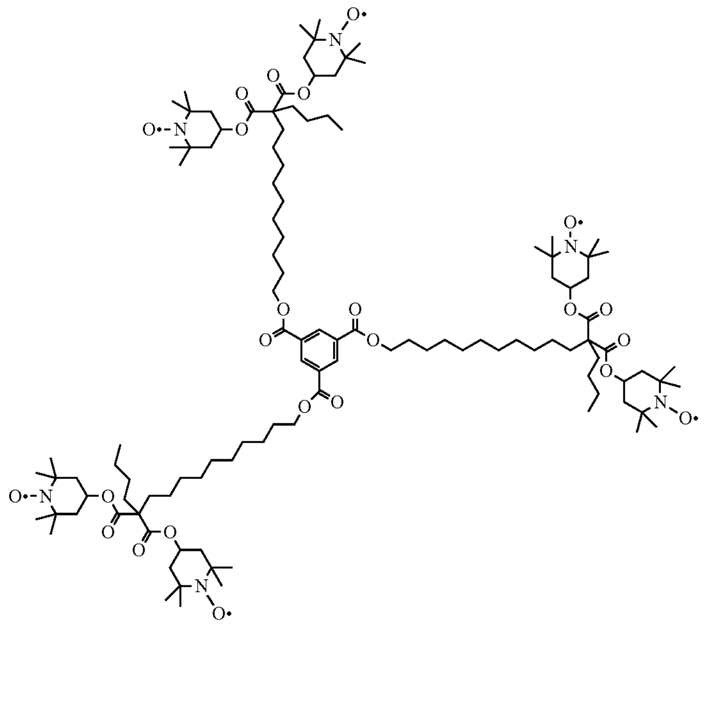

H-3-16
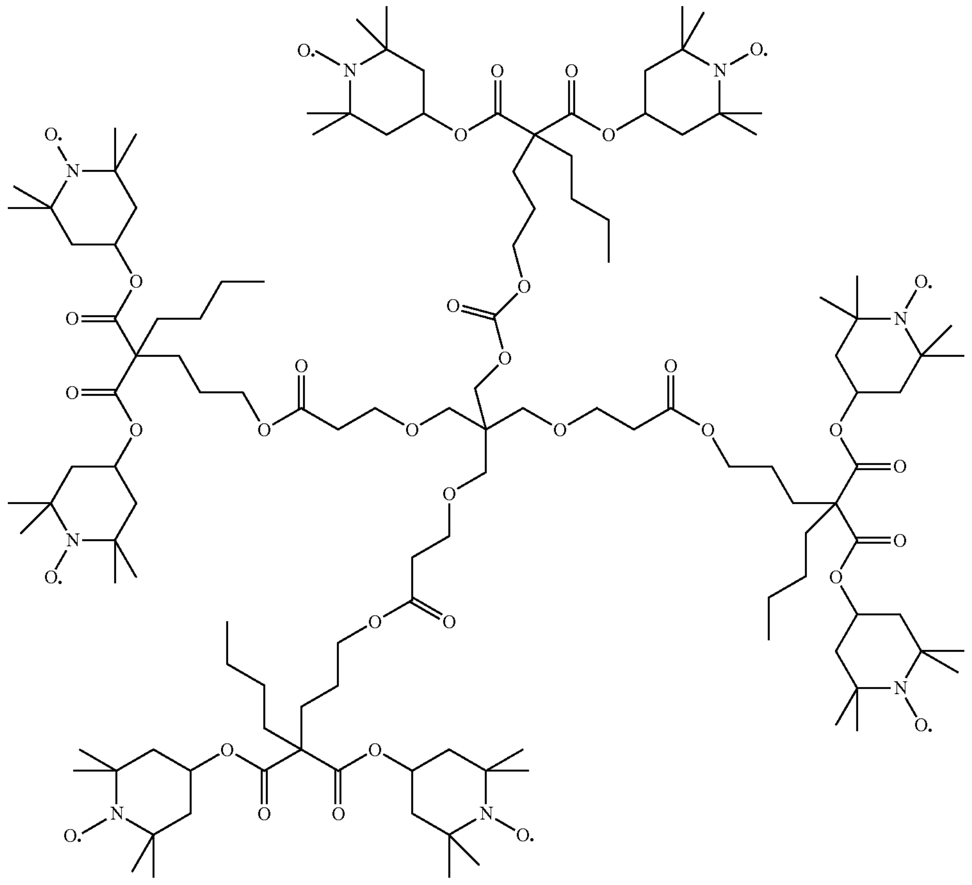
H-3-17
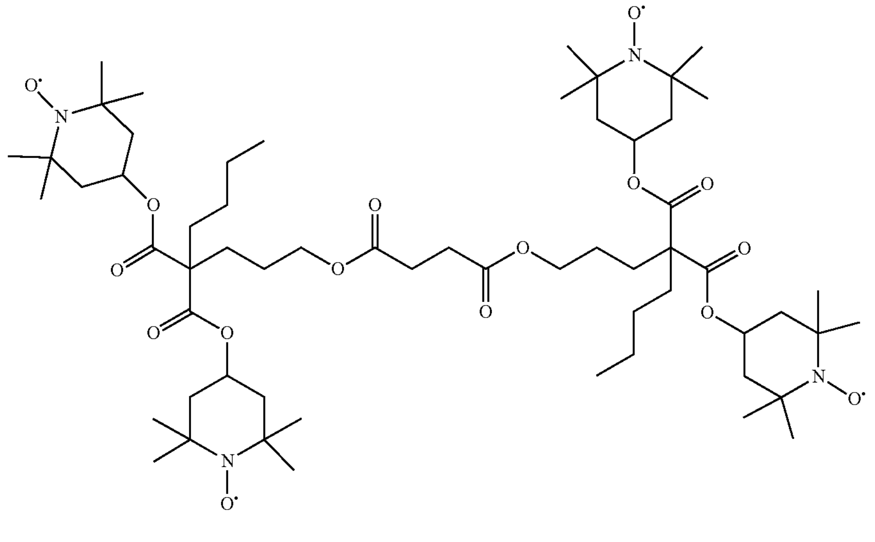

-continued
H-3-18
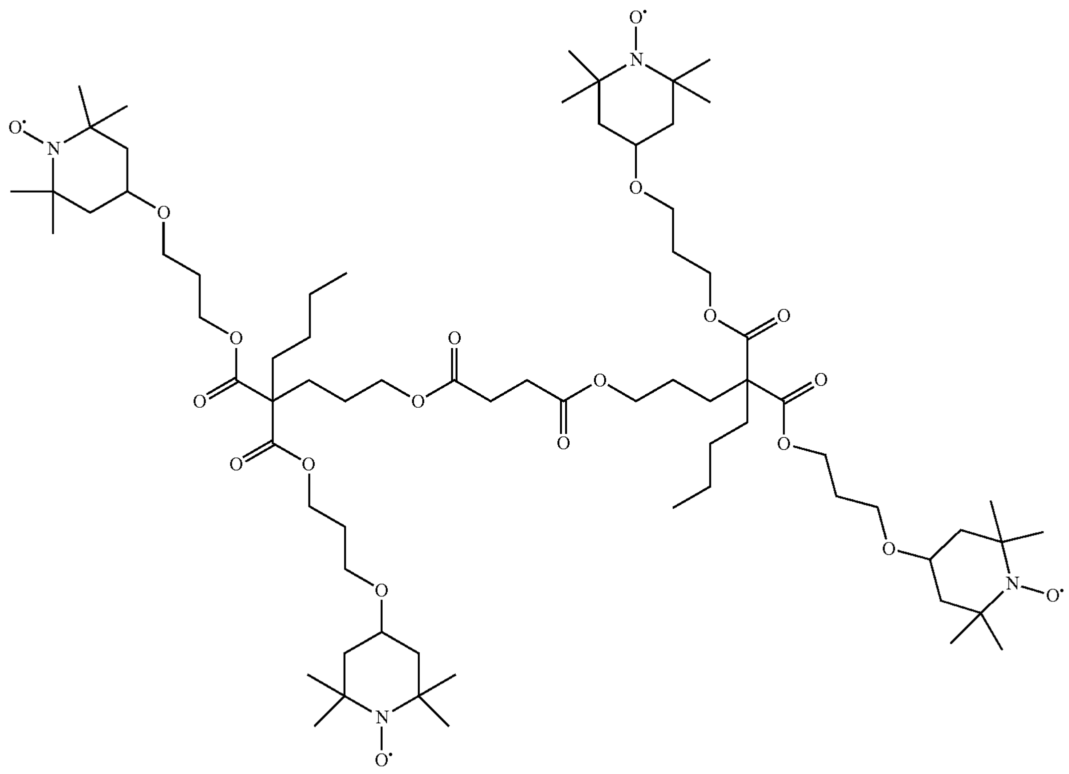
H-3-19
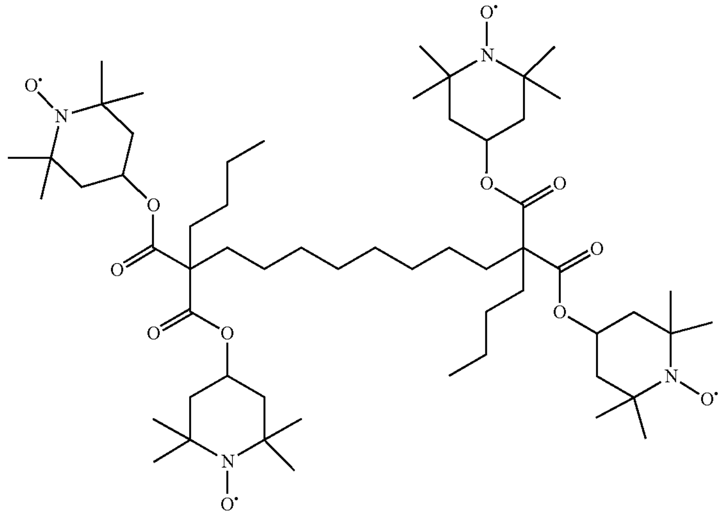

-continued

H-3-20

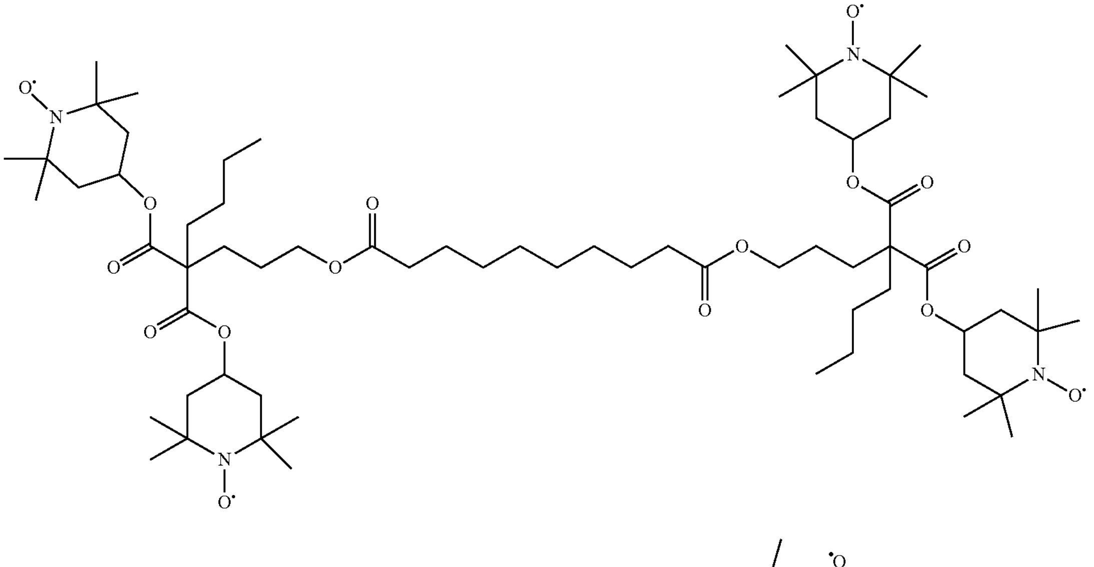

and

H-3-21

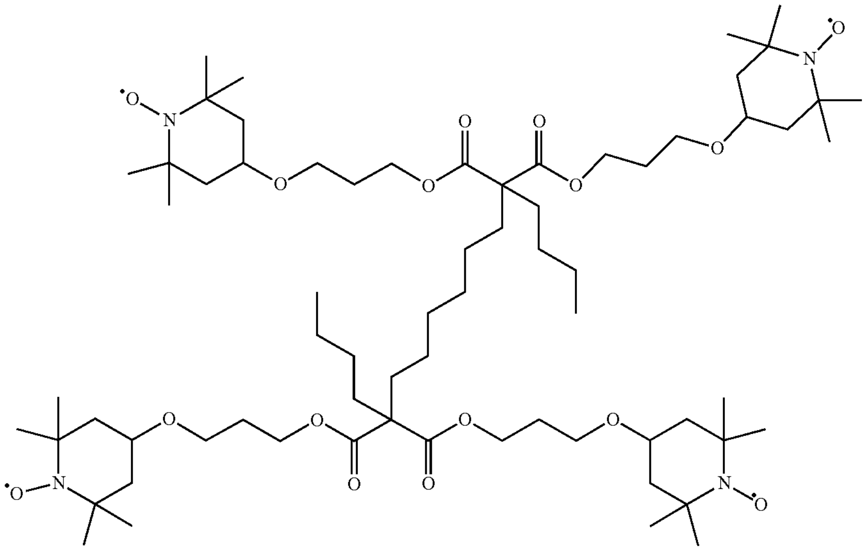

The preferred content of the one or more compounds of Formula H in the LC medium depends inter alia on the inherent chemical stability of the LC medium as well as on the nature of the compound of Formula H. Compounds of Formula H in which $R^{16}$ denotes O·, which are known as NO radical type HALS are preferably used in proportion ranging from 50 ppm to 1000 ppm, based on the weight of the LC medium. Compounds of Formula H in which $R^{16}$ denotes an H atom, which are known as NH radical type HALS are advantageously used in proportion ranging from 50 ppm to 2000 ppm, based on the weight of the LC medium.

Further preferred LC media are selected from the following preferred embodiments, including any combination thereof:

a compound of the Formulae G and U in combination with a compound of the Formula LP1, Z1 to Z7 and II and/or III a compound of the Formulae G and U in combination with a compound of the Formula LP2, Z1 to Z7 and II and/or III a compound of the Formulae G and U in combination with a compound of the Formula LP1, LP2, II and/or III and a compound of the Formula Z1 and Z4

The LC medium comprises one or more compounds of the Formulae G and U or its subformulae and LP1 and/or LP2, II and/or III and one or more compounds selected from the group consisting of the Formulae Z1, Z2, Z3, Z4, Z5, V, VI, VII, VIII, XIV, XV, XVI, XVIIa, XVIIb, XVIIc, XVIII, XIX, XX, XXI, XXIII, XXIV, XXV, XXVI, XXVII, XXVIII, XXIX, XXX, XXX-1, XXX-2, XXX-3, XXXII, XXXIII and S and their subformulae.

The LC medium comprises one or more compounds of the Formulae I or its subformulae and LP1 and/or LP2, II and/or III and one or more compounds selected from the group consisting of the Formulae Z1, Z2, Z3, Z4, Z5, IV, VI, XII, XIV, XVI, XVIIa, XVIIb, XVIIc, XX, LP1-1, XXIII, XXIX and S and their subformulae.

The LC medium comprises one or more compounds selected from the group consisting of the Formula II-1, II-2 and II-3, very preferably from the Formula II-1 and II-2. The individual concentration of each of these compounds is preferably from 2 to 15% by weight. The total concentration of these compounds is preferably from 5 to 25% by weight.

The LC medium comprises one or more compounds selected from the group consisting of the Formula III-1, III-4, III-6, III-16, III-19 and III-20, very preferably from the group consisting of the Formula III-1, III-6, III-16 and III-20. The individual concentration of each of these compounds is preferably from 2 to 15% by weight. The total concentration of these compounds is preferably from 5 to 30% by weight.

The LC medium comprises one or more compounds of the Formula IV, preferably selected from the Formula IVa or IVc, very preferably from the Formula IVa-1 or IVc-1, most preferably of the Formula IVc-1. The individual concentration of each of these compounds is preferably from 2 to 15% by weight. The total concentration of these compounds is preferably from 5 to 20% by weight.

The LC medium comprises one or more compounds of the Formula VI, preferably selected from the Formula VIb. The individual concentration of each of these compounds is preferably from 1 to 20% by weight. The total concentration of these compounds is preferably from 5 to 20% by weight.

The LC medium comprises one or more compounds of the Formula Z1, preferably selected from the Formula Z1-1. The total concentration of these compounds is preferably from 1 to 60% by weight, more preferably 5 to 50% by weight.

The LC medium comprises one or more compounds of the Formula Z2, preferably selected from the Formulae Z2-1 and Z2-2. The total concentration of these compounds is preferably from 2 to 35%, very preferably from 3 to 25% by weight.

The LC medium comprises from 5 to 20% by weight of compounds of the Formula Z3, preferably of the Formula Z3-1.

The LC medium comprises from 5 to 20% by weight of compounds of the Formula Z4, preferably of the Formula Z4-1.

The LC medium comprises from 10 to 65%, very preferably from 20 to 60% by weight of compounds of Formula Z5.

The LC medium comprises one or more compounds of the Formula LP1-1, preferably of the Formula LP1-1a or LP2-1b, very preferably of the Formula LP1-1a. The concentration of these compounds is preferably from 2 to 15% by weight.

The LC medium comprises from 1 to 15% by weight of compounds of the Formula LP2-1b.

The LC medium comprises one or more compounds of the Formula XII, preferably of the Formula XIIa or XIIb, very preferably of the Formula XIIa, most preferably of the Formula XIIa-1. The concentration of these compounds is preferably from 2 to 15% by weight.

The LC medium comprises from 1 to 15% by weight of compounds of the Formula XIIb.

The LC medium comprises one or more compounds of the Formula XIV, preferably of the Formula XIVd, very preferably of the Formula XIVd-1. The concentration of these compounds is preferably from 2 to 10% by weight.

The LC medium comprises one or more compounds of the Formula XVIb, preferably of the Formula XVIb-1, XVIb-2 and/or XVIb-3. The concentration of these compounds is preferably from 2 to 15% by weight.

The LC medium comprises one or more compounds of the Formula XVIc, preferably of the Formula XVIc-1, XVIc-2 and/or XVIc-3. The concentration of these compounds is preferably from 2 to 20% by weight.

The LC medium comprises one or more compounds selected from the group consisting of the Formulae XVIIa, XVIIb and XVIIc, very preferably of the Formula XVIIa wherein L is H and of the Formula XVIIb wherein L is F. The total concentration of these compounds is preferably from 0.5 to 5% by weight.

The LC medium comprises one or more compounds of the Formula XX, preferably of the Formula XXa. The concentration of these compounds is preferably from 2 to 10% by weight.

The LC medium comprises one or more compounds of the Formula XXI, preferably of the Formula XXIa. The concentration of these compounds is preferably from 2 to 10% by weight.

The LC medium comprises one or more compounds of the Formula XXIII, preferably of the Formula XXIIIa. The concentration of these compounds is preferably from 0.5 to 5% by weight.

The LC medium comprises one or more compounds of the Formula XXIX, preferably of the Formula XXIXa. The concentration of these compounds is preferably from 2 to 10% by weight.

The LC medium comprises one or more compounds of the Formula XXX. The concentration of these compounds is preferably from 2 to 10% by weight.

The LC medium comprises one or more compounds of the Formula XII. The concentration of these compounds is preferably from 2 to 10% by weight.

The LC medium comprises one or more compounds of the Formulae G and U, preferably of the Formulae G-1 and U-1, and LP1 and/or LP2, II and/or III, one or more compounds selected from the group consisting of the Formulae Z1, Z2 and Z3 or their subformulae, one or more compounds selected from the group consisting of the Formula XIV, one or more compounds selected from the group consisting of the Formulae IV, VI, XX, XXIII and XXIX or their subformulae, and one or more compounds selected from the group consisting of the Formulae LP2-1, XVI, XVIIa, XVIIb, XVIIc or their subformulae.

The LC medium comprises one or more compounds of Formulae G and U, preferably of the Formulae G-1 and U-1, LP1 and/or LP2, II and/or III, one or more compounds selected from the group consisting of the Formulae Z1, Z2, Z3, Z4 and Z5 or their subformulae, one or more compounds selected from the group consisting of the Formula XIVd or their subformulae, one or more compounds selected from the group consisting of the Formulae IVc, VIb, XXa, XXIIIa and XXIXa or their subformulae, and one or more compounds selected from the group consisting of the Formulae LP1-1b, XVIb, XVIc, XVIIa, XVIIb, XVIIc or their subformulae.

The LC medium comprises one or more compounds of the Formulae G and U, preferably of the Formulae G-1 and U-1, LP1 and/or LP2, II and/or III, one or more compounds selected from the group consisting of the Formulae Z1, Z2 and Z3 or their subformulae, one or more compounds of the Formula Y, preferably selected from the group consisting of the Formulae Y1 and Y2, one or more compounds selected from the group consisting of the Formula XIV, one or more compounds selected from the group consisting of the Formulae II, III, IV, VI, XX, XXIII and XXIX or their subformulae, and one or more compounds selected from the group consisting of the Formulae LP2-1, XVI, XVIIa, XVIIb, XVIIc or their subformulae.

The LC medium comprises one or more compounds of the Formulae G and U, preferably of the Formulae G-1 and U-1, LP1 and/or LP2, one or more compounds selected from the group consisting of the Formulae Z1, Z2, Z3, Z4 and Z5 or their subformulae, one or more compounds of Formula B, preferably selected from the group consisting of the Formulae B1, B2 and B3, one or more compounds of the Formula XIVd or their subformulae, one or more compounds selected from the group consisting of the Formulae II, III, IVc, VIb, XXa, XXIIIa and XXIXa or their subformulae, and one or more compounds selected from the group consisting of the Formulae LP1-1b, XVIb, XVIc, XVIIa, XVIIb, XVIIc or their subformulae.

Besides the compounds of the Formulae G and U, LP1 and/or LP2, the LC medium comprises further compounds selected from the group of the compounds of the Formula Z1, Z2, Z3, IV, LP1-1, XIV, XVI, XVIIa, XVIIb, XVIIc, XXI, XXIII, XXIX, XXX and XXIV or their subformulae.

Besides the compounds of the Formulae G and U, LP1 and/or LP2, the LC medium comprises further compounds selected from the group of the compounds of the Formulae Z1, Z2, Z3, IV, LP2-1, XIV, XVI, XVIIa, XVIIb, XVIIc, XXI, XXIII, XXIX, XXX and XXIV or their subformulae.

The proportion of compounds of the Formulae G and U or its subformulae in the LC medium is from 1 to 30%, very preferably from 2 to 25%, most preferably from 2 to 20% by weight.

The proportion of compounds of the Formulae Z1, Z2, Z3, Z4 and Z5 or their subformulae in the LC medium as a whole is from 10 to 65%, very preferably from 20 to 60% by weight.

The proportion of compounds of the Formula Y or its subformulae in the LC medium as a whole is from 0 to 15%, very preferably from 2 to 10% by weight.

The proportion of compounds of the Formula B or its subformulae in the LC medium as a whole is from 0 to 15%, very preferably from 2 to 10% by weight.

The proportion of compounds of the Formulae II, III, IV-VIII, XVIII-XXIII and XXVII-XXX in the LC medium as a whole is 30 to 60% by weight.

The proportion of compounds of the Formulae XIV and XV in the LC medium as a whole is 40 to 70% by weight.

The proportion of compounds of the Formulae XIV, XVIIa-c and XXXII in the LC medium as a whole is 0.5 to 15% by weight.

The term "alkyl" or "alkyl*" in this application encompasses straight-chain and branched alkyl groups having 1 to 6 carbon atoms, in particular the straight-chain groups methyl, ethyl, propyl, butyl, pentyl and hexyl. Groups having 2 to 5 carbon atoms are generally preferred.

The term "alkenyl" or "alkenyl*" encompasses straight-chain and branched alkenyl groups having 2 to 6 carbon atoms, in particular the straight-chain groups. Preferred alkenyl groups are $C_2$-$C_7$-1E-alkenyl, $C_4$-$C_6$-3E-alkenyl, in particular $C_2$-$C_6$-1E-alkenyl. Examples of particularly preferred alkenyl groups are vinyl, 1E-propenyl, 1E-butenyl, 1E-pentenyl, 1E-hexenyl, 3-butenyl, 3E-pentenyl, 3E-hexenyl, 4-pentenyl, 4Z-hexenyl, 4E-hexenyl and 5-hexenyl. Groups having up to 5 carbon atoms are generally preferred, in particular $CH_2{=}CH$, $CH_3CH{=}CH$.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" preferably encompasses straight-chain groups of the Formula $C_nH_{2n+1}$—O—$(CH_2)_m$, in which n and m each, independently of one another, denote 1 to 6. m may also denote 0. Preferably, n=1 and m=1 to 6 or m=0 and n=1 to 3. Further preferably the alkoxy or oxaalkyl group can also contain one or more further O atoms such that oxygen atoms are not directly linked to one another.

Through a suitable choice of the meanings of $R^0$ and $X^0$ in Formulae II and III, the addressing times, the threshold voltage, the steepness of the transmission characteristic lines, etc., can be modified in the desired manner. For example, 1E-alkenyl groups, 3E-alkenyl groups, 2E-alkenyloxy groups and the like generally result in shorter addressing times, improved nematic tendencies and a higher ratio between the elastic constants $K_3$ (bend) and $K_1$ (splay) compared with alkyl and alkoxy groups. 4-Alkenyl groups, 3-alkenyl groups and the like generally give lower threshold voltages and lower values of $K_3/K_1$ compared with alkyl and alkoxy groups. The LC media according to the invention are distinguished, in particular, by high $\Delta\varepsilon$ values and thus have significantly faster response times than the LC media from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the LC media according to the invention is not crucial. The LC media can therefore comprise one or more further components for the purposes of optimisation of various properties. However, the observed effect on the desired improvement in the properties of the medium is generally greater, the higher the total concentration of compounds of the above-mentioned formulae.

In a particularly preferred embodiment, the LC media according to the invention comprise compounds of the Formulae IV to VIII (preferably IV and V) in which $X^0$ denotes F, $OCF_3$, $OCHF_2$, $OCH{=}CF_2$, $OCF{=}CF_2$ or $OCF_2$—$CF_2H$. A favourable synergistic action with the compounds of the Formulae G and U, LP1 and/or LP2, II and III results in particularly advantageous properties. In particular, LC media comprising compounds of the Formulae G and U, LP1 and/or LP2, II and III are distinguished by their low threshold voltage.

The individual compounds of the above-mentioned formulae and the subformulae thereof which can be used in the LC media according to the invention are either known or can be prepared analogously to the known compounds.

The invention also relates to a process for the preparation of a LC medium as described above and below, by mixing one or more compounds of the Formulae G and U with one or more compounds of the Formulae LP1 and/or LP2, and one or more compounds selected from the group consisting of the Formulae II, III, Z1, Z2, Z3, Z4, IV, VI, XIV, LP2-1, XVI, XVIIa, XVIIb, XVIIc, XX, XXIII, XXIX.

The LC medium of the present invention may optionally comprise one or more polymerisable compounds. The polymerisable compounds are preferably selected from the Formula M $R^a—B^1—(Z^b—B^2)_m—R^b$ M in which the individual substituents, on each occurrence identically or differently, and each, independently of one another, have the following meaning:

NCSOCNR$^a$ and R$^b$ P, P-Sp-, H, F, Cl, Br, I, —CN, —$NO_2$, —NCO, -, -, —SCN, $SF_5$ or straight-chain or branched alkyl having 1 to 25 C atoms, in which, in addition, one or more non-adjacent $CH_2$ groups may each be replaced, independently of one another, by —C($R^0$)═C($R^{00}$)—, —C≡C—, NCSOCN—N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where, if $B^1$ and/or $B^2$ contain a saturated C atom, $R^a$ and/or $R^b$ may also denote a group which is spiro-linked to this saturated C atom, wherein at least one of the substituents $R^a$ and $R^b$ denotes or contains a group P or P-Sp-, P a polymerisable group, Sp a spacer group or a single bond, $B^1$ and $B^2$ an aromatic, heteroaromatic, alicyclic or heterocyclic group, preferably having 4 to 25 ring atoms, which may also contain fused rings, and which is unsubstituted, or mono- or polysubstituted by L, $Z^b$ —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH═CH—, —CF═CF—, —C≡C—, —CH═CH—COO—, —OCO—CH═CH—, $CR^0R^{00}$ or a single bond, $R^0$ and $R^{00}$ each, independently of one another, denote H or alkyl having 1 to 12 C atoms, m denotes 0, 1, 2, 3 or 4, n1 denotes 1, 2, 3 or 4, L P, P-Sp-, OH, $CH_2OH$, F, Cl, Br, I, —CN, —$NO_2$, —NCO, —NCS, —OCN, —SCN, —C(═O)N($R^x$)$_2$, —C(═O)$Y^1$, —C(═O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P and Sp have the meanings indicated in the Formula M above, $Y^1$ denotes halogen, $R^x$ denotes P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Further preferably, the LC media according to the present invention comprise one or more polymerisable compounds selected from Table H below.

Preferably, the proportion of polymerisable compounds in the LC medium, preferably selected from the Formula M and Table H, is from 0.01 to 5%, very preferably from 0.05 to 1%, most preferably from 0.1 to 0.5%.

It was observed that the addition of one or more polymerisable compounds to the LC medium, like those selected from the Formula M and Table H, leads to advantageous properties like fast response times. Such a LC medium is especially suitable for use in PSA displays where it shows low image sticking, a quick and complete polymerisation, the quick generation of a low pretilt angle which is stable after UV exposure, a high reliability, high VHR value after UV exposure, and a high birefringence. By appropriate selection of the polymerisable compounds it is possible to increase the absorption of the LC medium at longer UV wavelengths, so that it is possible to use such longer UV wavelengths for polymerisation, which is advantageous for the display manufacturing process.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C═C double bond or —C≡C— triple bond, and groups which are suitable for polymerisation with ring opening, such as, for example, oxetane or epoxide groups.

Preferred groups P are selected from the group consisting of $CH_2$═$CW^1$—CO—O—, $CH_2$═$CW^1$—CO—,

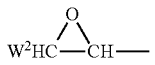 , 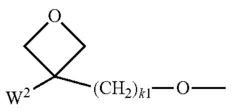 ,

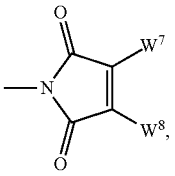 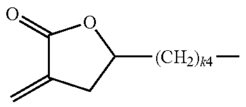 , $CH_2$═$CW^2$—$(O)_{k3}$—, $CW^1$═CH—CO—$(O)_{k3}$—, $CW^1$═CH—CO—NH—, $CH_2$═$CW^1$—CO—NH—, $CH_3$—CH═CH—O—, $(CH_2$═$CH)_2$CH—OCO—, $(CH_2$═CH—$CH_2)_2$CH—OCO—, $(CH_2$═$CH)_2$CH—O—, $(CH_2$═CH—$CH_2)_2$N—, $(CH_2$═CH—$CH_2)_2$N—CO—, HO—$CW^2W^3$—, HS—$CW^2W^3$—, $HW^2$N—, HO—$CW^2W^3$—NH—, $CH_2$═$CW^1$—CO—NH—, $CH_2$═CH—$(COO)_{k1}$-Phe-$(O)_{k2}$—, $CH_2$═CH—$(CO)_{k1}$-Phe-$(O)_{k2}$—, Phe-CH═CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more substituents L as defined for the Formula M above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2{=}CW^1{-}CO{-}O{-}$, $CH_2{=}CW^1{-}CO{-}$,

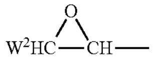
,
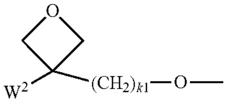
,
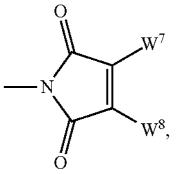
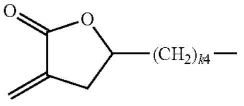
, $CH_2{=}CW^2{-}O{-}$, $CH{=}CW^2{-}$, $CW^1{=}CH{-}CO{-}(O)_{k3}{-}$, $CW^1{=}CH{-}CO{-}NH{-}$, $CH_2{=}CW^1{-}CO{-}NH{-}$, $(CH_2{=}CH)_2CH{-}OCO{-}$, $(CH_2{=}CH{-}CH_2)_2CH{-}OCO{-}$, $(CH_2{=}CH)_2CH{-}O{-}$, $(CH_2{=}CH{-}CH_2)_2N{-}$, $(CH_2{=}CH{-}CH_2)_2N{-}CO{-}$, $CH_2{=}CW^1{-}CO{-}NH{-}$, $CH_2{=}CH{-}(COO)_{k1}$-Phe-$(O)_{k2}{-}$, $CH_2{=}CH{-}(CO)_{k1}$-Phe-$(O)_{k2}{-}$, Phe-CH=CH— and $W^4W^5W^6Si{-}$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2{=}CW^1{-}CO{-}O{-}$, in particular $CH_2{=}CH{-}CO{-}O{-}$, $CH_2{=}C(CH_3){-}CO{-}O{-}$ and $CH_2{=}CF{-}CO{-}O{-}$, furthermore $CH_2{=}CH{-}O{-}$, $(CH_2{=}CH)_2CH{-}O{-}CO{-}$, $(CH_2{=}CH)_2CH{-}O{-}$,

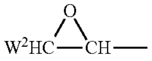
and
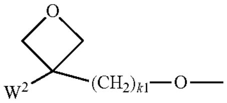
.

Further preferred polymerisable groups P are selected from the group consisting of vinyloxy, acrylate, methacrylate, fluoroacrylate, chloroacrylate, oxetane and epoxide, most preferably from acrylate and methacrylate.

If Sp is different from a single bond, it is preferably of the Formula Sp"-X", so that the respective substituent P-Sp- conforms to the Formula P-Sp"-X"—, wherein Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—O—, —O—CO—, —O—CO—O—, —S—CO—, —CO—S—, —N($R^{00}$)—CO—O—, —O—CO—N($R^0$)—, —N($R^0$)—CO—N($R^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N($R^0$)—, —N($R^0$)—CO—, —N($R^0$)—CO—N($R^{00}$)—, —$OCH_2$—, —$CH_2O$—, —$SCH_2$—, —$CH_2S$—, —$CF_2O$—, —$OCF_2$—, —$CF_2S$—, —$SCF_2$—, —$CF_2CH_2$—, —$CH_2CF_2$—, —$CF_2CF_2$—, —CH=N—, —N=CH—, —N=N—, —CH=$CR^0$—, —$CY^2$=$CY^3$—, —C≡C—, —CH=CH—CO—O—, —O—CO—CH=CH— or a single bond, $R^0$ and $R^{00}$ each, independently of one another, denote H or alkyl having 1 to 20 C atoms, and $Y^2$ and $Y^3$ each, independently of one another, denote H, F, C or CN.

X" is preferably —O—, —S—, —CO—, —COO—, —OCO—, —O—COO—, —CO—$NR^0$—, —$NR^0$—CO—, —$NR^0$—CO—$NR^{00}$— or a single bond.

Typical spacer groups Sp and -Sp"-X"— are, for example, —$(CH_2)_{p1}$—, $(CH_2CH_2O)_{q1}$—$CH_2CH_2$—, —$CH_2CH_2$—S—$CH_2CH_2$—, —$CH_2CH_2$—NH—$CH_2CH_2$— or —$(SiR^0R^{00}$—$O)_{p1}$—, in which p1 is an integer from 1 to 12, q1 is an integer from 1 to 3, and $R^0$ and $R^{00}$ have the meanings indicated in the Formula M above.

Particularly preferred groups Sp and -Sp"-X"— are —$(CH_2)_{p1}$—, —$(CH_2)_{p1}$—O—, —$(CH_2)_{p1}$—O—CO—, —$(CH_2)_{p1}$—CO—O—, —$(CH_2)_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxy-butylene, ethylenethioethylene, ethylene-N-methyliminoethylene, 1-methylalkylene, ethenylene, propenylene and butenylene.

For the production of PSA displays, the polymerisable compounds contained in the LC medium are polymerised or crosslinked (if one compound contains two or more polymerisable groups) by in-situ polymerisation in the LC medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

The combination of compounds of the preferred embodiments mentioned above with the polymerised compounds described above causes low threshold voltages, low rotational viscosities and very good low-temperature stabilities in the LC media according to the invention at the same time as constantly high clearing points and high VHR values.

The use of LC media containing polymerisable compounds allows the rapid establishment of a particularly low pretilt angle in PSA displays. In particular, the LC media exhibit significantly shortened response times, in particular also the grey-shade response times, in PSA displays compared with the media from the prior art.

Preference is generally given to LC media which have a nematic LC phase, and preferably have no chiral liquid crystal phase.

The invention also relates to the use of a LC medium according to the present invention as described above and below for electro-optical purposes, in particular for the use is in shutter glasses, for 3D applications, in TN, PS-TN, STN, TN-TFT, OCB, IPS, PS-IPS, FFS, HB-FFS, XB-FFS, PS-FFS, positive VA and positive PS-VA displays, and to electro-optical displays, in particular of the aforementioned types, containing a LC medium according to the present invention as described above and below, in particular a TN, PS-TN, STN, TN-TFT, OCB, IPS, PS-IPS, FFS, HB-FFS, XB-FFS, PS-FFS, positive VA (vertically aligned) or positive PS-VA display.

The invention also relates to electro-optical displays, such as, for example, STN or matrix LC (MLC) displays, having two plane-parallel outer plates, which, together with a frame, form a cell, integrated non-linear elements for switching individual pixels on the outer plates, and a nematic LC medium having positive dielectric anisotropy and high specific resistance located in the cell, wherein the nematic LC medium is a LC medium according to the present invention as described above and below.

The LC media according to the invention enable a significant broadening of the available parameter latitude. The achievable combinations of clearing point, viscosity at low temperature, thermal and UV stability and high optical anisotropy are far superior to previous materials from the prior art.

In particular, the combination of compounds of the Formulae G and U with compounds of the Formula LP1 and/or LP2 and, optionally, with compounds selected from the Formulae II-XXXII or their subformulae, leads to LC media which show a moderate positive dielectric anisotropy and at the same time an increased dielectric constant $\varepsilon_{\perp}$ perpendicular to the longitudinal axes of the LC molecules, while maintaining a low rotational viscosity and a low value of the ratio $\gamma_1/K_1$. This enables energy saving LC displays, especially of the FFS, HB-FFS, XB-FFS and IPS mode, with high brightness and transmission and low response times.

The LC media according to the invention are suitable for mobile applications and TFT applications, such as, for example, mobile telephones and PDAs. Furthermore, the LC media according to the invention are particularly suitably for use in FFS, HB-FFS, XB-FFS and IPS displays based on dielectrically positive liquid crystals.

The LC media according to the invention, while retaining the nematic phase down to −20° C. and preferably down to −30° C., particularly preferably down to −40° C., and the clearing point ≥75° C., preferably ≥80° C., at the same time allow rotational viscosities $\gamma_1$ of ≤120 mPa·s, particularly preferably ≤100 mPa·s, to be achieved, enabling excellent MLC displays having fast response times to be achieved. The rotational viscosities are determined at 20° C.

The dielectric anisotropy Δε of the LC media according to the invention at 20° C. and 1 kHz is preferably ≥+1.5, very preferably from +3 to +18, most preferred from +5 to +15.

The birefringence Δn of the LC media according to the invention at 20° C. is preferably from 0.08 to 0.2, very preferably from 0.09 to 0.15.

The rotational viscosity $\gamma_1$ of the LC media according to the invention is preferably ≤120 mPa s, more preferably ≤110 mPa s, very preferably ≤90 mPa s.

The ratio $\gamma_1/K_1$ (wherein $\gamma_1$ is the rotational viscosity and $K_1$ is the elastic constant for splay deformation) of the LC media according to the invention is preferably ≤7 mPa·s/pN, very preferably ≤6 mPa·s/pN, most preferably ≤5.5 mPa·s/pN.

The average elasticity constant ratio $K_{av}$ of the LC media according to the invention is preferably at least 14.0 pN, very preferably at least 15.0 pN, most preferably at least 16.0 pN. $K_{av}$ can be calculated according to the following formula: $K_{av}=(K_1+K_2+K_3)/3 \approx (K_1+\frac{1}{2}*K_1+K_3)/3$.

The nematic phase range of the LC media according to the invention preferably has a width of at least 90° C., more preferably of at least 100° C., in particular at least 110° C. This range preferably extends at least from −25° C. to +90° C.

It goes without saying that, through a suitable choice of the components of the LC media according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain LC media having a higher Δε and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the LC media according to the invention at the first minimum than in the case of LC media comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that LC media according to the invention comprising compounds of the Formulae ST-1, ST-2, RV, IA and IB exhibit a significantly smaller decrease in the HR on UV exposure than analogous LC media comprising cyanophenylcyclohexanes of the Formula

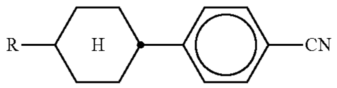

or esters of the Formula

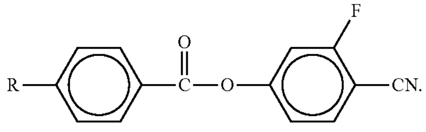

The light stability and UV stability of the LC media according to the invention are considerably better, i.e. they exhibit a significantly smaller decrease in the HR on exposure to light, heat or UV.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the LC parameters of the LC layer.

The LC media which can be used in accordance with the invention are prepared in a manner conventional per se, for example by mixing one or more compounds of Claim 1 with one or more compounds of the Formulae II-XXXII or with further LC compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The LC media may also comprise further additives known to the person skilled in the art and described in the literature, such as, for example, polymerisation initiators, inhibitors, surface-active substances, light stabilisers, antioxidants, e.g. BHT, TEMPOL, microparticles, free-radical scavengers, nanoparticles, etc. For example, 0 to 15% of pleochroic dyes or chiral dopants or initiators like Irgacure® 651 or Irgacure® 907 can be added. Suitable stabilisers and dopants are mentioned below in Tables F and G. In a preferred embodiment, the LC medium comprises one or more stabilisers selected from Table G. Preferably, the proportion of stabilisers, like those of the Formula ST and H, as described above or listed in Table G, in the LC medium is from 10 to 2000 ppm, very preferably from 30 to 1000 ppm.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

For the present invention and in the following examples, the structures of the LC compounds are indicated by means of acronyms, with the transformation into chemical formulae taking place in accordance with Tables A to C below. All substituents $C_mH_{2m+1}$, $C_nH_{2n+1}$, and $C_lH_{2l+1}$ or $C_mH_{2m-1}$, $C_nH_{2n-1}$ and $C_lH_{2l-1}$ are straight-chain alkyl groups or alkylene groups, in each case having n, m and l C atoms respectively. Preferably, n, m and l are independently of each other 1, 2, 3, 4, 5, 6, or 7. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| Ring elements | |
|---|---|
| C | 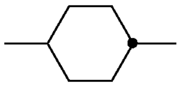 |

TABLE A-continued

| Ring elements | |
|---|---|
| D | 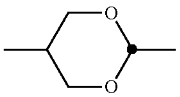 |
| A | 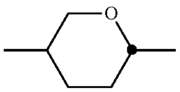 |
| P |  |
| G | 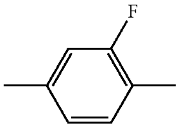 |
| U | 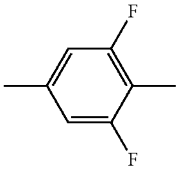 |
| Y | 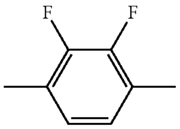 |
| P(F, Cl)Y | 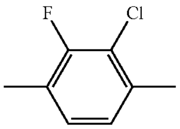 |
| np | 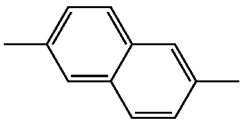 |
| DI | 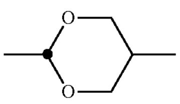 |
| AI | 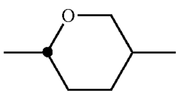 |
| GI | 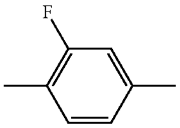 |

TABLE A-continued
| Ring elements | |
|---|---|
| UI | 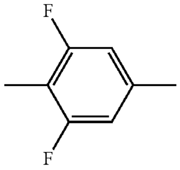 |
| U(1) | 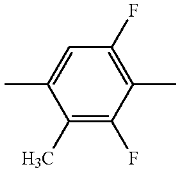 |
| P(Cl,F)Y | 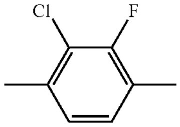 |
| n3f | 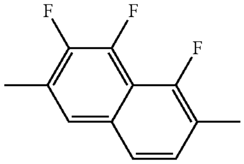 |
| th | 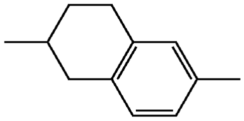 |
| tH2f | 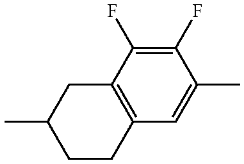 |
| o2f | 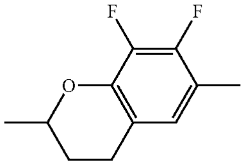 |
| dh | 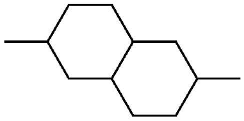 |
| B | 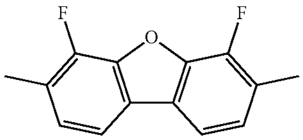 |
| O | 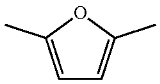 |
TABLE A-continued
| Ring elements | |
|---|---|
| K | 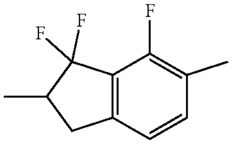 |
| L | 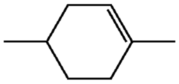 |
| nN3fl | 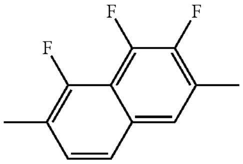 |
| thl | 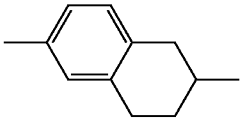 |
| tH2fl | 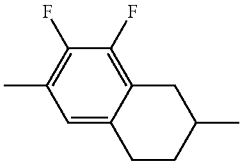 |
| o2fl | 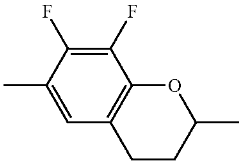 |
| B(S) | 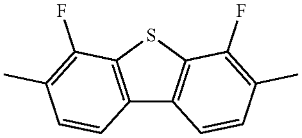 |
| S | 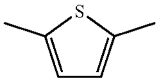 |
| KI | 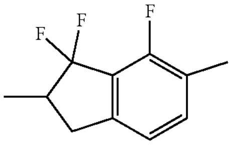 |
| LI | 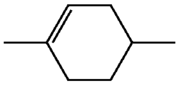 |
| F | 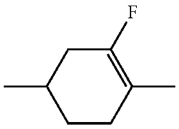 |

TABLE A-continued

| Ring elements | |
|---|---|
| Bh | 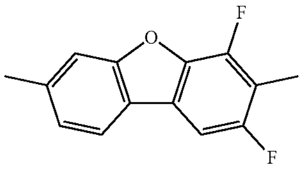 |
| Bf | 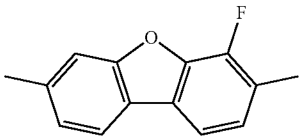 |
| Bfi | 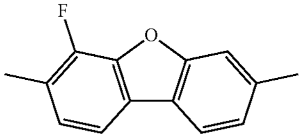 |
| FI | 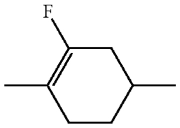 |
| Bh(S) | 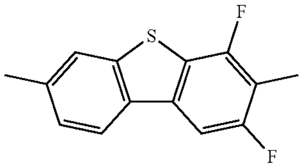 |
| Bf(S) | 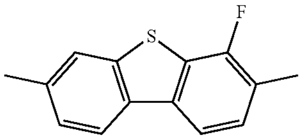 |
| Bfi(S) | 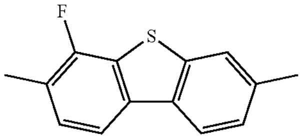 |

TABLE B

| Bridging units | | | |
|---|---|---|---|
| E | $-CH_2-CH_2-$ | | |
| V | $-CH=CH-$ | | |
| T | $-C\equiv C-$ | | |
| W | $-CF_2-CF_2-$ | | |
| B | $-CF=CF-$ | | |
| Z | $-CO-O-$ | ZI | $-O-CO-$ |
| X | $-CF=CH-$ | XI | $-CH=CF-$ |
| O | $-CH_2-O-$ | OI | $-O-CH_2-$ |
| Q | $-CF_2-O-$ | QI | $-O-CF_2-$ |

TABLE C

| End groups | | | |
|---|---|---|---|
| On the left individually or in combination | | On the right individually or in combination | |
| —n— | $C_nH_{2n+1}-$ | —n | $-C_nH_{2n+1}$ |
| —nO— | $C_nH_{2n+1}-O-$ | —On | $-O-C_nH_{2n+1}$ |
| —V— | $CH_2=CH-$ | —V | $-CH=CH_2$ |
| —nV— | $C_nH_{2n+1}-CH=CH-$ | —nV | $-C_nH_{2n}-CH=CH_2$ |
| —Vn— | $CH_2=CH-C_nH_{2n}-$ | —Vn | $-CH=CH-C_nH_{2n+1}$ |
| —nVm— | $C_nH_{2n+1}-CH=CH-C_mH_{2m}-$ | —nVm | $-C_nH_{2n}-CH=CH-C_mH_{2m+1}$ |
| —N— | $N\equiv C-$ | —N | $-C\equiv N$ |
| —S— | $S=C=N-$ | —S | $-N=C=S$ |
| —F— | $F-$ | —F | $-F$ |
| —CL— | $Cl-$ | —CL | $-Cl$ |
| —M— | $CFH_2-$ | —M | $-CFH_2$ |
| —D— | $CF_2H-$ | —D | $-CF_2H$ |
| —T— | $CF_3-$ | —T | $-CF_3$ |
| —MO— | $CFH_2O-$ | —OM | $-OCFH_2$ |
| —DO— | $CF_2HO-$ | —OD | $-OCF_2H$ |
| —TO— | $CF_3O-$ | —OT | $-OCF_3$ |
| —A— | $H-C\equiv C-$ | —A | $-C\equiv C-H$ |
| —nA— | $C_nH_{2n+1}-C\equiv C-$ | —An | $-C\equiv C-C_nH_{2n+1}$ |
| —NA— | $N\equiv C-C\equiv C-$ | —AN | $-C\equiv C-C\equiv N$ |
| —(cn)— | 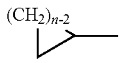 | —(cn) | 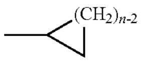 |
| —(cn)m— | 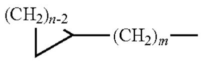 | —m(cn) | 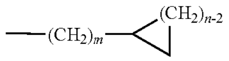 |
| On the left only in combination | | On the right only in combination | |

TABLE C-continued

| End groups | | | |
|---|---|---|---|
| —...n...— | $-C_nH_{2n}-$ | —...n... | $-C_nH_{2n}-$ |
| —...M...— | —CFH— | —...M... | —CFH— |
| —...D...— | $-CF_2-$ | —...D... | —CF2— |
| —...V...— | —CH═CH— | —...V... | —CH═CH— |
| —...Z...— | —CO—O— | —...Z... | —CO—O— |
| —...ZI...— | —O—CO— | —...ZI... | —O—CO— |
| —...K...— | —CO— | —...K... | —CO— |
| —...W...— | —CF═CF— | —...W... | —CF═CF— |

in which n and m are each integers, and the three dots " . . . " are placeholders for other abbreviations from this table.

The following abbreviations are used:

(n, m, k and l are, independently of one another, each an integer, preferably 1 to 12 preferably 1 to 6, k and l possibly may be also 0 and preferably are 0 to 4, more preferably 0 or 2 and most preferably 2, n preferably is 1, 2, 3, 4 or 5, in the combination "-nO—" it preferably is 1, 2, 3 or 4, preferably 2 or 4, m preferably is 1, 2, 3, 4 or 5, in the combination "—Om" it preferably is 1, 2, 3 or 4, more preferably 2 or 4. The combination "—IVm" preferably is "2V1".)

Preferred components of the LC medium are shown in Tables D and E.

TABLE D

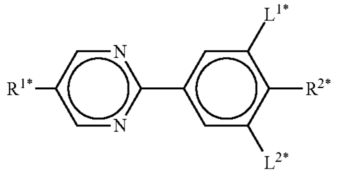

PYP

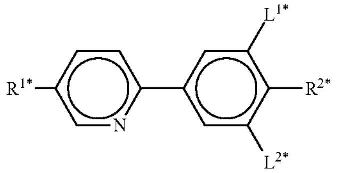

PYRP

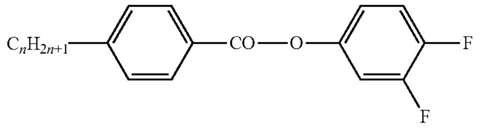

MEnF.F

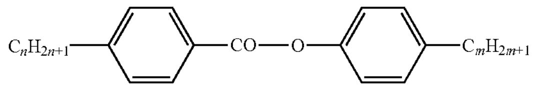

MEnm

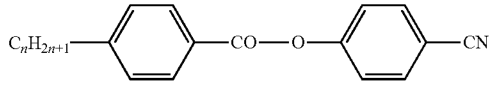

MEnN

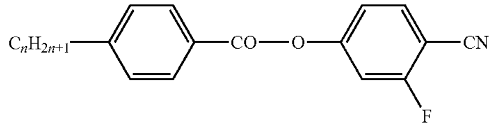

MEnN.F

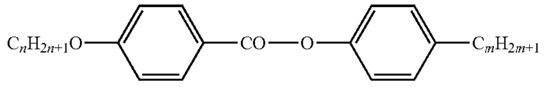

MEnO.m

TABLE D-continued
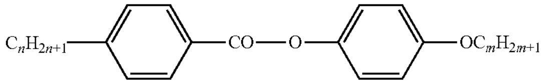
MEn.Om
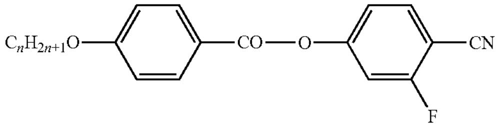
MEnON.F
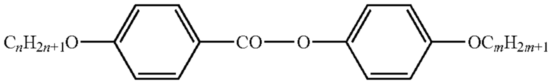
MEnOOm
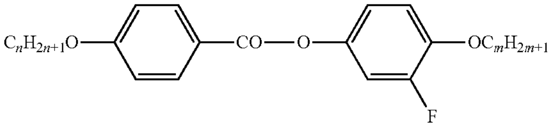
MEnOOm.F
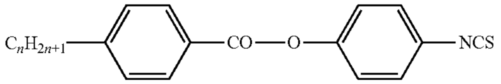
MEnS
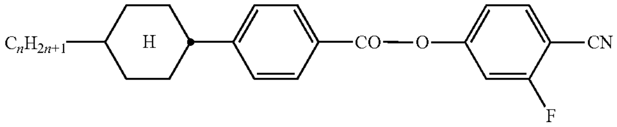
HP-nN.F
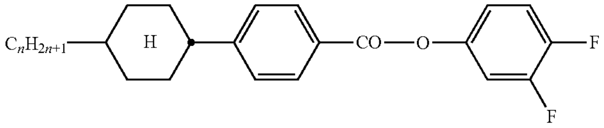
HP-nF.F
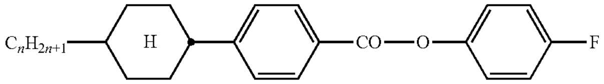
HP-nF
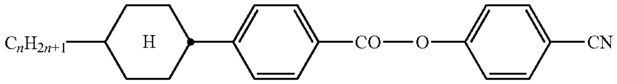
HP-nN
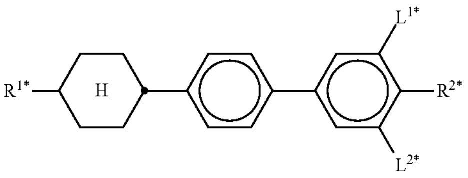
BCH
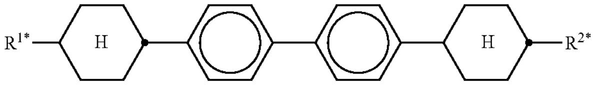
CBC TABLE D-continued
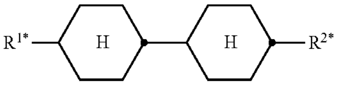
CCH
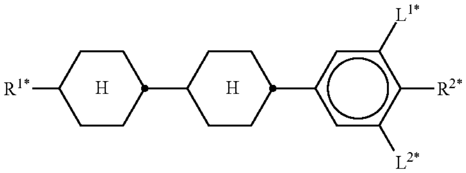
CCP
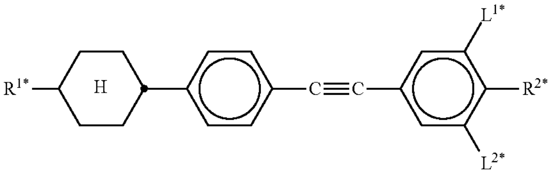
CPTP
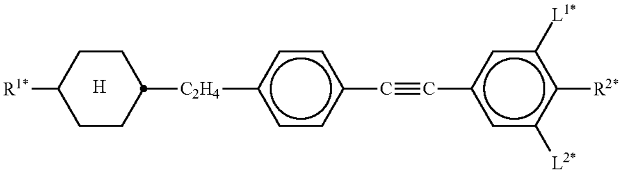
CEPTP
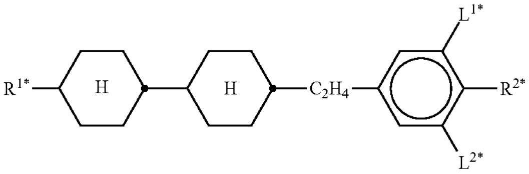
ECCP
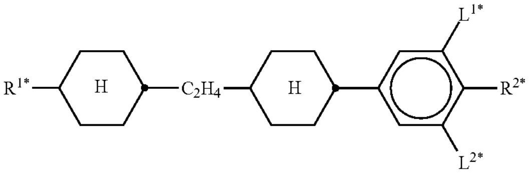
CECP
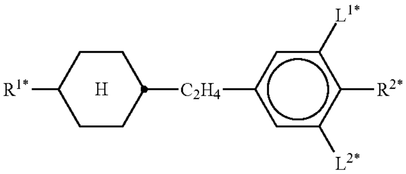
EPCH
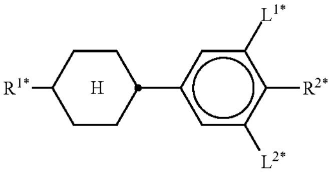
PCH TABLE D-continued
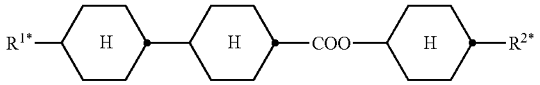
CH
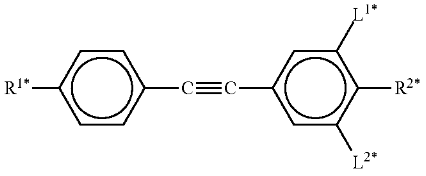
PTP
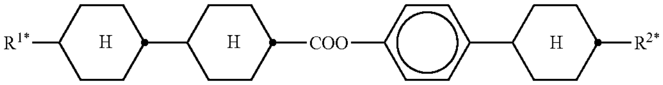
CCPC
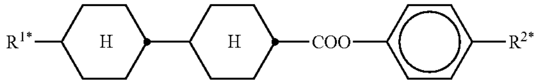
CP
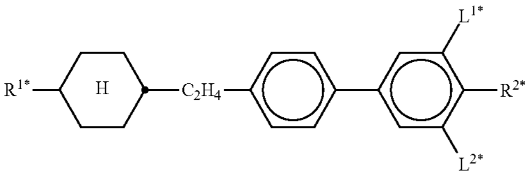
BECH
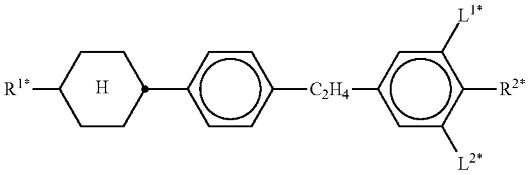
EBCH
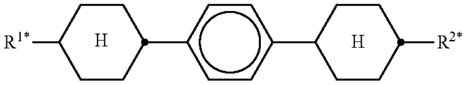
CPC
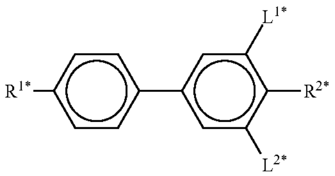
B
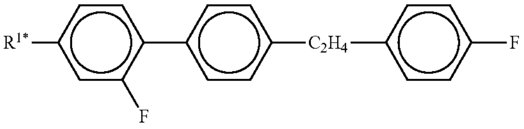
FET-nF
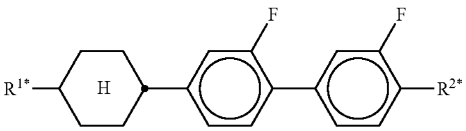
CGG TABLE D-continued
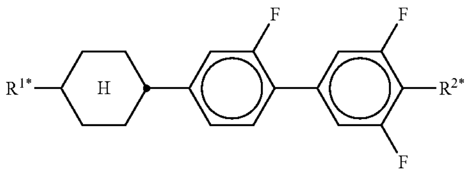
CGU
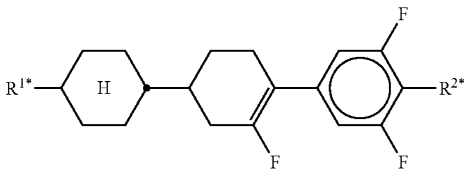
CFU
TABLE E
In the following formulae, n and m each, independently of one another, denote 0, 1, 2, 3, 4, 5, 6, 7, 8, 9, 10, 11 or 12, in particular 2, 3, 5, furthermore 0, 4, 6.
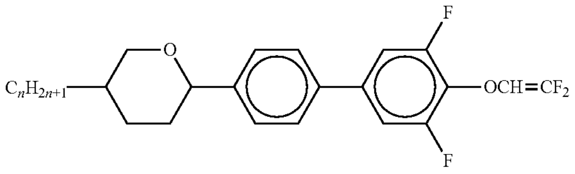
APU-n-OXF
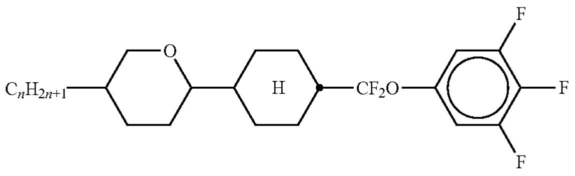
ACQU-n-F
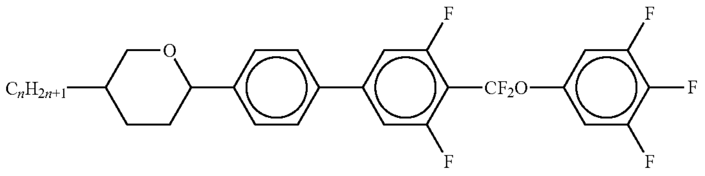
APUQU-n-F
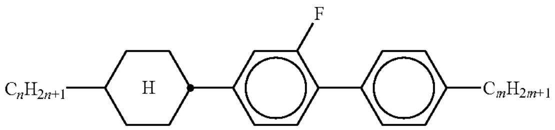
BCH-n.Fm
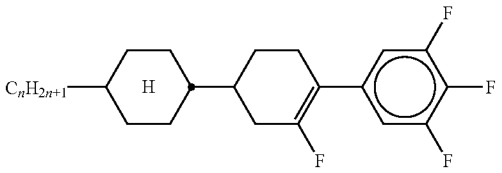
CFU-n-F TABLE E-continued
| In the following formulae, n and m each, independently of one another, denote 0, 1, 2, 3, 4, 5, 6, 7, 8, 9, 10, 11 or 12, in particular 2, 3, 5, furthermore 0, 4, 6. |
|---|
| 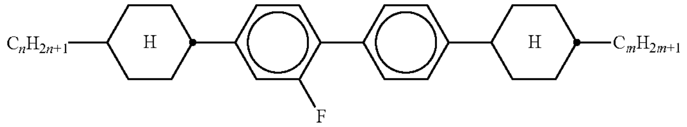 |
| CBC-nmF |
| 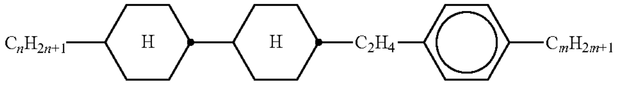 |
| ECCP-nm |
| 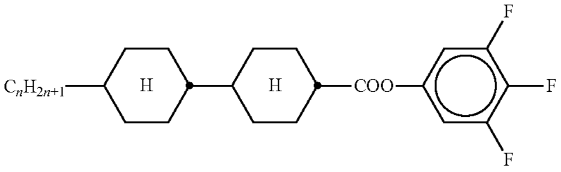 |
| CCZU-n-F |
| 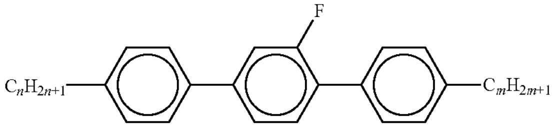 |
| PGP-n-m |
| 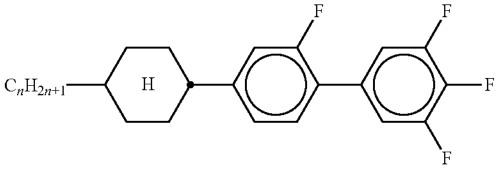 |
| CGU-n-F |
| 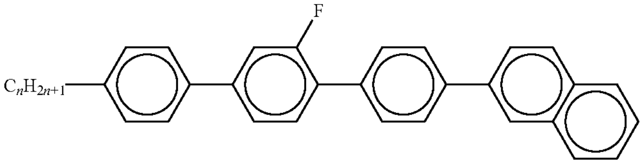 |
| PGP-n-NA |
| 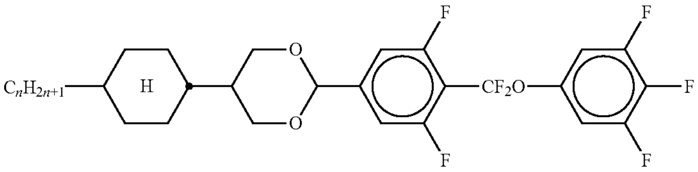 |
| CDUQU-n-F |
| 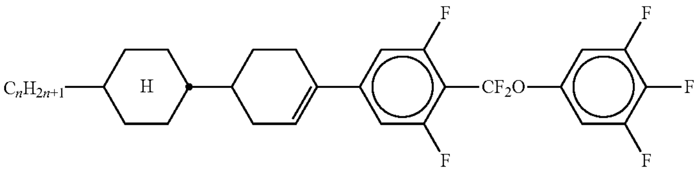 |
| CLUQU-n-F |

TABLE E-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
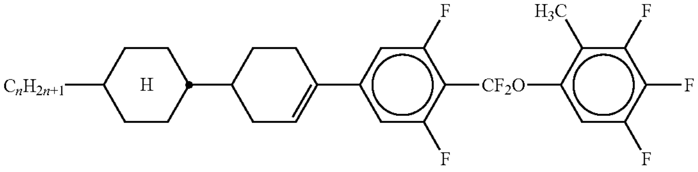
CLUQU(1)-n-F
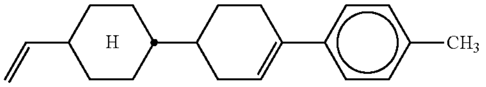
CLP-V-n
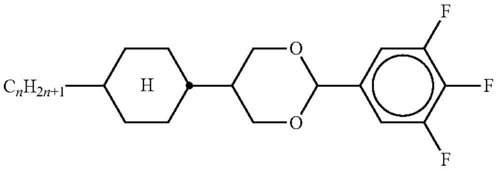
CDU-n-F
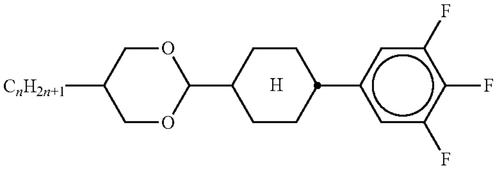
DCU-n-F
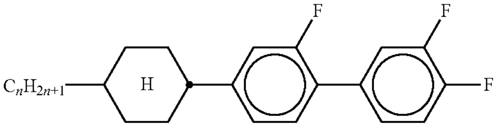
CGG-n-F
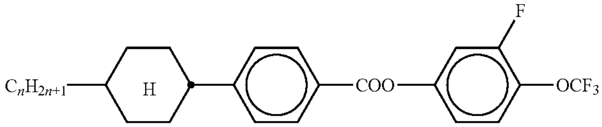
CPZG-n-OT
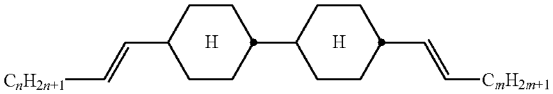
CC-nV-Vm
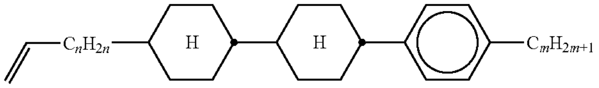
CCP-Vn-m
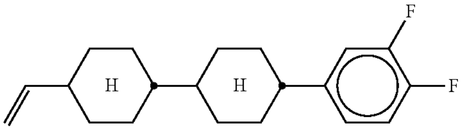
CCG-V-F
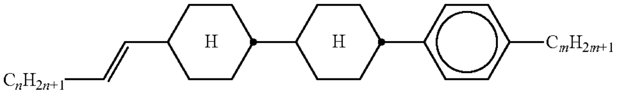
CCP-nV-m
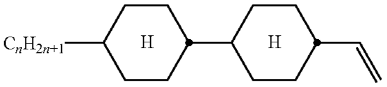
CC-n-V TABLE E-continued
| In the following formulae, n and m each, independently of one another, denote 0, 1, 2, 3, 4, 5, 6, 7, 8, 9, 10, 11 or 12, in particular 2, 3, 5, furthermore 0, 4, 6. |
| --- |
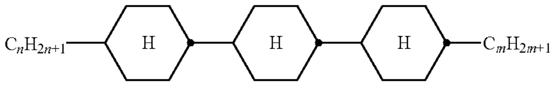
CCC-n-m
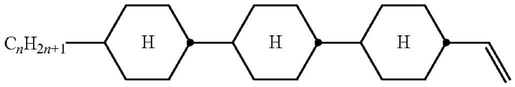
CCC-n-V
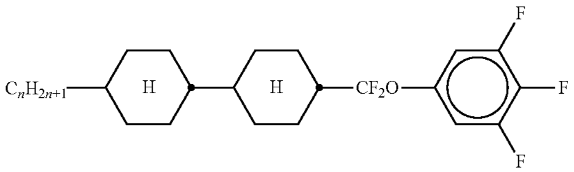
CCQU-n-F
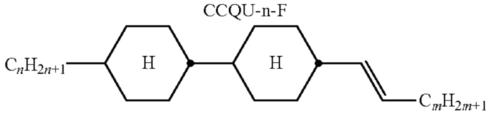
CC-n-Vm
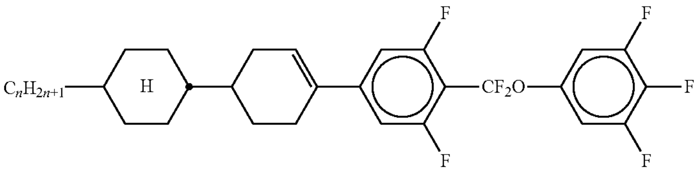
CLUQU-n-F
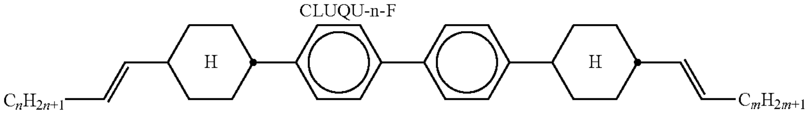
CPPC-nV-Vm
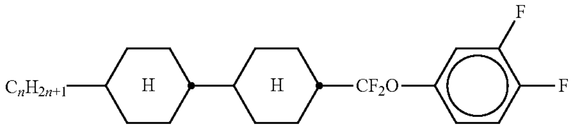
CCQG-n-F
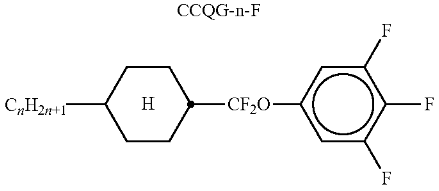
CQU-n-F
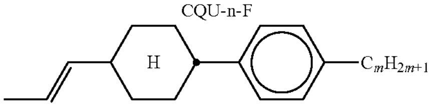
CP-1V-m
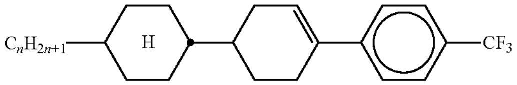
CLP-n-T
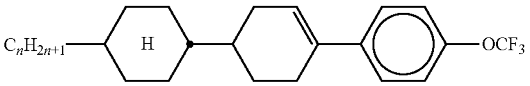
CLP-n-OT
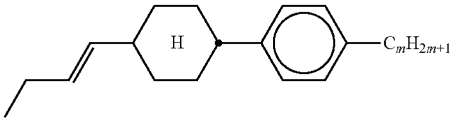
CP-2V-m TABLE E-continued
| In the following formulae, n and m each, independently of one another, denote 0, 1, 2, 3, 4, 5, 6, 7, 8, 9, 10, 11 or 12, in particular 2, 3, 5, furthermore 0, 4, 6. |
| --- |
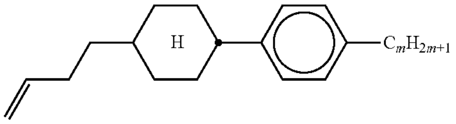
CP-V2-m
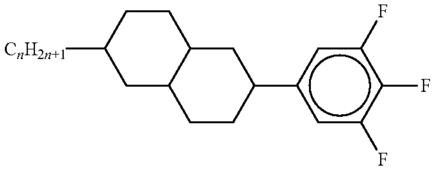
Dec-U-n-F
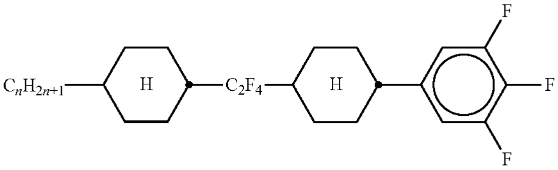
CWCU-n-F
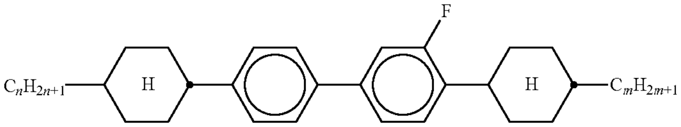
CPGP-n-m
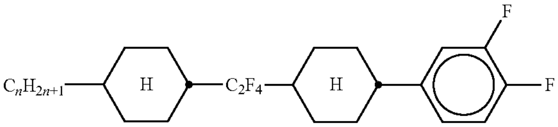
CWCG-n-F
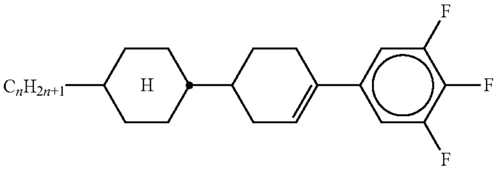
CLU-n-F
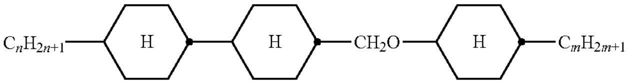
CCOC-n-m
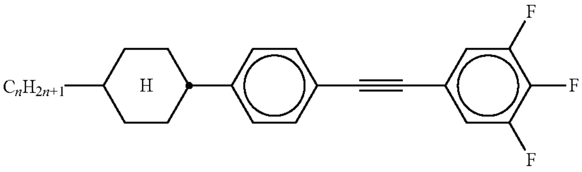
CPTU-n-F
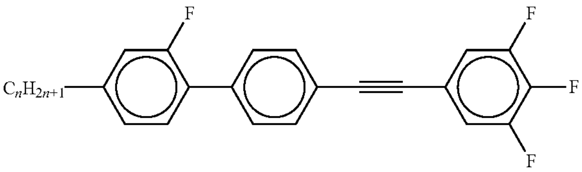
GPTU-n-F TABLE E-continued
| In the following formulae, n and m each, independently of one another, denote 0, 1, 2, 3, 4, 5, 6, 7, 8, 9, 10, 11 or 12, in particular 2, 3, 5, furthermore 0, 4, 6. |
| --- |
| 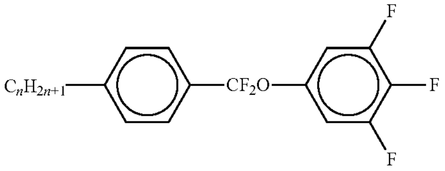 |
| PQU-n-F |
| 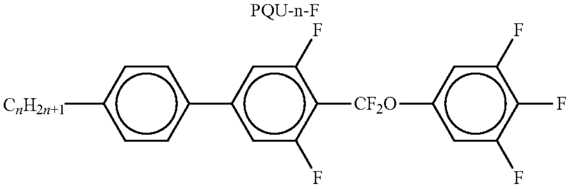 |
| PUQU-n-F |
| 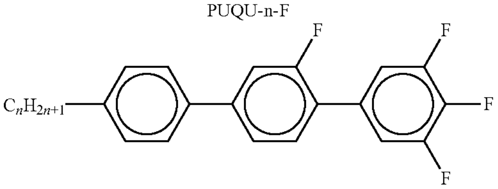 |
| PGU-n-F |
| 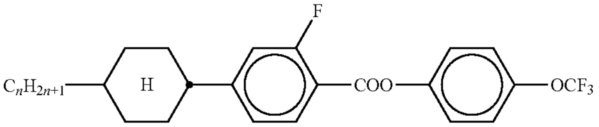 |
| CGZP-n-OT |
| 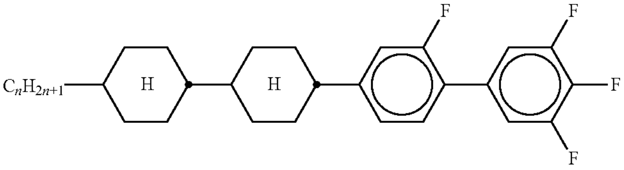 |
| CCGU-n-F |
| 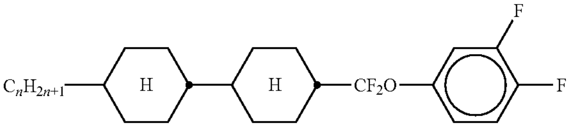 |
| CCQG-n-F |
| 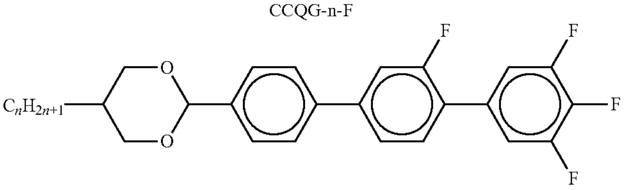 |
| DPGU-n-F |
| 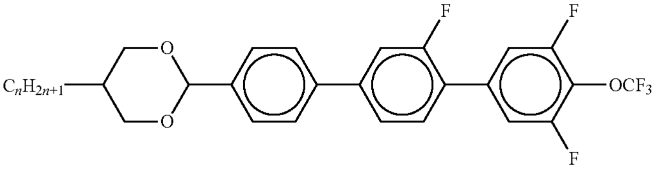 |
| DPGU-n-OT |
| 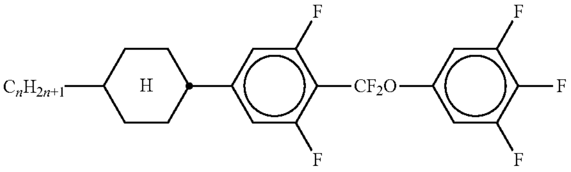 |
| CUQU-n-F |

TABLE E-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
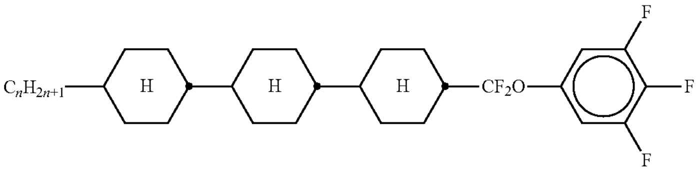
CCCQU-n-F
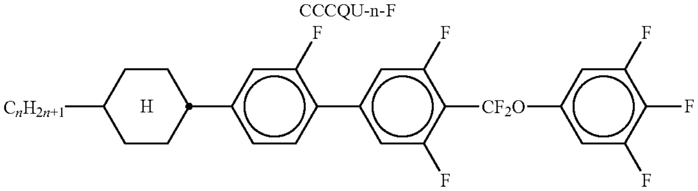
CGUQU-n-F
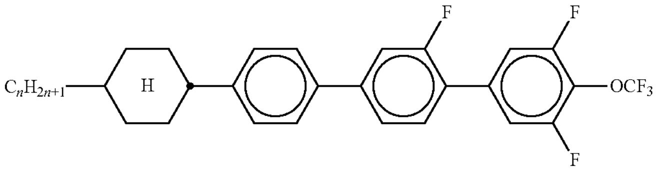
CPGU-n-OT
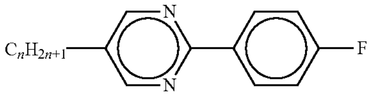
PYP-nF
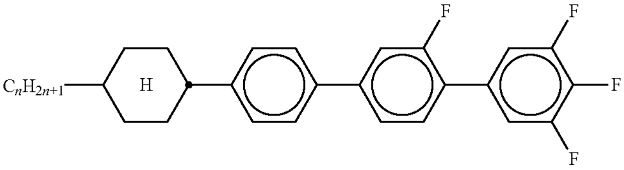
CPGU-n-F
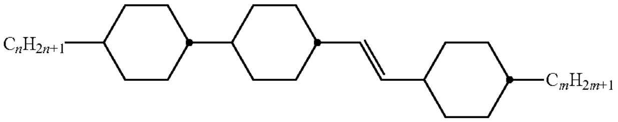
CCVC-n-m
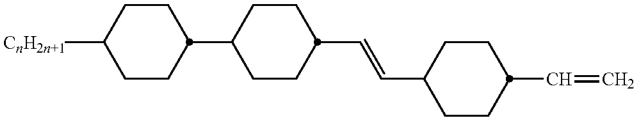
CCVC-n-V
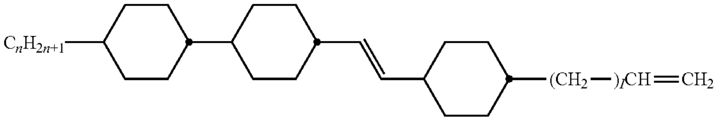
CCVC-n-IV
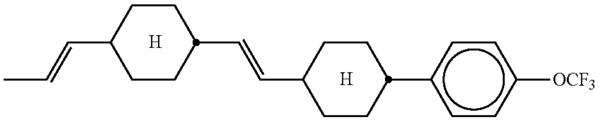
CVCP-1V-OT
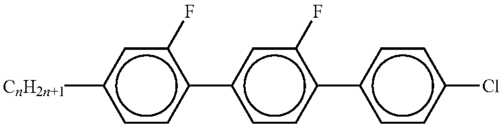
GGP-n-Cl TABLE E-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
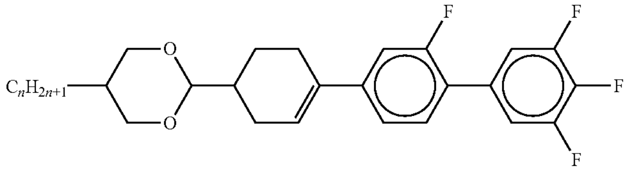
DLGU-n-F
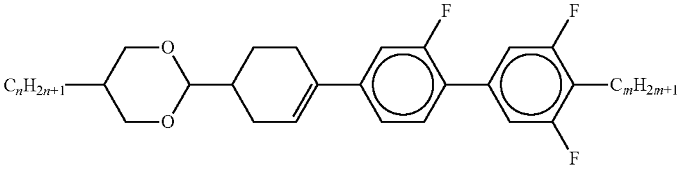
DLGU-n-m
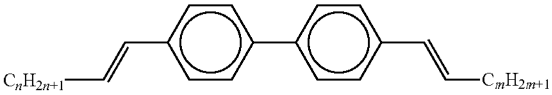
PP-nV-Vm
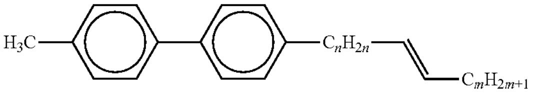
PP-1-nVm
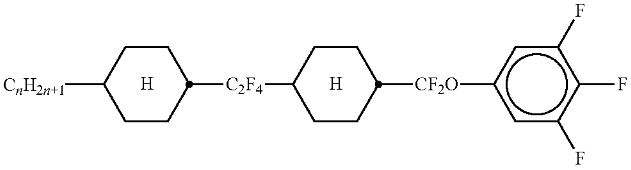
CWCQU-n-F
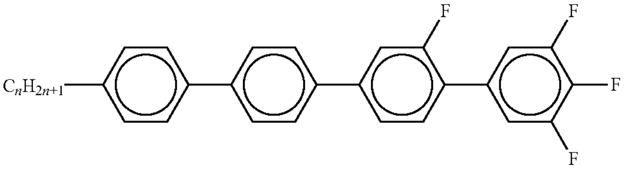
PPGU-n-F
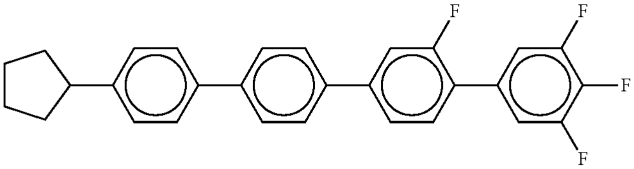
PPGU-(c5)-F
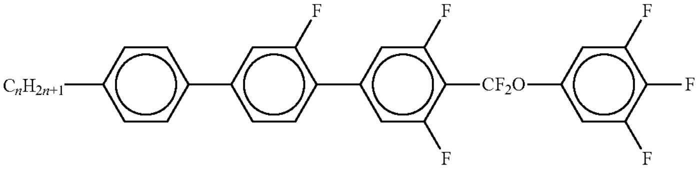
PGUQU-n-F
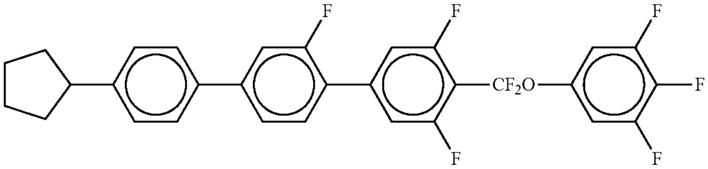
PGUQU-(c5)-F TABLE E-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
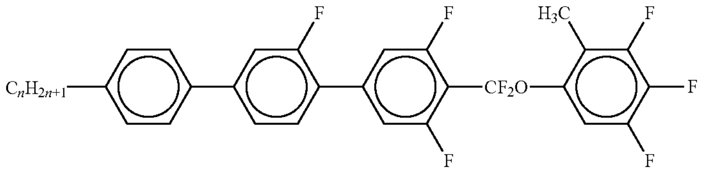
PGUQU(1)-n-F
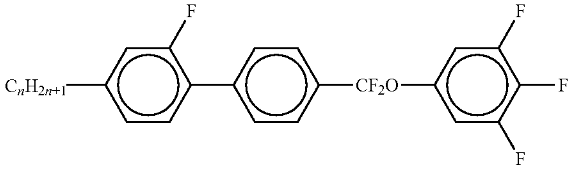
GPQU-n-F
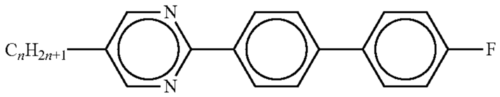
MPP-n-F
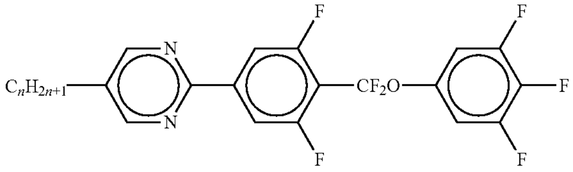
MUQU-n-F
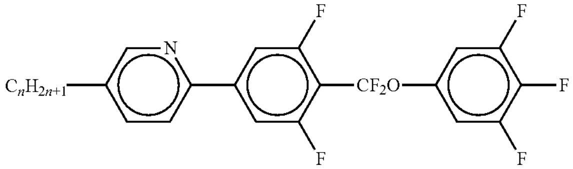
NUQU-n-F
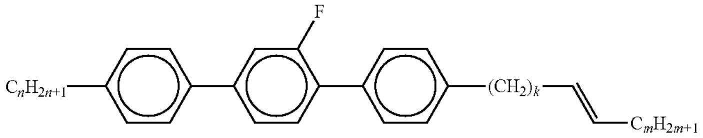
PGP-n-kVm
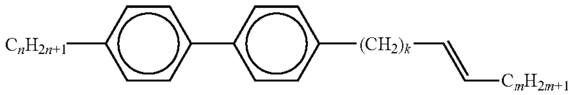
PP-n-kVm
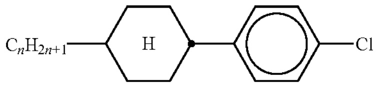
PCH-nCl
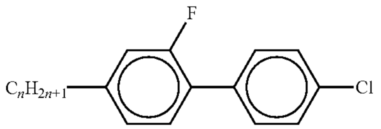
GP-n-Cl
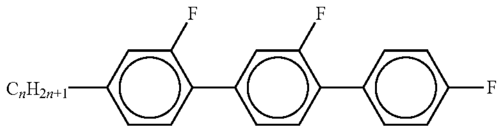
GGP-n-F TABLE E-continued
| In the following formulae, n and m each, independently of one another, denote 0, 1, 2, 3, 4, 5, 6, 7, 8, 9, 10, 11 or 12, in particular 2, 3, 5, furthermore 0, 4, 6. |
|---|
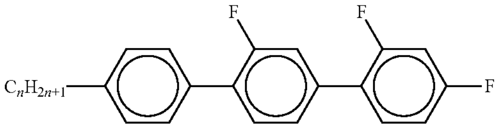
PGIGI-n-F
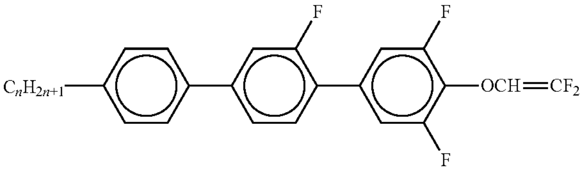
PGU-n-OXF
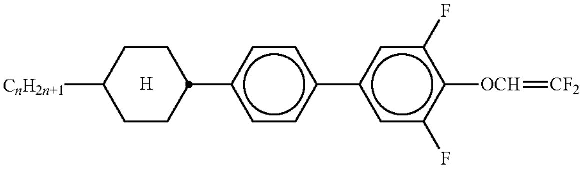
CPU-n-OXF
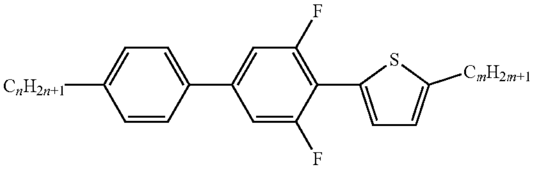
PUS-n-m
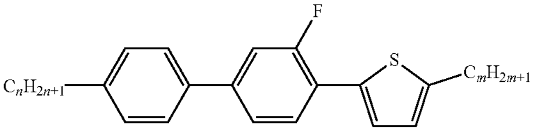
PGS-n-m
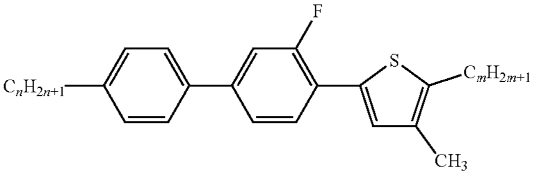
PGS(1)-n-m
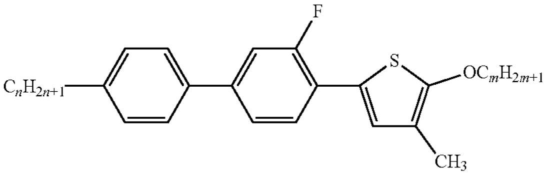
PGS(1)-n-Om
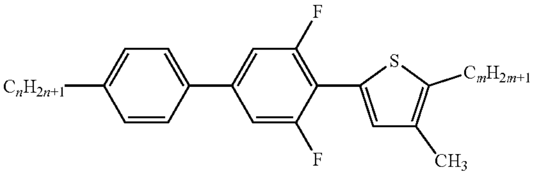
PUS(1)-n-m TABLE E-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
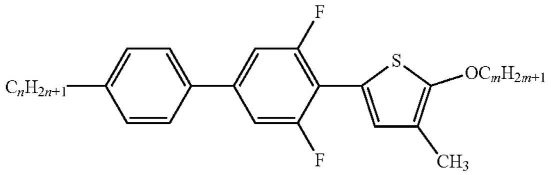
PUS(1)-n-Om
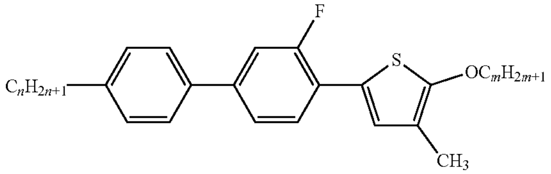
PUS-n-Om
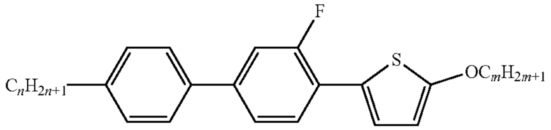
PGS-n-Om
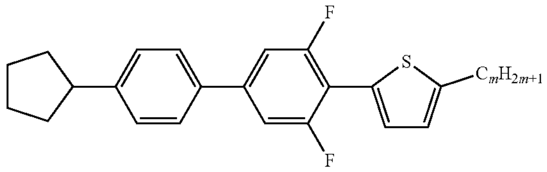
PUS-(c5)-m
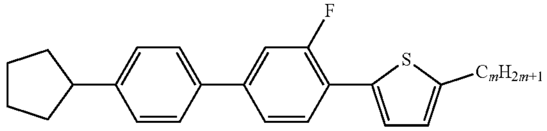
PGS-(c5)-m
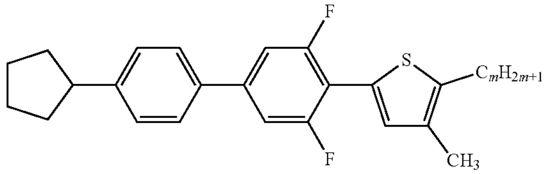
PUS(1)-(c5)-m
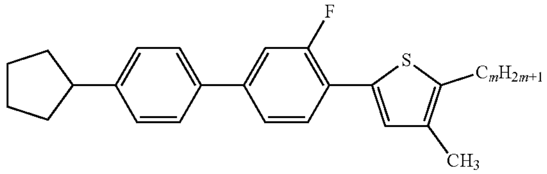
PGS(1)-(c5)-m
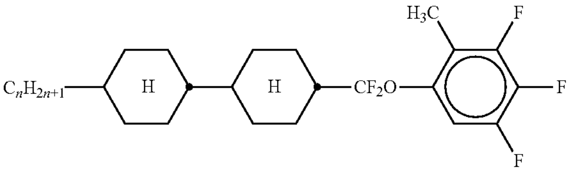
CCQU-n-F(1)

TABLE E-continued
In the following formulae, n and m each, independently of one another, denote 0, 1, 2, 3, 4, 5, 6, 7, 8, 9, 10, 11 or 12, in particular 2, 3, 5, furthermore 0, 4, 6.
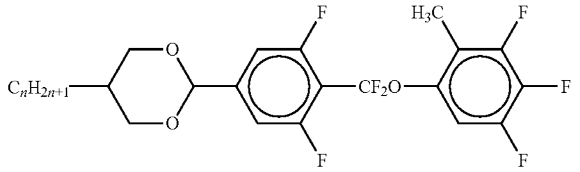
DUQU-n-F(1)
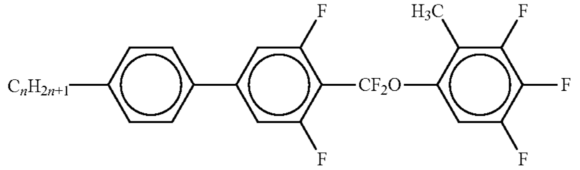
PUQU-n-F(1)
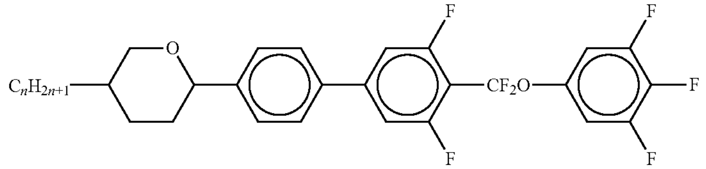
APUQU-n-F(1)
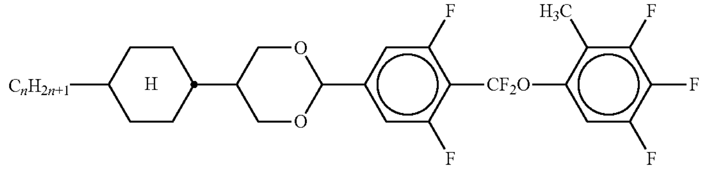
CDUQU-n-F(1)
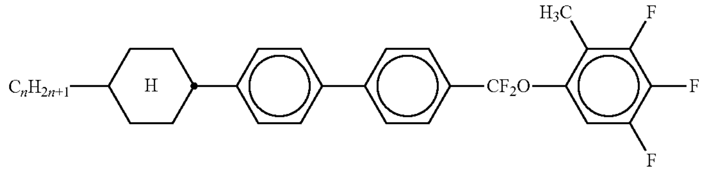
CPPQU-n-F(1)
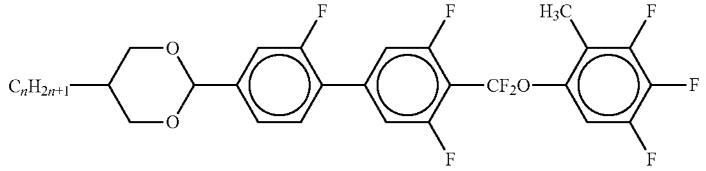
DGUQU-n-F(1)
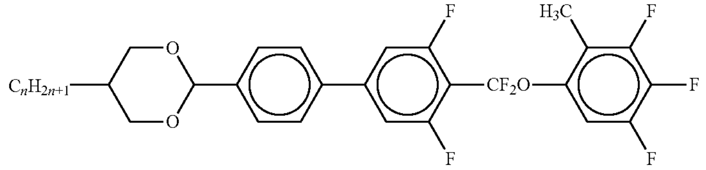
DPUQU-n-F(1)
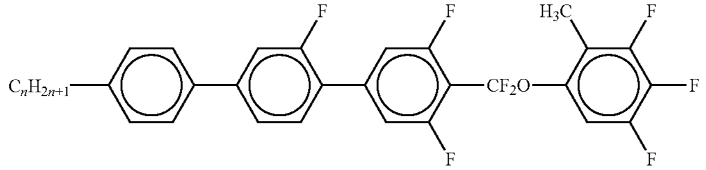
PGUQU-n-F(1)

TABLE E-continued

| In the following formulae, n and m each, independently of one another, denote 0, 1, 2, 3, 4, 5, 6, 7, 8, 9, 10, 11 or 12, in particular 2, 3, 5, furthermore 0, 4, 6. |
|---|
| 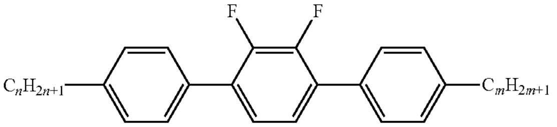 PYP-n-m |

Particular preference is given to LC media which, besides the compounds of the Formulae G, LP1 and/or LP2, comprise at least one, two, three, four or more compounds from Table E.

TABLE F

| Table F indicates possible dopants which are generally added to the LC media according to the invention. The LC media preferably comprise 0-10% by weight, in particular 0.01-5% by weight and particularly preferably 0.01-3% by weight of dopants. |
|---|
| 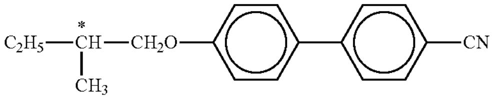 C 15 |
| 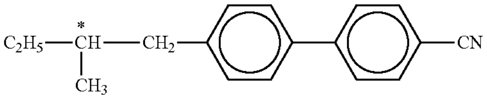 CB 15 |
| 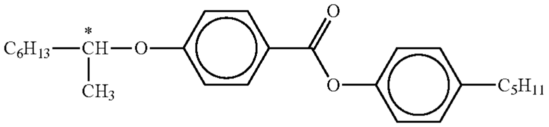 CM 21 |
| 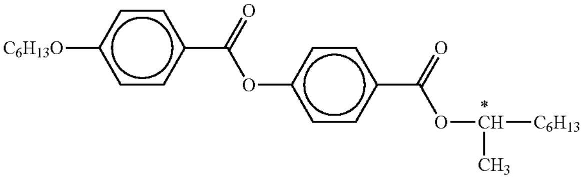 R/S-811 |
| 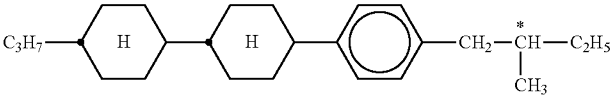 CM 44 |
| 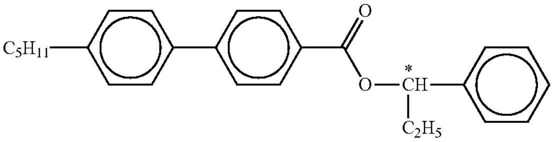 CM 45 |
| 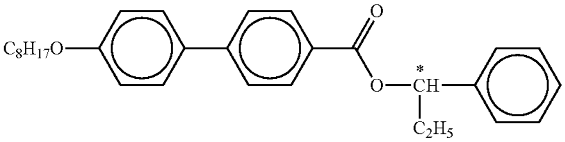 CM 47 |

TABLE F-continued
| |
|---|
| Table F indicates possible dopants which are generally added to the LC media according to the invention. The LC media preferably comprise 0-10% by weight, in particular 0.01-5% by weight and particularly preferably 0.01-3% by weight of dopants. |
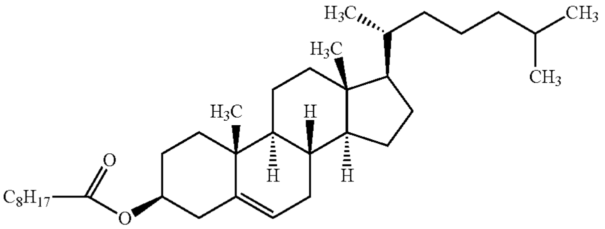
CN
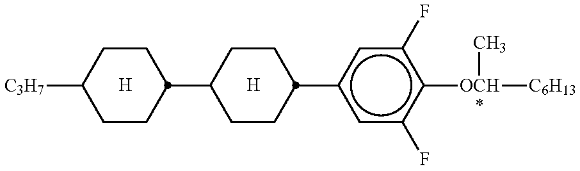
R/S-2011
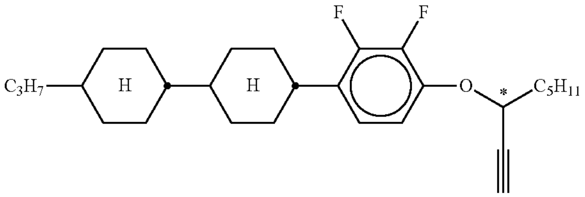
R/S-3011
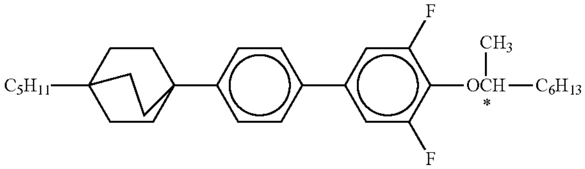
R/S-4011
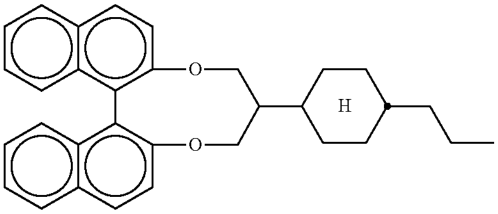
R/S-5011
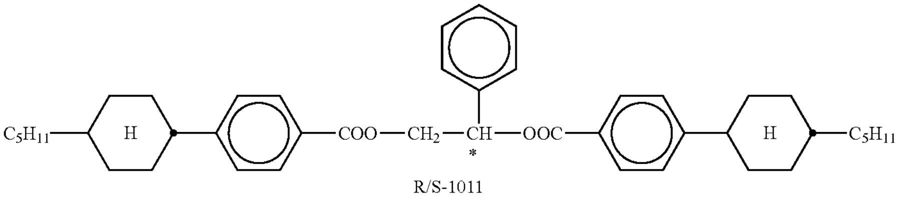
R/S-1011

TABLE G
| Stabilisers, which can additionally be added, for example, to the LC media according to the invention in amounts of 0 to 10% by weight, are mentioned below. |
|---|
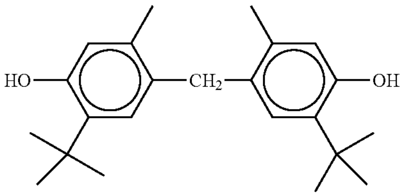
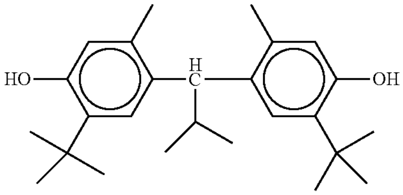
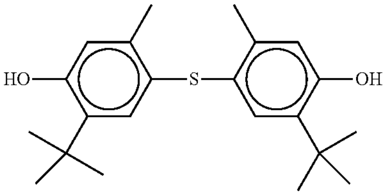
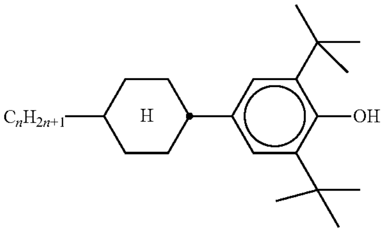
n = 1, 2, 3, 4, 5, 6 or 7
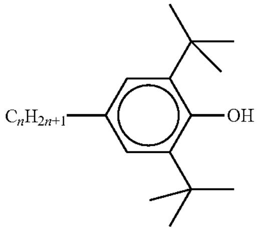
n = 1, 2, 3, 4, 5, 6 or 7
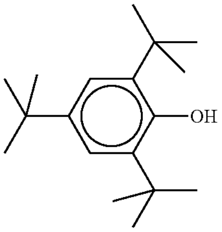

TABLE G-continued
| Stabilisers, which can additionally be added, for example, to the LC media according to the invention in amounts of 0 to 10% by weight, are mentioned below. |
|---|
| 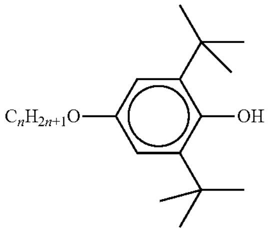 |
| n = 1, 2, 3, 4, 5, 6 or 7 |
| 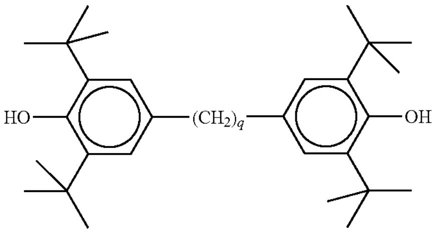 |
| q = 1, 2, 3, 4, 5, 6 or 7 |
| 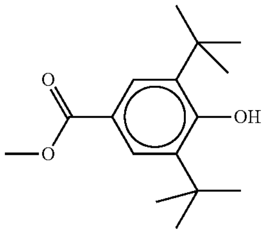 |
| 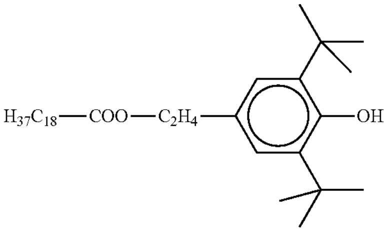 |
| 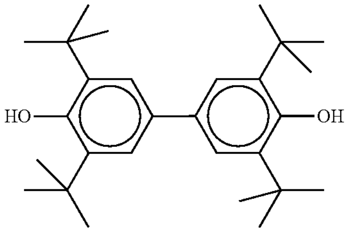 |

TABLE G-continued
| Stabilisers, which can additionally be added, for example, to the LC media according to the invention in amounts of 0 to 10% by weight, are mentioned below. |
| --- |
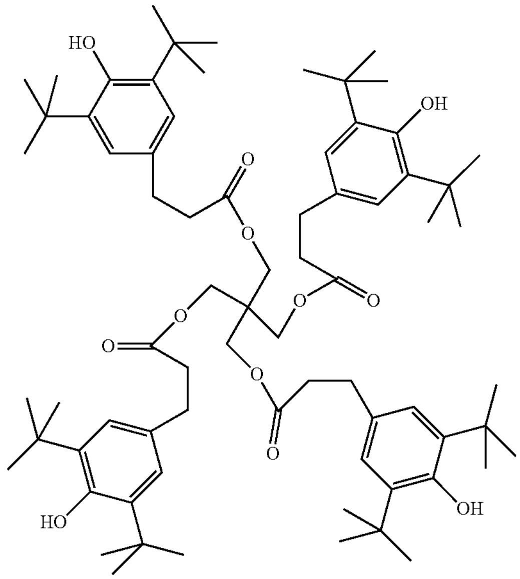 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
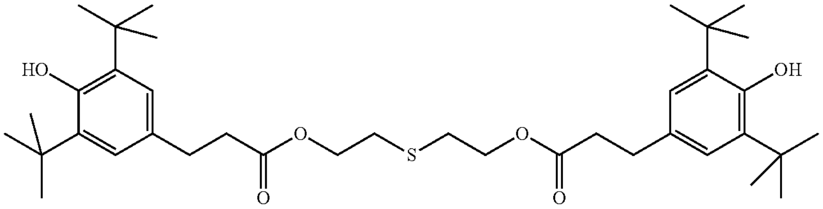 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
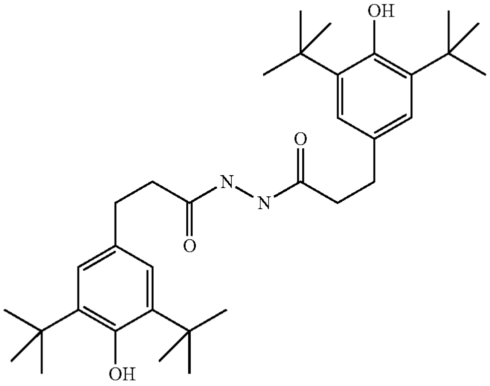 [SMILES: CC(C)(C)c1cc(CCC(=O)NNC(=O)CCc2cc(C(C)(C)C)c(O)c(C(C)(C)C)c2)cc(C(C)(C)C)c1O]
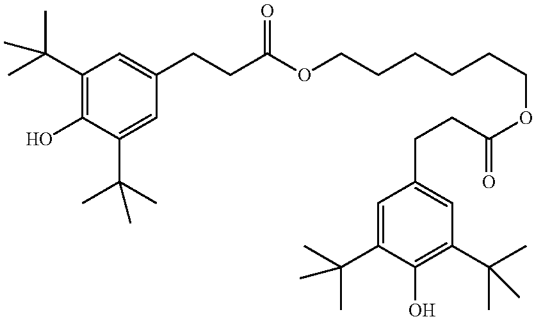 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

TABLE G-continued
| Stabilisers, which can additionally be added, for example, to the LC media according to the invention in amounts of 0 to 10% by weight, are mentioned below. |
|---|
| 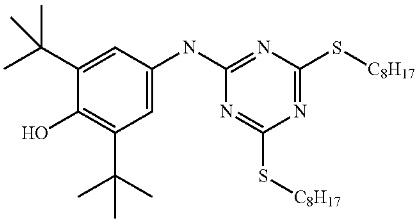 |
| 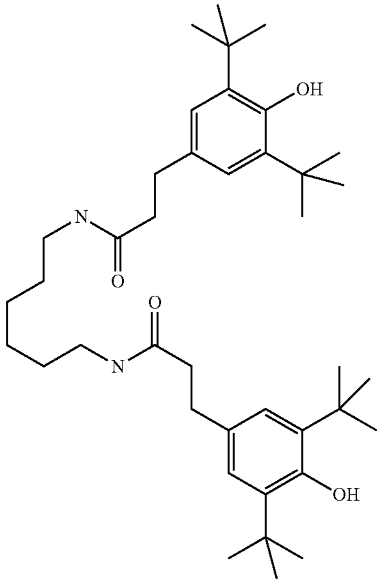 [SMILES: CC(C)(C)c1cc(CCC(=O)NCCCCCCNC(=O)CCc2cc(C(C)(C)C)c(O)c(C(C)(C)C)c2)cc(C(C)(C)C)c1O] |
| 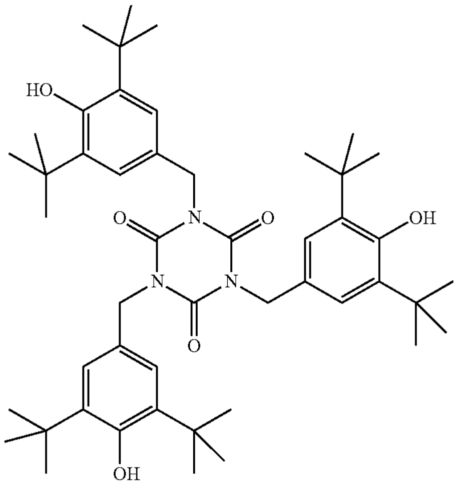 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O] |

TABLE G-continued
| Stabilisers, which can additionally be added, for example, to the LC media according to the invention in amounts of 0 to 10% by weight, are mentioned below. |
| --- |
| 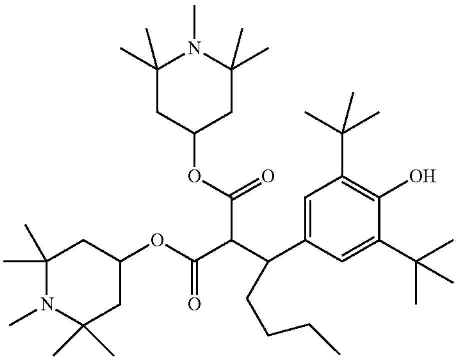 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1] |
| 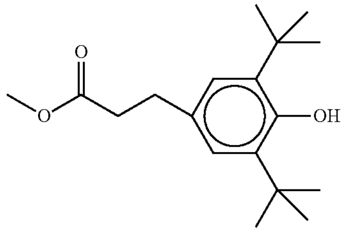 |
| 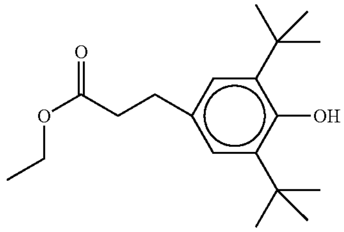 |
| 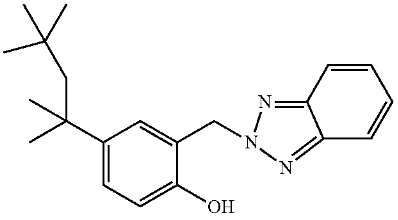 [SMILES: CC(C)(C)CC(C)(C)c1ccc(O)c(Cn2nc3ccccc3n2)c1] |
| 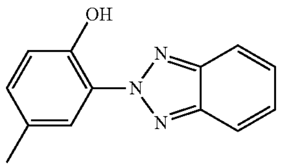 [SMILES: Cc1ccc(O)c(-n2nc3ccccc3n2)c1] |
| 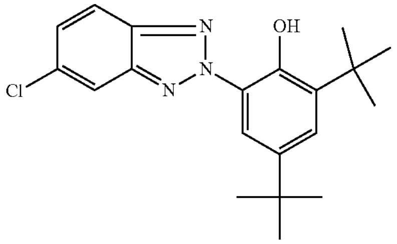 [SMILES: CC(C)(C)c1cc(-n2nc3ccc(Cl)cc3n2)c(O)c(C(C)(C)C)c1] |

TABLE G-continued
| Stabilisers, which can additionally be added, for example, to the LC media according to the invention in amounts of 0 to 10% by weight, are mentioned below. |
| --- |
| 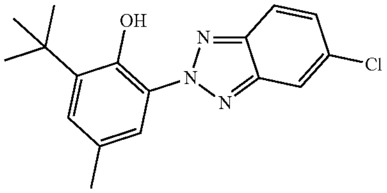 [SMILES: Cc1cc(-n2nc3ccc(Cl)cc3n2)c(O)c(C(C)(C)C)c1] |
| 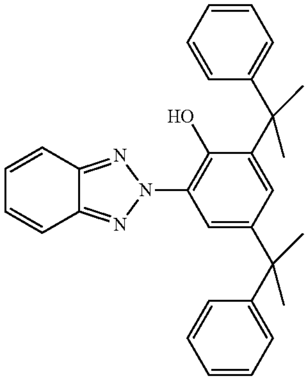 [SMILES: CC(C)(c1ccccc1)c1cc(-n2nc3ccccc3n2)c(O)c(C(C)(C)c2ccccc2)c1] |
| 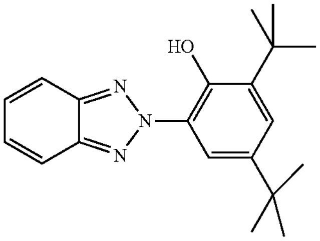 [SMILES: CC(C)(C)c1cc(-n2nc3ccccc3n2)c(O)c(C(C)(C)C)c1] |
| 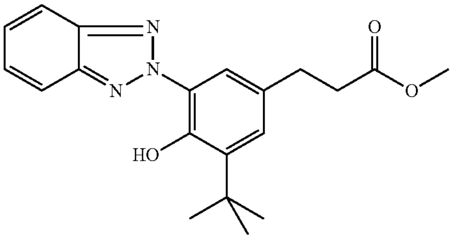 [SMILES: COC(=O)CCc1cc(-n2nc3ccccc3n2)c(O)c(C(C)(C)C)c1] |
| 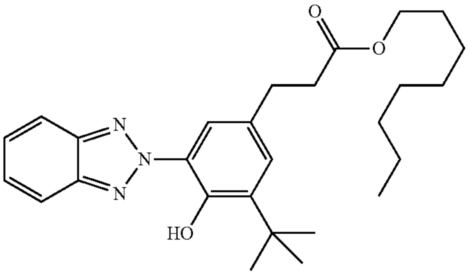 [SMILES: CCCCCCCCOC(=O)CCc1cc(-n2nc3ccccc3n2)c(O)c(C(C)(C)C)c1] |

TABLE G-continued
| Stabilisers, which can additionally be added, for example, to the LC media according to the invention in amounts of 0 to 10% by weight, are mentioned below. |
| --- |
| 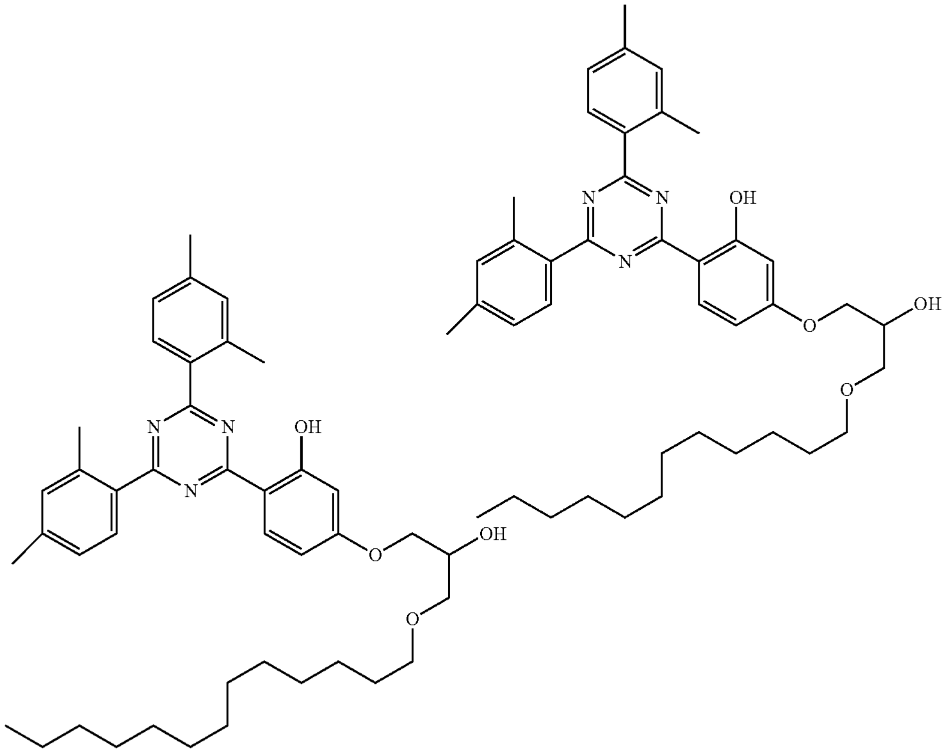 |
| 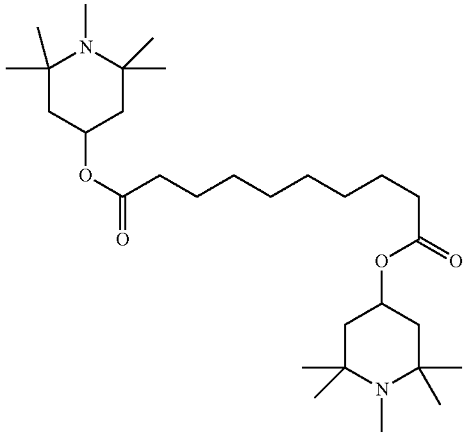 |

TABLE G-continued
| Stabilisers, which can additionally be added, for example, to the LC media according to the invention in amounts of 0 to 10% by weight, are mentioned below. |
| --- |
| 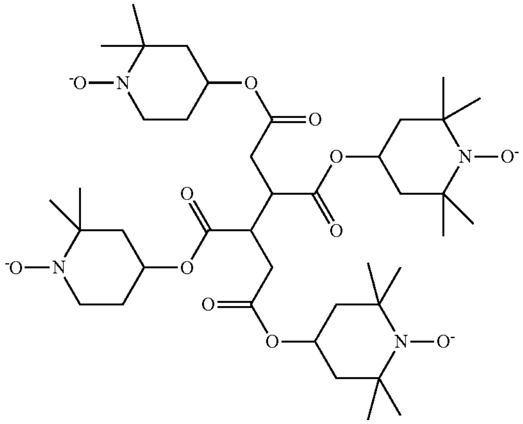 |
| 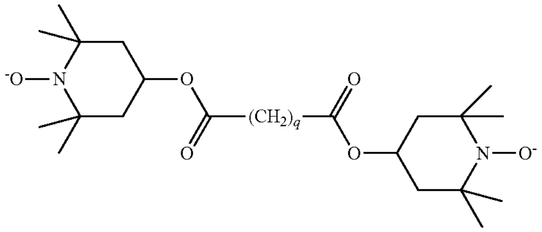 |
| q = 1, 2, 3, 4, 5, 6, 7, 8, 9 or 10 |
TABLE H
| Table H shows illustrative reactive mesogenic compounds (RMs) which can be used in the LC media in accordance with the present invention. |
| --- |
| 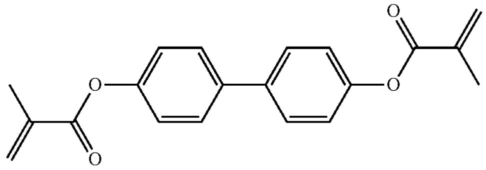 [SMILES: C=C(C)C(=O)Oc1ccc(-c2ccc(OC(=O)C(=C)C)cc2)cc1] |
| RM-1 |
| 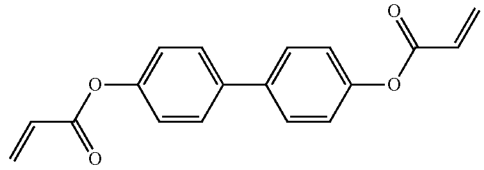 [SMILES: C=CC(=O)Oc1ccc(-c2ccc(OC(=O)C=C)cc2)cc1] |
| RM-2 |
| 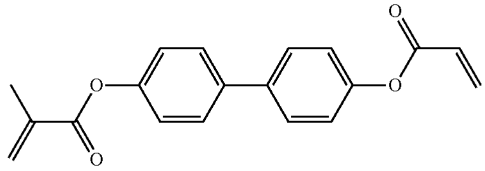 [SMILES: C=CC(=O)Oc1ccc(-c2ccc(OC(=O)C(=C)C)cc2)cc1] |
| RM-3 |

TABLE H-continued
Table H shows illustrative reactive mesogenic compounds (RMs) which can be used in the LC media in accordance with the present invention.
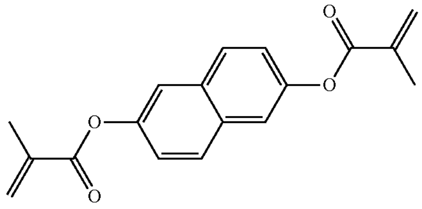 [SMILES: C=C(C)C(=O)Oc1ccc2cc(OC(=O)C(=C)C)ccc2c1]
RM-4
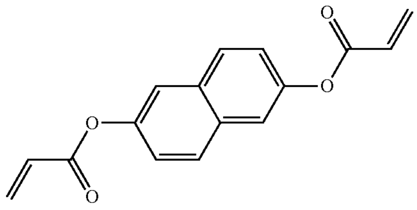 [SMILES: C=CC(=O)Oc1ccc2cc(OC(=O)C=C)ccc2c1]
RM-5
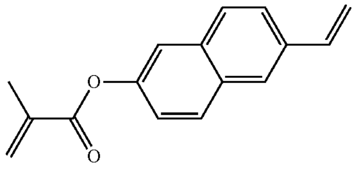 [SMILES: C=Cc1ccc2cc(OC(=O)C(=C)C)ccc2c1]
RM-6
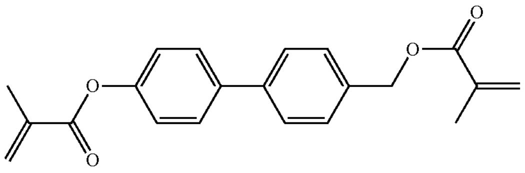 [SMILES: C=C(C)C(=O)OCc1ccc(-c2ccc(OC(=O)C(=C)C)cc2)cc1]
RM-7
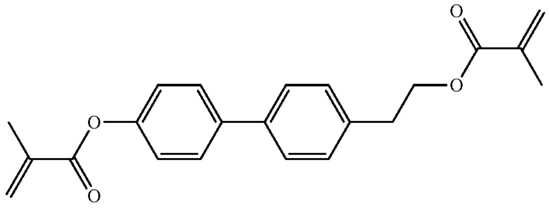 [SMILES: C=C(C)C(=O)OCCc1ccc(-c2ccc(OC(=O)C(=C)C)cc2)cc1]
RM-8
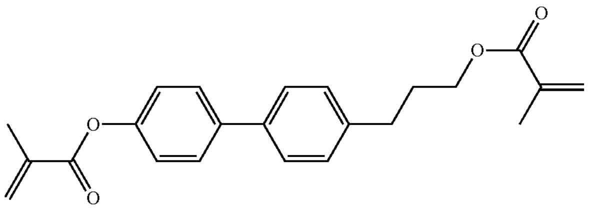 [SMILES: C=C(C)C(=O)OCCCc1ccc(-c2ccc(OC(=O)C(=C)C)cc2)cc1]
RM-9

TABLE H-continued
Table H shows illustrative reactive mesogenic compounds (RMs) which can be used in the LC media in accordance with the present invention.
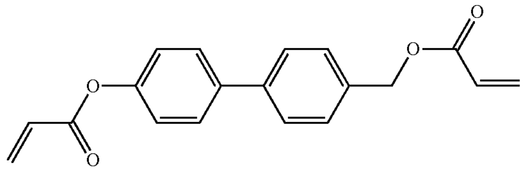 [SMILES: C=CC(=O)OCc1ccc(-c2ccc(OC(=O)C=C)cc2)cc1]
RM-10
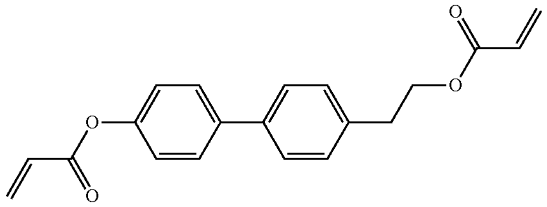 [SMILES: C=CC(=O)OCCc1ccc(-c2ccc(OC(=O)C=C)cc2)cc1]
RM-11
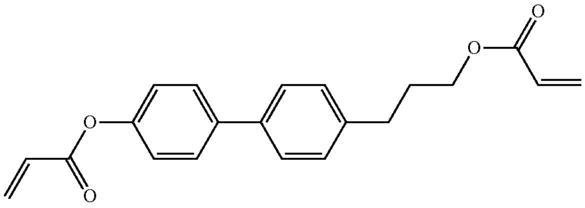 [SMILES: C=CC(=O)OCCCc1ccc(-c2ccc(OC(=O)C=C)cc2)cc1]
RM-12
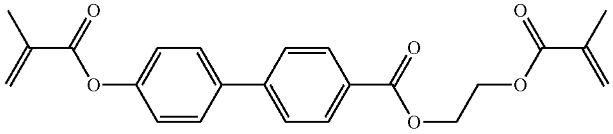 [SMILES: C=C(C)C(=O)OCCOC(=O)c1ccc(-c2ccc(OC(=O)C(=C)C)cc2)cc1]
RM-13
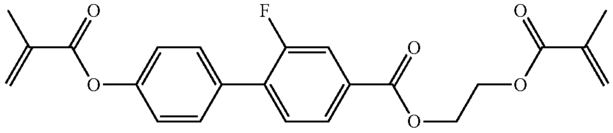 [SMILES: C=C(C)C(=O)OCCOC(=O)c1ccc(-c2ccc(OC(=O)C(=C)C)cc2)c(F)c1]
RM-14
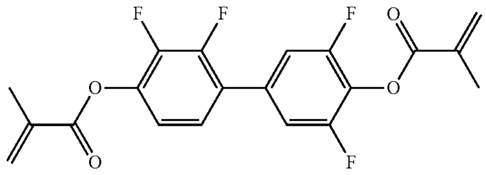 [SMILES: C=C(C)C(=O)Oc1ccc(-c2cc(F)c(OC(=O)C(=C)C)c(F)c2)c(F)c1F]
RM-15
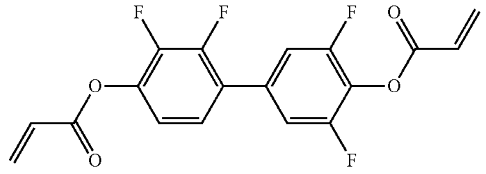 [SMILES: C=CC(=O)Oc1ccc(-c2cc(F)c(OC(=O)C=C)c(F)c2)c(F)c1F]
RM-16

TABLE H-continued
| Table H shows illustrative reactive mesogenic compounds (RMs) which can be used in the LC media in accordance with the present invention. |
| --- |
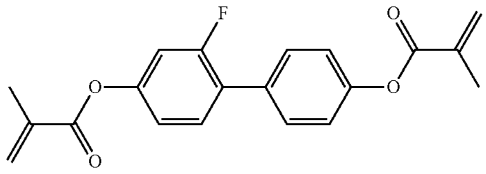
RM-17
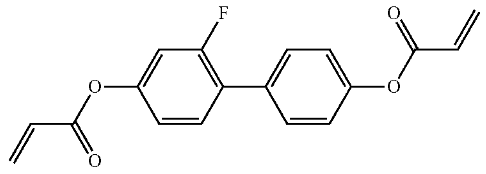 [SMILES: C=CC(=O)Oc1ccc(-c2ccc(OC(=O)C=C)cc2F)cc1]
RM-18
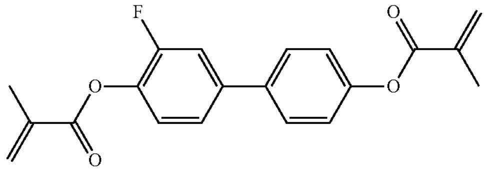 [SMILES: C=C(C)C(=O)Oc1ccc(-c2ccc(OC(=O)C(=C)C)c(F)c2)cc1]
RM-19
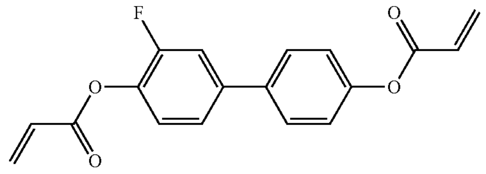 [SMILES: C=CC(=O)Oc1ccc(-c2ccc(OC(=O)C=C)c(F)c2)cc1]
RM-20
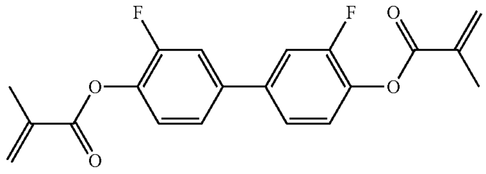 [SMILES: C=C(C)C(=O)Oc1ccc(-c2ccc(OC(=O)C(=C)C)c(F)c2)cc1F]
RM-21
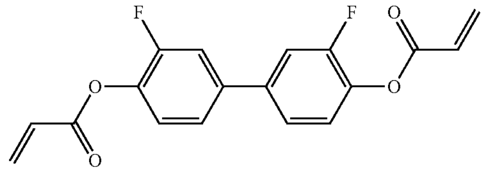 [SMILES: C=CC(=O)Oc1ccc(-c2ccc(OC(=O)C=C)c(F)c2)cc1F]
RM-22
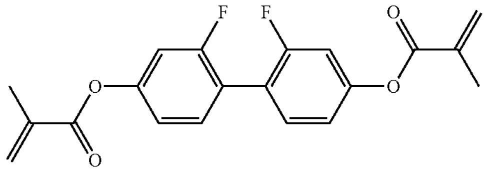 [SMILES: C=C(C)C(=O)Oc1ccc(-c2ccc(OC(=O)C(=C)C)cc2F)c(F)c1]
RM-23

TABLE H-continued
| Table H shows illustrative reactive mesogenic compounds (RMs) which can be used in the LC media in accordance with the present invention. |
|---|
| 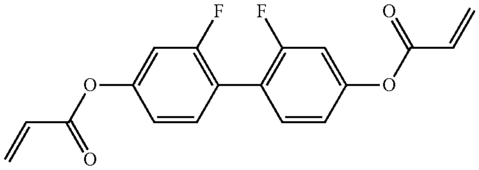 [SMILES: C=CC(=O)Oc1ccc(-c2ccc(OC(=O)C=C)cc2F)c(F)c1] |
| RM-24 |
| 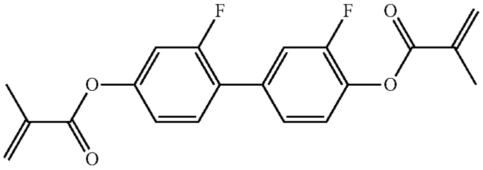 [SMILES: C=C(C)C(=O)Oc1ccc(-c2ccc(OC(=O)C(=C)C)c(F)c2)c(F)c1] |
| RM-25 |
| 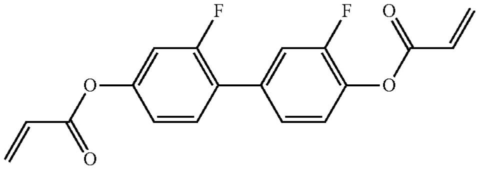 [SMILES: C=CC(=O)Oc1ccc(-c2ccc(OC(=O)C=C)c(F)c2)c(F)c1] |
| RM-26 |
| 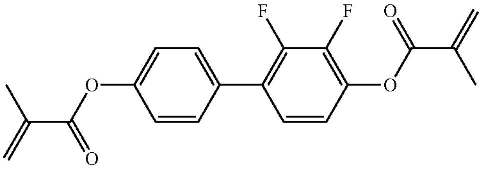 [SMILES: C=C(C)C(=O)Oc1ccc(-c2ccc(OC(=O)C(=C)C)c(F)c2F)cc1] |
| RM-27 |
| 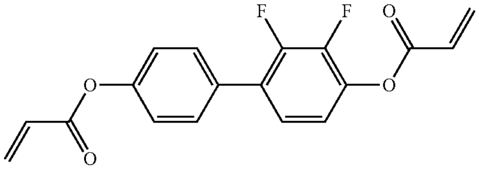 [SMILES: C=CC(=O)Oc1ccc(-c2ccc(OC(=O)C=C)c(F)c2F)cc1] |
| RM-28 |
| 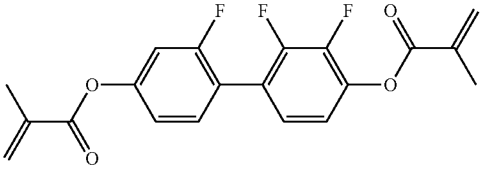 [SMILES: C=C(C)C(=O)Oc1ccc(-c2ccc(OC(=O)C(=C)C)c(F)c2F)c(F)c1] |
| RM-29 |
| 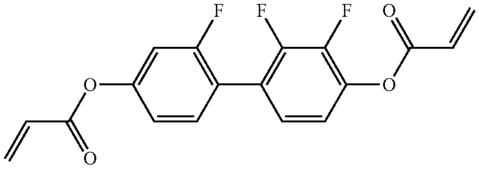 [SMILES: C=CC(=O)Oc1ccc(-c2ccc(OC(=O)C=C)c(F)c2F)c(F)c1] |
| RM-30 |

TABLE H-continued
| Table H shows illustrative reactive mesogenic compounds (RMs) which can be used in the LC media in accordance with the present invention. |
| --- |
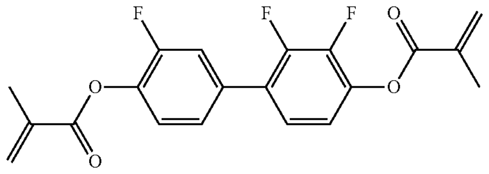 [SMILES: C=C(C)C(=O)Oc1ccc(-c2ccc(OC(=O)C(=C)C)c(F)c2F)cc1F]
RM-31
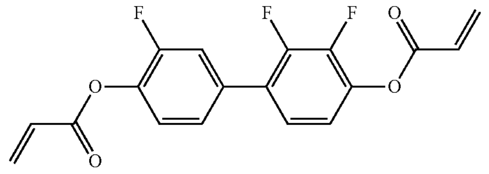 [SMILES: C=CC(=O)Oc1ccc(-c2ccc(OC(=O)C=C)c(F)c2F)cc1F]
RM-32
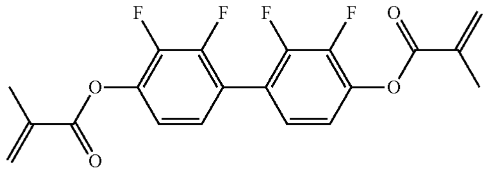 [SMILES: C=C(C)C(=O)Oc1ccc(-c2ccc(OC(=O)C(=C)C)c(F)c2F)c(F)c1F]
RM-33
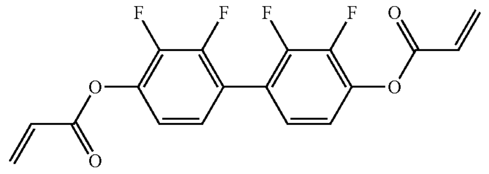 [SMILES: C=CC(=O)Oc1ccc(-c2ccc(OC(=O)C=C)c(F)c2F)c(F)c1F]
RM-34
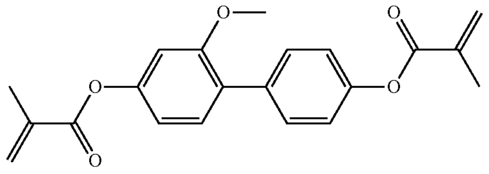
RM-35
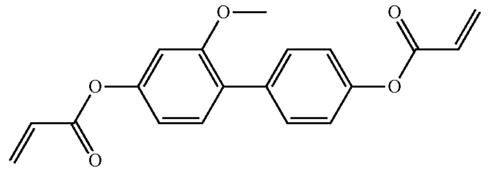
RM-36
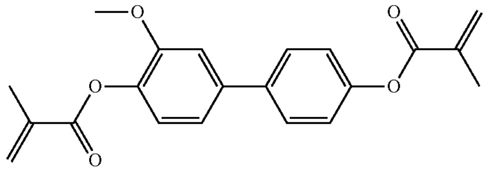
RM-37

TABLE H-continued
| Table H shows illustrative reactive mesogenic compounds (RMs) which can be used in the LC media in accordance with the present invention. |
| --- |
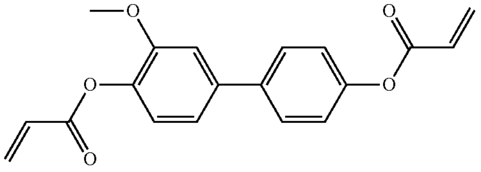
RM-38
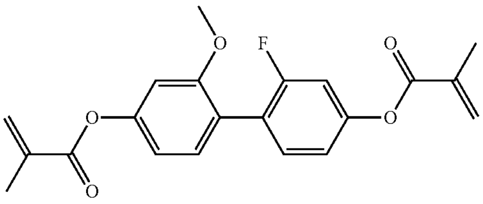 [SMILES: C=C(C)C(=O)Oc1ccc(-c2ccc(OC(=O)C(=C)C)cc2OC)c(F)c1]
RM-39
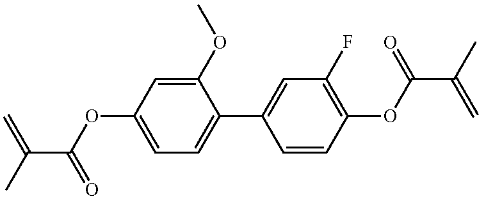 [SMILES: C=C(C)C(=O)Oc1ccc(-c2ccc(OC(=O)C(=C)C)c(F)c2)c(OC)c1]
RM-40
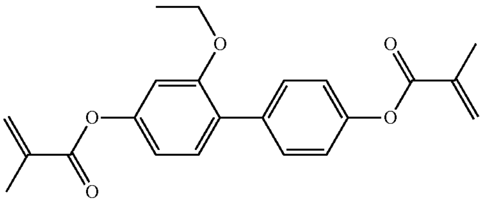 [SMILES: C=C(C)C(=O)Oc1ccc(-c2ccc(OC(=O)C(=C)C)cc2OCC)cc1]
RM-41
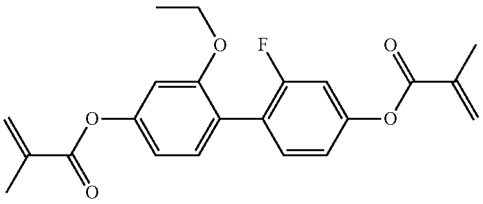 [SMILES: C=C(C)C(=O)Oc1ccc(-c2ccc(OC(=O)C(=C)C)cc2OCC)c(F)c1]
RM-42
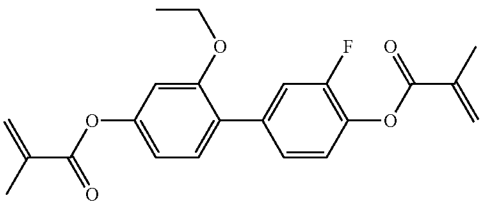 [SMILES: C=C(C)C(=O)Oc1ccc(-c2ccc(OC(=O)C(=C)C)c(F)c2)c(OCC)c1]
RM-43

TABLE H-continued
Table H shows illustrative reactive mesogenic compounds (RMs) which can be used in the LC media in accordance with the present invention.
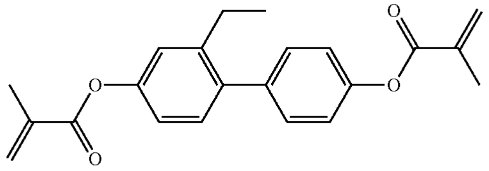
RM-44
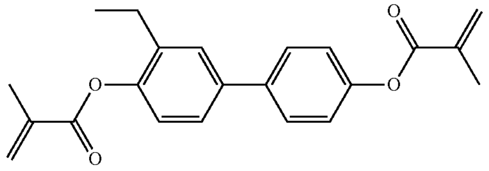 [SMILES: C=C(C)C(=O)Oc1ccc(-c2ccc(OC(=O)C(=C)C)c(CC)c2)cc1]
RM-45
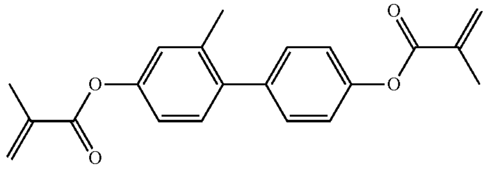 [SMILES: C=C(C)C(=O)Oc1ccc(-c2ccc(OC(=O)C(=C)C)cc2C)cc1]
RM-46
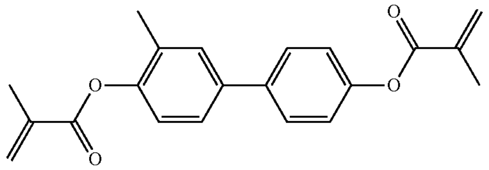
RM-47
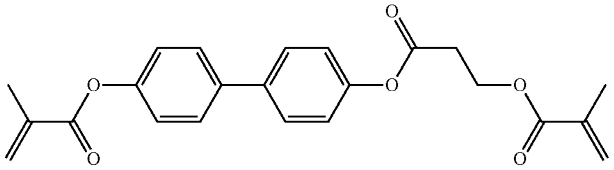 [SMILES: C=C(C)C(=O)OCCC(=O)Oc1ccc(-c2ccc(OC(=O)C(=C)C)cc2)cc1]
RM-48
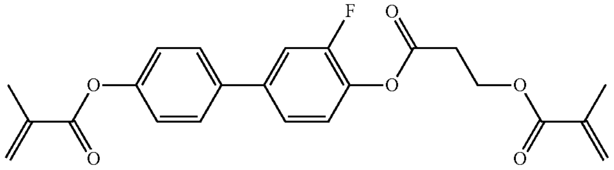 [SMILES: C=C(C)C(=O)OCCC(=O)Oc1ccc(-c2ccc(OC(=O)C(=C)C)cc2)cc1F]
RM-49
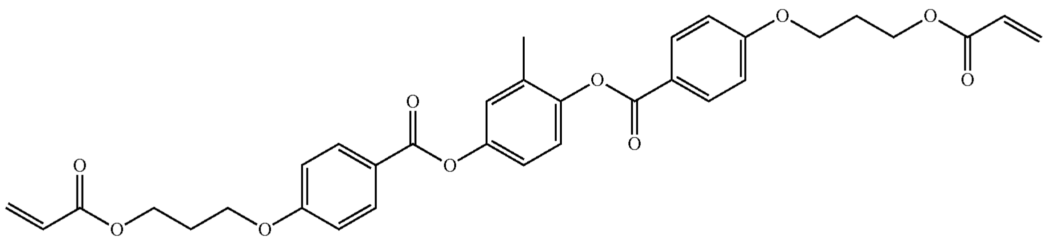 [SMILES: C=CC(=O)OCCCOc1ccc(C(=O)Oc2ccc(OC(=O)c3ccc(OCCCOC(=O)C=C)cc3)c(C)c2)cc1]

TABLE H-continued
| Table H shows illustrative reactive mesogenic compounds (RMs) which can be used in the LC media in accordance with the present invention. |
|---|
RM-50
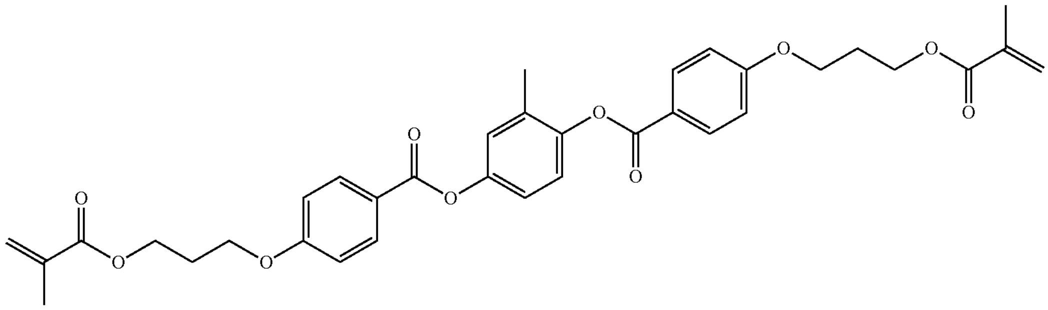 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-51
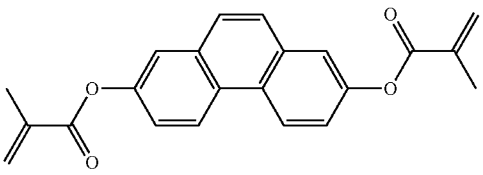 [SMILES: C=C(C)C(=O)Oc1ccc2c(ccc3cc(OC(=O)C(=C)C)ccc32)c1]
RM-52
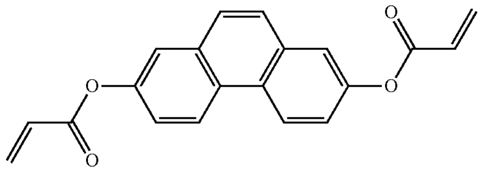 [SMILES: C=CC(=O)Oc1ccc2c(ccc3cc(OC(=O)C=C)ccc32)c1]
RM-53
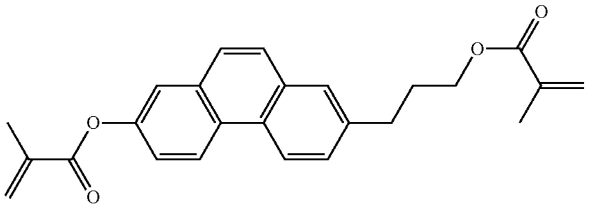 [SMILES: C=C(C)C(=O)OCCCc1ccc2c(ccc3cc(OC(=O)C(=C)C)ccc32)c1]
RM-54
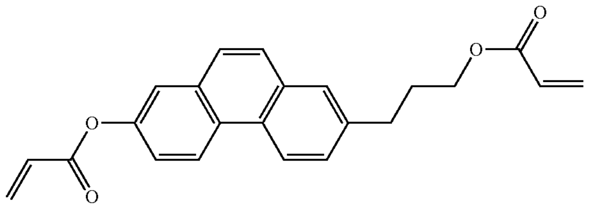 [SMILES: C=CC(=O)OCCCc1ccc2c(ccc3cc(OC(=O)C=C)ccc32)c1]
RM-55

TABLE H-continued
| Table H shows illustrative reactive mesogenic compounds (RMs) which can be used in the LC media in accordance with the present invention. |
|---|
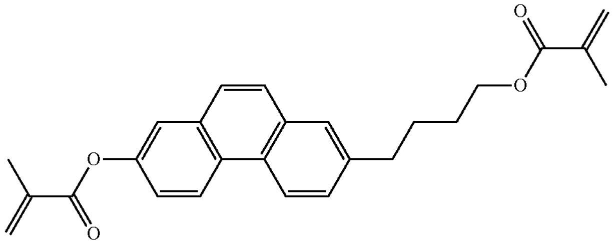 [SMILES: C=C(C)C(=O)OCCCCc1ccc2c(ccc3cc(OC(=O)C(=C)C)ccc32)c1]
RM-56
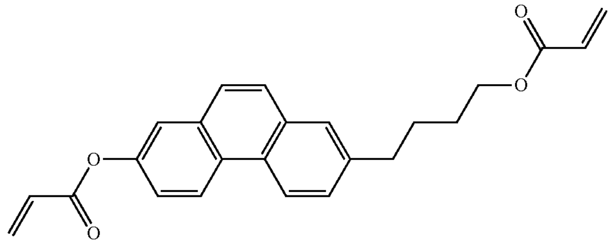 [SMILES: C=CC(=O)OCCCCc1ccc2c(ccc3cc(OC(=O)C=C)ccc32)c1]
RM-57
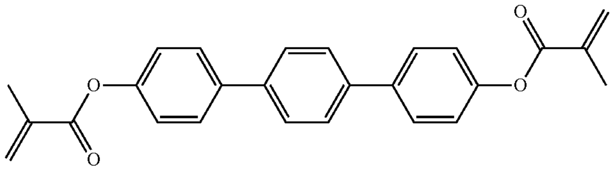 [SMILES: C=C(C)C(=O)Oc1ccc(-c2ccc(-c3ccc(OC(=O)C(=C)C)cc3)cc2)cc1]
RM-58
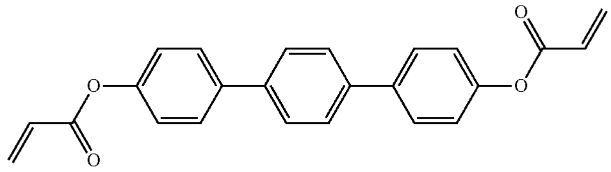 [SMILES: C=CC(=O)Oc1ccc(-c2ccc(-c3ccc(OC(=O)C=C)cc3)cc2)cc1]
RM-59
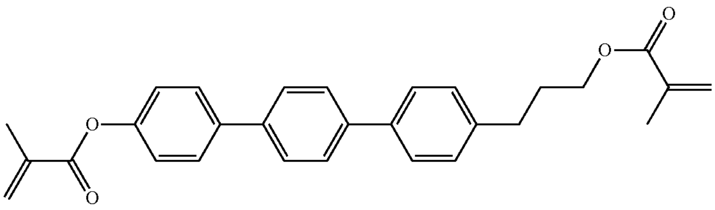 [SMILES: C=C(C)C(=O)OCCCc1ccc(-c2ccc(-c3ccc(OC(=O)C(=C)C)cc3)cc2)cc1]
RM-60
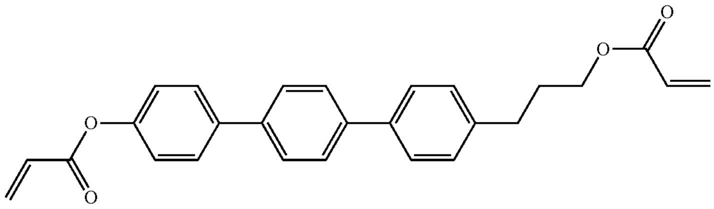 [SMILES: C=CC(=O)OCCCc1ccc(-c2ccc(-c3ccc(OC(=O)C=C)cc3)cc2)cc1]
RM-61

TABLE H-continued
| Table H shows illustrative reactive mesogenic compounds (RMs) which can be used in the LC media in accordance with the present invention. |
|---|
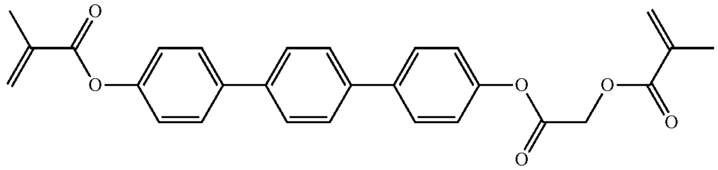 [SMILES: C=C(C)C(=O)OCC(=O)Oc1ccc(-c2ccc(-c3ccc(OC(=O)C(=C)C)cc3)cc2)cc1]
RM-62
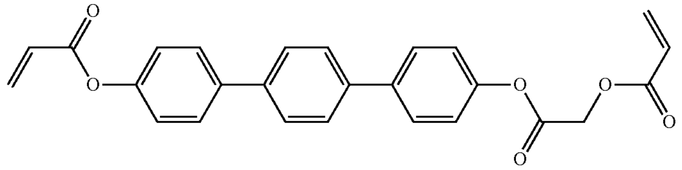 [SMILES: C=CC(=O)OCC(=O)Oc1ccc(-c2ccc(-c3ccc(OC(=O)C=C)cc3)cc2)cc1]
RM-63
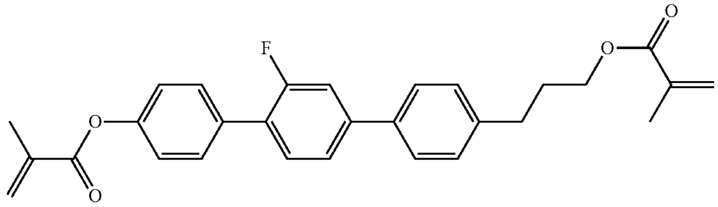 [SMILES: C=C(C)C(=O)OCCCc1ccc(-c2ccc(-c3ccc(OC(=O)C(=C)C)cc3)c(F)c2)cc1]
RM-64
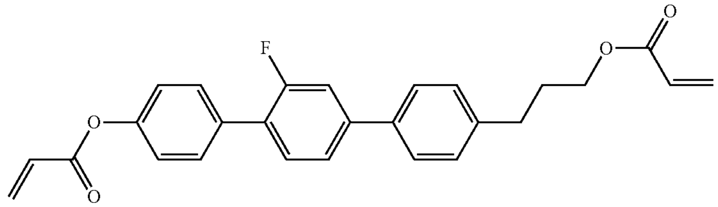 [SMILES: C=CC(=O)OCCCc1ccc(-c2ccc(-c3ccc(OC(=O)C=C)cc3)c(F)c2)cc1]
RM-65
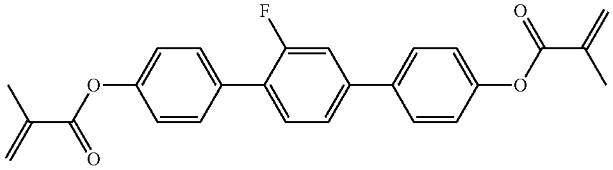 [SMILES: C=C(C)C(=O)Oc1ccc(-c2ccc(-c3ccc(OC(=O)C(=C)C)cc3)c(F)c2)cc1]
RM-66
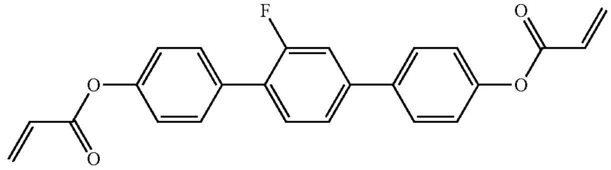 [SMILES: C=CC(=O)Oc1ccc(-c2ccc(-c3ccc(OC(=O)C=C)cc3)c(F)c2)cc1]
RM-67
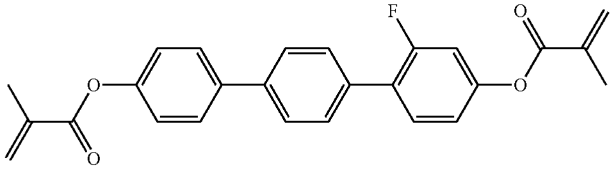 [SMILES: C=C(C)C(=O)Oc1ccc(-c2ccc(-c3ccc(OC(=O)C(=C)C)cc3F)cc2)cc1]

TABLE H-continued
| Table H shows illustrative reactive mesogenic compounds (RMs) which can be used in the LC media in accordance with the present invention. |
| --- |
RM-68
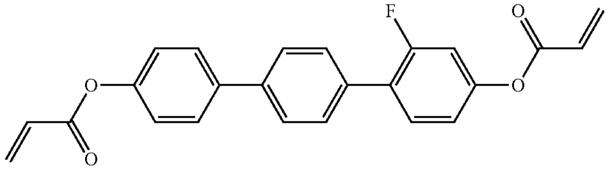 [SMILES: C=CC(=O)Oc1ccc(-c2ccc(-c3ccc(OC(=O)C=C)cc3F)cc2)cc1]
RM-69
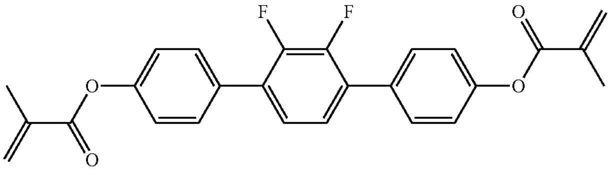 [SMILES: C=C(C)C(=O)Oc1ccc(-c2ccc(-c3ccc(OC(=O)C(=C)C)cc3)c(F)c2F)cc1]
RM-70
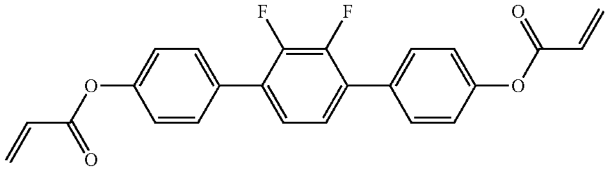 [SMILES: C=CC(=O)Oc1ccc(-c2ccc(-c3ccc(OC(=O)C=C)cc3)c(F)c2F)cc1]
RM-71
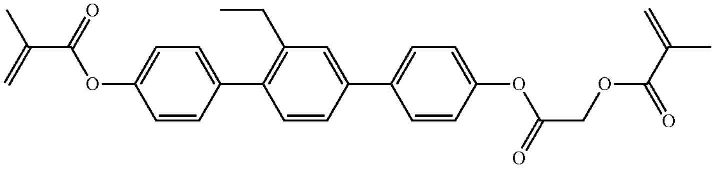 [SMILES: C=C(C)C(=O)OCC(=O)Oc1ccc(-c2ccc(-c3ccc(OC(=O)C(=C)C)cc3)c(CC)c2)cc1]
RM-72
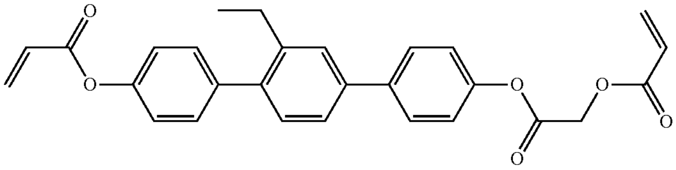 [SMILES: C=CC(=O)OCC(=O)Oc1ccc(-c2ccc(-c3ccc(OC(=O)C=C)cc3)c(CC)c2)cc1]
RM-73
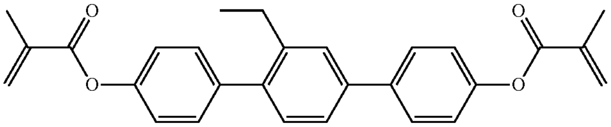 [SMILES: C=C(C)C(=O)Oc1ccc(-c2ccc(-c3ccc(OC(=O)C(=C)C)cc3)c(CC)c2)cc1]
RM-74
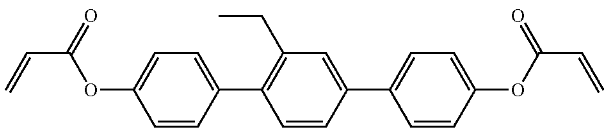 [SMILES: C=CC(=O)Oc1ccc(-c2ccc(-c3ccc(OC(=O)C=C)cc3)c(CC)c2)cc1]
RM-75

TABLE H-continued
Table H shows illustrative reactive mesogenic compounds (RMs) which can be used in the LC media in accordance with the present invention.
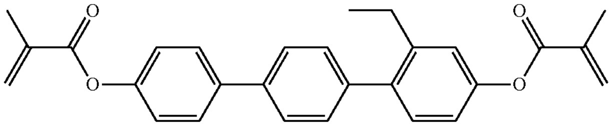 [SMILES: C=C(C)C(=O)Oc1ccc(-c2ccc(-c3ccc(OC(=O)C(=C)C)cc3CC)cc2)cc1]
RM-76
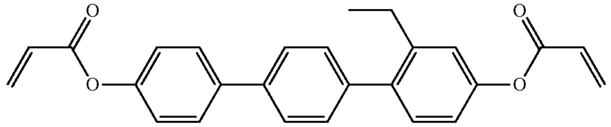 [SMILES: C=CC(=O)Oc1ccc(-c2ccc(-c3ccc(OC(=O)C=C)cc3CC)cc2)cc1]
RM-77
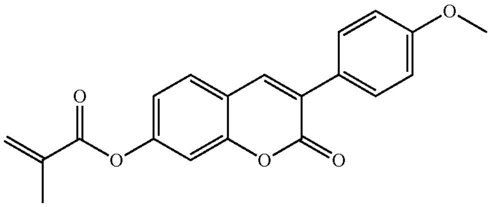 [SMILES: C=C(C)C(=O)Oc1ccc2cc(-c3ccc(OC)cc3)c(=O)oc2c1]
RM-78
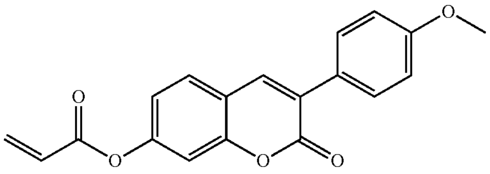 [SMILES: C=CC(=O)Oc1ccc2cc(-c3ccc(OC)cc3)c(=O)oc2c1]
RM-79
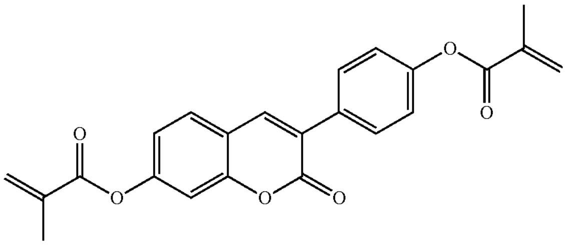 [SMILES: C=C(C)C(=O)Oc1ccc(-c2cc3ccc(OC(=O)C(=C)C)cc3oc2=O)cc1]
RM-80
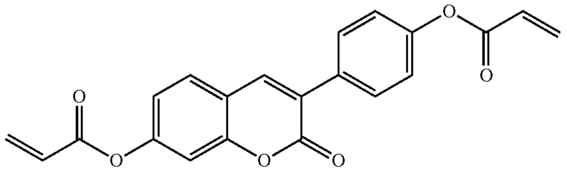 [SMILES: C=CC(=O)Oc1ccc(-c2cc3ccc(OC(=O)C=C)cc3oc2=O)cc1]
RM-81
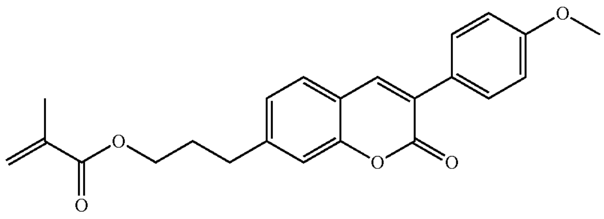 [SMILES: C=C(C)C(=O)OCCCc1ccc2cc(-c3ccc(OC)cc3)c(=O)oc2c1]

TABLE H-continued
| Table H shows illustrative reactive mesogenic compounds (RMs) which can be used in the LC media in accordance with the present invention. |
|---|
RM-82
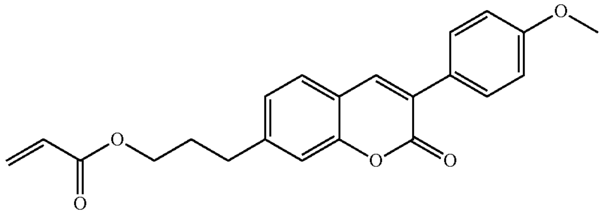 [SMILES: C=CC(=O)OCCCc1ccc2cc(-c3ccc(OC)cc3)c(=O)oc2c1]
RM-83
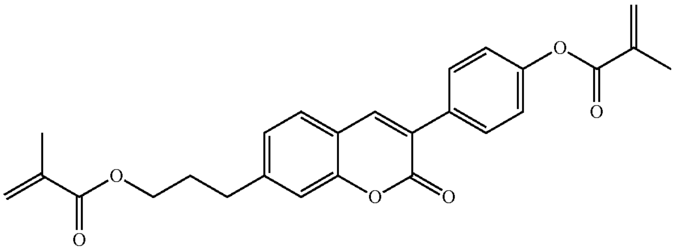 [SMILES: C=C(C)C(=O)OCCCc1ccc2cc(-c3ccc(OC(=O)C(=C)C)cc3)c(=O)oc2c1]
RM-84
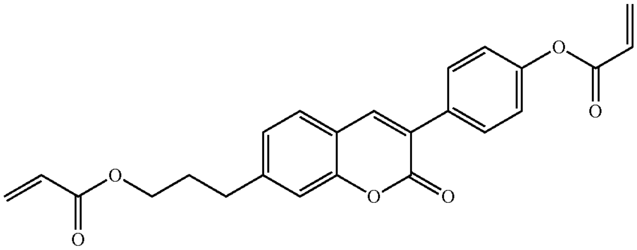 [SMILES: C=CC(=O)OCCCc1ccc2cc(-c3ccc(OC(=O)C=C)cc3)c(=O)oc2c1]
RM-85
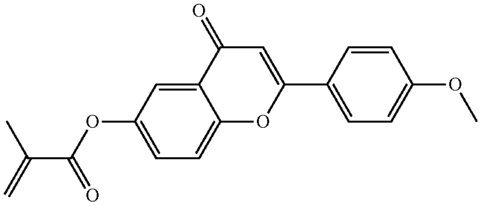 [SMILES: C=C(C)C(=O)Oc1ccc2oc(-c3ccc(OC)cc3)cc(=O)c2c1]
RM-86
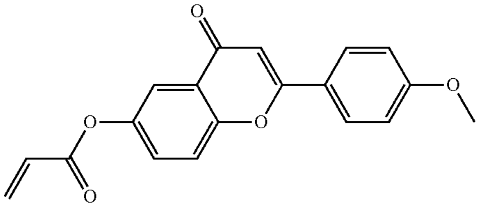 [SMILES: C=CC(=O)Oc1ccc2oc(-c3ccc(OC)cc3)cc(=O)c2c1]
RM-87

TABLE H-continued
| Table H shows illustrative reactive mesogenic compounds (RMs) which can be used in the LC media in accordance with the present invention. |
| --- |
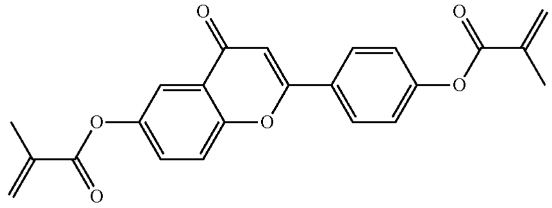 [SMILES: C=C(C)C(=O)Oc1ccc(-c2cc(=O)c3cc(OC(=O)C(=C)C)ccc3o2)cc1]
RM-88
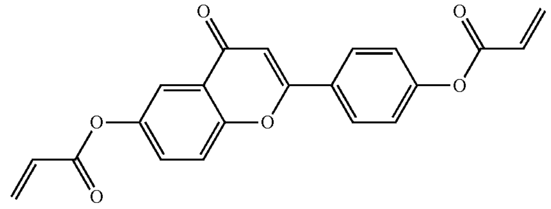 [SMILES: C=CC(=O)Oc1ccc(-c2cc(=O)c3cc(OC(=O)C=C)ccc3o2)cc1]
RM-89
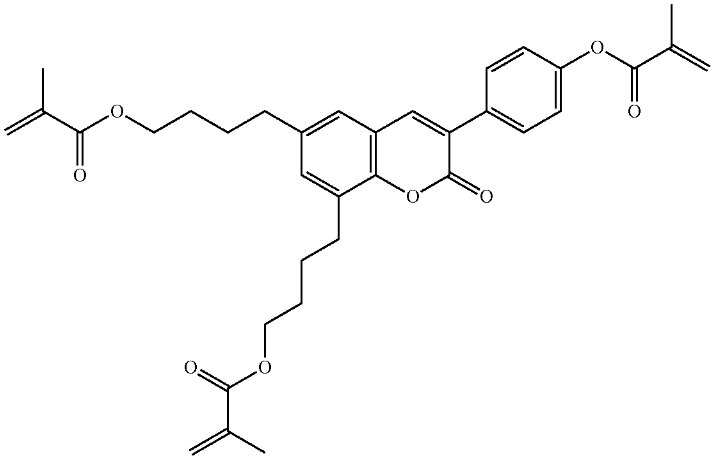 [SMILES: C=C(C)C(=O)OCCCCc1cc(CCCCOC(=O)C(=C)C)c2oc(=O)c(-c3ccc(OC(=O)C(=C)C)cc3)cc2c1]
RM-90
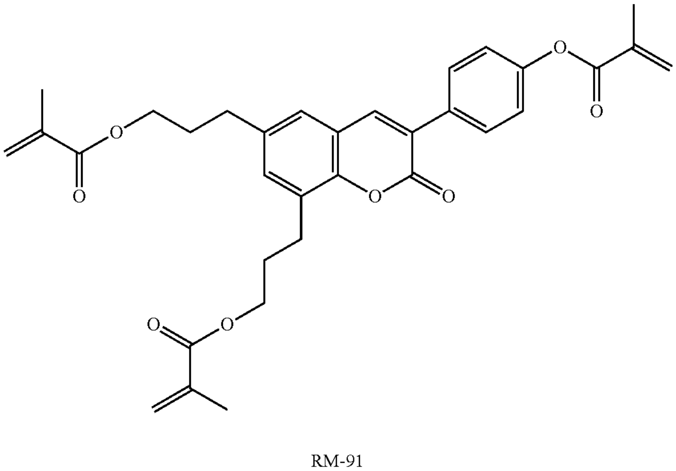
RM-91

TABLE H-continued
| Table H shows illustrative reactive mesogenic compounds (RMs) which can be used in the LC media in accordance with the present invention. |
|---|
| 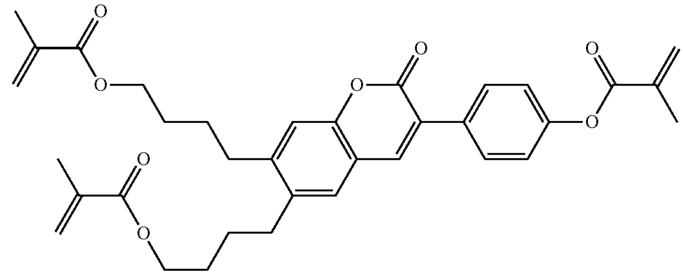 [SMILES: C=C(C)C(=O)OCCCCc1cc2cc(-c3ccc(OC(=O)C(=C)C)cc3)c(=O)oc2cc1CCCCOC(=O)C(=C)C] |
| RM-92 |
| 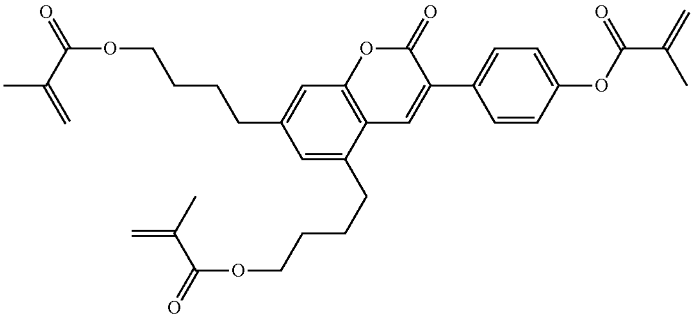 [SMILES: C=C(C)C(=O)OCCCCc1cc(CCCCOC(=O)C(=C)C)c2cc(-c3ccc(OC(=O)C(=C)C)cc3)c(=O)oc2c1] |
| RM-93 |
| 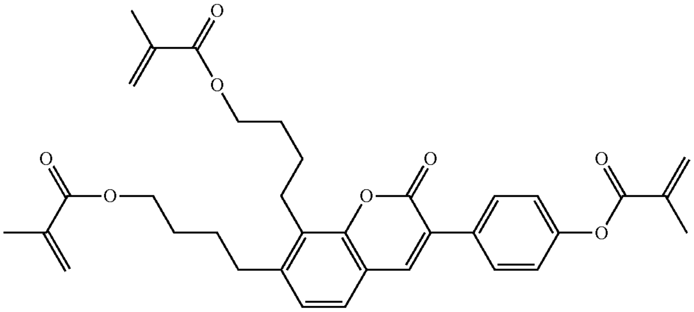 [SMILES: C=C(C)C(=O)OCCCCc1ccc2cc(-c3ccc(OC(=O)C(=C)C)cc3)c(=O)oc2c1CCCCOC(=O)C(=C)C] |
| RM-94 |
| 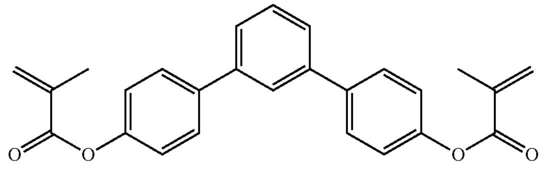 [SMILES: C=C(C)C(=O)Oc1ccc(-c2cccc(-c3ccc(OC(=O)C(=C)C)cc3)c2)cc1] |
| RM-95 |
| 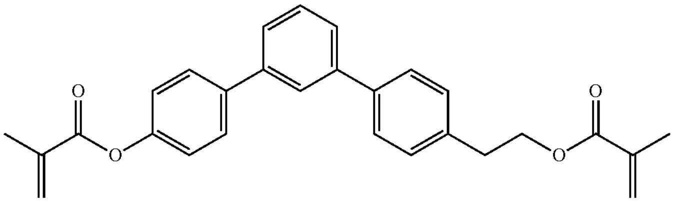 [SMILES: C=C(C)C(=O)OCCc1ccc(-c2cccc(-c3ccc(OC(=O)C(=C)C)cc3)c2)cc1] |
| RM-96 |

TABLE H-continued
| Table H shows illustrative reactive mesogenic compounds (RMs) which can be used in the LC media in accordance with the present invention. |
| --- |
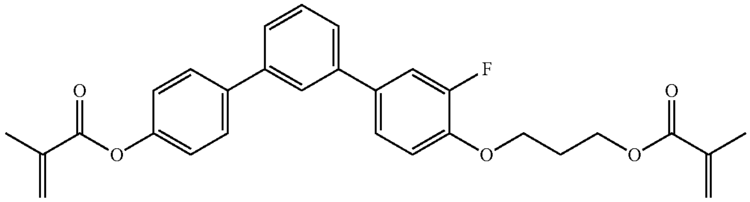 [SMILES: C=C(C)C(=O)OCCCOc1ccc(-c2cccc(-c3ccc(OC(=O)C(=C)C)cc3)c2)cc1F]
RM-97
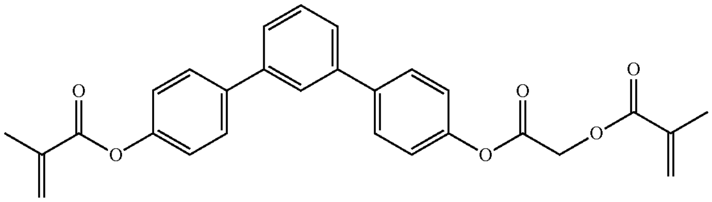 [SMILES: C=C(C)C(=O)OCC(=O)Oc1ccc(-c2cccc(-c3ccc(OC(=O)C(=C)C)cc3)c2)cc1]
RM-98
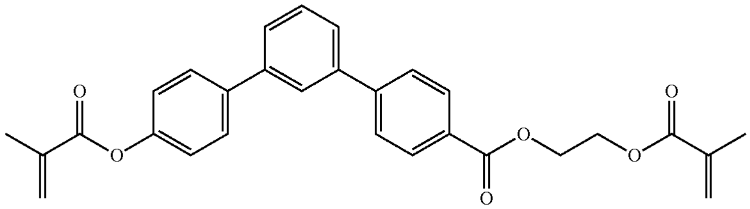 [SMILES: C=C(C)C(=O)OCCOC(=O)c1ccc(-c2cccc(-c3ccc(OC(=O)C(=C)C)cc3)c2)cc1]
RM-99
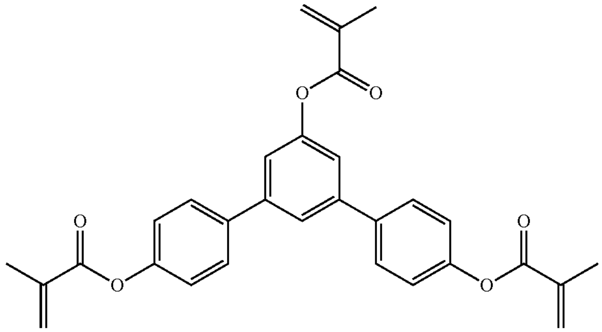 [SMILES: C=C(C)C(=O)Oc1ccc(-c2cc(OC(=O)C(=C)C)cc(-c3ccc(OC(=O)C(=C)C)cc3)c2)cc1]
RM-100
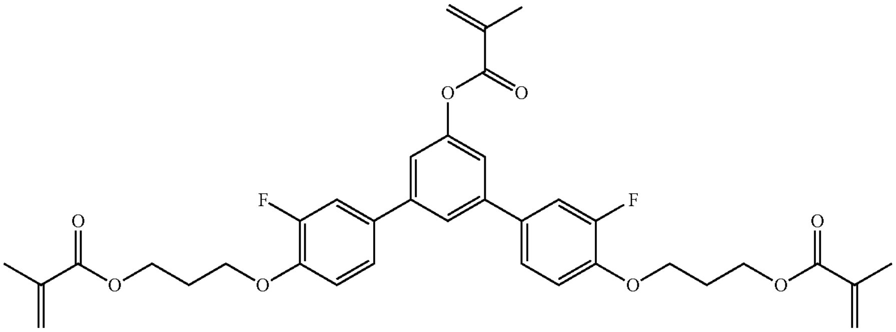 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-101

TABLE H-continued
| Table H shows illustrative reactive mesogenic compounds (RMs) which can be used in the LC media in accordance with the present invention. |
|---|
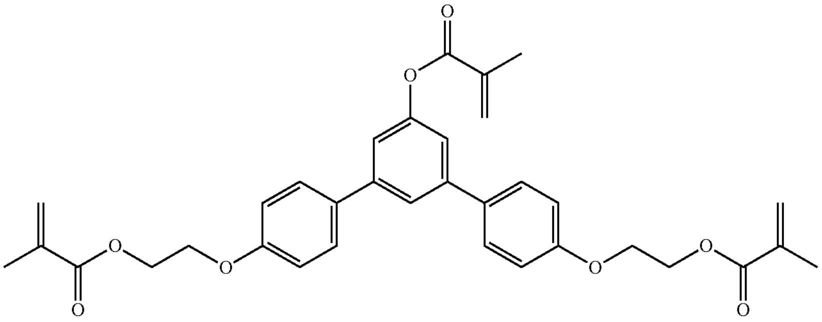 [SMILES: C=C(C)C(=O)OCCOc1ccc(-c2cc(OC(=O)C(=C)C)cc(-c3ccc(OCCOC(=O)C(=C)C)cc3)c2)cc1]
RM-102
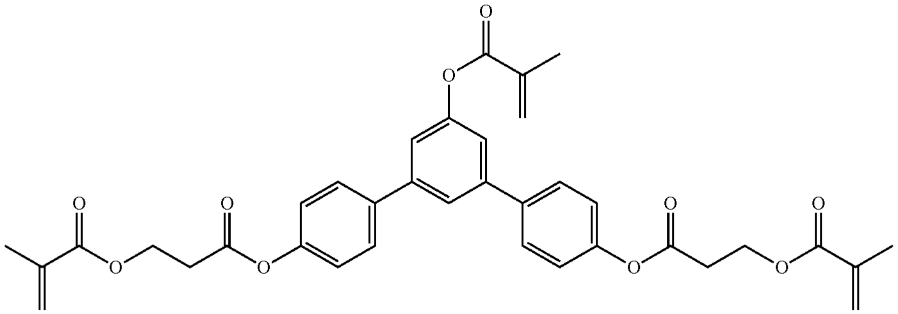 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-103
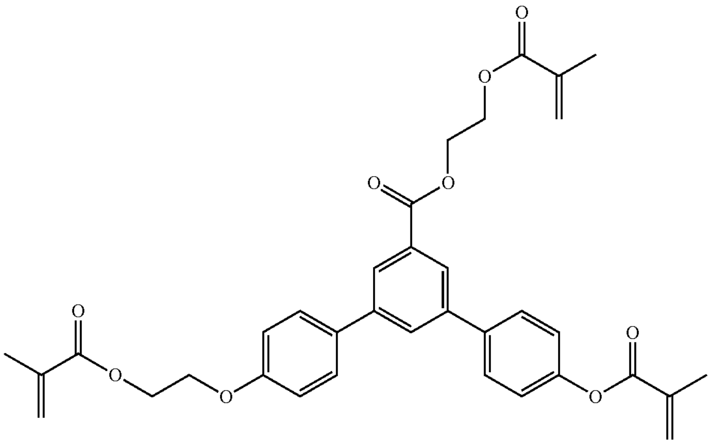 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-104

TABLE H-continued
Table H shows illustrative reactive mesogenic compounds (RMs) which can be used in the LC media in accordance with the present invention.
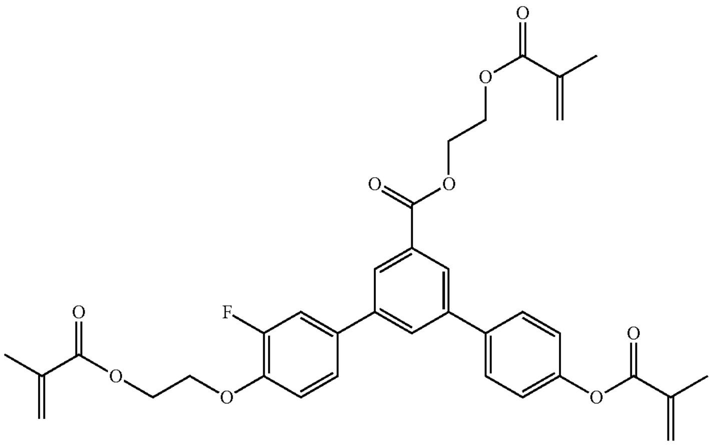 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-105
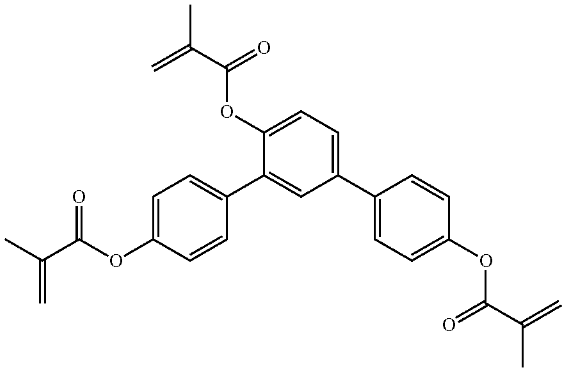 [SMILES: C=C(C)C(=O)Oc1ccc(-c2ccc(OC(=O)C(=C)C)c(-c3ccc(OC(=O)C(=C)C)cc3)c2)cc1]
RM-106
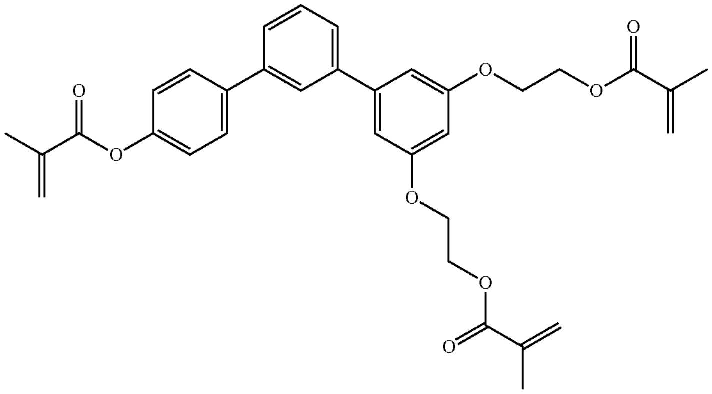 [SMILES: C=C(C)C(=O)OCCOc1cc(OCCOC(=O)C(=C)C)cc(-c2cccc(-c3ccc(OC(=O)C(=C)C)cc3)c2)c1]
RM-107

TABLE H-continued
Table H shows illustrative reactive mesogenic compounds (RMs) which can be used in the LC media in accordance with the present invention.
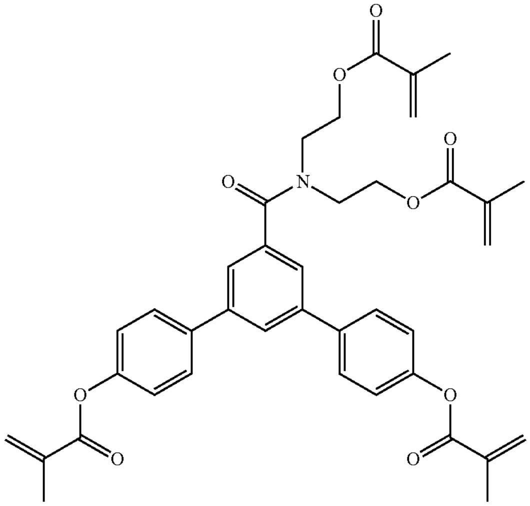 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-108
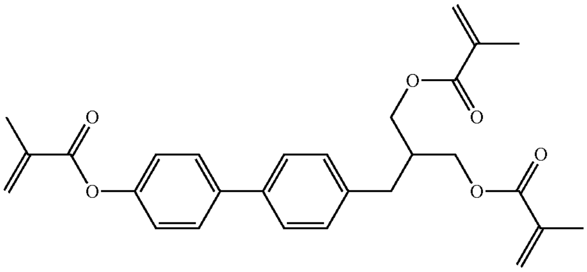
RM-109
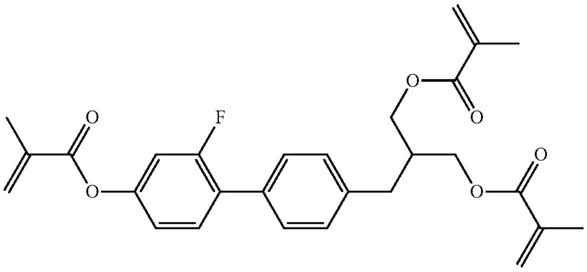 [SMILES: C=C(C)C(=O)OCC(COC(=O)C(=C)C)Cc1ccc(-c2ccc(OC(=O)C(=C)C)cc2F)cc1]
RM-110
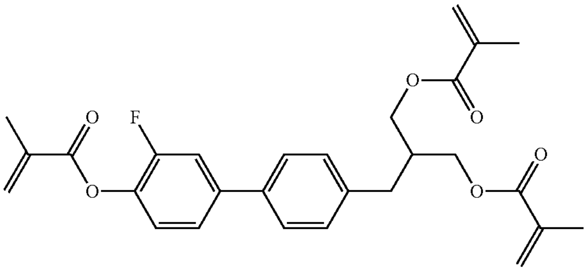 [SMILES: C=C(C)C(=O)OCC(COC(=O)C(=C)C)Cc1ccc(-c2ccc(OC(=O)C(=C)C)c(F)c2)cc1]
RM-111

TABLE H-continued
Table H shows illustrative reactive mesogenic compounds (RMs) which can be used in the LC media in accordance with the present invention.
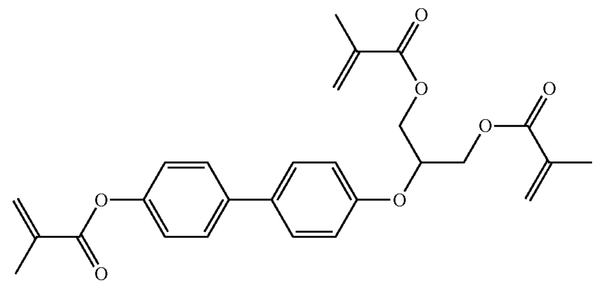 [SMILES: C=C(C)C(=O)OCC(COC(=O)C(=C)C)Oc1ccc(-c2ccc(OC(=O)C(=C)C)cc2)cc1]
RM-112
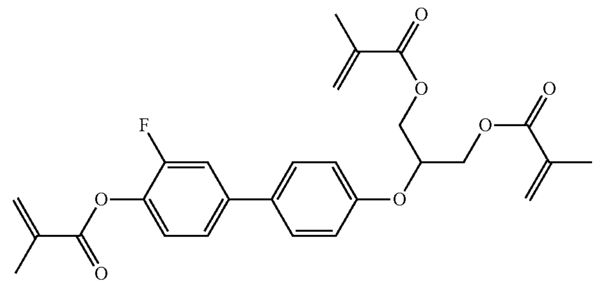 [SMILES: C=C(C)C(=O)OCC(COC(=O)C(=C)C)Oc1ccc(-c2ccc(OC(=O)C(=C)C)c(F)c2)cc1]
RM-113
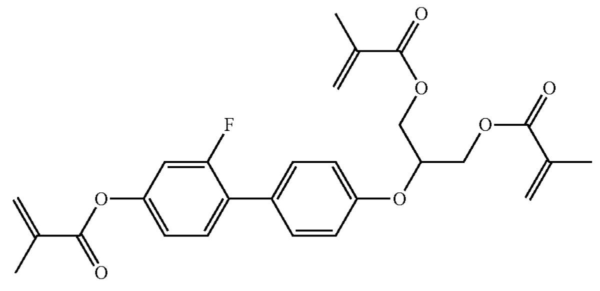 [SMILES: C=C(C)C(=O)OCC(COC(=O)C(=C)C)Oc1ccc(-c2ccc(OC(=O)C(=C)C)cc2F)cc1]
RM-114
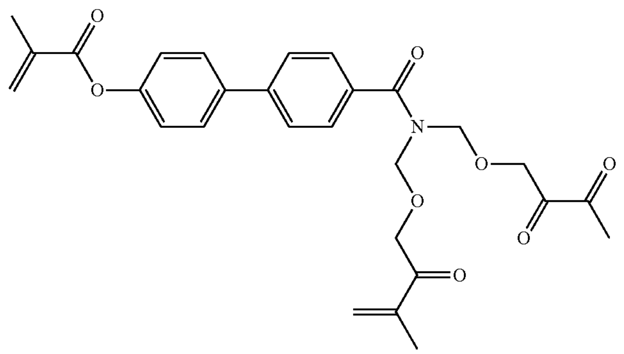 [SMILES: C=C(C)C(=O)COCN(COCC(=O)C(C)=O)C(=O)c1ccc(-c2ccc(OC(=O)C(=C)C)cc2)cc1]
RM-115

TABLE H-continued
| Table H shows illustrative reactive mesogenic compounds (RMs) which can be used in the LC media in accordance with the present invention. |
|---|
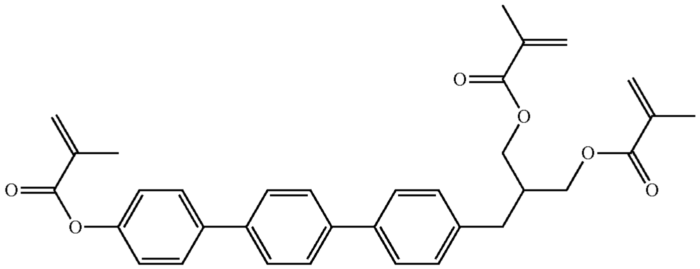 [SMILES: C=C(C)C(=O)OCC(COC(=O)C(=C)C)Cc1ccc(-c2ccc(-c3ccc(OC(=O)C(=C)C)cc3)cc2)cc1]
RM-116
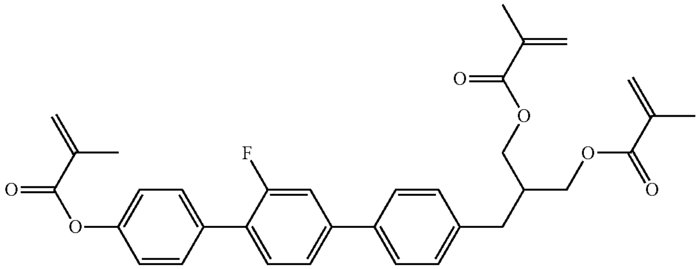 [SMILES: C=C(C)C(=O)OCC(COC(=O)C(=C)C)Cc1ccc(-c2ccc(-c3ccc(OC(=O)C(=C)C)cc3)c(F)c2)cc1]
RM-117
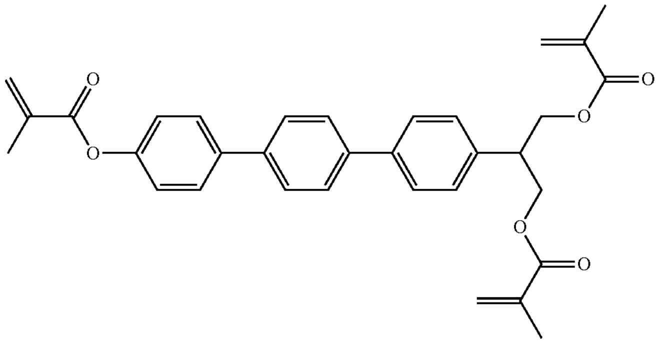 [SMILES: C=C(C)C(=O)OCC(COC(=O)C(=C)C)c1ccc(-c2ccc(-c3ccc(OC(=O)C(=C)C)cc3)cc2)cc1]
RM-118
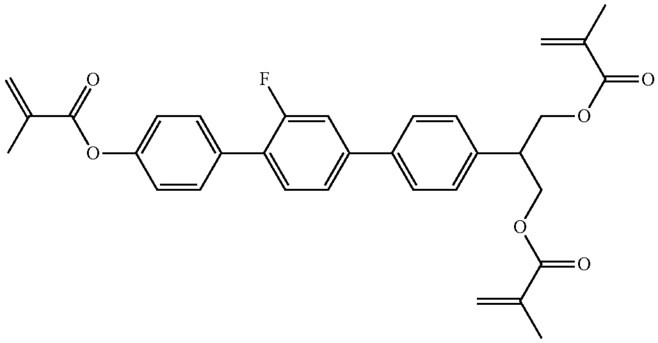 [SMILES: C=C(C)C(=O)OCC(COC(=O)C(=C)C)c1ccc(-c2ccc(-c3ccc(OC(=O)C(=C)C)cc3)c(F)c2)cc1]
RM-119

TABLE H-continued
Table H shows illustrative reactive mesogenic compounds (RMs) which can be used in the LC media in accordance with the present invention.
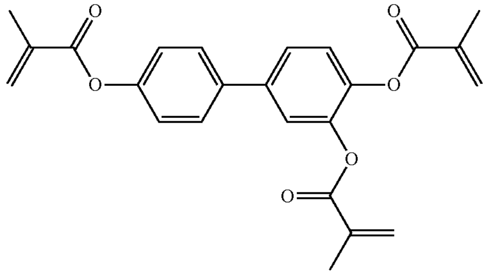 [SMILES: C=C(C)C(=O)Oc1ccc(-c2ccc(OC(=O)C(=C)C)c(OC(=O)C(=C)C)c2)cc1]
RM-120
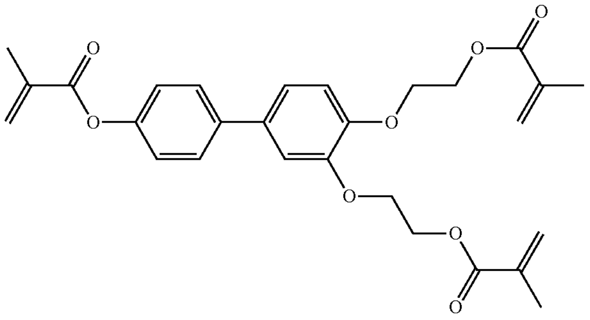 [SMILES: C=C(C)C(=O)OCCOc1ccc(-c2ccc(OC(=O)C(=C)C)cc2)cc1OCCOC(=O)C(=C)C]
RM-121
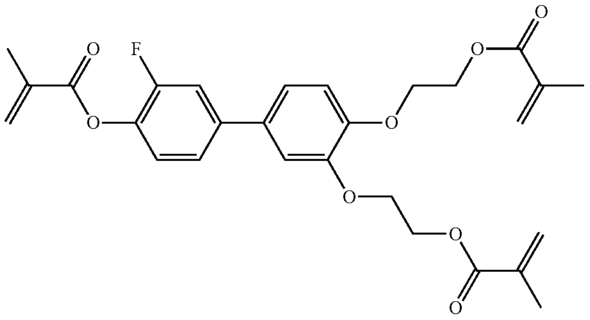 [SMILES: C=C(C)C(=O)OCCOc1ccc(-c2ccc(OC(=O)C(=C)C)c(F)c2)cc1OCCOC(=O)C(=C)C]
RM-122
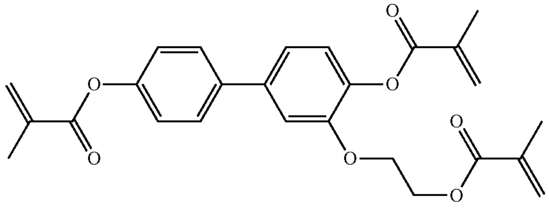 [SMILES: C=C(C)C(=O)OCCOc1cc(-c2ccc(OC(=O)C(=C)C)cc2)ccc1OC(=O)C(=C)C]
RM-123
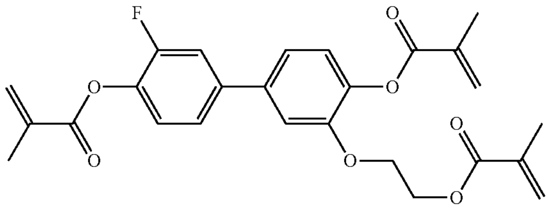
RM-124

TABLE H-continued
| Table H shows illustrative reactive mesogenic compounds (RMs) which can be used in the LC media in accordance with the present invention. |
| --- |
| 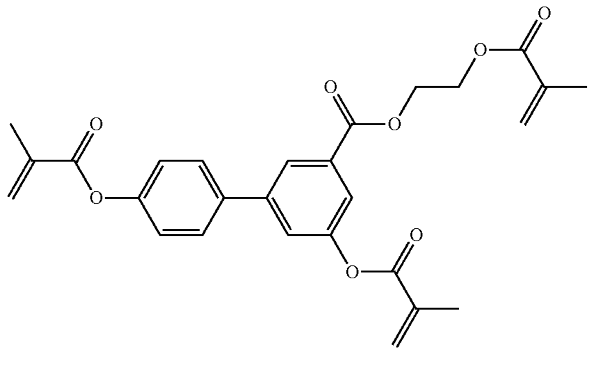 [SMILES: C=C(C)C(=O)OCCOC(=O)c1cc(OC(=O)C(=C)C)cc(-c2ccc(OC(=O)C(=C)C)cc2)c1] |
| RM-125 |
| 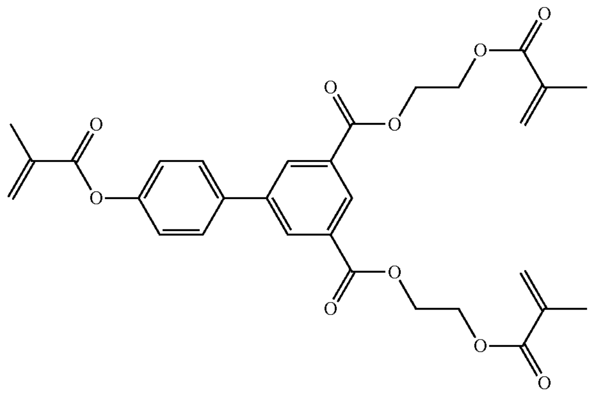 [SMILES: C=C(C)C(=O)OCCOC(=O)c1cc(C(=O)OCCOC(=O)C(=C)C)cc(-c2ccc(OC(=O)C(=C)C)cc2)c1] |
| RM-126 |
| 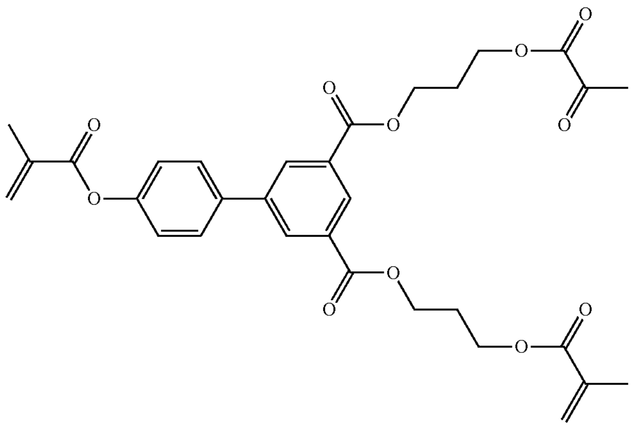 [SMILES: C=C(C)C(=O)OCCCOC(=O)c1cc(C(=O)OCCCOC(=O)C(C)=O)cc(-c2ccc(OC(=O)C(=C)C)cc2)c1] |
| RM-127 |

TABLE H-continued
Table H shows illustrative reactive mesogenic compounds (RMs) which can be used in the LC media in accordance with the present invention.
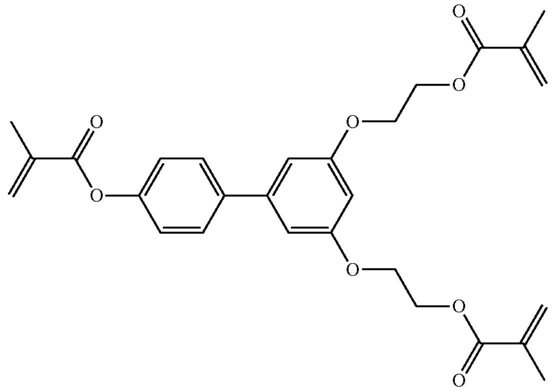 [SMILES: C=C(C)C(=O)OCCOc1cc(OCCOC(=O)C(=C)C)cc(-c2ccc(OC(=O)C(=C)C)cc2)c1]
RM-128
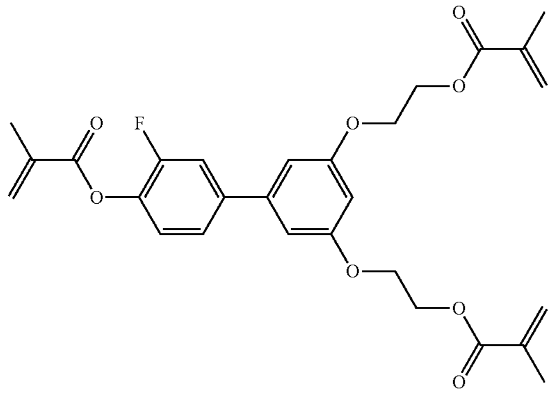 [SMILES: C=C(C)C(=O)OCCOc1cc(OCCOC(=O)C(=C)C)cc(-c2ccc(OC(=O)C(=C)C)c(F)c2)c1]
RM-129
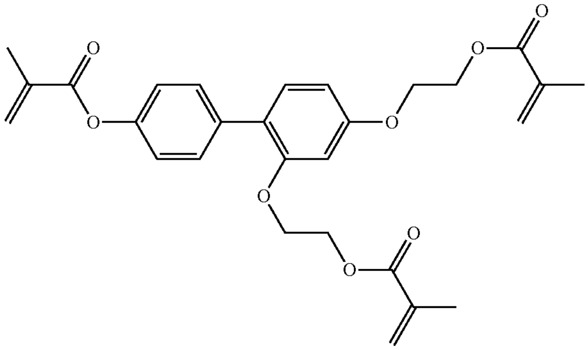 [SMILES: C=C(C)C(=O)OCCOc1ccc(-c2ccc(OC(=O)C(=C)C)cc2)c(OCCOC(=O)C(=C)C)c1]
RM-130

TABLE H-continued
| Table H shows illustrative reactive mesogenic compounds (RMs) which can be used in the LC media in accordance with the present invention. |
|---|
| 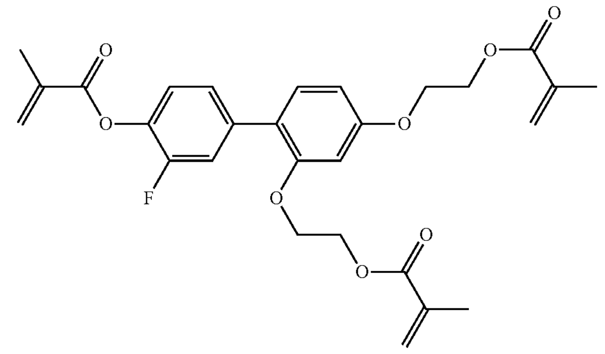 [SMILES: C=C(C)C(=O)OCCOc1ccc(-c2ccc(OC(=O)C(=C)C)c(F)c2)c(OCCOC(=O)C(=C)C)c1] |
| RM-131 |
| 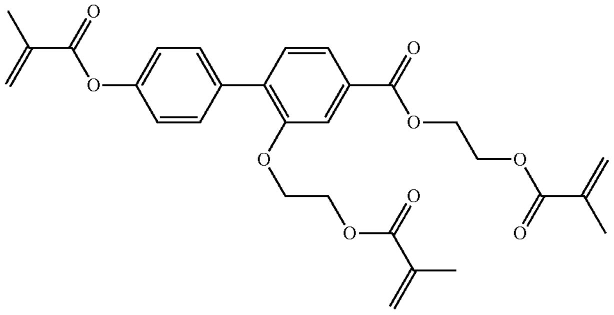 [SMILES: C=C(C)C(=O)OCCOC(=O)c1ccc(-c2ccc(OC(=O)C(=C)C)cc2)c(OCCOC(=O)C(=C)C)c1] |
| RM-132 |
| 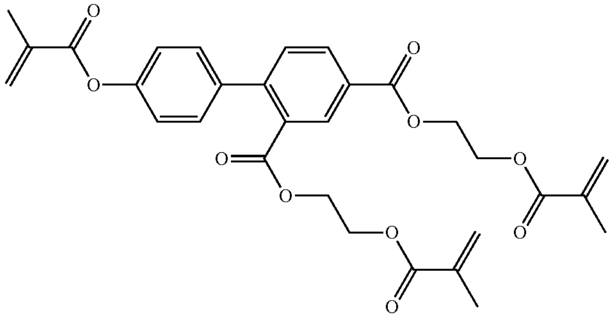 [SMILES: C=C(C)C(=O)OCCOC(=O)c1ccc(-c2ccc(OC(=O)C(=C)C)cc2)c(C(=O)OCCOC(=O)C(=C)C)c1] |
| RM-133 |
| 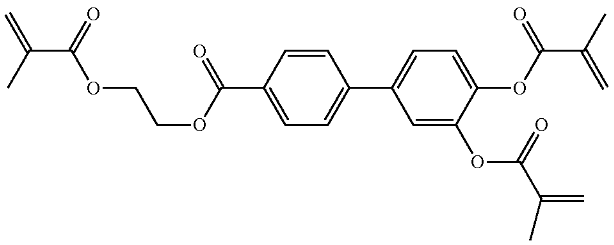 [SMILES: C=C(C)C(=O)OCCOC(=O)c1ccc(-c2ccc(OC(=O)C(=C)C)c(OC(=O)C(=C)C)c2)cc1] |
| RM-134 |

TABLE H-continued
| Table H shows illustrative reactive mesogenic compounds (RMs) which can be used in the LC media in accordance with the present invention. |
| --- |
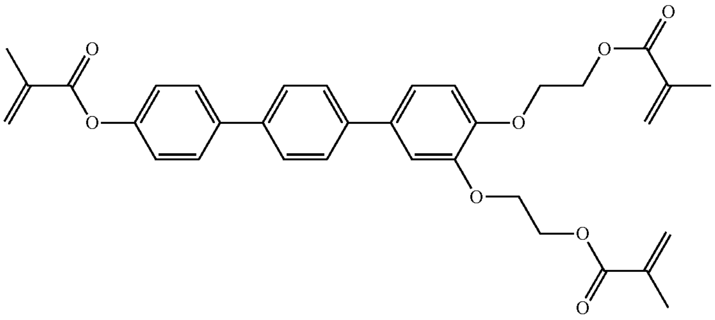 [SMILES: C=C(C)C(=O)OCCOc1ccc(-c2ccc(-c3ccc(OC(=O)C(=C)C)cc3)cc2)cc1OCCOC(=O)C(=C)C]
RM-135
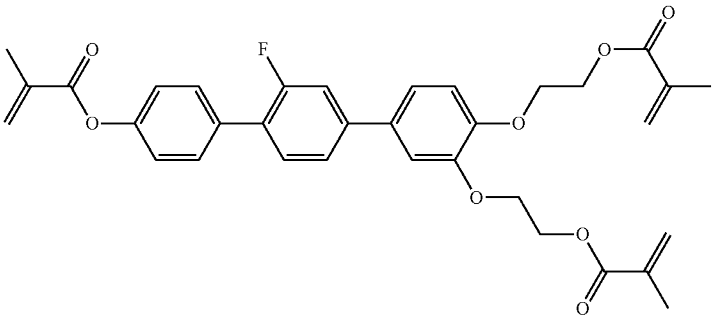 [SMILES: C=C(C)C(=O)OCCOc1ccc(-c2ccc(-c3ccc(OC(=O)C(=C)C)cc3)c(F)c2)cc1OCCOC(=O)C(=C)C]
RM-136
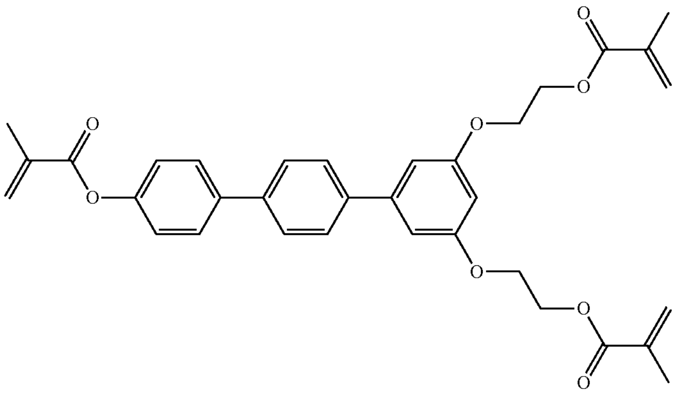 [SMILES: C=C(C)C(=O)OCCOc1cc(OCCOC(=O)C(=C)C)cc(-c2ccc(-c3ccc(OC(=O)C(=C)C)cc3)cc2)c1]
RM-137

TABLE H-continued
| Table H shows illustrative reactive mesogenic compounds (RMs) which can be used in the LC media in accordance with the present invention. |
|---|
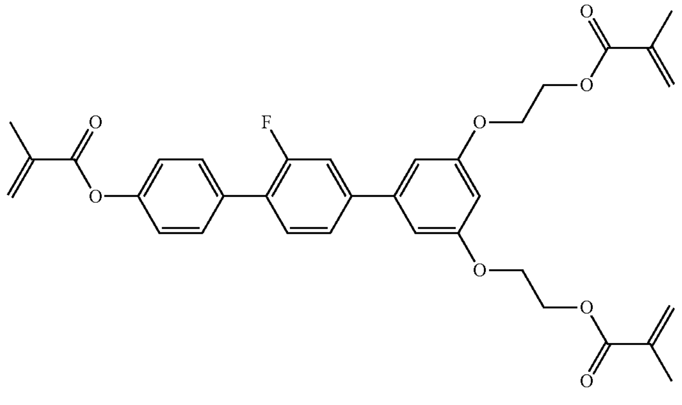 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-138
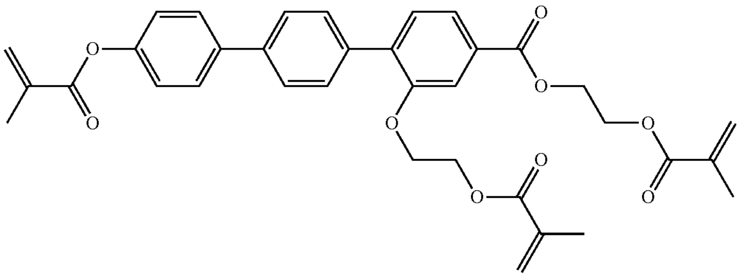 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-139
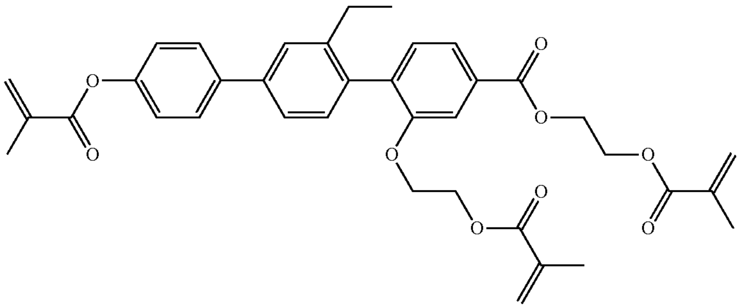 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-140
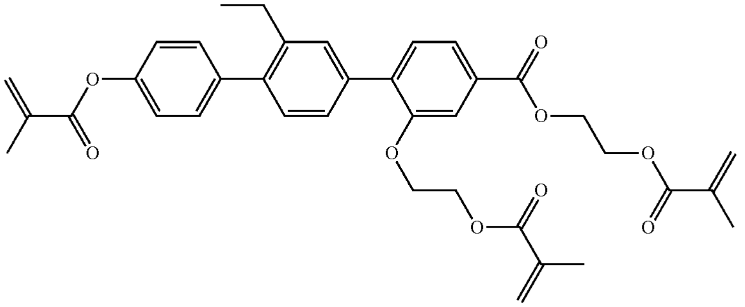 [SMILES: C=C(C)C(=O)OCCOC(=O)c1ccc(-c2ccc(-c3ccc(OC(=O)C(=C)C)cc3)c(CC)c2)c(OCCOC(=O)C(=C)C)c1]
RM-141

TABLE H-continued
| Table H shows illustrative reactive mesogenic compounds (RMs) which can be used in the LC media in accordance with the present invention. |
| --- |
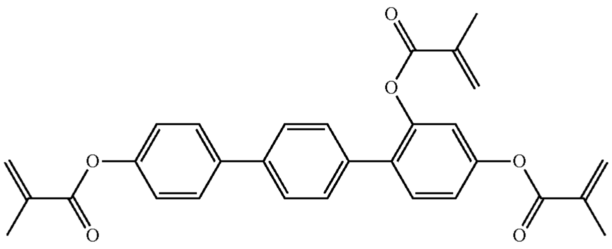 [SMILES: C=C(C)C(=O)Oc1ccc(-c2ccc(-c3ccc(OC(=O)C(=C)C)cc3OC(=O)C(=C)C)cc2)cc1]
RM-142
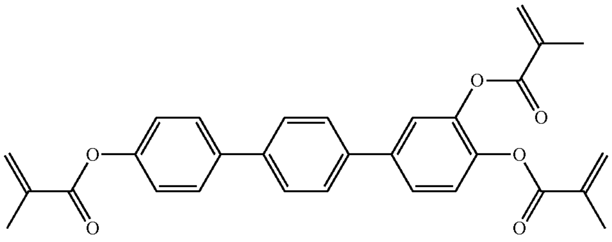 [SMILES: C=C(C)C(=O)Oc1ccc(-c2ccc(-c3ccc(OC(=O)C(=C)C)c(OC(=O)C(=C)C)c3)cc2)cc1]
RM-143
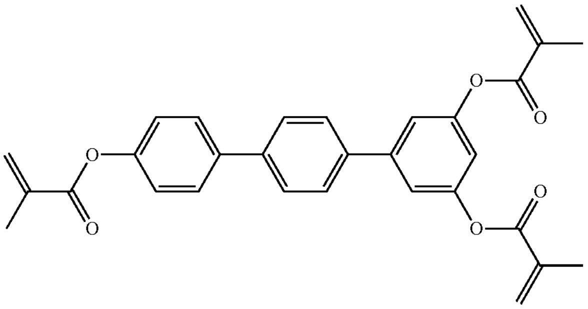 [SMILES: C=C(C)C(=O)Oc1ccc(-c2ccc(-c3cc(OC(=O)C(=C)C)cc(OC(=O)C(=C)C)c3)cc2)cc1]
RM-144
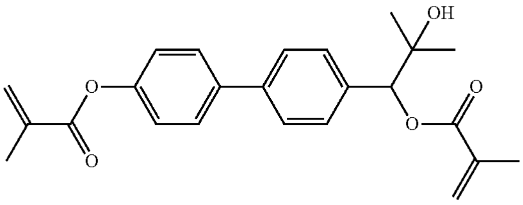 [SMILES: C=C(C)C(=O)Oc1ccc(-c2ccc(C(OC(=O)C(=C)C)C(C)(C)O)cc2)cc1]
RM-145
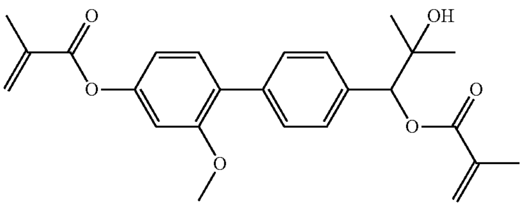 [SMILES: C=C(C)C(=O)Oc1ccc(-c2ccc(C(OC(=O)C(=C)C)C(C)(C)O)cc2)c(OC)c1]
RM-146

TABLE H-continued
| Table H shows illustrative reactive mesogenic compounds (RMs) which can be used in the LC media in accordance with the present invention. |
|---|
| 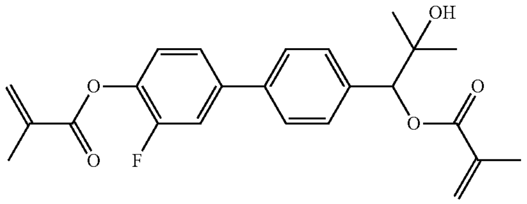 |
| RM-147 |
| 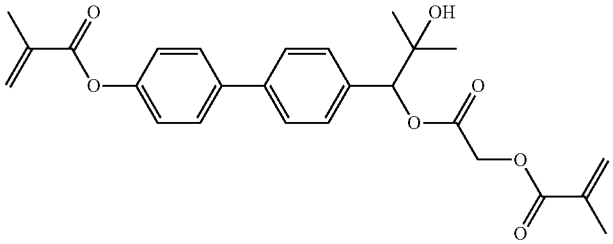 [SMILES: C=C(C)C(=O)OCC(=O)OC(c1ccc(-c2ccc(OC(=O)C(=C)C)cc2)cc1)C(C)(C)O] |
| RM-148 |
| 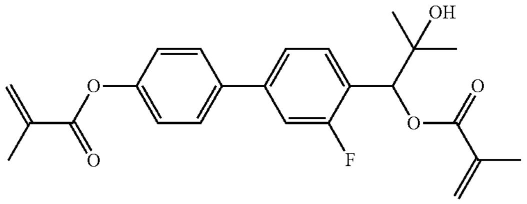 |
| RM-149 |
| 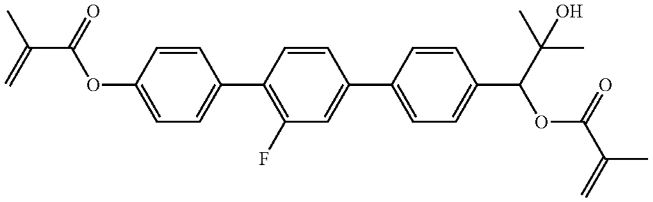 [SMILES: C=C(C)C(=O)Oc1ccc(-c2ccc(-c3ccc(C(OC(=O)C(=C)C)C(C)(C)O)cc3)cc2F)cc1] |
| RM-150 |
| 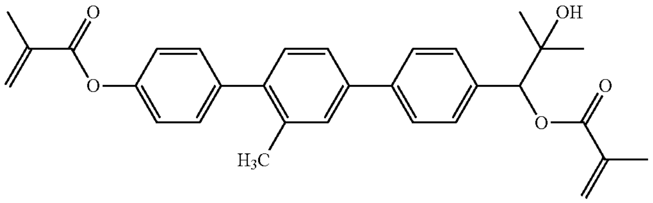 [SMILES: C=C(C)C(=O)Oc1ccc(-c2ccc(-c3ccc(C(OC(=O)C(=C)C)C(C)(C)O)cc3)cc2C)cc1] |
| RM-151 |

TABLE H-continued
Table H shows illustrative reactive mesogenic compounds (RMs) which can be used in the LC media in accordance with the present invention.
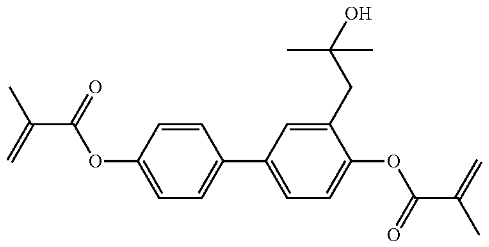 [SMILES: C=C(C)C(=O)Oc1ccc(-c2ccc(OC(=O)C(=C)C)c(CC(C)(C)O)c2)cc1]
RM-152
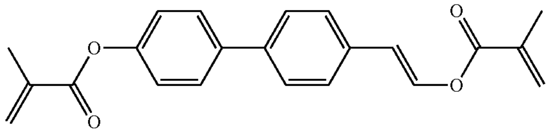 [SMILES: C=C(C)C(=O)O/C=C/c1ccc(-c2ccc(OC(=O)C(=C)C)cc2)cc1]
RM-153
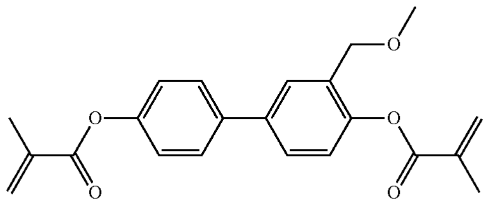 [SMILES: C=C(C)C(=O)Oc1ccc(-c2ccc(OC(=O)C(=C)C)c(COC)c2)cc1]
RM-154
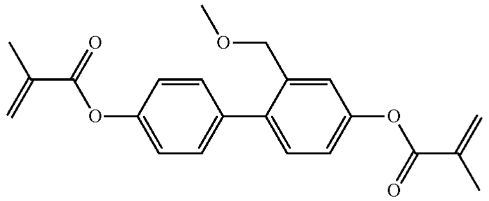 [SMILES: C=C(C)C(=O)Oc1ccc(-c2ccc(OC(=O)C(=C)C)cc2COC)cc1]
RM-155
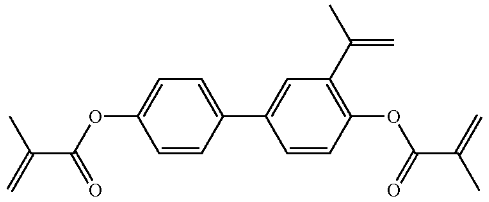 [SMILES: C=C(C)C(=O)Oc1ccc(-c2ccc(OC(=O)C(=C)C)c(C(=C)C)c2)cc1]
RM-156
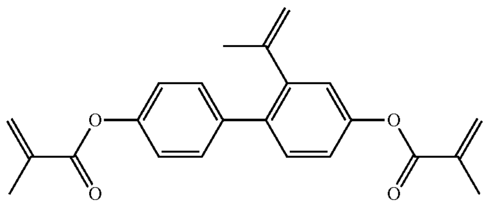 [SMILES: C=C(C)C(=O)Oc1ccc(-c2ccc(OC(=O)C(=C)C)cc2C(=C)C)cc1]
RM-157

TABLE H-continued
Table H shows illustrative reactive mesogenic compounds (RMs) which can be used in the LC media in accordance with the present invention.
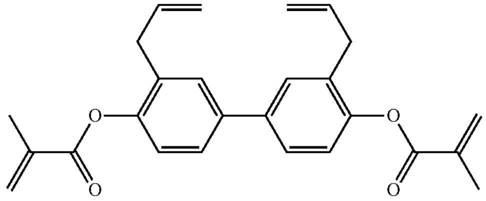 [SMILES: C=CCc1cc(-c2ccc(OC(=O)C(=C)C)c(CC=C)c2)ccc1OC(=O)C(=C)C]
RM-158
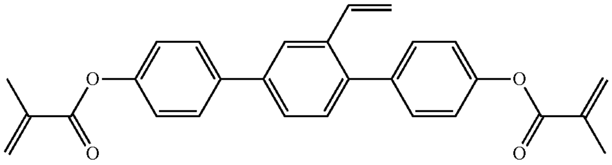 [SMILES: C=Cc1cc(-c2ccc(OC(=O)C(=C)C)cc2)ccc1-c1ccc(OC(=O)C(=C)C)cc1]
RM-159
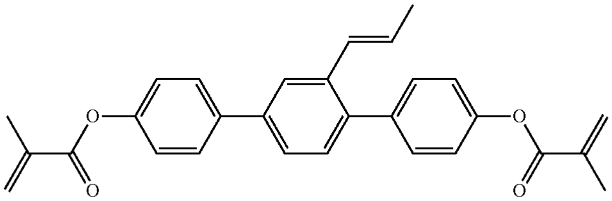 [SMILES: C=C(C)C(=O)Oc1ccc(-c2ccc(-c3ccc(OC(=O)C(=C)C)cc3)c(/C=C/C)c2)cc1]
RM-160
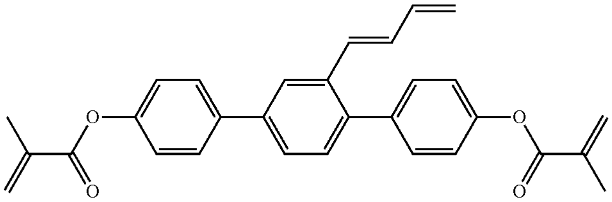 [SMILES: C=C/C=C/c1cc(-c2ccc(OC(=O)C(=C)C)cc2)ccc1-c1ccc(OC(=O)C(=C)C)cc1]
RM-161
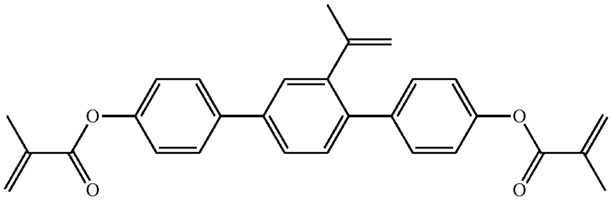 [SMILES: C=C(C)C(=O)Oc1ccc(-c2ccc(-c3ccc(OC(=O)C(=C)C)cc3)c(C(=C)C)c2)cc1]
RM-162
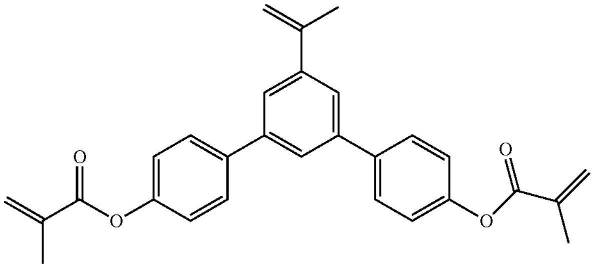 [SMILES: C=C(C)C(=O)Oc1ccc(-c2cc(C(=C)C)cc(-c3ccc(OC(=O)C(=C)C)cc3)c2)cc1]
RM-163

TABLE H-continued
Table H shows illustrative reactive mesogenic compounds (RMs) which can be used in the LC media in accordance with the present invention.
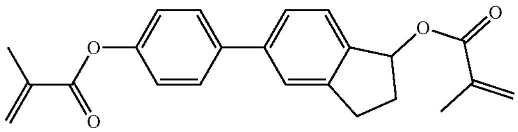 [SMILES: C=C(C)C(=O)Oc1ccc(-c2ccc3c(c2)CCC3OC(=O)C(=C)C)cc1]
RM-164
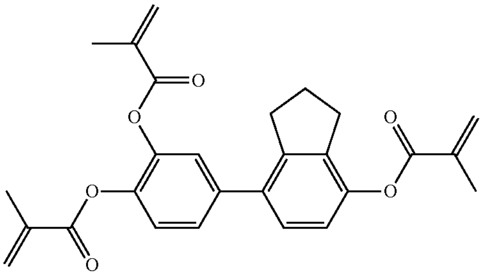 [SMILES: C=C(C)C(=O)Oc1ccc(-c2ccc(OC(=O)C(=C)C)c3c2CCC3)cc1OC(=O)C(=C)C]
RM-165
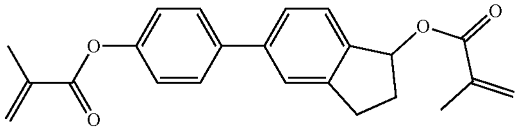 [SMILES: C=C(C)C(=O)Oc1ccc(-c2ccc3c(c2)CCC3OC(=O)C(=C)C)cc1]
RM-166
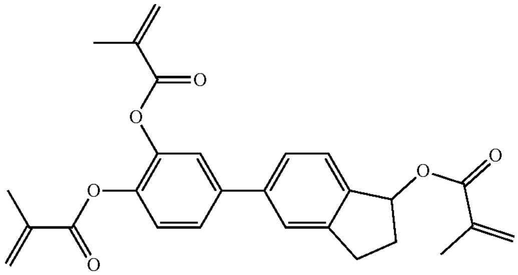 [SMILES: C=C(C)C(=O)Oc1ccc(-c2ccc3c(c2)CCC3OC(=O)C(=C)C)cc1OC(=O)C(=C)C]
RM-167
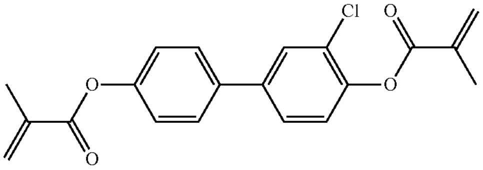 [SMILES: C=C(C)C(=O)Oc1ccc(-c2ccc(OC(=O)C(=C)C)c(Cl)c2)cc1]
RM-168
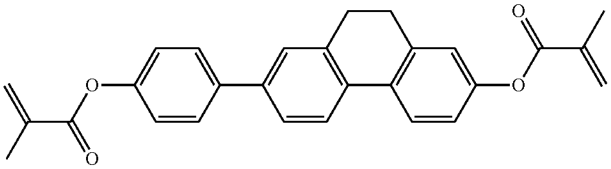 [SMILES: C=C(C)C(=O)Oc1ccc(-c2ccc3c(c2)CCc2cc(OC(=O)C(=C)C)ccc2-3)cc1]
RM-169

TABLE H-continued
| Table H shows illustrative reactive mesogenic compounds (RMs) which can be used in the LC media in accordance with the present invention. |
| --- |
| 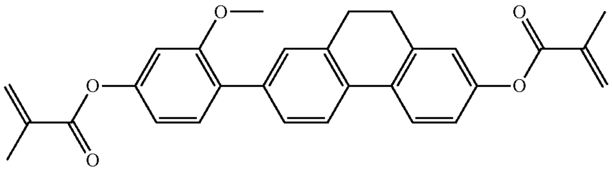 [SMILES: C=C(C)C(=O)Oc1ccc2c(c1)CCc1cc(-c3ccc(OC(=O)C(=C)C)cc3OC)ccc1-2] |
| RM-170 |
| 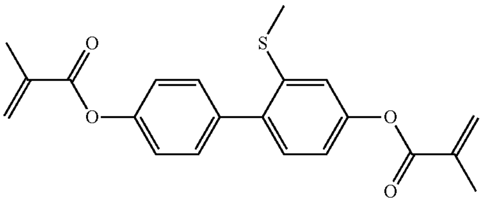 [SMILES: C=C(C)C(=O)Oc1ccc(-c2ccc(OC(=O)C(=C)C)cc2SC)cc1] |
| RM-171 |
| 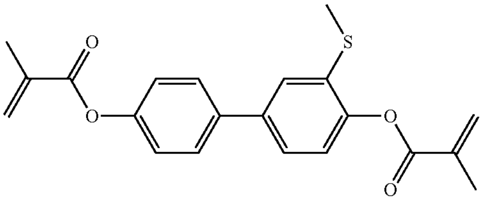 [SMILES: C=C(C)C(=O)Oc1ccc(-c2ccc(OC(=O)C(=C)C)c(SC)c2)cc1] |
| RM-172 |
| 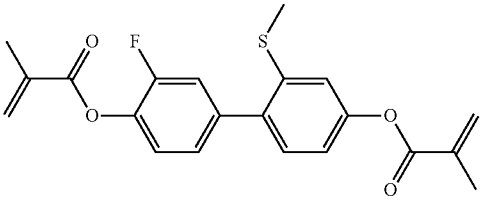 [SMILES: C=C(C)C(=O)Oc1ccc(-c2ccc(OC(=O)C(=C)C)c(F)c2)c(SC)c1] |
| RM-173 |
| 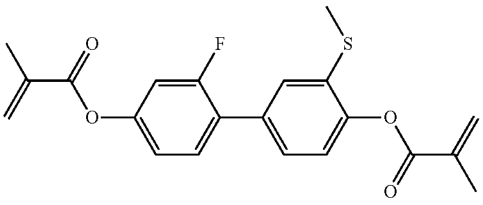 [SMILES: C=C(C)C(=O)Oc1ccc(-c2ccc(OC(=O)C(=C)C)c(SC)c2)c(F)c1] |
| RM-174 |
| 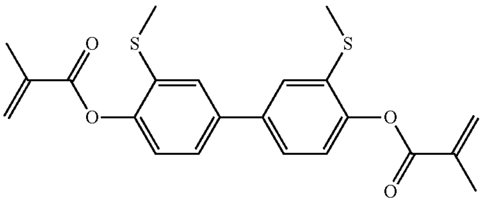 [SMILES: C=C(C)C(=O)Oc1ccc(-c2ccc(OC(=O)C(=C)C)c(SC)c2)cc1SC] |
| RM-175 |

TABLE H-continued
| Table H shows illustrative reactive mesogenic compounds (RMs) which can be used in the LC media in accordance with the present invention. |
|---|
| 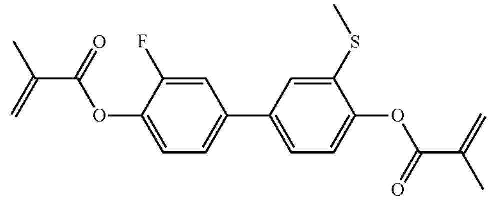 [SMILES: C=C(C)C(=O)Oc1ccc(-c2ccc(OC(=O)C(=C)C)c(SC)c2)cc1F] RM-176 |
| 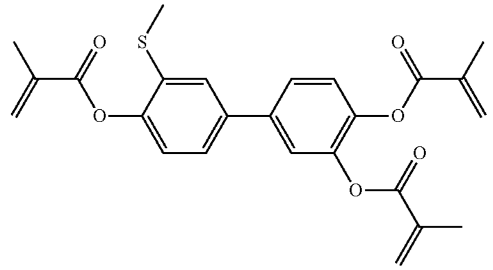 [SMILES: C=C(C)C(=O)Oc1ccc(-c2ccc(OC(=O)C(=C)C)c(SC)c2)cc1OC(=O)C(=C)C] RM-177 |
| 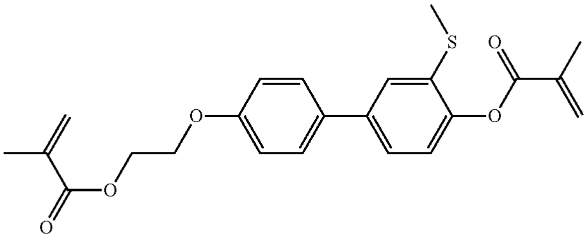 [SMILES: C=C(C)C(=O)OCCOc1ccc(-c2ccc(OC(=O)C(=C)C)c(SC)c2)cc1] RM-178 |
| 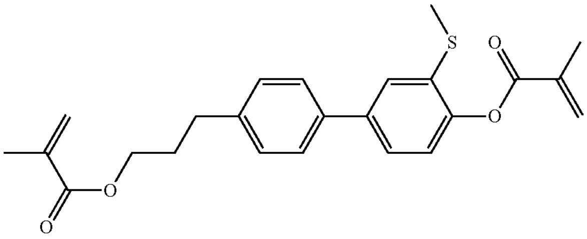 [SMILES: C=C(C)C(=O)OCCCc1ccc(-c2ccc(OC(=O)C(=C)C)c(SC)c2)cc1] RM-179 |
| 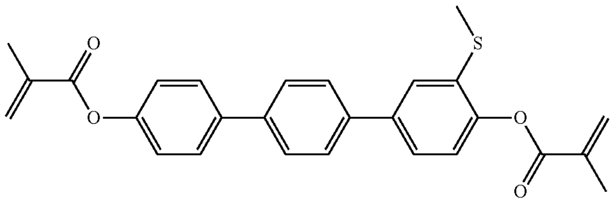 [SMILES: C=C(C)C(=O)Oc1ccc(-c2ccc(-c3ccc(OC(=O)C(=C)C)c(SC)c3)cc2)cc1] RM-180 |

TABLE H-continued

Table H shows illustrative reactive mesogenic compounds (RMs) which can be used in the LC media in accordance with the present invention.

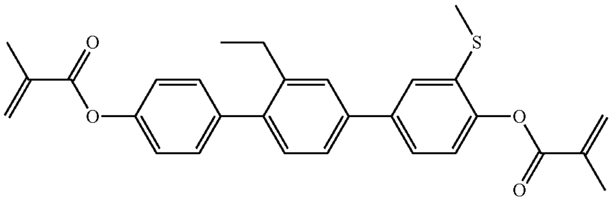 [SMILES: C=C(C)C(=O)Oc1ccc(-c2ccc(-c3ccc(OC(=O)C(=C)C)c(SC)c3)cc2CC)cc1]

RM-181

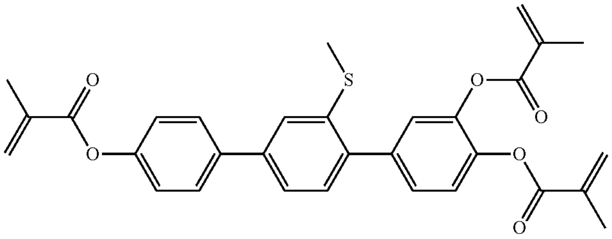 [SMILES: C=C(C)C(=O)Oc1ccc(-c2ccc(-c3ccc(OC(=O)C(=C)C)c(OC(=O)C(=C)C)c3)c(SC)c2)cc1]

RM-182

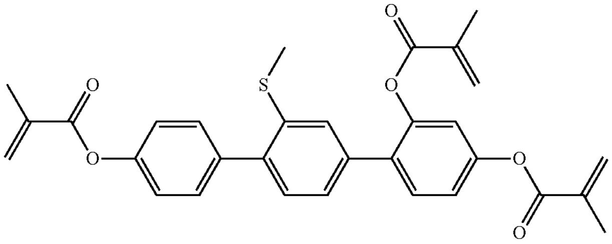 [SMILES: C=C(C)C(=O)Oc1ccc(-c2ccc(-c3ccc(OC(=O)C(=C)C)cc3OC(=O)C(=C)C)cc2SC)cc1]

RM-183

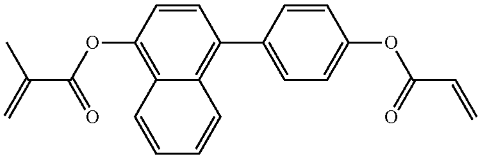 [SMILES: C=CC(=O)Oc1ccc(-c2ccc(OC(=O)C(=C)C)c3ccccc23)cc1]

RM-184

The LC media according to the invention may optionally comprise one or more polymerizable compounds, preferably selected from the polymerizable compounds of the Formulae RM-1 to RM-184. Of these, compounds RM-1, RM-4, RM-8, RM-17, RM-19, RM-35, RM-37, RM-39, RM-40, RM-41, RM-48, RM-52, RM-54, RM-57, RM-58, RM-64, RM-74, RM-76, RM-88, RM-91, RM-102, RM-103, RM-109, RM-116, RM-117, RM-120, RM-121, RM-122, RM-139, RM-140, RM-142, RM-143, RM-145, RM-146, RM-147, RM-149, RM-156 to RM-163, RM-169, RM-170 and RM-171 to RM-184 are particularly preferred.

TABLE I

Table I shows self-alignment additives for vertical alignment which can be used in LC media for SA-FFS, SA-HB-FFS and SA-XB-FFS displays according to the present invention:

SA-1

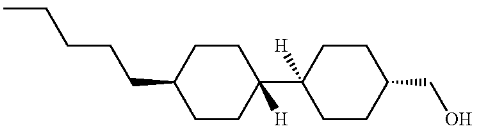 [SMILES: CCCCC[C@H]1CC[C@H]([C@H]2CC[C@H](CO)CC2)CC1]

TABLE I-continued
Table I shows self-alignment additives for vertical alignment which can be used in LC media for SA-FFS, SA-HB-FFS and SA-XB-FFS displays according to the present invention:
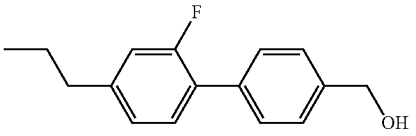 [SMILES: CCCc1ccc(-c2ccc(CO)cc2)c(F)c1]
SA-2
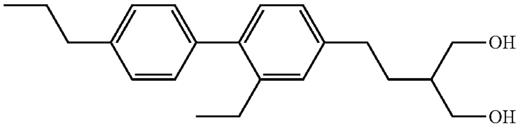 [SMILES: CCCc1ccc(-c2ccc(CCC(CO)CO)cc2CC)cc1]
SA-3
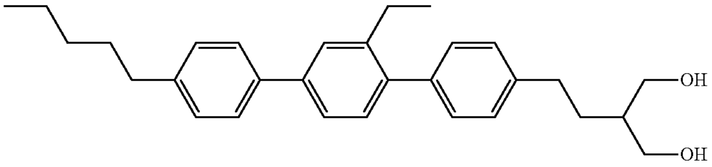 [SMILES: CCCCCc1ccc(-c2ccc(-c3ccc(CCC(CO)CO)cc3)c(CC)c2)cc1]
SA-4
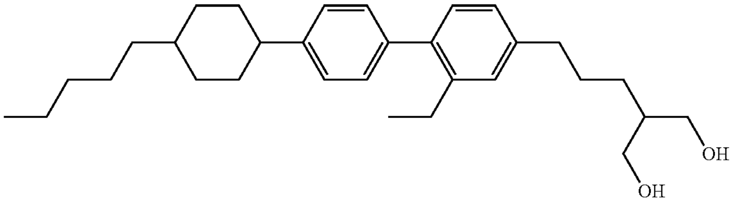 [SMILES: CCCCCC1CCC(c2ccc(-c3ccc(CCCC(CO)CO)cc3CC)cc2)CC1]
SA-5
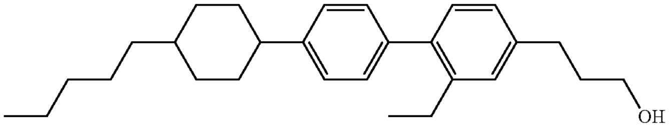 [SMILES: CCCCCC1CCC(c2ccc(-c3ccc(CCCO)cc3CC)cc2)CC1]
SA-6
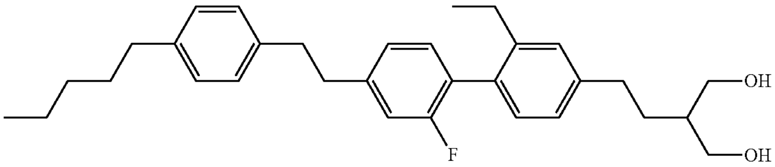 [SMILES: CCCCCc1ccc(CCc2ccc(-c3ccc(CCC(CO)CO)cc3CC)c(F)c2)cc1]
SA-7
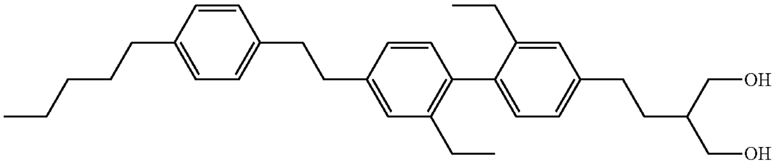 [SMILES: CCCCCc1ccc(CCc2ccc(-c3ccc(CCC(CO)CO)cc3CC)c(CC)c2)cc1]
SA-8
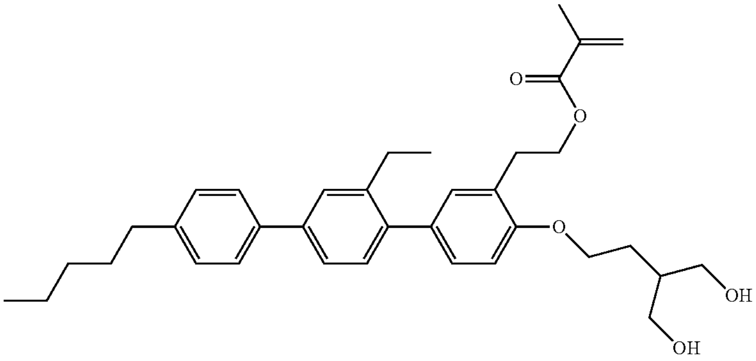 [SMILES: C=C(C)C(=O)OCCc1cc(-c2ccc(-c3ccc(CCCCC)cc3)cc2CC)ccc1OCCC(CO)CO]
SA-9

TABLE I-continued
Table I shows self-alignment additives for vertical alignment which can be used in LC media for SA-FFS, SA-HB-FFS and SA-XB-FFS displays according to the present invention:
SA-10
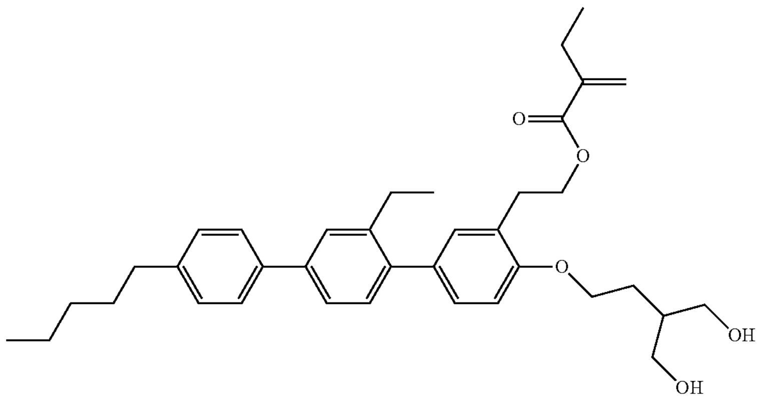 [SMILES: C=C(CC)C(=O)OCCc1cc(-c2ccc(-c3ccc(CCCCC)cc3)cc2CC)ccc1OCCC(CO)CO]
SA-11
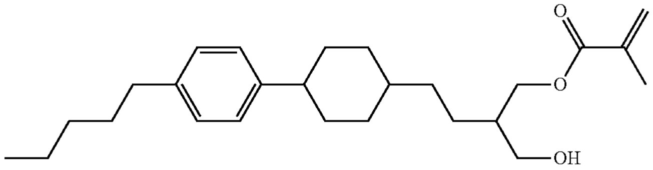 [SMILES: C=C(C)C(=O)OCC(CO)CCC1CCC(c2ccc(CCCCC)cc2)CC1]
SA-12
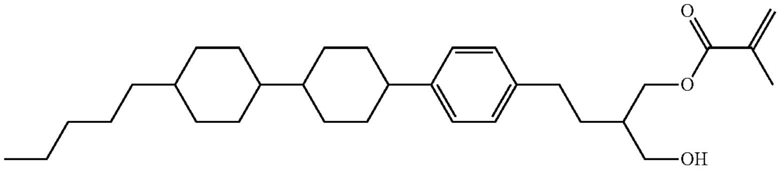 [SMILES: C=C(C)C(=O)OCC(CO)CCc1ccc(C2CCC(C3CCC(CCCCC)CC3)CC2)cc1]
SA-13
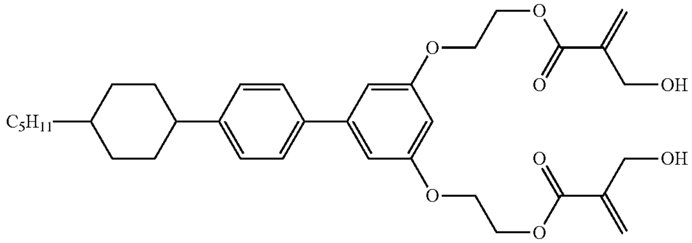
SA-14
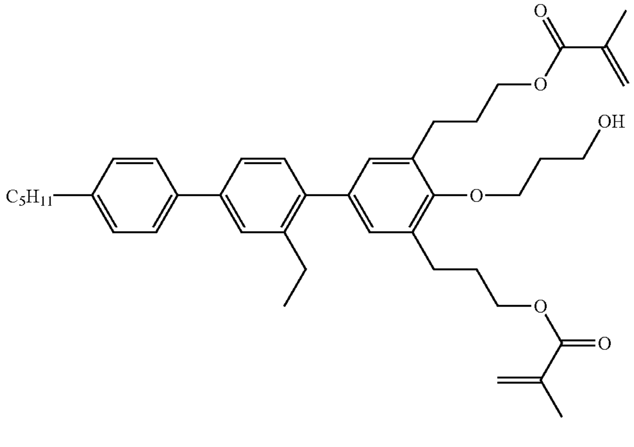

TABLE I-continued
| Table I shows self-alignment additives for vertical alignment which can be used in LC media for SA-FFS, SA-HB-FFS and SA-XB-FFS displays according to the present invention: |
|---|
SA-15
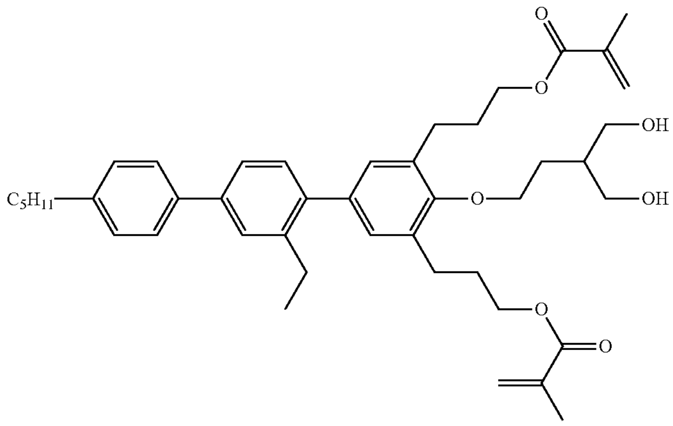
SA-16
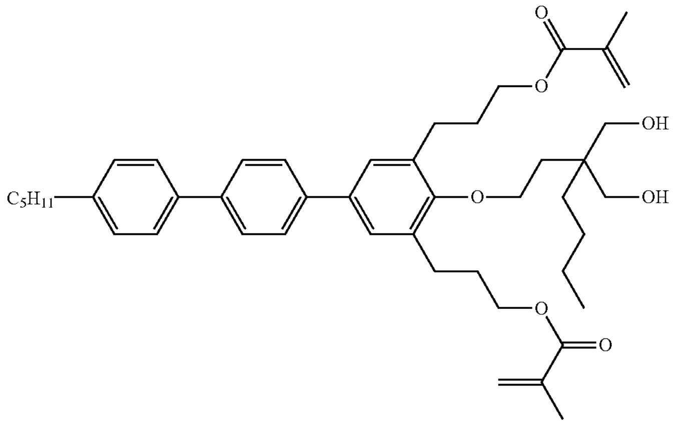
SA-17
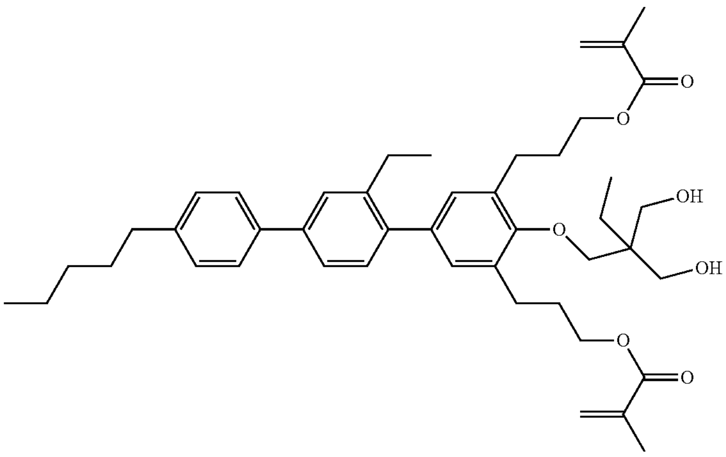 [SMILES: C=C(C)C(=O)OCCCc1cc(-c2ccc(-c3ccc(CCCCC)cc3)cc2CC)cc(CCCOC(=O)C(=C)C)c1OCC(CC)(CO)CO]

TABLE I-continued
Table I shows self-alignment additives for vertical alignment which can be used in LC media for SA-FFS, SA-HB-FFS and SA-XB-FFS displays according to the present invention:
SA-18
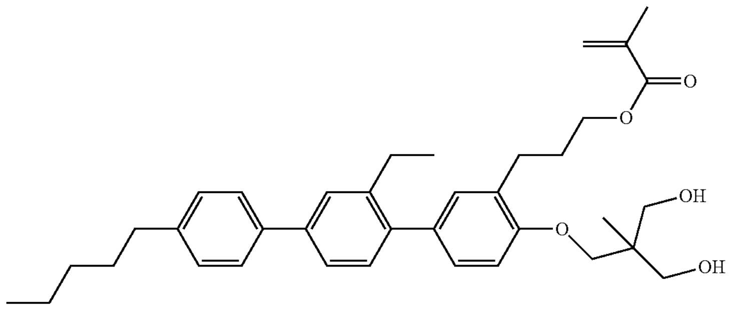 [SMILES: C=C(C)C(=O)OCCCc1cc(-c2ccc(-c3ccc(CCCCC)cc3)cc2CC)ccc1OCC(C)(CO)CO]
SA-19
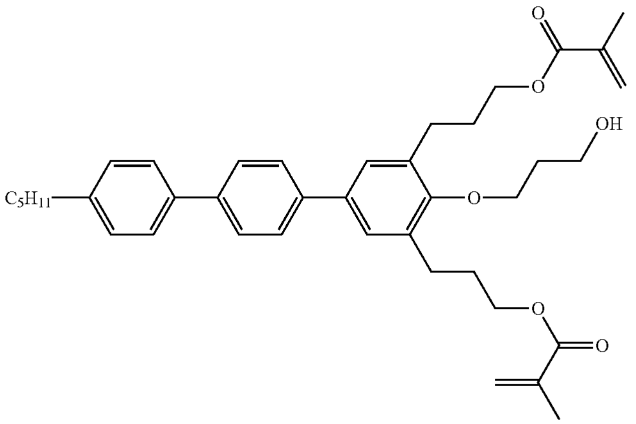
SA-20
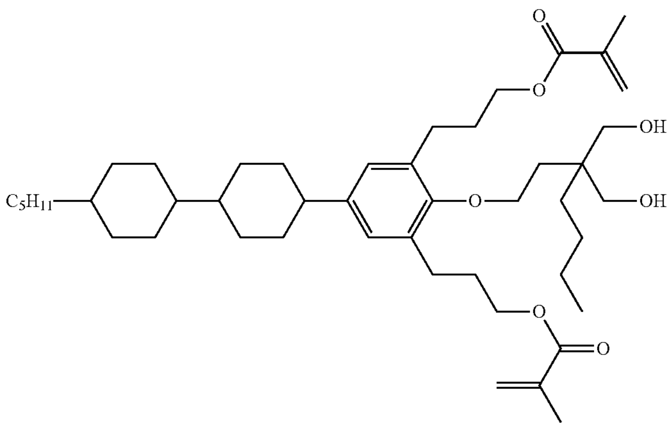

TABLE I-continued
| Table I shows self-alignment additives for vertical alignment which can be used in LC media for SA-FFS, SA-HB-FFS and SA-XB-FFS displays according to the present invention: |
|---|
| 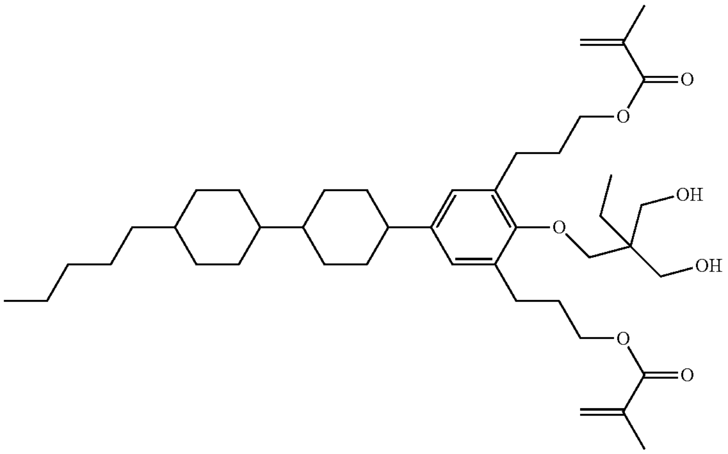 [SMILES: C=C(C)C(=O)OCCCc1cc(C2CCC(C3CCC(CCCCC)CC3)CC2)cc(CCCOC(=O)C(=C)C)c1OCC(CC)(CO)CO] SA-21 |
| 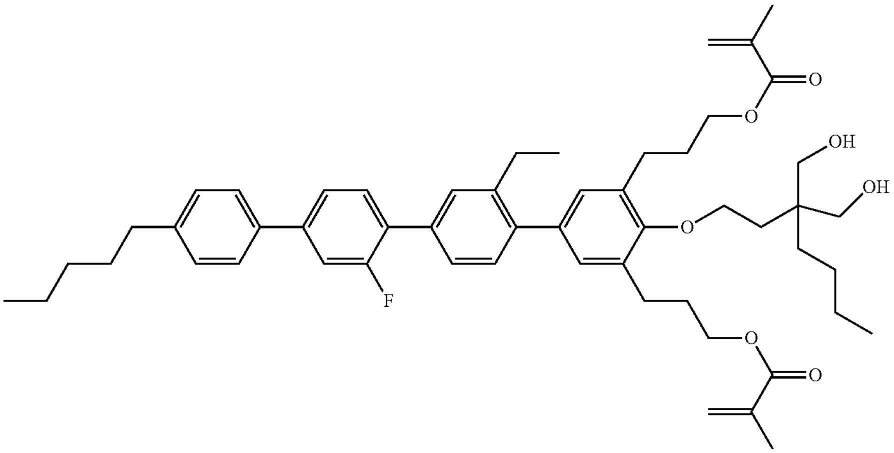 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC] SA-22 |
| 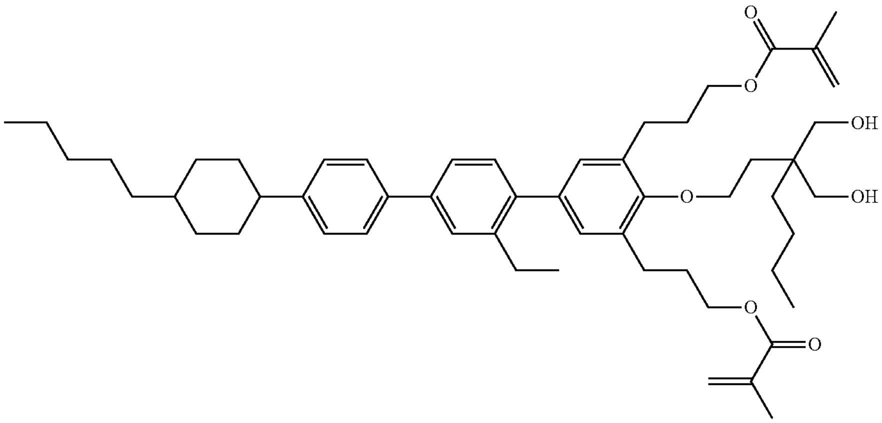 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCC] SA-23 |

TABLE I-continued
| Table I shows self-alignment additives for vertical alignment which can be used in LC media for SA-FFS, SA-HB-FFS and SA-XB-FFS displays according to the present invention: |
|---|
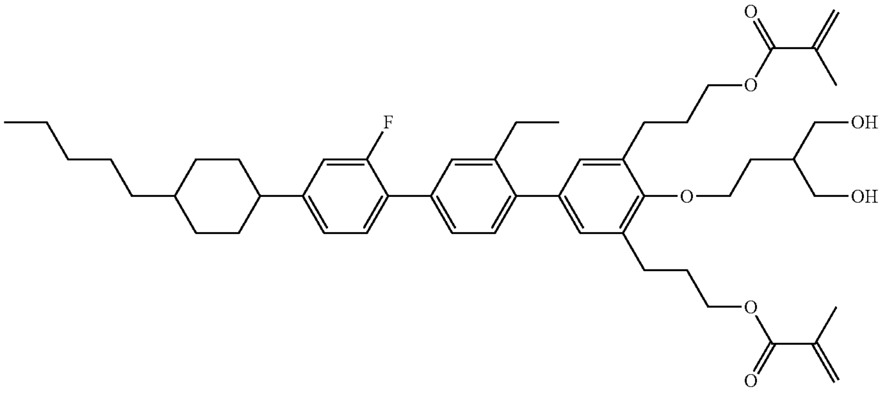 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO]
SA-24
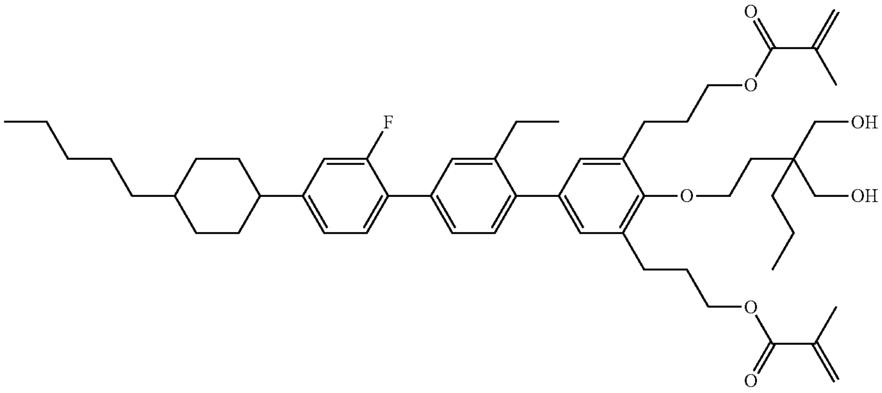 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCC]
SA-25
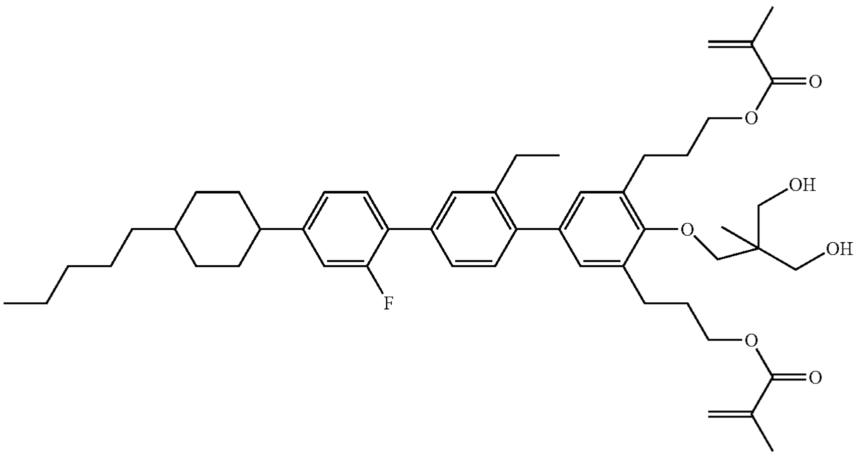 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(C)(CO)CO]
SA-26

TABLE I-continued
| Table I shows self-alignment additives for vertical alignment which can be used in LC media for SA-FFS, SA-HB-FFS and SA-XB-FFS displays according to the present invention: |
|---|
SA-27
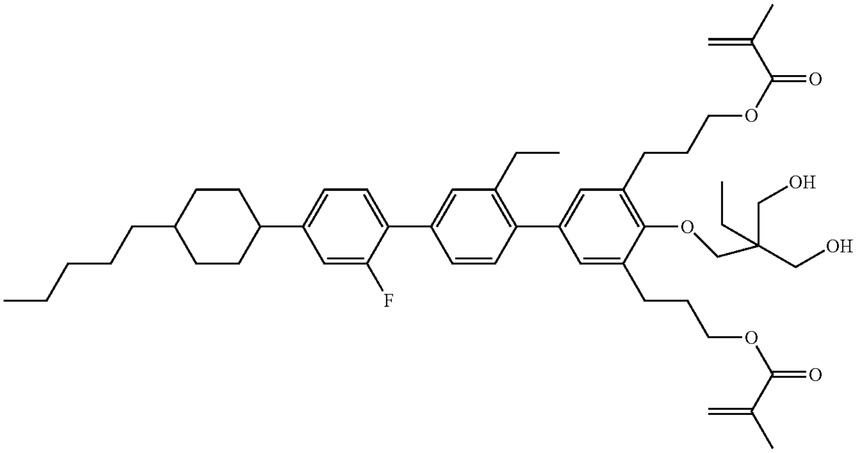 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(CC)(CO)CO]
SA-28
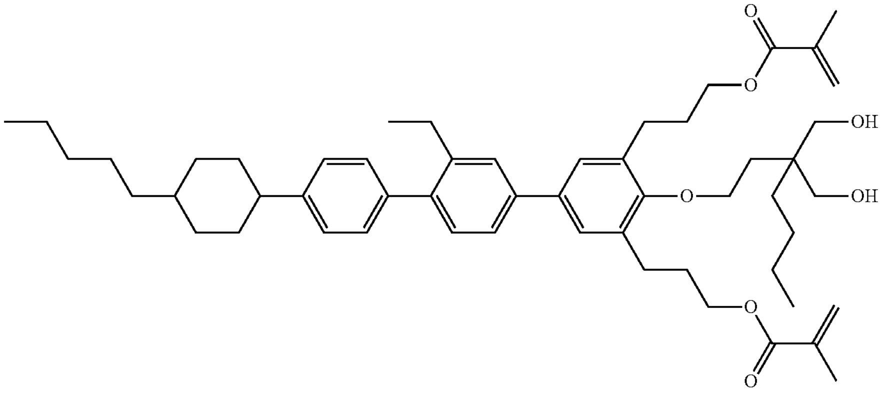 [SMILES: C=C(C)C(=O)OCCCc1cc(-c2ccc(-c3ccc(C4CCC(CCCCC)CC4)cc3)c(CC)c2)cc(CCCOC(=O)C(=C)C)c1OCCC(CO)(CO)CCCC]
SA-29
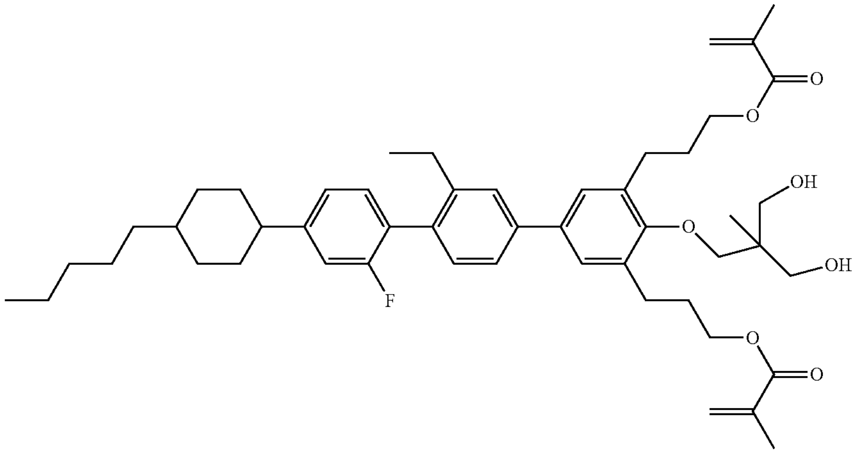 [SMILES: C=C(C)C(=O)OCCCc1cc(-c2ccc(-c3ccc(C4CCC(CCCCC)CC4)cc3F)c(CC)c2)cc(CCCOC(=O)C(=C)C)c1OCC(C)(CO)CO]

TABLE I-continued
| Table I shows self-alignment additives for vertical alignment which can be used in LC media for SA-FFS, SA-HB-FFS and SA-XB-FFS displays according to the present invention: |
|---|
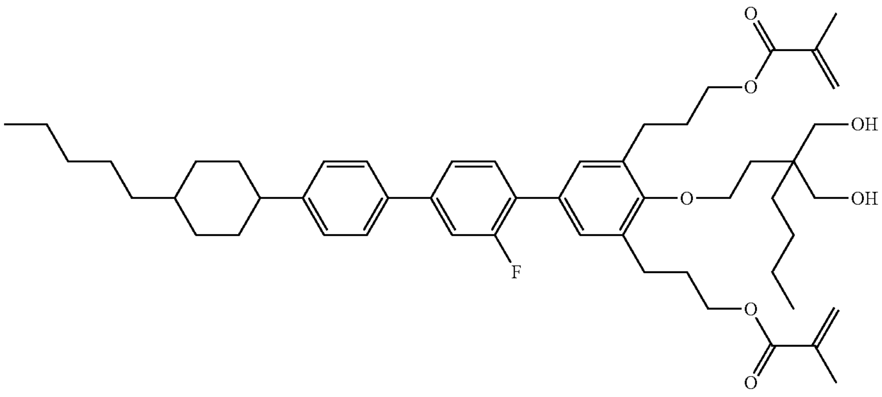 [SMILES: C=C(C)C(=O)OCCCc1cc(-c2ccc(-c3ccc(C4CCC(CCCCC)CC4)cc3)cc2F)cc(CCCOC(=O)C(=C)C)c1OCCC(CO)(CO)CCCC]
SA-30
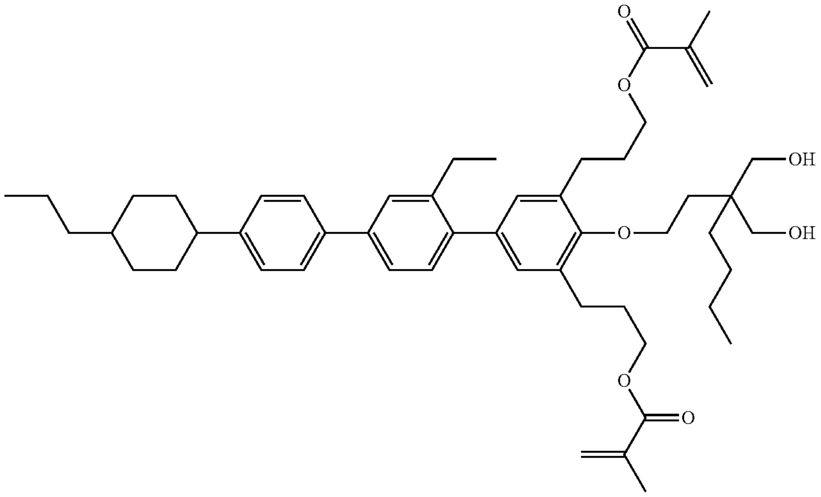 [SMILES: C=C(C)C(=O)OCCCc1cc(-c2ccc(-c3ccc(C4CCC(CCC)CC4)cc3)cc2CC)cc(CCCOC(=O)C(=C)C)c1OCCC(CO)(CO)CCCC]
SA-31
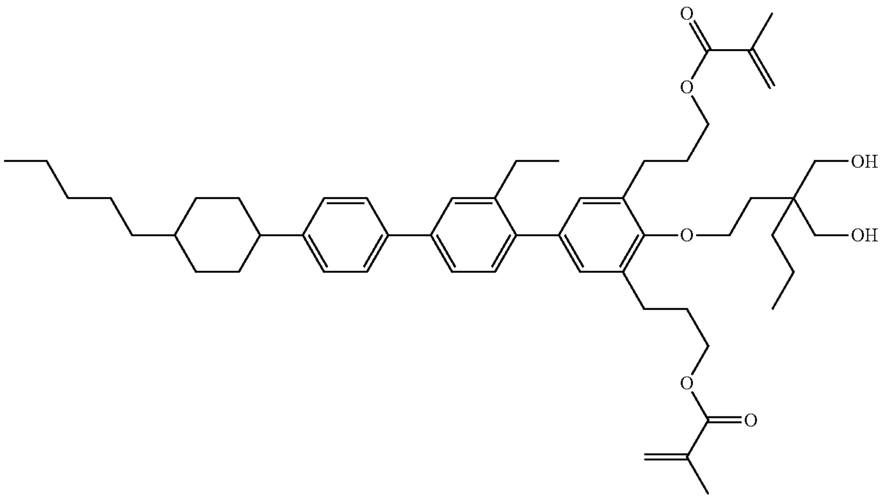 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCC]
SA-32

TABLE I-continued
Table I shows self-alignment additives for vertical alignment which can be used in LC media for SA-FFS, SA-HB-FFS and SA-XB-FFS displays according to the present invention:
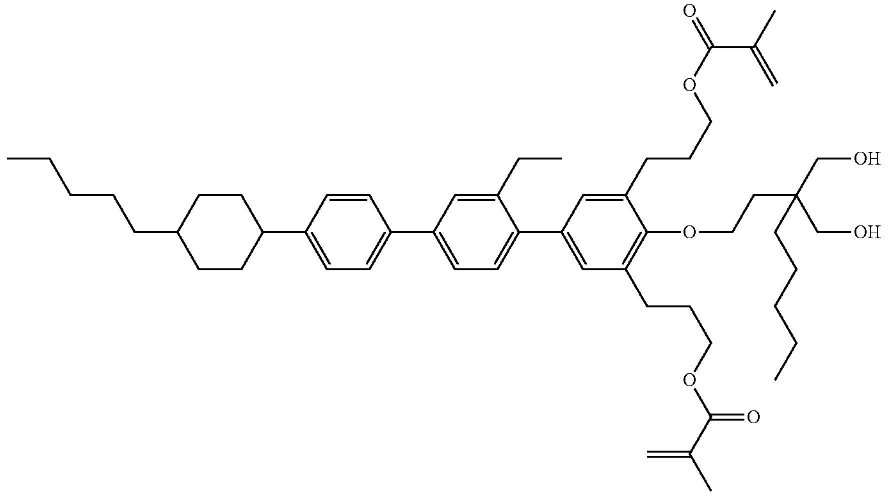 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCCC]
SA-33
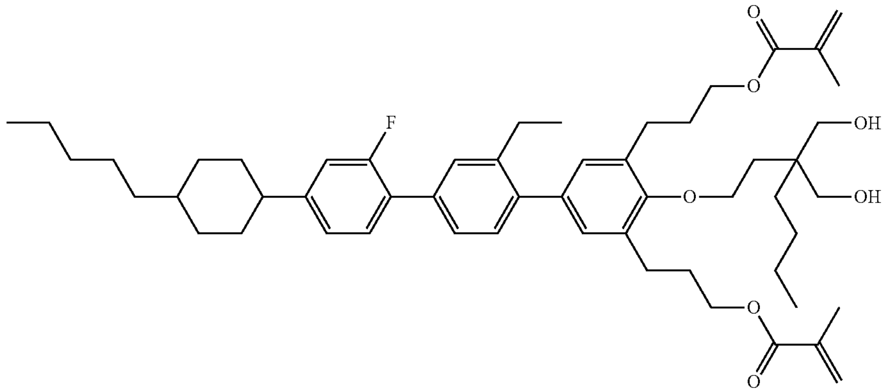 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCCC]
SA-34
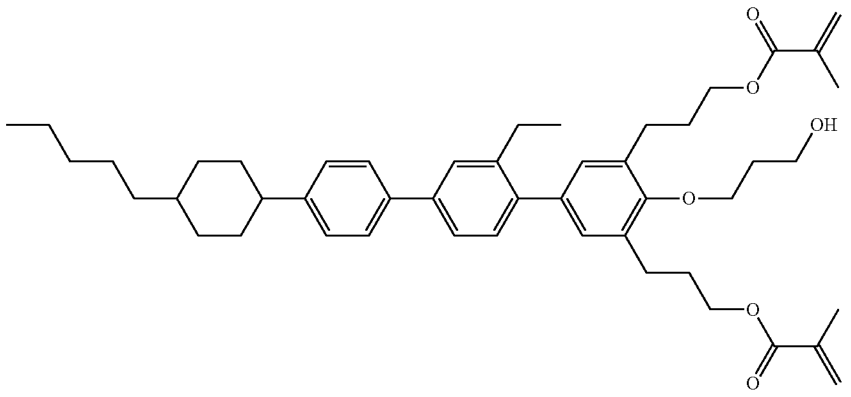 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCCO]
SA-35
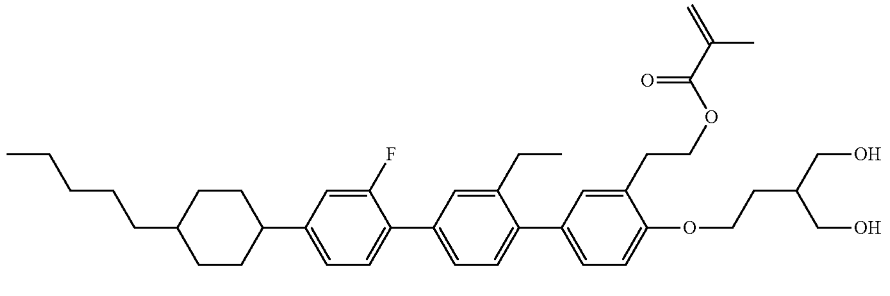 [SMILES: C=C(C)C(=O)OCCc1cc(-c2ccc(-c3ccc(C4CCC(CCCCC)CC4)cc3F)cc2CC)ccc1OCCC(CO)CO]
SA-36

TABLE I-continued
| Table I shows self-alignment additives for vertical alignment which can be used in LC media for SA-FFS, SA-HB-FFS and SA-XB-FFS displays according to the present invention: |
|---|
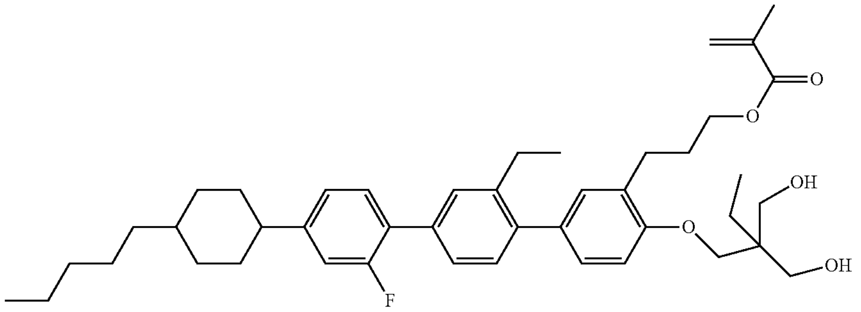 [SMILES: C=C(C)C(=O)OCCCc1cc(-c2ccc(-c3ccc(C4CCC(CCCCC)CC4)cc3F)cc2CC)ccc1OCC(CC)(CO)CO]
SA-37
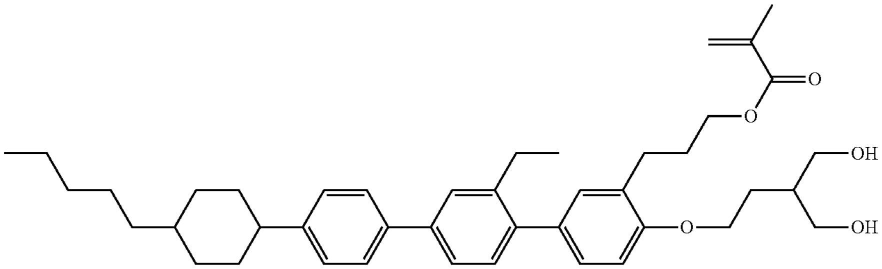 [SMILES: C=C(C)C(=O)OCCCc1cc(-c2ccc(-c3ccc(C4CCC(CCCCC)CC4)cc3)cc2CC)ccc1OCCC(CO)CO]
SA-38
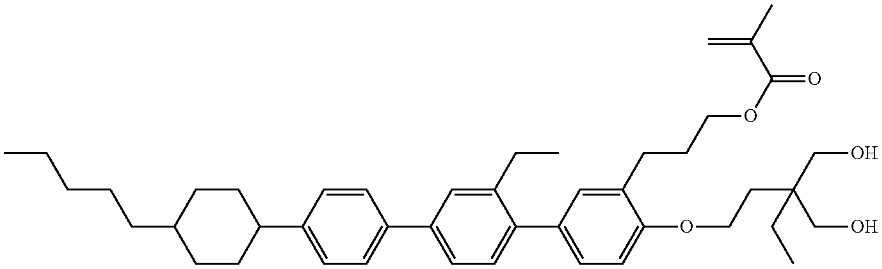 [SMILES: C=C(C)C(=O)OCCCc1cc(-c2ccc(-c3ccc(C4CCC(CCCCC)CC4)cc3)cc2CC)ccc1OCCC(CC)(CO)CO]
SA-39
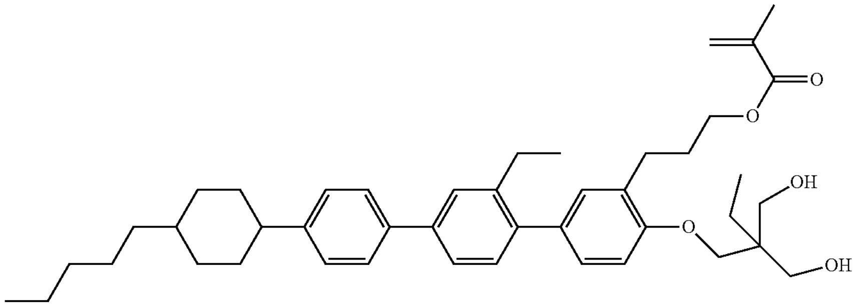 [SMILES: C=C(C)C(=O)OCCCc1cc(-c2ccc(-c3ccc(C4CCC(CCCCC)CC4)cc3)cc2CC)ccc1OCC(CC)(CO)CO]
SA-40
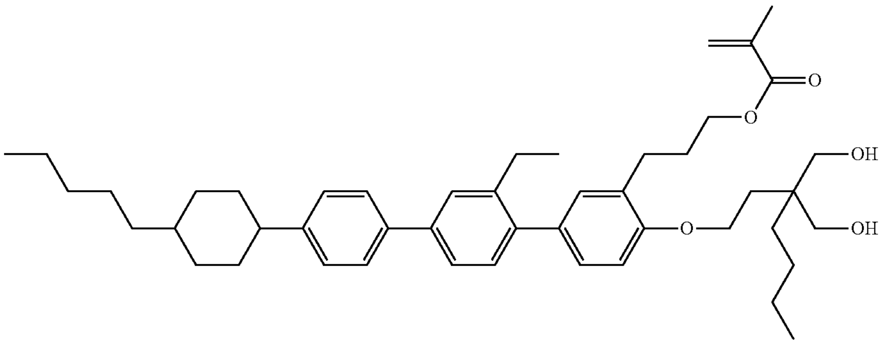 [SMILES: C=C(C)C(=O)OCCCc1cc(-c2ccc(-c3ccc(C4CCC(CCCCC)CC4)cc3)cc2CC)ccc1OCCC(CO)(CO)CCCC]
SA-41

TABLE I-continued
| Table I shows self-alignment additives for vertical alignment which can be used in LC media for SA-FFS, SA-HB-FFS and SA-XB-FFS displays according to the present invention: |
| --- |
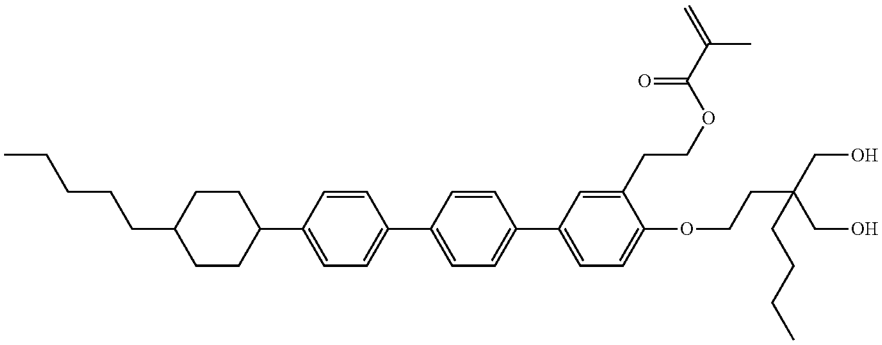 [SMILES: C=C(C)C(=O)OCCc1cc(-c2ccc(-c3ccc(C4CCC(CCCCC)CC4)cc3)cc2)ccc1OCCC(CO)(CO)CCCC]
SA-42
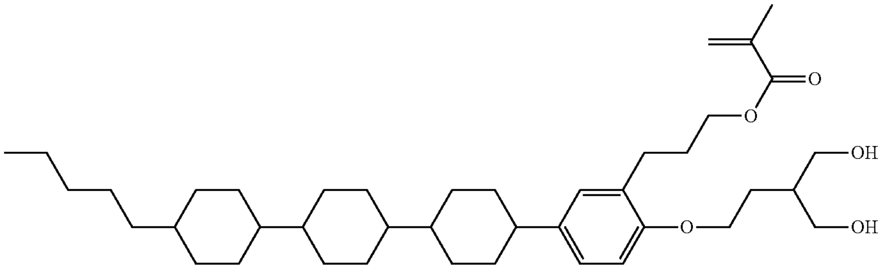 [SMILES: C=C(C)C(=O)OCCCc1cc(C2CCC(C3CCC(C4CCC(CCCCC)CC4)CC3)CC2)ccc1OCCC(CO)CO]
SA-43
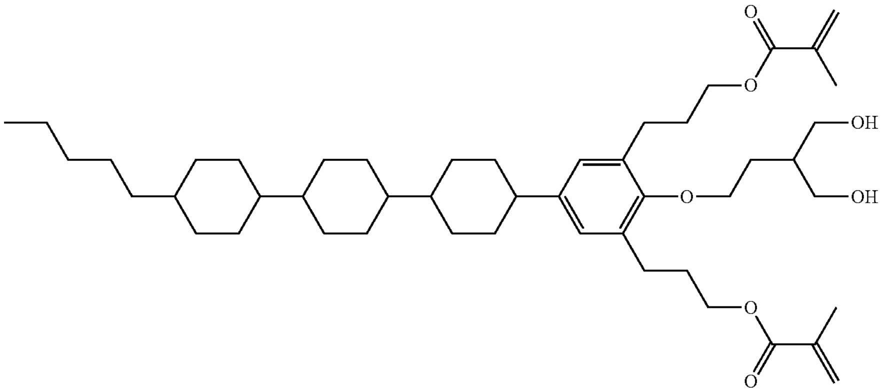 [SMILES: C=C(C)C(=O)OCCCc1cc(C2CCC(C3CCC(C4CCC(CCCCC)CC4)CC3)CC2)cc(CCCOC(=O)C(=C)C)c1OCCC(CO)CO]
SA-44
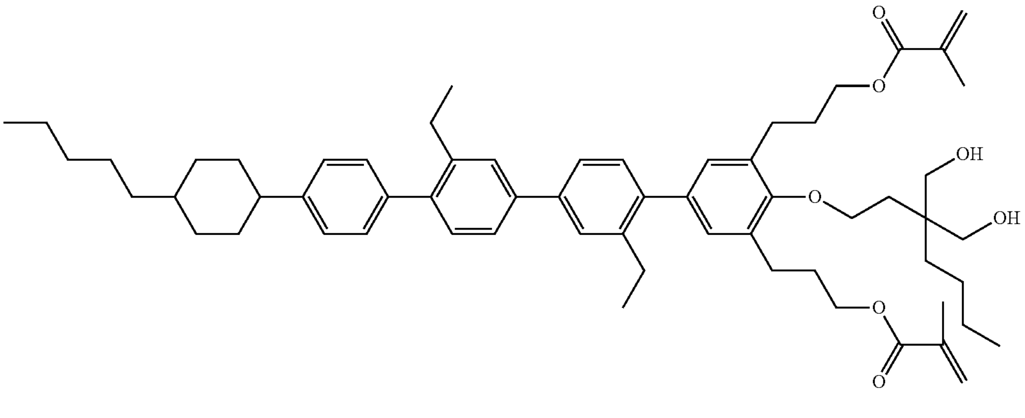 [SMILES: C=C(C)C(=O)OCCCc1cc(-c2ccc(-c3ccc(-c4ccc(C5CCC(CCCCC)CC5)cc4)c(CC)c3)cc2CC)cc(CCCOC(=O)C(=C)C)c1OCCC(CO)(CO)CCCC]
SA-45

TABLE I-continued

| Table I shows self-alignment additives for vertical alignment which can be used in LC media for SA-FFS, SA-HB-FFS and SA-XB-FFS displays according to the present invention: |
|---|
| 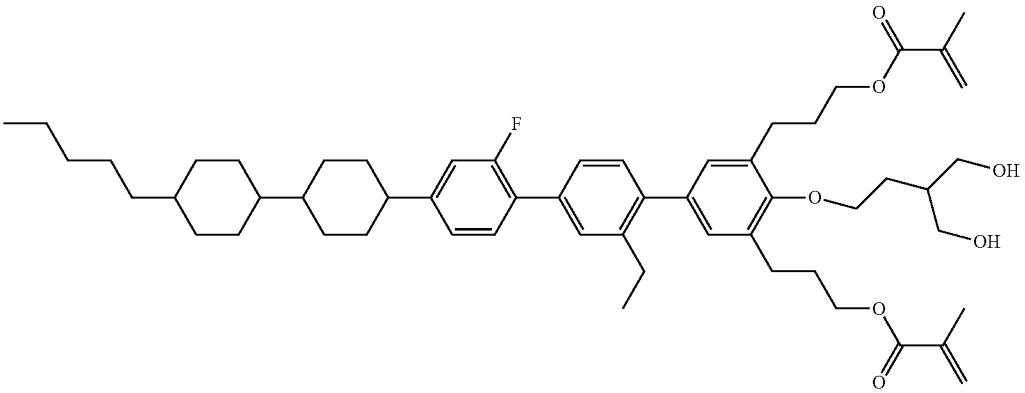 [SMILES: C=C(C)C(=O)OCCCc1cc(-c2ccc(-c3ccc(C4CCC(C5CCC(CCCCC)CC5)CC4)cc3F)cc2CC)cc(CCCOC(=O)C(=C)C)c1OCCC(CO)CO] SA-46 |
| 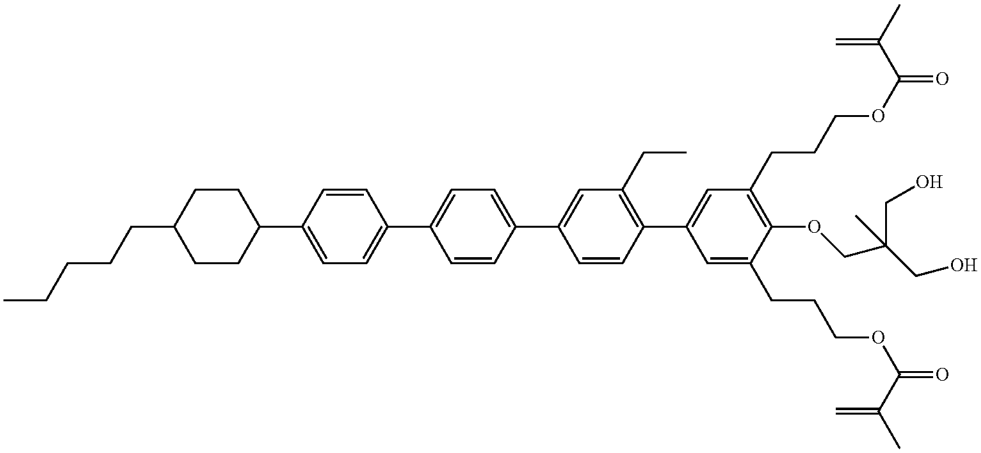 [SMILES: C=C(C)C(=O)OCCCc1cc(-c2ccc(-c3ccc(-c4ccc(C5CCC(CCCCC)CC5)cc4)cc3)cc2CC)cc(CCCOC(=O)C(=C)C)c1OCC(C)(CO)CO] SA-47 |
| 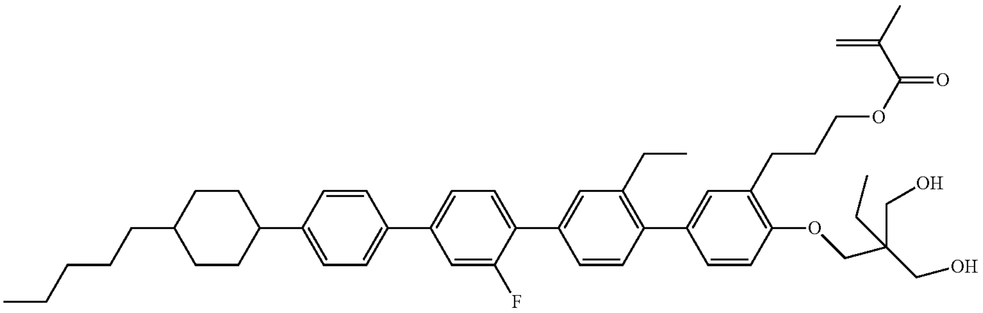 [SMILES: C=C(C)C(=O)OCCCc1cc(-c2ccc(-c3ccc(-c4ccc(C5CCC(CCCCC)CC5)cc4)cc3F)cc2CC)ccc1OCC(CC)(CO)CO] SA-48 |
| 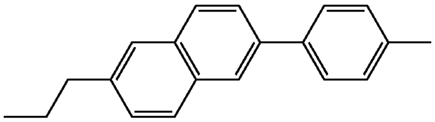 [SMILES: CCCc1ccc2cc(-c3ccc(C)cc3)ccc2c1] SA-49 |

In a preferred embodiment, the LC media, SA-VA and SA-FFS displays according to the present invention comprise one or more SA additives selected from the Formulae SA-1 to SA-49, preferably from the Formulae SA-14 to SA-49, very preferably from the Formulae SA-20 to SA-34 and SA-44, in combination with one or more RMs.

The following examples are intended to explain the invention without limiting it.

Above and below, percentage data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, the following symbols are used $V_0$ Fredericks threshold voltage, capacitive [V] at 20° C., $V_{10}$ voltage [V] for 10% transmission, $n_e$ extraordinary refractive index measured at 20° C. and 589 nm, $n_0$ ordinary refractive index measured at 20° C. and 589 nm, $\Delta n$ optical anisotropy measured at 20° C. and 589 nm, $\varepsilon_\perp$ dielectric susceptibility (or "dielectric constant") perpendicular to the to the longitudinal axes of the molecules at 20° C. and 1 kHz, $\varepsilon\|$ dielectric susceptibility (or "dielectric constant") parallel to the to the longitudinal axes of the molecules at 20° C. and 1 kHz, $\Delta\varepsilon$ dielectric anisotropy at 20° C. and 1 kHz, cl.p. or T(N,I) clearing point [° C.], v flow viscosity measured at 20° C. [$mm^2 \cdot s^{-1}$], $\gamma_1$ rotational viscosity measured at 20° C. [mPa·s], $K_1$ elastic constant, "splay" deformation at 20° C. [pN], $K_2$ elastic constant, "twist" deformation at 20° C. [pN], $K_3$ elastic constant, "bend" deformation at 20° C. [pN], and VHR voltage holding ratio.

All physical properties are determined in accordance with "Merck Liquid Crystals, Physical Properties of Liquid Crystals", status November 1997, Merck KGaA, Germany, and apply for a temperature of 20° C., unless explicitly indicated otherwise.

EXAMPLES

Example M1

A nematic LC medium is formulated as follows:

| Composition | | | |
|---|---|---|---|
| Nr. | Comp. | Conc., wt. - % | Properties |
| 1 | CC-3-2V1 | 4.0 | T(N, I) = 91.0° C. |
| 2 | CC-3-V | 35.0 | $\Delta n$ (20° C., 589 nm) = 0.1341 |
| 3 | CC-3-V1 | 8.0 | $n_e$ (589 nm, 20° C.) = 1.6283 |
| 4 | CC-4-V1 | 3.0 | $n_o$ (589 nm, 20° C.) = 1.4942 |
| 5 | CLP-3-T | 7.0 | $\Delta\varepsilon$ (20° C., 1 kHz) = 3.95 |
| 6 | CLP-3-1 | 8.0 | $\varepsilon_{\|}$ (20° C., 1 kHz) = 6.63 |
| 7 | PGS-2-1 | 8.0 | $\varepsilon_\perp$ (20° C., 1 kHz) = 2.68 |
| 8 | PGP-1-2V | 7.25 | $\gamma_1$ (20° C.) = 68.9 mPa · s |
| 9 | PGUQU-3-F | 4.25 | $K_1$ (20° C.) = 20.93 pN |
| 10 | PGUQU-4-F | 4.0 | $K_3$ (20° C.) = 17.56 pN |
| 11 | PGUQU-5-F | 3.0 | LTS bulk [−20° C.] = 1000 h |
| 12 | PP-1-2V1 | 5.0 | |
| 13 | PPGU-3-F | 0.5 | |
| 14 | PUS-3-2 | 3.0 | |

The LC mixture has $K_{av}$ of 16.32 pN and $\gamma_1/K_1$ of 3.29 mPa·s/pN.

Mixture Example S1 (Stabilised with Compound of Formula H-3-5)

A nematic LC mixture according to the invention is formulated as follows:

| | |
|---|---|
| Mixture M1 | 99.995 wt. - % |
| Compound of Formula H-3-5 | 50 ppm |

Addition of 50 ppm of the compound of the Formula H-3-5 significantly improves the $VHR_{100}$ after UV exposure compared to the non-stabilized mixture M1, without affecting the remaining physical properties of the mixture M1.

H-3-5

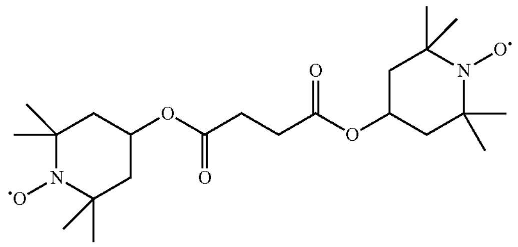

Example M2

A nematic LC medium is formulated as follows:

| Composition | | | |
|---|---|---|---|
| Nr. | Comp. | Conc., wt. - % | Properties |
| 1 | CC-3-2V1 | 4.0 | T(N, I) = 90.0° C. |
| 2 | CC-3-V | 38.0 | $\Delta n$ (20° C., 589 nm) = 0.1346 |
| 3 | CC-3-V1 | 8.0 | $n_e$ (589 nm, 20° C.) = 1.6258 |
| 4 | CLP-3-T | 7.0 | $n_o$ (589 nm, 20° C.) = 1.4912 |
| 5 | CLP-3-1 | 8.0 | $\Delta\varepsilon$ (20° C., 1 kHz) = 3.9 |
| 6 | PGS-3-1 | 8.0 | $\varepsilon_{\|}$ (20° C., 1 kHz) = 6.6 |
| 7 | PGP-1-2V | 5.5 | $\varepsilon_\perp$ (20° C., 1 kHz) = 2.7 |
| 8 | PGUQU-3-F | 4.0 | $\gamma_1$ (20° C.) = 67 mPa · s |
| 9 | PGUQU-4-F | 4.0 | $K_1$ (20° C.) = 20.6 pN |
| 10 | PGUQU-5-F | 3.0 | $K_3$ (20° C.) = 16.9 pN |
| 11 | PP-1-2V1 | 5.0 | |
| 12 | PPGU-3-F | 0.5 | |
| 13 | PUS-3-2 | 5.0 | |

The LC mixture has $K_{av}$ of 15.93 pN and $\gamma_1/K_1$ of 3.25 mPa·s/pN.

Mixture Example S2 (Stabilised with Compound of Formula H-3-3)

A nematic LC mixture according to the invention is formulated as follows:

| | |
|---|---|
| Mixture M2 | 99.9 wt. - % |
| Compound of Formula H-3-3 | 1 000 ppm |

Addition of 1 000 ppm of the compound of the Formula H-3-3 significantly improves the $VHR_{100}$ after UV exposure compared to the non-stabilized mixture M2, without affecting the remaining physical properties of the mixture M2.

H-3-3

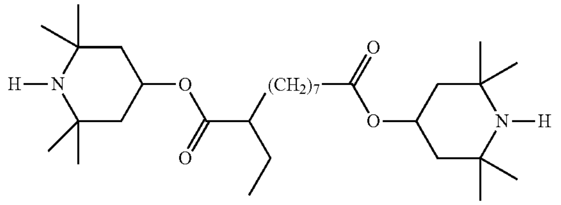

Example M3

A nematic LC medium is formulated as follows:

| Composition | | | |
|---|---|---|---|
| Nr. | Comp. | Conc., wt. - % | Properties |
| 1 | CC-3-2V1 | 4.0 | T(N, I) = 92° C. |
| 2 | CC-3-V | 35.0 | Δn (20° C., 589 nm) = 0.1340 |
| 3 | CC-3-V1 | 8.0 | $n_e$ (589 nm, 20° C.) = 1.6256 |
| 4 | CC-4-V1 | 3.0 | $n_o$ (589 nm, 20° C.) = 1.4916 |
| 5 | CLP-3-T | 7.0 | Δε (20° C., 1 kHz) = 4.0 |
| 6 | CLP-3-1 | 8.0 | $\varepsilon_{\|}$ (20° C., 1 kHz) = 6.6 |
| 7 | PGS-3-1 | 8.0 | $\varepsilon_{\perp}$ (20° C., 1 kHz) = 2.7 |
| 8 | PGP-1-2V | 7.25 | $\gamma_1$ (20° C.) = 70 mPa · s |
| 9 | PGUQU-3-F | 4.25 | $K_1$ (20° C.) = 21.2 pN |
| 10 | PGUQU-4-F | 4.0 | $K_3$ (20° C.) = 17.5 pN |
| 11 | PGUQU-5-F | 3.0 | |
| 12 | PP-1-2V1 | 5.0 | |
| 13 | PPGU-3-F | 0.5 | |
| 14 | PUS-3-2 | 3.0 | |

The LC mixture has $K_{av}$ of 16.43 pN and $\gamma_1/K_1$ of 3.30 mPa·s/pN.

Mixture Example S3 (Stabilised with Compound of Formula H-3-1)

A nematic LC mixture according to the invention is formulated as follows:

| Mixture M3 | 99.9 wt.-% |
|---|---|
| Compound of Formula H-3-1 | 1 000 ppm |

Addition of 1 000 ppm of the compound of Formula H-3-1 significantly improves the $VHR_{100}$ after UV exposure compared to the non-stabilized mixture M3, without affecting the remaining physical properties of the mixture M3.

H-3-1

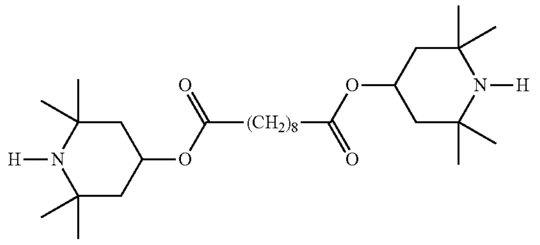

Example M4

A nematic LC medium is formulated as follows:

| Composition | | | | | |
|---|---|---|---|---|---|
| Nr. | Comp. | Conc., wt.-% | Properties | | |
| 1 | CC-3-2V1 | 4.0 | T(N, I) | = | 90.5° C. |
| 2 | CC-3-V | 35.0 | Δn (20° C., 589 nm) | = | 0.1329 |
| 3 | CC-3-V1 | 8.0 | $n_e$ (589 nm, 20° C.) | = | 1.6255 |
| 4 | CC-4-V1 | 3.0 | $n_o$ (589 nm, 20° C.) | = | 1.4926 |
| 5 | CLP-3-T | 7.0 | Δε (20° C., 1 kHz) | = | 3.9 |
| 6 | CLP-3-1 | 8.0 | $\varepsilon_{\|}$ (20° C., 1 kHz) | = | 6.6 |
| 7 | PGS-2-2 | 8.0 | $\varepsilon_{\perp}$ (20° C., 1 kHz) | = | 2.7 |
| 8 | PGP-1-2V | 7.25 | $\gamma_1$ (20° C.) | = | 67 mPa · s |
| 9 | PGUQU-3-F | 4.25 | $K_1$ (20° C.) | = | 21.1 pN |
| 10 | PGUQU-4-F | 4.0 | $K_3$ (20° C.) | = | 17.4 pN |
| 11 | PGUQU-5-F | 3.0 | | | |
| 12 | PP-1-2V1 | 5.0 | | | |
| 13 | PPGU-3-F | 0.5 | | | |
| 14 | PUS-3-2 | 3.0 | | | |

The LC mixture has $K_{av}$ of 16.35 pN and $\gamma_1/K_1$ of 3.18 mPa·s/pN.

Mixture Example S4 (Stabilised with Compound of Formula ST-2-3)

A nematic LC mixture according to the invention is formulated as follows:

| Mixture M4 | 99.95 wt.-% |
|---|---|
| Compound of Formula ST-2-3 | 500 ppm |

Addition of 500 ppm of the compound of the Formula ST-2-3 significantly improves the $VHR_{100}$ after UV exposure compared to the non-stabilized mixture M4, without affecting the remaining physical properties of the mixture M4.

ST-2-3

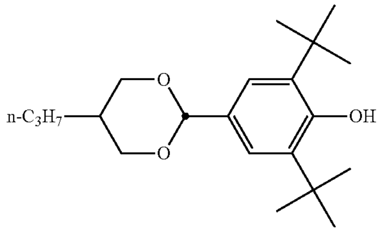

Example M5

A nematic LC medium is formulated as follows:

| Composition | | | | | |
|---|---|---|---|---|---|
| Nr. | Comp. | Conc., wt.-% | Properties | | |
| 1 | CC-3-2V1 | 4.0 | T(N, I) | = | 91.0° C. |
| 2 | CC-3-V | 35.0 | Δn (20° C., 589 nm) | = | 0.1326 |
| 3 | CC-3-V1 | 8.0 | $n_e$ (589 nm, 20° C.) | = | 1.6247 |
| 4 | CC-4-V1 | 3.0 | $n_o$ (589 nm, 20° C.) | = | 1.4921 |
| 5 | CLP-3-T | 7.0 | Δε (20° C., 1 kHz) | = | 4.0 |
| 6 | CLP-3-1 | 8.0 | $\varepsilon_{\|}$ (20° C., 1 kHz) | = | 6.6 |
| 7 | PGS-3-2 | 8.0 | $\varepsilon_{\perp}$ (20° C., 1 kHz) | = | 2.7 |
| 8 | PGP-1-2V | 7.25 | $\gamma_1$ (20° C.) | = | 69 mPa · s |
| 9 | PGUQU-3-F | 4.25 | $K_1$ (20° C.) | = | 21.2 pN |
| 10 | PGUQU-4-F | 4.0 | $K_3$ (20° C.) | = | 17.5 pN |

-continued

| Composition | | | |
|---|---|---|---|
| Nr. | Comp. | Conc., wt.-% | Properties |
| 11 | PGUQU-5-F | 3.0 | |
| 12 | PP-1-2V1 | 5.0 | |
| 13 | PPGU-3-F | 0.5 | |
| 14 | PUS-3-2 | 3.0 | |

The LC mixture has $K_{av}$ of 16.43 pN and $\gamma_1/K_1$ of 3.25 mPa·s/pN.

Mixture Example S5 (Stabilised with Compound of Formula ST-2-3)

A nematic LC mixture according to the invention is formulated as follows:

| | |
|---|---|
| Mixture M5 | 99.95 wt.-% |
| Compound of Formula ST-2-3 | 500 ppm |

Addition of 500 ppm of the compound of the Formula ST-2-3 significantly improves the $VHR_{100}$ after UV exposure compared to the non-stabilized mixture M5, without affecting the remaining physical properties of the mixture M5.

Example M6

A nematic LC medium is formulated as follows:

| Composition | | | | | |
|---|---|---|---|---|---|
| Nr. | Comp. | Conc., wt.-% | Properties | | |
| 1 | CC-3-2V1 | 4.0 | T(N, I) | = | 91.0° C. |
| 2 | CC-3-V | 35.0 | Δn (20° C., 589 nm) | = | 0.1337 |
| 3 | CC-3-V1 | 8.0 | $n_e$ (589 nm, 20° C.) | = | 1.6281 |
| 4 | CC-4-V1 | 3.0 | $n_o$ (589 nm, 20° C.) | = | 1.4944 |
| 5 | CLP-3-T | 7.0 | Δε (20° C., 1 kHz) | = | 4.0 |
| 6 | CLP-3-1 | 8.0 | $\varepsilon_{\parallel}$ (20° C., 1 kHz) | = | 6.8 |
| 7 | PGS-2-1 | 8.0 | $\varepsilon_{\perp}$ (20° C., 1 kHz) | = | 2.8 |
| 8 | PGP-1-2V | 7.25 | $\gamma_1$ (20° C.) | = | 69 mPa · s |
| 9 | PGUQU-3-F | 4.25 | $K_1$ (20° C.) | = | 20.8 pN |
| 10 | PGUQU-4-F | 4.0 | $K_3$ (20° C.) | = | 17.4 pN |
| 11 | PGUQU(1)-3-F | 3.0 | LTS bulk [−20° C.] | = | 1000 h |
| 12 | PP-1-2V1 | 5.0 | | | |
| 13 | PPGU-3-F | 0.5 | | | |
| 14 | PUS-3-2 | 3.0 | | | |

PGUQU(1)-3-F

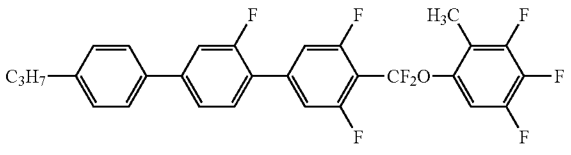

Mixture Example S6 (Stabilised with Compound of Formula H-3-1)

A nematic LC mixture according to the invention is formulated as follows:

| | |
|---|---|
| Mixture M6 | 99.9 wt.-% |
| Compound of Formula H-3-1 | 1 000 ppm |

Addition of 1 000 ppm of the compound of Formula H-3-1 significantly improves the $VHR_{100}$ after UV exposure compared to the non-stabilized mixture M6, without affecting the remaining physical properties of the mixture M6.

Example M7

A nematic LC medium is formulated as follows:

| Composition | | | | | |
|---|---|---|---|---|---|
| Nr. | Comp. | Conc., wt.-% | Properties | | |
| 1 | CC-3-2V1 | 4.0 | T(N, I) | = | 91° C. |
| 2 | CC-3-V | 35.0 | Δn (20° C., 589 nm) | = | 0.1330 |
| 3 | CC-3-V1 | 8.0 | $n_e$ (589 nm, 20° C.) | = | 1.6278 |
| 4 | CC-4-V1 | 3.0 | $n_o$ (589 nm, 20° C.) | = | 1.4948 |
| 5 | CLP-3-T | 7.0 | Δε (20° C., 1 kHz) | = | 4.0 |
| 6 | CLP-3-1 | 8.0 | $\varepsilon_{\parallel}$ (20° C., 1 kHz) | = | 6.8 |
| 7 | PGS-2-1 | 8.0 | $\varepsilon_{\perp}$ (20° C., 1 kHz) | = | 2.8 |
| 8 | PGP-1-2V | 7.25 | $\gamma_1$ (20° C.) | = | 72 mPa · s |
| 9 | PGUQU-3-F | 4.25 | | | |
| 10 | PGUQU-4-F | 4.0 | | | |
| 11 | PGUQU-5-F | 3.0 | | | |
| 12 | PP-1-2V1 | 5.0 | | | |
| 13 | PPGU-3-F | 0.5 | | | |
| 14 | PUS-(c3) 1-2 | 3.0 | | | |

PUS-(c3)1-2

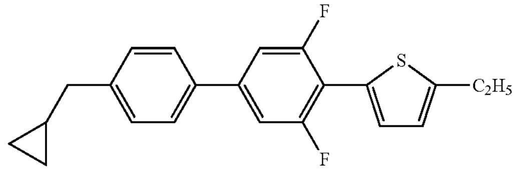

Mixture Example S7 (Stabilised with Compound of Formula ST-1-3)

A nematic LC mixture according to the invention is formulated as follows:

| | |
|---|---|
| Mixture M7 | 99.95 wt.-% |
| Compound of Formula ST-1-3 | 500 ppm |

Addition of 500 ppm of the compound of the Formula ST-1-3 significantly improves the $VHR_{100}$ after UV exposure compared to the non-stabilized mixture M7, without affecting the remaining physical properties of the mixture M7.

ST-1-3

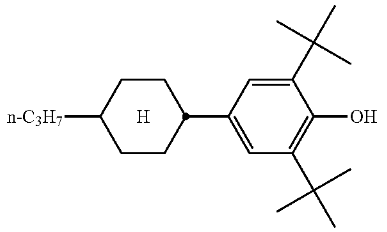

Example M8

A nematic LC medium is formulated as follows:

| Composition | | | | | |
|---|---|---|---|---|---|
| Nr. | Comp. | Conc., wt.-% | Properties | | |
| 1 | CC-3-2V1 | 4.0 | T(N, I) | = | 92° C. |
| 2 | CC-3-V | 35.0 | Δn (20° C., 589 nm) | = | 0.1331 |
| 3 | CC-3-V1 | 8.0 | $n_e$ (589 nm, 20° C.) | = | 1.6279 |
| 4 | CC-4-V1 | 3.0 | $n_o$ (589 nm, 20° C.) | = | 1.4949 |
| 5 | CLP-3-T | 7.0 | Δε (20° C., 1 kHz) | = | 4.0 |
| 6 | CLP-3-1 | 8.0 | $ε_{\|\|}$ (20° C., 1 kHz) | = | 6.8 |
| 7 | PGS-2-1 | 8.0 | $ε_⊥$ (20° C., 1 kHz) | = | 2.8 |
| 8 | PGP-1-1(c3) | 7.25 | $γ_1$ (20° C.) | = | 70 mPa · s |
| 9 | PGUQU-3-F | 4.25 | | | |
| 10 | PGUQU-4-F | 4.0 | | | |
| 11 | PGUQU-5-F | 3.0 | | | |
| 12 | PP-1-2V1 | 5.0 | | | |
| 13 | PPGU-3-F | 0.5 | | | |
| 14 | PUS-3-2 | 3.0 | | | |

PGP-1-1(c3)

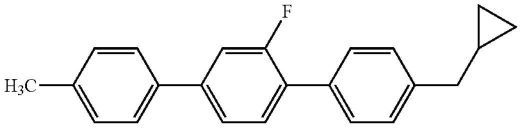

Mixture Example S8 (Stabilised with Compound of Formula ST-1-3)

A nematic LC mixture according to the invention is formulated as follows:

| Mixture M8 | 99.95 wt.-% |
|---|---|
| Compound of Formula ST-1-3 | 500 ppm |

Addition of 500 ppm of the compound of the Formula ST-1-3 significantly improves the $VHR_{100}$ after UV exposure compared to the non-stabilized mixture M8, without affecting the remaining physical properties of the mixture M8.

Example M9

A nematic LC medium is formulated as follows:

| Composition | | | | | |
|---|---|---|---|---|---|
| Nr. | Comp. | Conc., wt.-% | Properties | | |
| 1 | CC-3-2V1 | 4.0 | T(N, I) | = | 91° C. |
| 2 | CC-3-V | 35.0 | Δn (20° C., | = | 0.1327 |
| 3 | CC-3-V1 | 8.0 | 589 nm) | | |
| 4 | CC-4-V1 | 3.0 | $n_e$ (589 nm, | = | 1.6278 |
| 5 | CLP-3-T | 7.0 | 20° C.) | | |
| 6 | CLP-3-1 | 8.0 | $n_o$ (589 nm, | = | 1.4951 |
| 7 | PGS-2-1 | 8.0 | 20° C.) | | |
| 8 | PGP-1-2V | 7.25 | Δε (20° C., | = | 4.0 |
| 9 | PGUQU-3-F | 4.25 | 1 kHz) | | |
| 10 | PGUQU-(c3)1-F | 4.0 | $ε_{\|\|}$ (20° C., | = | 6.8 |
| 11 | PGUQU-5-F | 3.0 | 1 kHz) | | |
| 12 | PP-1-2V1 | 5.0 | $ε_⊥$ (20° C., | = | 2.8 |
| 13 | PPGU-3-F | 0.5 | 1 kHz) | | |
| 14 | PUS-3-2 | 3.0 | $γ_1$ (20° C.) | = | 69 mPa · s |

PGUQU(c3)1-F

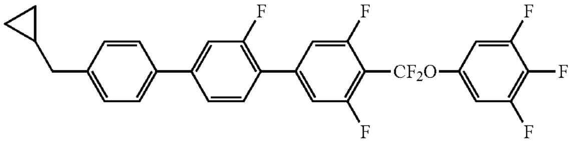

Mixture Example S9 (Stabilised with Compound of Formula ST-2-3)

A nematic LC mixture according to the invention is formulated as follows:

| Mixture M9 | 99.96 wt.-% |
|---|---|
| Compound of Formula ST-2-3 | 400 ppm |

Addition of 500 ppm of the compound of the Formula ST-2-3 significantly improves the $VHR_{100}$ after UV exposure compared to the non-stabilized mixture M9, without affecting the remaining physical properties of the mixture M9.

Example M10

A nematic LC medium is formulated as follows:

| Composition | | | | | |
|---|---|---|---|---|---|
| Nr. | Comp. | Conc., wt.-% | Properties | | |
| 1 | CC-3-2V1 | 4.0 | T(N, I) | = | 90.5° C. |
| 2 | CC-3-V | 35.0 | Δn (20° C., 589 nm) | = | 0.1324 |
| 3 | CC-3-V1 | 8.0 | $n_e$ (589 nm, 20° C.) | = | 1.6252 |
| 4 | CC-4-V1 | 3.0 | $n_o$ (589 nm, 20° C.) | = | 1.4928 |
| 5 | CLP-3-T | 7.0 | Δε (20° C., 1 kHz) | = | 3.9 |
| 6 | CLP-3-1 | 8.0 | $ε_{\|\|}$ (20° C., 1 kHz) | = | 6.6 |
| 7 | PGS-2-2 | 8.0 | $ε_⊥$ (20° C., 1 kHz) | = | 2.7 |
| 8 | PGP-1-2V | 7.25 | $γ_1$ (20° C.) | = | 67 mPa · s |
| 9 | PGUQU-3-F | 4.25 | $K_1$ (20° C.) | = | 20.1 pN |

-continued

| Composition | | | | | |
|---|---|---|---|---|---|
| Nr. | Comp. | Conc., wt.-% | Properties | | |
| 10 | PGUQU-4-F | 4.0 | $K_3$ (20° C.) | = | 16.8 pN |
| 11 | PGUQU-(c5)-F | 3.0 | | | |
| 12 | PP-1-2V1 | 5.0 | | | |
| 13 | PPGU-3-F | 0.5 | | | |
| 14 | PUS-3-2 | 3.0 | | | |

PGUQU(c5)-F

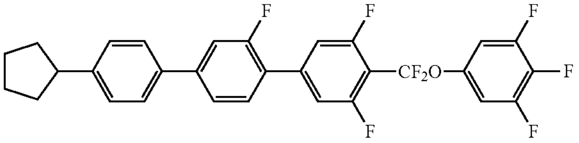

Mixture Example S10 (Stabilised with Compound of Formula H-3-4)

A nematic LC mixture according to the invention is formulated as follows:

| Mixture M10 | 99.995 wt.-% |
|---|---|
| Compound of Formula H-3-4 | 50 ppm |

Addition of 50 ppm of the compound of the Formula H-3-4 significantly improves the $VHR_{100}$ after UV exposure compared to the non-stabilized mixture M10, without affecting the remaining physical properties of the mixture M10.

H-3-4

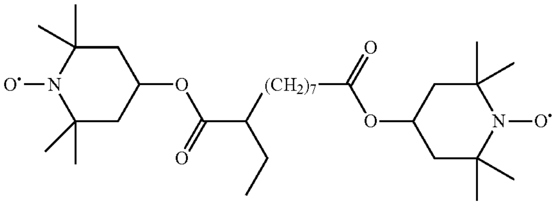

Example M11

A nematic LC medium is formulated as follows:

| Composition | | | |
|---|---|---|---|
| Nr. | Comp. | Conc., wt.-% | Properties |
| 1 | CC-3-2V1 | 4.0 | T(N, I) = 90.9° C. |
| 2 | CC-3-V | 35.0 | $\Delta n$ (20° C., 589 nm) = 0.1319 |
| 3 | CC-3-V1 | 8.0 | $n_e$ (589 nm, 20° C.) = 1.6255 |

-continued

| Composition | | | |
|---|---|---|---|
| Nr. | Comp. | Conc., wt.-% | Properties |
| 4 | CC-4-V1 | 3.0 | $n_o$ (589 nm, 20° C.) = 1.4936 |
| 5 | CLP-3-T | 7.0 | $\Delta\varepsilon$ (20° C., 1 kHz) = 4.0 |
| 6 | CLP-3-1 | 8.0 | $\varepsilon_{\parallel}$ (20° C., 1 kHz) = 6.7 |
| 7 | PGS-2-2 | 8.0 | $\varepsilon_{\perp}$ (20° C., 1 kHz) = 2.7 |
| 8 | PGP-1-2V | 7.25 | $\gamma_1$ (20° C.) = 67 mPa · s |
| 9 | PGUQU-3-F | 4.25 | |
| 10 | PGUQU-4-F | 4.0 | |
| 11 | PGUQU-5-F | 3.0 | |
| 12 | PP-1-2V1 | 3.0 | |
| | PP-1-1(c3) | 2.0 | |
| 13 | PPGU-(c5)-F | 0.5 | |
| 14 | PUS-(c5)-2 | 3.0 | |

PP-1-1(c3)

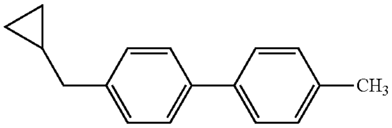

PPGU-(c5)-F

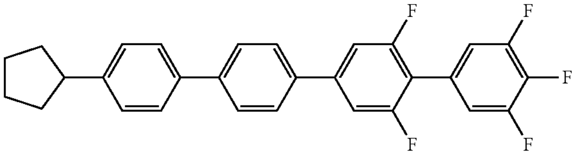

PUS-(c5)-2

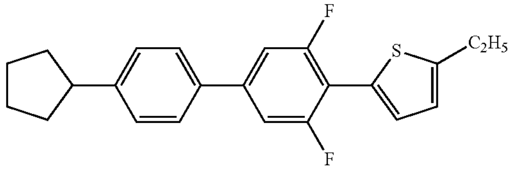

Mixture Example S11 (Stabilised with Compound of Formula H-3-2)

A nematic LC mixture according to the invention is formulated as follows:

| Mixture M11 | 99.995 wt.-% |
|---|---|
| Compound of Formula H-3-2 | 50 ppm |

Addition of 50 ppm of the compound of the Formula H-3-2 significantly improves the $VHR_{100}$ after UV exposure compared to the non-stabilized mixture M11, without affecting the remaining physical properties of the mixture M11.

H-3-2

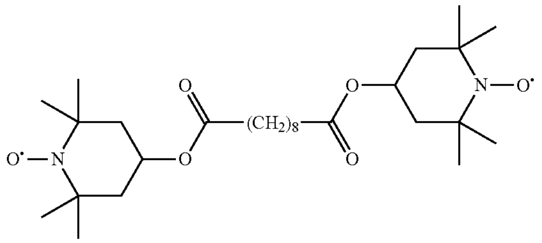

Example M12

A nematic LC medium is formulated as follows:

| Composition | | | |
|---|---|---|---|
| Nr. | Comp. | Conc., wt.-% | Properties |
| 1 | CC-3-2V1 | 10.0 | T(N, I) = 91° C. |
| 2 | CC-3-V | 28.5 | Δn (20° C., 589 nm) = 0.1094 |
| 3 | CC-3-V1 | 10.0 | $n_e$ (589 nm, 20° C.) = |
| 4 | CLP-3-T | 10.0 | $n_o$ (589 nm, 20° C.) = |
| 5 | CCP-3-1 | 6.5 | Δε (20° C., 1 kHz) = 4.1 |
| 6 | CDUQU-3-F | 11.5 | $ε_{\|}$ (20° C., 1 kHz) = 7.2 |
| 7 | CLY-3-02 | 5.0 | $ε_{⊥}$ (20° C., 1 kHz) = 3.0 |
| 8 | PGS-2-1 | 5.0 | $γ_1$ (20° C.) = 80 mPa · s |
| 9 | PP-1-2V1 | 10.0 | $K_1$ (20° C.) = 22.1 pN |
| 10 | DPGU-4-F | 1.5 | $K_3$ (20° C.) = 20.2 PN |
| 11 | PUS-3-2 | 2.0 | |

The LC mixture has $K_{av}$ of 17.83 pN and $γ_1/K_1$ of 3.61 mPa·s/pN.

Mixture Example S12 (Stabilised with Compound of Formula ST-2-3)

A nematic LC mixture according to the invention is formulated as follows:

| | |
|---|---|
| Mixture M12 | 99.96 wt.-% |
| Compound of Formula ST-2-3 | 400 ppm |

Addition of 400 ppm of the compound of the Formula ST-2-3 significantly improves the $VHR_{100}$ after UV exposure compared to the non-stabilized mixture M12, without affecting the remaining physical properties of the mixture M12.

Base Mixture M13

A nematic LC mixture is formulated as follows:

| Composition | | | |
|---|---|---|---|
| Nr. | Compound | Concentration, wt.-% | Properties |
| 1 | CC-3-2V1 | 4.0 | T(N, I) = 85° C. |
| 2 | CC-3-V | 34.5 | $n_e$ [589 nm, 20° C.]: = 1.6276 |
| 3 | CC-3-V1 | 8.0 | $n_o$ [589 nm, 20° C.]: = 1.4930 |
| 4 | CPP-3-2V1 | 3.5 | Δn [589 nm, 20° C.]: = 0.1346 |
| 5 | CLP-3-T | 7.0 | $ε_{\|}$ [1 kHz, 20° C.]: = 6.8 |
| 6 | CLP-V-1 | 7.0 | $ε_{⊥}$ [1 kHz, 20° C.]: = 2.7 |
| 7 | PGP-1-2V | 4.0 | Δε [1 kHz, 20° C.]: = 4.1 |
| 8 | PGUQU-3-F | 4.0 | $γ_1$ [mPa s, 20° C.]: = 64 |
| 9 | PGUQU-4-F | 3.0 | $K_1$ [pN, 20° C.]: = 20.5 |
| 10 | PGUQU-5-F | 3.0 | $K_3$ [pN, 20° C.]: = 17.4 |
| 11 | PP-1-2V1 | 10.0 | |
| 12 | PPGU-3-F | 0.5 | |
| 13 | PGS-3-T | 3.5 | |
| 14 | PUS-3-2 | 8.0 | |

Mixture Example S13 (Stabilised with Compound of Formula H-3-7)

A nematic LC mixture according to the invention is formulated as follows:

| | |
|---|---|
| Mixture M13 | 99.9 wt.-% |
| Compound of Formula H-3-7 | 1 000 ppm |

Addition of 1 000 ppm of the compound of Formula H-3-7 significantly improves the $VHR_{100}$ after UV exposure compared to the non-stabilized mixture M13, without affecting the remaining physical properties of the mixture M13.

H-3-7

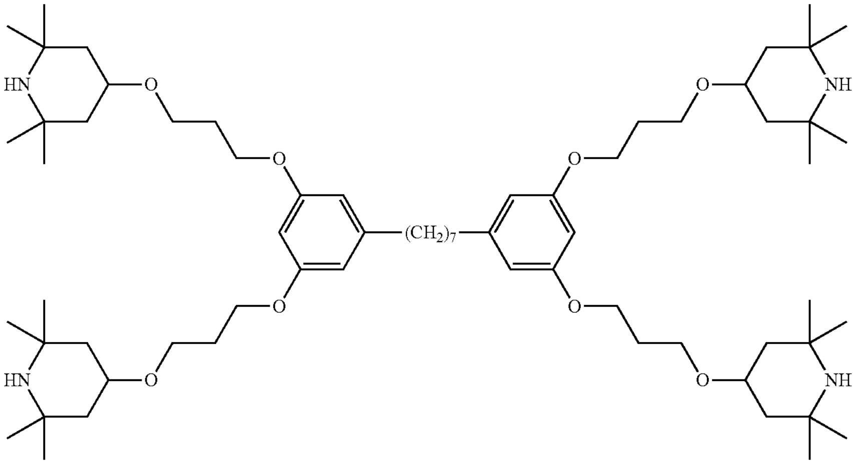

Base Mixture M14

A nematic LC mixture is formulated as follows:

| Composition | | | |
|---|---|---|---|
| Nr. | Compound | Concentration, wt .- % | Properties |
| 1 | CC-3-2V1 | 4.0 | T(N, I) = 86° C. |
| 2 | CC-3-V | 34.5 | $n_e$ [589 nm, 20° C.]: = 1.6308 |
| 3 | CC-3-V1 | 8.0 | $n_o$ [589 nm, 20° C.]: = 1.4945 |
| 4 | CPP-3-2V1 | 3.5 | $\Delta n$ [589 nm, 20° C.]: = 0.1363 |
| 5 | CLP-3-T | 7.0 | $\varepsilon_{\parallel}$ [1 kHz, 20° C.]: = 6.3 |
| 6 | CLP-V-1 | 7.0 | $\varepsilon_{\perp}$ [1 kHz, 20° C.]: = 2.6 |
| 7 | PGP-1-2V | 4.0 | $\Delta\varepsilon$ [1 kHz, 20° C.]: = 3.7 |
| 8 | PGUQU-3-F | 4.0 | $\gamma_1$ [mPa s, 20° C.]: = 65 |
| 9 | PGUQU-4-F | 3.0 | $K_1$ [pN, 20° C.]: = 20.2 |
| 10 | PGUQU-5-F | 3.0 | $K_3$ [pN, 20° C.]: = 17.2 |
| 11 | PP-1-2V1 | 10.0 | |
| 12 | PPGU-3-F | 0.5 | |
| 13 | PGS-2-1 | 3.5 | |
| 14 | PUS-3-2 | 8.0 | |

Mixture Example S14 (Stabilised with Compound of Formula H-3-8)

A nematic LC mixture according to the invention is formulated as follows:

| Mixture M14 | 99.9 wt.-% |
|---|---|
| Compound of Formula H-3-8 | 1 000 ppm |

Addition of 1 000 ppm of the compound of Formula H-3-8 significantly improves the $VHR_{100}$ after UV exposure compared to the non-stabilized mixture M14, without affecting the remaining physical properties of the mixture M14.

H-3-8

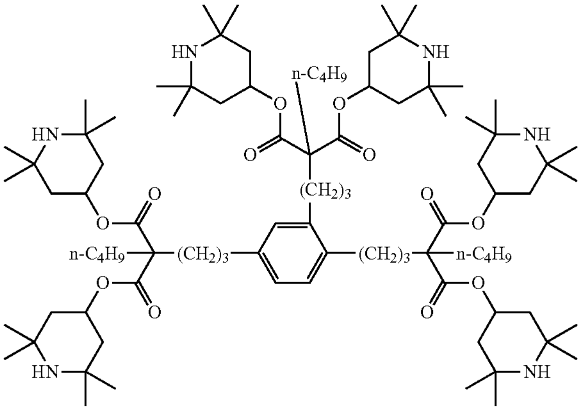

Base Mixture M15

A nematic LC mixture is formulated as follows:

| Composition | | | |
|---|---|---|---|
| Nr. | Compound | Concentration, wt.-% | Properties |
| 1 | CC-3-2V1 | 4.0 | T(N, I) = 85.5° C. |
| 2 | CC-3-V | 34.5 | $n_e$ [589 nm, 20° C.]: = 1.6303 |
| 3 | CC-3-V1 | 8.0 | $n_o$ [589 nm, 20° C.]: = 1.4946 |
| 4 | CPP-3-2V1 | 3.5 | $\Delta n$ [589 nm, 20° C.]: = 0.1357 |
| 5 | CLP-3-T | 7.0 | $\varepsilon_{\parallel}$ [1 kHz, 20° C.]: = 6.3 |
| 6 | CLP-V-1 | 7.0 | $\varepsilon_{\perp}$ [1 kHz, 20° C.]: = 2.6 |
| 7 | PGP-1-2V | 4.0 | $\Delta\varepsilon$ [1 kHz, 20° C.]: = 3.7 |
| 8 | PGUQU-3-F | 4.0 | $\gamma_1$ [mPa s, 20° C.]: = 66 |
| 9 | PGUQU-4-F | 3.0 | $K_1$ [pN, 20° C.]: = 20.2 |
| 10 | PGUQU-5-F | 3.0 | $K_3$ [pN, 20° C.]: = 17.1 |
| 11 | PP-1-2V1 | 10.0 | |
| 12 | PPGU-3-F | 0.5 | |
| 13 | PGS-2-2 | 3.5 | |
| 14 | PUS-3-2 | 8.0 | |

Mixture Example S15 (Stabilised with Compound of Formula H-3-9)

A nematic LC mixture according to the invention is formulated as follows:

| Mixture M15 | 99.995 wt.-% |
|---|---|
| Compound of Formula H-3-9 | 50 ppm |

Addition of 50 ppm of the compound of the Formula H-3-9 significantly improves the $VHR_{100}$ after UV exposure compared to the non-stabilized mixture M15, without affecting the remaining physical properties of the mixture M15.

H-3-9

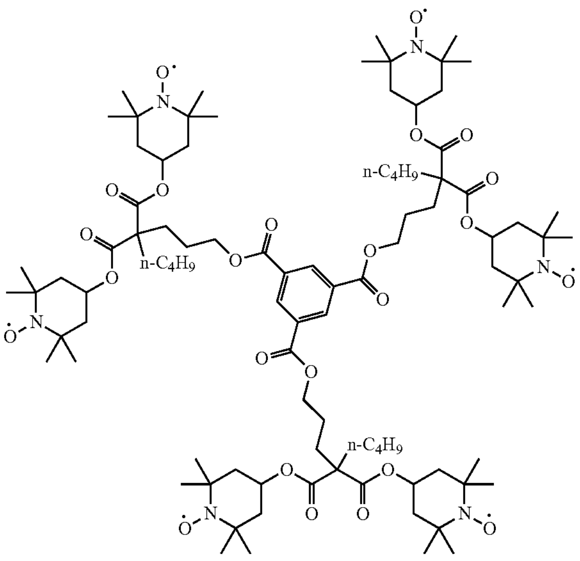

Base Mixture M16

A nematic LC mixture is formulated as follows:

| Composition | | | |
|---|---|---|---|
| Nr. | Compound | Concentration, wt.-% | Properties |
| 1 | CC-3-2V1 | 4.0 | T(N, I) = 85° C. |
| 2 | CC-3-V | 34.5 | $n_e$ [589 nm, 20° C.]: = 1.6295 |
| 3 | CC-3-V1 | 8.0 | $n_o$ [589 nm, 20° C.]: = 1.4940 |
| 4 | CPP-3-2V1 | 3.5 | Δn [589 nm, 20° C.]: = 0.1355 |
| 5 | CLP-3-T | 7.0 | $\varepsilon_{\parallel}$ [1 kHz, 20° C.]: = 6.3 |
| 6 | CLP-V-1 | 7.0 | $\varepsilon_{\perp}$ [1 kHz, 20° C.]: = 2.6 |
| 7 | PGP-1-2V | 4.0 | Δε [1 kHz, 20° C.]: = 3.7 |
| 8 | PGUQU-3-F | 4.0 | $\gamma_1$ [mPa s, 20° C.]: = 65 |
| 9 | PGUQU-4-F | 3.0 | $K_1$ [pN, 20° C.]: = 20.1 |
| 10 | PGUQU-5-F | 3.0 | $K_3$ [pN, 20° C.]: = 85 |
| 11 | PP-1-2V1 | 10.0 | |
| 12 | PPGU-3-F | 0.5 | |
| 13 | PGS-2-3 | 3.5 | |
| 14 | PUS-3-2 | 8.0 | |

Mixture Example S16 (Stabilised with Compound of Formula H-3-11)

A nematic LC mixture according to the invention is formulated as follows:

| Mixture M16 | 99.995 wt.-% |
|---|---|
| Compound of Formula H-3-11 | 50 ppm |

Addition of 50 ppm of the compound of the Formula H-3-11 significantly improves the $VHR_{100}$ after UV exposure compared to the non-stabilized mixture M16, without affecting the remaining physical properties of the mixture M16.

H-3-11

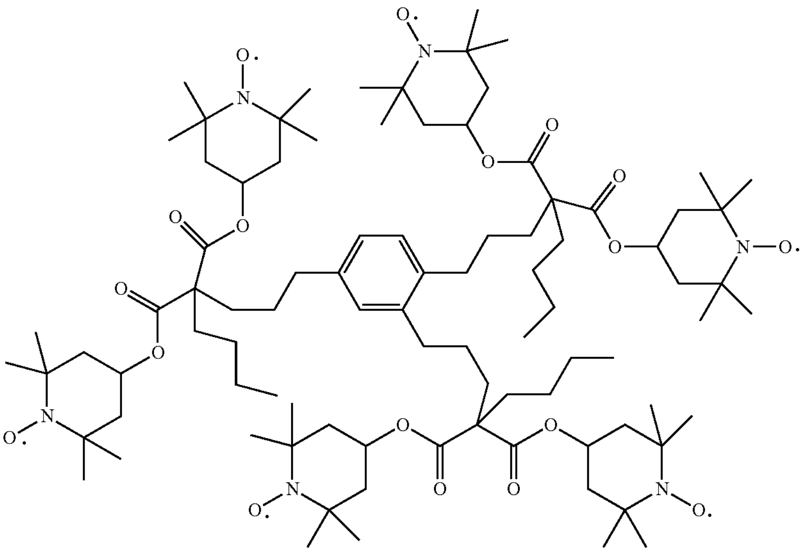

Base Mixture M17

A nematic LC mixture is formulated as follows:

| Composition | | | |
|---|---|---|---|
| Nr. | Compound | Concentration, wt.-% | Properties |
| 1 | CC-3-2V1 | 4.0 | T(N, I) = 86° C. |
| 2 | CC-3-V | 34.5 | $n_e$ [589 nm, 20° C.]: = 1.6304 |
| 3 | CC-3-V1 | 8.0 | $n_o$ [589 nm, 20° C.]: = 1.4942 |
| 4 | CPP-3-2V1 | 3.5 | Δn [589 nm, 20° C.]: = 0.1362 |
| 5 | CLP-3-T | 7.0 | $\varepsilon_{\parallel}$ [1 kHz, 20° C.]: = 6.3 |
| 6 | CLP-V-1 | 7.0 | $\varepsilon_{\perp}$ [1 kHz, 20° C.]: = 2.6 |
| 7 | PGP-1-2V | 4.0 | Δε [1 kHz, 20° C.]: = 3.7 |
| 8 | PGUQU-3-F | 4.0 | $\gamma_1$ [mPa s, 20° C.]: = 66 |
| 9 | PGUQU-4-F | 3.0 | $K_1$ [pN, 20° C.]: = 20.3 |
| 10 | PGUQU-5-F | 3.0 | $K_3$ [pN, 20° C.]: = 17.4 |
| 11 | PP-1-2V1 | 10.0 | |
| 12 | PPGU-3-F | 0.5 | |
| 13 | PGS-3-1 | 3.5 | |
| 14 | PUS-3-2 | 8.0 | |

Mixture Example S17 (Stabilised with Compound of Formula H-3-10)

A nematic LC mixture according to the invention is formulated as follows:

| | |
|---|---|
| Mixture M17 | 99.995 wt.-% |
| Compound of Formula H-3-10 | 50 ppm |

Addition of 50 ppm of the compound of the Formula H-3-10 significantly improves the $VHR_{100}$ after UV exposure compared to the non-stabilized mixture M17, without affecting the remaining physical properties of the mixture M17.

Base Mixture M18

A nematic LC mixture is formulated as follows:

| Composition | | | |
|---|---|---|---|
| Nr. | Compound | Concentration, wt.-% | Properties |
| 1 | CC-3-2V1 | 4.0 | T(N, I) = 85.5° C. |
| 2 | CC-3-V | 34.5 | $n_e$ [589 nm, 20° C.]: = 1.6301 |
| 3 | CC-3-V1 | 8.0 | $n_o$ [589 nm, 20° C.]: = 1.4940 |
| 4 | CPP-3-2V1 | 3.5 | Δn [589 nm, 20° C.]: = 0.1361 |
| 5 | CLP-3-T | 7.0 | $\varepsilon_{\parallel}$ [1 kHz, 20° C.]: = 6.3 |
| 6 | CLP-V-1 | 7.0 | $\varepsilon_{\perp}$ [1 kHz, 20° C.]: = 2.6 |
| 7 | PGP-1-2V | 4.0 | Δε [1 kHz, 20° C.]: = 3.7 |
| 8 | PGUQU-3-F | 4.0 | $\gamma_1$ [mPa s, 20° C.]: = 64 |
| 9 | PGUQU-4-F | 3.0 | $K_1$ [pN, 20° C.]: = 20.2 |
| 10 | PGUQU-5-F | 3.0 | $K_3$ [pN, 20° C.]: = 16.9 |
| 11 | PP-1-2V1 | 10.0 | |
| 12 | PPGU-3-F | 0.5 | |
| 13 | PUS-3-2 | 8.0 | |
| 14 | PGS-3-2 | 3.5 | |

Mixture Example S18 (Stabilised with Compound of Formula H-3-12)

A nematic LC mixture according to the invention is formulated as follows:

| | |
|---|---|
| Mixture M18 | 99.995 wt.-% |
| Compound of Formula H-3-12 | 50 ppm |

Addition of 50 ppm of the compound of the Formula H-3-12 significantly improves the $VHR_{100}$ after UV exposure compared to the non-stabilized mixture M18, without affecting the remaining physical properties of the mixture M18.

H-3-10

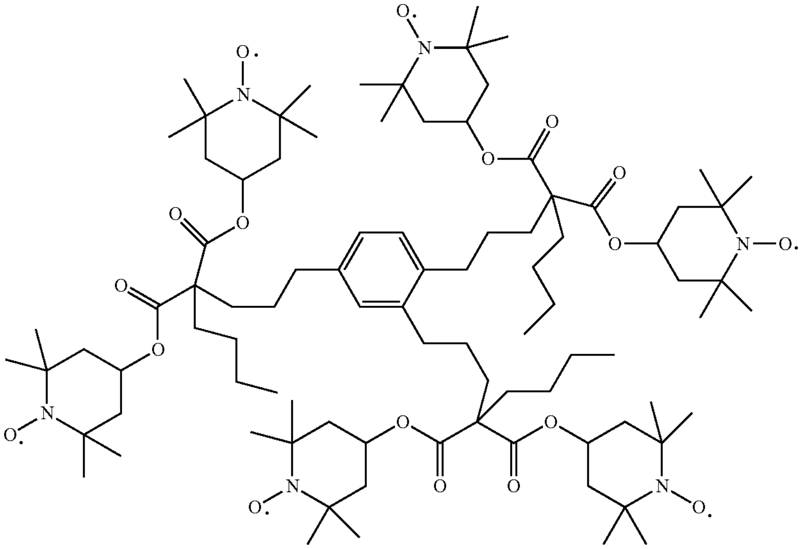

H-3-12

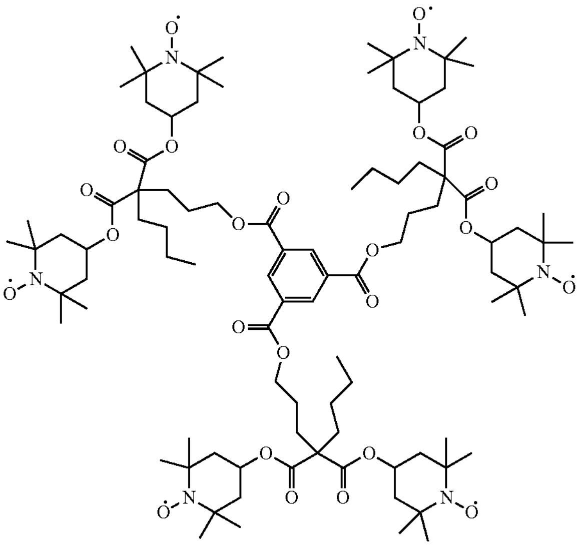

Base Mixture M19

A nematic LC mixture is formulated as follows:

| Composition | | | Properties | | |
|---|---|---|---|---|---|
| Nr. | Compound | Concentration, wt.-% | | | |
| 1 | CC-3-V | 16.00 | T(N, I) | = | 103.7° C. |
| 2 | CPGP-5-2 | 2.50 | $n_e$ [589 nm, 20° C.]: | = | 1.6968 |
| 3 | PCH-302 | 10.00 | $n_o$ [589 nm, 20° C.]: | = | 1.4783 |
| 4 | PGP-1-2V | 12.00 | Δn [589 nm, 20° C.]: | = | 0.2185 |
| 5 | PGP-2-2V | 15.00 | ε‖ [1 kHz, 20° C.]: | = | 7.9 |
| 6 | PGP-2-3 | 5.00 | $\varepsilon_\perp$ [1 kHz, 20° C.]: | = | 3.3 |
| 7 | PGP-2-4 | 3.50 | Δε [1 kHz, 20° C.]: | = | 4.6 |
| 8 | PGS-2-1 | 8.00 | $\gamma_1$ [mPa s, 20° C.]: | = | 136 |
| 9 | PGU-3-F | 2.50 | $K_1$ [pN, 20° C.]: | = | 20.9 |
| 10 | PGUQU-3-F | 6.00 | $K_3$ [pN, 20° C.]: | = | 15.9 |
| 11 | PGUQU-4-F | 5.00 | $V_0$ (20° C.): | = | 2.23 V |
| 12 | PPGU-3-F | 1.00 | | | |
| 13 | PUS-3-2 | 13.50 | | | |

Mixture Example S19 (Stabilised with Compound of Formula ST-2-3)

A nematic LC mixture according to the invention is formulated as follows:

| | |
|---|---|
| Mixture M19 | 99.95 wt.-% |
| Compound of Formula ST-2-3 | 500 ppm |

Addition of 500 ppm of the compound of the Formula ST-2-3 significantly improves the $VHR_{100}$ after UV exposure compared to the non-stabilized mixture M19, without affecting the remaining physical properties of the mixture M19.

Base Mixture M20

A nematic LC mixture is formulated as follows:

| Composition | | | Properties | | |
|---|---|---|---|---|---|
| Nr. | Compound | Concentration, wt.-% | | | |
| 1 | CC-3-2V1 | 14.00 | T(N, I) | = | 88.1° C. |
| 2 | CC-3-V | 32.00 | $n_e$ [589 nm, 20° C.]: | = | 1.5839 |
| 3 | CC-3-V1 | 10.00 | $n_o$ [589 nm, 20° C.]: | = | 1.4857 |
| 4 | CCP-3-1 | 10.50 | Δn [589 nm, 20° C.]: | = | 0.0982 |
| 5 | CLP-3-T | 8.00 | $\varepsilon_{\parallel}$ [1 kHz, 20° C.]: | = | 5.3 |
| 6 | CLP-V-1 | 4.00 | $\varepsilon_\perp$ [1 kHz, 20° C.]: | = | 2.5 |
| 7 | DLGU-3-F | 8.00 | Δε [1 kHz, 20° C.]: | = | 2.8 |
| 8 | PCH-302 | 1.50 | $\gamma_1$ [mPa s, 20° C.]: | = | 80 |
| 9 | PGS-2-1 | 1.00 | $K_1$ [pN, 20° C.]: | = | 20.4 |
| 10 | PP-1-2V1 | 10.00 | $K_3$ [pN, 20° C.]: | = | 20.2 |
| 11 | PUS-3-2 | 1.00 | | | |

Mixture Example S20 (Stabilised with Compound of Formula ST-2-3)

A nematic LC mixture according to the invention is formulated as follows:

| | |
|---|---|
| Mixture M20 | 99.96 wt.-% |
| Compound of Formula ST-2-3 | 400 ppm |

Addition of 400 ppm of the compound of the Formula ST-2-3 significantly improves the $VHR_{100}$ after UV exposure compared to the non-stabilized mixture M20, without affecting the remaining physical properties of the mixture M20.

Example M21 (Inventive)

A nematic LC medium is formulated as follows:

| Composition | | | Properties | | |
|---|---|---|---|---|---|
| Nr. | Comp. | Conc., wt.-% | | | |
| 1 | CC-3-2V1 | 14.00 | T(N, I) | = | 91° C. |
| 2 | CC-3-V | 28.50 | Δn (20° C., 589 nm) | = | 0.1013 |
| 3 | CC-3-V1 | 10.00 | $n_e$ (589 nm, 20° C.) | = | 1.5873 |
| 4 | CCOC-3-3 | 2.00 | $n_o$ (589 nm, 20° C.) | = | 1.4860 |
| 5 | CCP-3-1 | 10.50 | Δε (20° C., 1 kHz) | = | 2.9 |
| 6 | CDUQU-3-F | 2.50 | $\varepsilon_{\parallel}$ (20° C., 1 kHz) | = | 5.4 |
| 7 | CLP-3-T | 8.00 | $\varepsilon_\perp$ (20° C., 1 kHz) | = | 2.5 |
| 8 | CLP-V-1 | 4.00 | $\gamma_1$ (20° C.) | = | 84 mPa · s |
| 9 | DLGU-3-F | 5.50 | $K_1$ (20° C.) | = | 21.2 pN |
| 10 | PCH-302 | 1.00 | $K_3$ (20° C.) | = | 20.6 pN |
| 11 | PGS-2-1 | 1.00 | | | |
| 12 | PP-1-2V1 | 10.00 | | | |
| 13 | PUS-3-2 | 3.00 | | | |

Mixture Example S21 (Stabilised with Compound of Formula ST-2-3)

A nematic LC mixture according to the invention is formulated as follows:

| Mixture M21 | 99.96 wt.-% |
|---|---|
| Compound of Formula ST-2-3 | 400 ppm |

Addition of 400 ppm of the compound of the Formula ST-2-3 significantly improves the $VHR_{100}$ after UV exposure compared to the non-stabilized mixture M21, without affecting the remaining physical properties of the mixture M21.

Example M22 (Inventive)

A nematic LC medium is formulated as follows:

| Composition | | | | | |
|---|---|---|---|---|---|
| Nr. | Comp. | Conc., wt.-% | Properties | | |
| 1 | CC-3-V | 37.00 | T(N, I) | = | 76.1° C. |
| 2 | PGS-2-1 | 12.00 | Δn (20° C., 589 nm) | = | 0.1782 |
| 3 | PP-1-2V1 | 9.00 | $n_e$ (589 nm, 20° C.) | = | 1.6872 |
| 4 | PGUQU-4-F | 4.00 | $n_o$ (589 nm, 20° C.) | = | 1.5090 |
| 5 | PGUQU-3-F | 6.00 | Δε (20° C., 1 kHz) | = | 3.1 |
| 6 | PUS-3-2 | 23.00 | $ε_{\|\|}$ (20° C., 1 kHz) | = | 5.9 |
| 7 | PGP-2-3 | 4.00 | $ε_{\perp}$ (20° C., 1 kHz) | = | 2.8 |
| 8 | PGP-1-2V | 5.00 | $γ_1$ (20° C.) | = | 50 mPa · s |
| | | | $K_1$ (20° C.) | = | 15.6 pN |
| | | | $K_3$ (20° C.) | = | 12.4 pN |
| | | | $V_0$ (20° C.) | = | 2.36 V |

Mixture Example S22 (Stabilised with Compound of Formula ST-2-3)

A nematic LC mixture according to the invention is formulated as follows:

| Mixture M22 | 99.95 wt.-% |
|---|---|
| Compound of Formula ST-2-3 | 500 ppm |

Addition of 500 ppm of the compound of the Formula ST-2-3 significantly improves the $VHR_{100}$ after UV exposure compared to the non-stabilized mixture M22, without affecting the remaining physical properties of the mixture.

Example M23 (Inventive)

A nematic LC medium is formulated as follows:

| Composition | | | | | |
|---|---|---|---|---|---|
| Nr. | Comp. | Conc., wt.-% | Properties | | |
| 1 | CC-3-V | 40.50 | T(N, I) | = | 75° C. |
| 2 | CC-3-V1 | 10.50 | Δn (20° C., 589 nm) | = | 0.1252 |
| 3 | CCH-34 | 6.00 | $n_e$ (589 nm, 20° C.) | = | 1.6132 |
| 4 | CCP-30CF3 | 2.00 | $n_o$ (589 nm, 20° C.) | = | 1.4880 |
| 5 | DGUQU-4-F | 6.00 | Δε (20° C., 1 kHz) | = | 5.1 |
| 6 | PGP-2-2V | 3.50 | $ε_{\|\|}$ (20° C., 1 kHz) | = | 8.0 |
| 7 | PGS-2-1 | 3.00 | $ε_{\perp}$ (20° C., 1 kHz) | = | 2.9 |
| 8 | PGUQU-3-F | 5.50 | $γ_1$ (20° C.) | = | 51 mPa · s |
| 9 | PGUQU-4-F | 5.00 | $K_1$ (20° C.) | = | 14.5 pN |
| 10 | PP-1-2V1 | 1.50 | $K_3$ (20° C.) | = | 13.0 pN |
| 11 | PUS-3-2 | 16.50 | $V_0$ (20° C.) | = | 1.77 V |

Mixture Example S23 (Stabilised with Compound of Formula ST-2-3)

A nematic LC mixture according to the invention is formulated as follows:

| Mixture M23 | 99.9 wt.-% |
|---|---|
| Compound of Formula ST-2-3 | 500 ppm |

Addition of 500 ppm of the compound of the Formula ST-2-3 significantly improves the $VHR_{100}$ after UV exposure compared to the non-stabilized mixture M23, without affecting the remaining physical properties of the mixture.

Example M24 (Inventive)

A nematic LC medium is formulated as follows:

| Composition | | | | | |
|---|---|---|---|---|---|
| Nr. | Comp. | Conc., wt.-% | Properties | | |
| 1 | CC-3-V | 44.5 | T(N, I) | = | 74.5° C. |
| 2 | CC-3-V1 | 10.0 | Δn (20° C., 589 nm) | = | 0.1372 |
| 3 | CPGP-4-3 | 2.0 | $n_e$ (589 nm, 20° C.) | = | 1.6334 |
| 4 | DPGU-4-F | 3.0 | $n_o$ (589 nm, 20° C.) | = | 1.4962 |
| 5 | PGP-1-2V | 6.0 | Δε (20° C., 1 kHz) | = | 2.9 |
| 6 | PGS-2-1 | 8.0 | $ε_{\|\|}$ (20° C., 1 kHz) | = | 5.6 |
| 7 | PGUQU-3-F | 4.0 | $ε_{\perp}$ (20° C., 1 kHz) | = | 2.7 |
| 8 | PGUQU-5-F | 3.5 | $γ_1$ (20° C.) | = | 53 mPa · s |
| 9 | PP-1-2V1 | 9.5 | $K_1$ (20° C.) | = | 15.1 pN |
| 10 | PUS-3-2 | 9.5 | $K_3$ (20° C.) | = | 13.8 pN |

Mixture Example S24 (Stabilised with Compound of Formula H-3-6)

A nematic LC mixture according to the invention is formulated as follows:

| Mixture M24 | 99.995 wt.-% |
|---|---|
| Compound of Formula H-3-6 | 50 ppm |

Addition of 50 ppm of the compound of the Formula H-3-6 significantly improves the $VHR_{100}$ after UV exposure compared to the non-stabilized mixture M24, without affecting the remaining physical properties of the mixture M24.

H-3-6

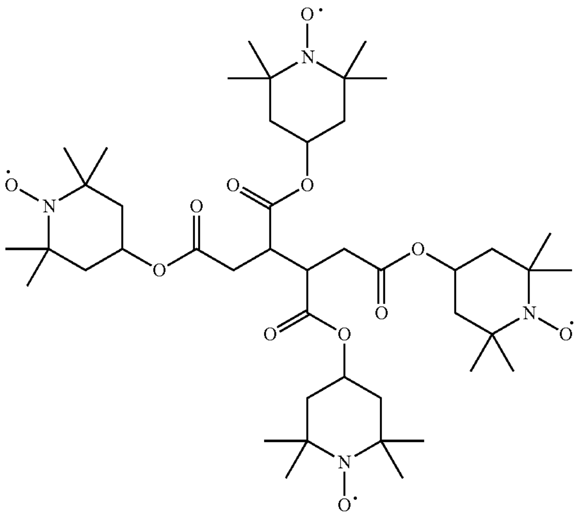

H-3-13

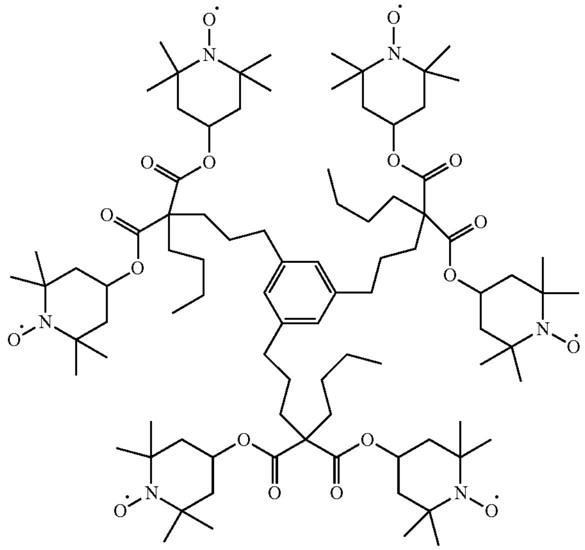

Example M25 (Inventive)

A nematic LC medium is formulated as follows:

| Composition | | | | | |
|---|---|---|---|---|---|
| Nr. | Comp. | Conc., wt.-% | Properties | | |
| 1 | BCH-32 | 3.5 | T(N, I) | = | 73.7° C. |
| 2 | CC-3-2V1 | 1.0 | Δn (20° C., 589 nm) | = | 0.1318 |
| 3 | CC-3-V | 41.25 | $n_e$ (589 nm, 20° C.) | = | 1.6272 |
| 4 | CC-3-V1 | 10.0 | $n_o$ (589 nm, 20° C.) | = | 1.4954 |
| 5 | CCP-3-1 | 5.0 | Δε (20° C., 1 kHz) | = | 2.9 |
| 6 | PGS-2-1 | 8.0 | $ε_{\|\|}$ (20° C., 1 kHz) | = | 5.5 |
| 7 | PGUQU-3-F | 4.5 | $ε_{⊥}$ (20° C., 1 kHz) | = | 2.6 |
| 8 | PGUQU-4-F | 4.5 | $γ_1$ (20° C.) | = | 52 mPa · s |
| 9 | PGUQU-5-F | 1.25 | $K_1$ (20° C.) | = | 15.5 pN |
| 10 | PP-1-2V1 | 9.5 | $K_3$ (20° C.) | = | 13.5 pN |
| 11 | PUS-3-2 | 11.5 | | | |

Mixture Example S25 (Stabilised with Compound of Formula H-3-13)

A nematic LC mixture according to the invention is formulated as follows:

| | |
|---|---|
| Mixture M25 | 99.993 wt.-% |
| Compound of Formula H-3-13 | 70 ppm |

Addition of 70 ppm of the compound of the Formula H-3-13 significantly improves the $VHR_{100}$ after UV exposure compared to the non-stabilized mixture M25, without affecting the remaining physical properties of the mixture M25.

Example M26 (Inventive)

A nematic LC medium is formulated as follows:

| Composition | | | |
|---|---|---|---|
| Nr. | Comp. | Conc., wt.-% | Properties |
| 1 | CC-3-2V1 | 8.5 | T(N, I) = 77° C. |
| 2 | CC-3-V | 32.0 | Δn (20° C., 589 nm) = 0.1270 |
| 3 | CC-3-V1 | 11.0 | $n_e$ (589 nm, 20° C.) = 1.6195 |
| 4 | CC-4-V1 | 2.0 | $n_o$ (589 nm, 20° C.) = 1.4925 |
| 5 | CCP-3-1 | 5.0 | Δε (20° C., 1 kHz) = 4.3 |
| 6 | CDUQU-3-F | 2.0 | $ε_{\|\|}$ (20° C., 1 kHz) = 7.1 |
| 7 | DGUQU-4-F | 4.0 | $ε_{⊥}$ (20° C., 1 kHz) = 2.8 |
| 8 | DPGU-4-F | 4.0 | $γ_1$ (20° C.) = 58 mPa · s |
| 9 | PGS-2-1 | 8.0 | $K_1$ (20° C.) = 17.0 pN |
| 10 | PGUQU-3-F | 5.0 | $K_3$ (20° C.) = 15.1 pN |
| 11 | PP-1-2V1 | 12.0 | |
| 12 | PUS-3-2 | 6.5 | |

Mixture Example S26 (Stabilised with Compound of Formula H-3-14)

A nematic LC mixture according to the invention is formulated as follows:

| | |
|---|---|
| Mixture M26 | 99.99 wt.-% |
| Compound of Formula H-3-14 | 100 ppm |

Addition of 100 ppm of the compound of the Formula H-3-14 significantly improves the $VHR_{100}$ after UV exposure compared to the non-stabilized mixture M26, without affecting the remaining physical properties of the mixture M26.

H-3-14

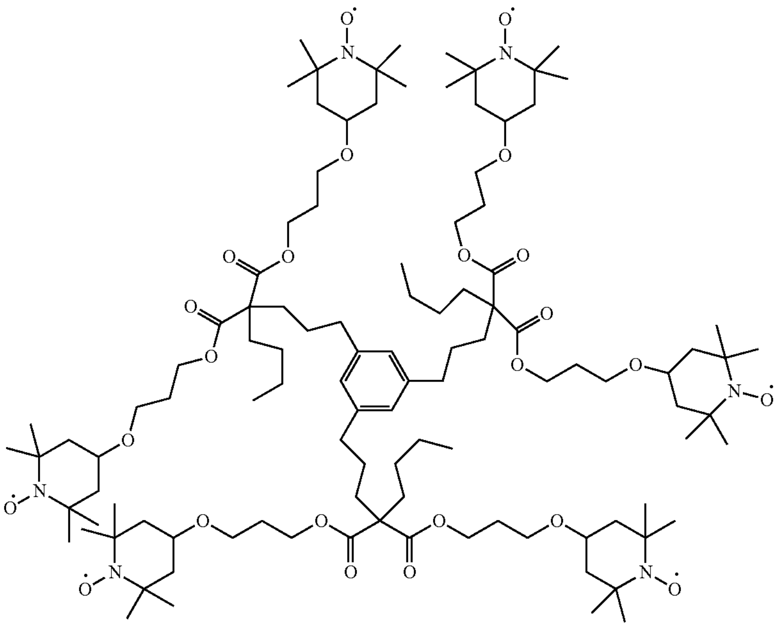

Example M27 (Inventive)

A nematic LC medium is formulated as follows:

| Composition | | | |
|---|---|---|---|
| Nr. | Comp. | Conc., wt.-% | Properties |
| 1 | CC-3-V | 35.0 | T(N, I) = 78.8° C. |
| 2 | CC-3-V1 | 11.0 | Δn (20° C., 589 nm) = 0.1289 |
| 3 | CC-3-2V1 | 5.0 | $n_e$ (589 nm, 20° C.) = 1.6229 |
| 4 | PP-1-2V1 | 10.0 | $n_o$ (589 nm, 20° C.) = 1.4940 |
| 5 | CCP-V-1 | 8.0 | Δε (20° C., 1 kHz) = 4.4 |
| 6 | PGUQU-3-F | 6.0 | $\varepsilon_{\parallel}$ (20° C., 1 kHz) = 7.1 |
| 7 | DGUQU-4-F | 4.0 | $\varepsilon_{\perp}$ (20° C., 1 kHz) = 2.8 |
| 8 | DPGU-4-F | 5.0 | $\gamma_1$ (20° C.) = 58 mPa · s |
| 9 | PUS-3-2 | 8.0 | $K_1$ (20° C.) = 16.2 pN |
| 10 | PGS-2-1 | 8.0 | $K_3$ (20° C.) = 14.7 pN |

Mixture Example S27 (Stabilised with Compound of Formula H-3-15)

A nematic LC mixture according to the invention is formulated as follows:

| | |
|---|---|
| Mixture M27 | 99.99 wt.-% |
| Compound of Formula H-3-15 | 100 ppm |

Addition of 100 ppm of the compound of the Formula H-3-15 significantly improves the $VHR_{100}$ after UV exposure compared to the non-stabilized mixture M27, without affecting the remaining physical properties of the mixture M27.

H-3-15

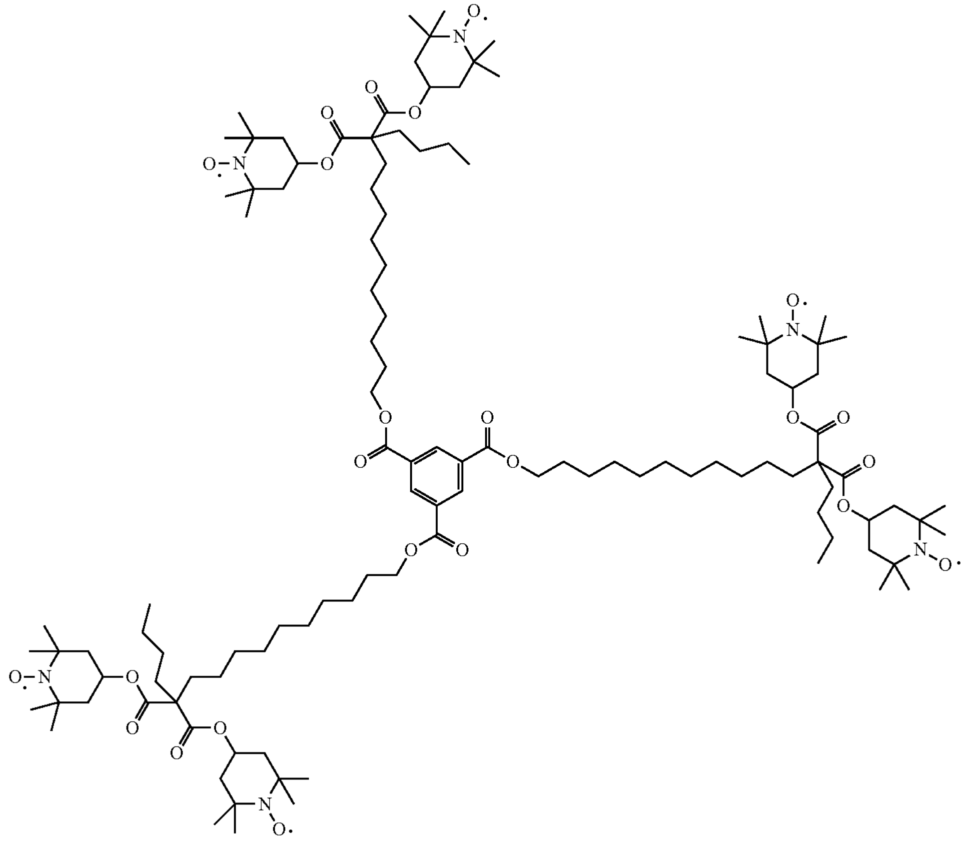

Example M28 (Inventive)

A nematic LC medium is formulated as follows:

| Composition | | | |
|---|---|---|---|
| Nr. | Comp. | Conc., wt.-% | Properties |
| 1 | CC-3-V | 42.0 | T(N, I) = 79.7° C. |
| 2 | CC-3-V1 | 10.0 | Δn (20° C., 589 nm) = 0.1215 |
| 3 | PP-1-2V1 | 8.0 | $n_e$ (589 nm, 20° C.) = 1.6161 |
| 4 | PGU-2-F | 3.0 | $n_o$ (589 nm, 20° C.) = 1.4946 |
| 5 | CCP-V-1 | 13.0 | Δε (20° C., 1 kHz) = 2.8 |
| 6 | CLY-3-O2 | 1.0 | $ε_{\|}$ (20° C., 1 kHz) = 5.5 |
| 7 | PGUQU-3-F | 2.0 | $ε_{⊥}$ (20° C., 1 kHz) = 2.7 |
| 8 | DPGU-4-F | 6.5 | $γ_1$ (20° C.) = 53 mPa · s |
| 9 | PUS-3-2 | 8.0 | $K_1$ (20° C.) = 15.8 pN |
| 10 | PGS-2-1 | 6.0 | $K_3$ (20° C.) = 14.2 pN |
| 11 | PPGU-3-F | 0.5 | |

Mixture Example S28 (Stabilised with Compound of Formula H-3-16)

A nematic LC mixture according to the invention is formulated as follows:

| | |
|---|---|
| Mixture M28 | 99.99 wt.-% |
| Compound of Formula H-3-16 | 100 ppm |

Addition of 100 ppm of the compound of the Formula H-3-16 significantly improves the $VHR_{100}$ after UV exposure compared to the non-stabilized mixture M28, without affecting the remaining physical properties of the mixture M28.

Example M29 (Inventive)

A nematic LC medium is formulated as follows:

| Composition | | | |
|---|---|---|---|
| Nr. | Comp. | Conc., wt.-% | Properties |
| 1 | CC-3-V | 41.0 | T(N, I) = 83.5° C. |
| 2 | CC-3-V1 | 8.0 | Δn (20° C., 589 nm) = 0.1224 |
| 3 | CCH-34 | 4.0 | $n_e$ (589 nm, 20° C.) = 1.6159 |
| 4 | CCP-3-1 | 5.0 | $n_o$ (589 nm, 20° C.) = 1.4935 |
| 5 | CCP-V-1 | 7.5 | Δε (20° C., 1 kHz) = 3.0 |
| 6 | CLY-3-O2 | 1.0 | $ε_{\|}$ (20° C., 1 kHz) = 5.6 |
| 7 | DPGU-4-F | 5.0 | $ε_{⊥}$ (20° C., 1 kHz) = 2.7 |
| 8 | PGS-2-1 | 8.0 | $γ_1$ (20° C.) = 56 mPa · s |
| 9 | PGUQU-3-F | 6.0 | $K_1$ (20° C.) = 16.6 pN |
| 10 | PP-1-2V1 | 6.0 | $K_3$ (20° C.) = 14.8 pN |
| 11 | PPGU-3-F | 0.5 | |
| 12 | PUS-3-2 | 8.0 | |

Mixture Example S29 (Stabilised with Compound of Formula H-3-17)

A nematic LC mixture according to the invention is formulated as follows:

| | |
|---|---|
| Mixture M29 | 99.99 wt.-% |
| Compound of Formula H-3-17 | 100 ppm |

Addition of 100 ppm of the compound of the Formula H-3-17 significantly improves the $VHR_{100}$ after UV exposure compared to the non-stabilized mixture M29, without affecting the remaining physical properties of the mixture M29.

H-3-17

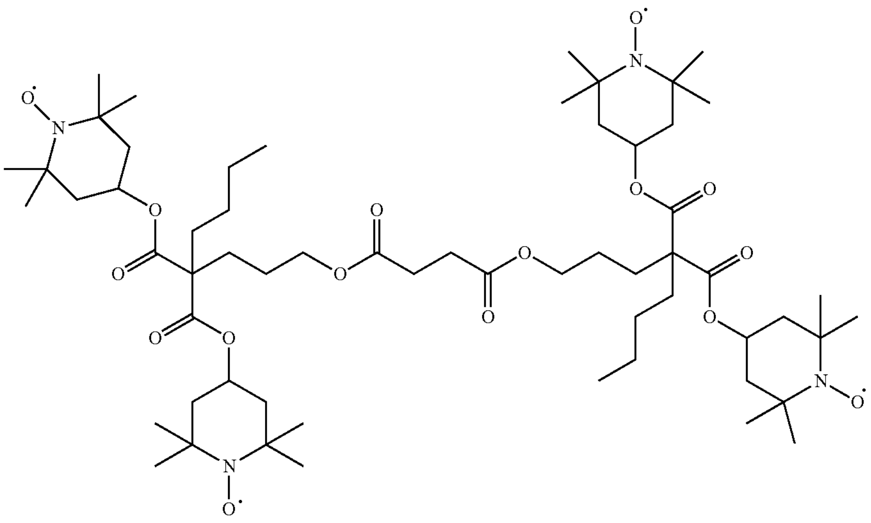

Example M30 (Inventive)

A nematic LC medium is formulated as follows:

| Composition | | | |
|---|---|---|---|
| Nr. | Comp. | Conc., wt.-% | Properties |
| 1 | CC-3-V | 35.0 | T(N, I) = 83.6° C. |
| 2 | PCH-302 | 8.0 | Δn (20° C., 589 nm) = 0.1613 |
| 3 | PP-1-2V1 | 9.0 | $n_e$ (589 nm, 20° C.) = 1.6655 |
| 4 | PGP-2-3 | 3.0 | $n_o$ (589 nm, 20° C.) = 1.5042 |
| 5 | PGP-1-2V | 3.0 | Δε (20° C., 1 kHz) = 4.7 |
| 6 | PGP-2-2V | 2.0 | $\varepsilon_{\parallel}$ (20° C., 1 kHz) = 7.8 |
| 7 | DLGU-3-F | 5.0 | $\varepsilon_{\perp}$ (20° C., 1 kHz) = 3.1 |
| 8 | DPGU-4-F | 12.0 | $\gamma_1$ (20° C.) = 76 mPa · s |
| 9 | PUS-3-2 | 15.0 | $K_1$ (20° C.) = 17.2 pN |
| 10 | PGS-2-1 | 5.0 | $K_3$ (20° C.) = 13.8 pN |
| 11 | PGP-3-2V | 3.0 | |

Mixture Example S30 (Stabilised with Compound of Formula H-3-18)

A nematic LC mixture according to the invention is formulated as follows:

| | |
|---|---|
| Mixture M30 | 99.995 wt.-% |
| Compound of Formula H-3-18 | 50 ppm |

Addition of 50 ppm of the compound of the Formula H-3-18 significantly improves the $VHR_{100}$ after UV exposure compared to the non-stabilized mixture M30, without affecting the remaining physical properties of the mixture M30.

Example M31 (Inventive)

A nematic LC medium is formulated as follows:

| Composition | | | |
|---|---|---|---|
| Nr. | Comp. | Conc., wt.-% | Properties |
| 1 | CC-3-V | 40.0 | T(N, I) = 86.1° C. |
| 2 | CC-3-V1 | 8.0 | Δn (20° C., 589 nm) = 0.1225 |
| 3 | CC-3-2V1 | 1.0 | $n_e$ (589 nm, 20° C.) = 1.6156 |
| 4 | CCH-34 | 4.0 | $n_o$ (589 nm, 20° C.) = 1.4931 |
| 5 | CCP-3-1 | 5.0 | Δε (20° C., 1 kHz) = 2.9 |
| 6 | CCP-3-3 | 1.0 | $\varepsilon_{\parallel}$ (20° C., 1 kHz) = 5.6 |
| 7 | CCP-V-1 | 6.5 | $\varepsilon_{\perp}$ (20° C., 1 kHz) = 2.7 |
| 8 | CLY-3-O2 | 1.0 | $\gamma_1$ (20° C.) = 57 mPa · s |
| 9 | DPGU-4-F | 6.0 | $K_1$ (20° C.) = 17.1 pN |
| 10 | PGS-2-1 | 8.0 | $K_3$ (20° C.) = 14.7 pN |
| 11 | PGUQU-3-F | 5.0 | |
| 12 | PP-1-2V1 | 6.0 | |
| 13 | PPGU-3-F | 0.5 | |
| 14 | PUS-3-2 | 8.0 | |

Mixture Example S31 (Stabilised with Compound of Formula H-3-19)

A nematic LC mixture according to the invention is formulated as follows:

| | |
|---|---|
| Mixture M31 | 99.995 wt.-% |
| Compound of Formula H-3-19 | 50 ppm |

Addition of 50 ppm of the compound of the Formula H-3-19 significantly improves the $VHR_{100}$ after UV exposure compared to the non-stabilized mixture M31, without affecting the remaining physical properties of the mixture M31.

H-3-19

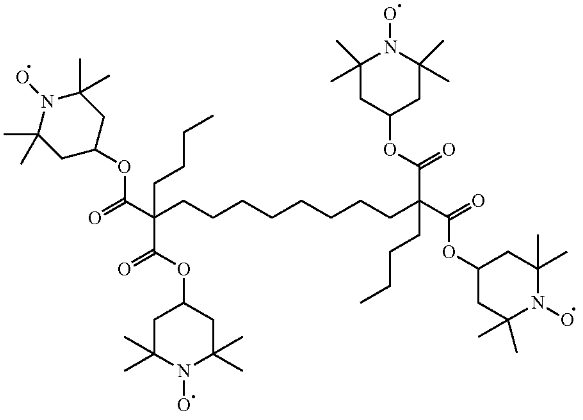

Example M32 (Inventive)

A nematic LC medium is formulated as follows:

| Composition | | | |
|---|---|---|---|
| Nr. | Comp. | Conc., wt.-% | Properties |
| 1 | CC-3-V | 44.5 | T(N, I) = 74.6° C. |
| 2 | CC-3-V1 | 10.0 | Δn (20° C., 589 nm) = 0.1364 |
| 3 | CLGIP-3-2 | 2.0 | $n_e$ (589 nm, 20° C.) = |
| 4 | DPGU-4-F | 3.0 | $n_o$ (589 nm, 20° C.) = |
| 5 | PGP-1-2V | 6.0 | Δε (20° C., 1 kHz) = 2.9 |
| 6 | PGS-2-1 | 8.0 | $ε_{\|}$ (20° C., 1 kHz) = |
| 7 | PGUQU-3-F | 4.0 | $ε_{\perp}$ (20° C., 1 kHz) = |
| 8 | PGUQU-5-F | 3.5 | $γ_1$ (20° C.) = 53.7 mPa · s |
| 9 | PP-1-2V1 | 9.5 | $K_1$ (20° C.) = 15.2 pN |
| 10 | PUS-3-2 | 9.5 | $K_3$ (20° C.) = 14 pN |

Mixture Example S32 (Stabilised with Compound of Formula ST-4-1)

A nematic LC mixture according to the invention is formulated as follows:

| | |
|---|---|
| Mixture M32 | 99.95 wt.-% |
| Compound of Formula ST-4-1 | 500 ppm |

Addition of 500 ppm of the compound of the Formula ST-4-1 significantly improves the $VHR_{100}$ after UV exposure compared to the non-stabilized mixture M32, without affecting the remaining physical properties of the mixture M32.

ST-4-1

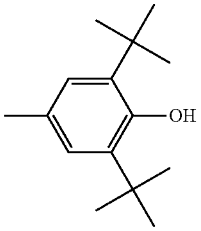

Example M33 (Inventive)

A nematic LC medium is formulated as follows:

| Composition | | | |
|---|---|---|---|
| Nr. | Comp. | Conc., wt.-% | Properties |
| 1 | B(S)-2O-O5 | 3.0 | T(N, I) = 105.2 ° C. |
| 2 | CC-3-V | 36.0 | Δn (20° C., 589 nm) = 0.1054 |
| 3 | CC-3-V1 | 6.0 | $n_e$ (589 nm, 20° C.) = 1.5931 |
| 4 | CC-4-V1 | 2.5 | $n_o$ (589 nm, 20° C.) = 1.4877 |
| 5 | CCGU-3-F | 1.5 | Δε (20° C., 1 kHz) = 4.0 |
| 6 | CCP-V-1 | 14.5 | $ε_{\|}$ (20° C., 1 kHz) = 7.3 |
| 7 | CCP-V2-1 | 5.0 | $ε_{\perp}$ (20° C., 1 kHz) = 3.3 |
| 8 | CCVC-3-V | 4.5 | $γ_1$ (20° C.) = 87 mPa · s |
| 9 | CDUQU-3-F | 7.0 | $K_1$ (20° C.) = 17.9 pN |
| 10 | CLY-3-O2 | 2.5 | $K_3$ (20° C.) = 18.3 pN |
| 11 | DGUQU-4-F | 1.5 | |
| 12 | DLGU-3-F | 3.0 | |
| 13 | DPGU-4-F | 3.5 | |
| 14 | PGS-2-1 | 3.5 | |
| 15 | PPGU-3-F | 0.5 | |
| 16 | PUS-3-2 | 4.0 | |
| 17 | PCH-302 | 1.5 | |

Mixture Example S33 (Stabilised with Compound of Formula ST-4-2)

A nematic LC mixture according to the invention is formulated as follows:

| | |
|---|---|
| Mixture M33 | 99.92 wt. - % |
| Compound of Formula ST-4-2 | 800 ppm |

Addition of 800 ppm of the compound of the Formula ST-4-2 significantly improves the $VHR_{100}$ after UV exposure compared to the non-stabilized mixture M33, without affecting the remaining physical properties of the mixture M33.

ST-4-2

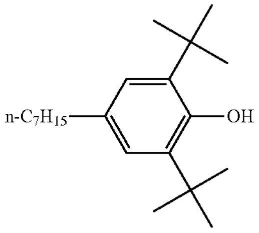

Example M34 (Inventive)

A nematic LC medium is formulated as follows:

| Composition | | | |
|---|---|---|---|
| Nr. | Comp. | Conc., wt. - % | Properties |
| 1 | B(S)-2O-O5 | 3.0 | T(N, I) = 103.2° C. |
| 2 | CC-3-V | 36.0 | Δn (20° C., 589 nm) = 0.1042 |
| 3 | CC-3-V1 | 6.0 | $n_e$ (589 nm, 20° C.) = |
| 4 | CC-4-V1 | 2.5 | $n_o$ (589 nm, 20° C.) = |
| 5 | CCGU-3-F | 1.5 | Δε (20° C., 1 kHz) = 3.8 |
| 6 | CCP-V-1 | 14.5 | $\varepsilon_{\parallel}$ (20° C., 1 kHz) = |
| 7 | CCP-V2-1 | 5.0 | $\varepsilon_{\perp}$ (20° C., 1 kHz) = |
| 8 | CCVC-3-V | 4.5 | $\gamma_1$ (20° C.) = 88.3 mPa · s |
| 9 | CDUQU-3-F | 7.0 | $K_1$ (20° C.) = 17.6 pN |
| 10 | CLOY-3-O2 | 2.5 | $K_3$ (20° C.) = 18.2 pN |
| 11 | DGUQU-4-F | 1.5 | |
| 12 | DLGU-3-F | 3.0 | |
| 13 | DPGU-4-F | 3.5 | |
| 14 | PGS-2-1 | 3.5 | |
| 15 | PPGU-3-F | 0.5 | |
| 16 | PUS-3-2 | 4.0 | |
| 17 | PCH-302 | 1.5 | |

Mixture Example S34 (Stabilised with Compound of Formula H-3-20)

A nematic LC mixture according to the invention is formulated as follows:

| Mixture M34 | 99.995 wt. - % |
|---|---|
| Compound of Formula H-3-20 | 50 ppm |

Addition of 50 ppm of the compound of the Formula H-3-20 significantly improves the $VHR_{100}$ after UV exposure compared to the non-stabilized mixture M34, without affecting the remaining physical properties of the mixture M34.

Example M35 (Inventive)

A nematic LC medium is formulated as follows:

| Composition | | | |
|---|---|---|---|
| Nr. | Comp. | Conc., wt. - % | Properties |
| 1 | CC-3-V1 | 6.0 | T(N, I) = 105° C. |
| 2 | CC-4-V1 | 2.5 | Δn (20° C., 589 nm) = 0.1047 |
| 3 | CCGU-3-F | 1.5 | $n_e$ (589 nm, 20° C.) = |
| 4 | CCP-V-1 | 14.5 | $n_o$ (589 nm, 20° C.) = |
| 5 | CCP-V2-1 | 5.0 | Δε (20° C., 1 kHz) = 3.87 |
| 6 | CCVC-3-V | 4.5 | $\varepsilon_{\parallel}$ (20° C., 1 kHz) = |
| 7 | CDUQU-3-F | 7.0 | $\varepsilon_{\perp}$ (20° C., 1 kHz) = |
| 8 | CCOY-3-O2 | 2.5 | $\gamma_1$ (20° C.) = 88.2 mPa · s |
| 9 | DGUQU-4-F | 1.5 | $K_1$ (20° C.) = 17.7 pN |
| 10 | DLGU-3-F | 3.0 | $K_3$ (20° C.) = 18.4 pN |
| 11 | DPGU-4-F | 3.5 | |
| 12 | PGS-2-1 | 3.5 | |
| 13 | PPGU-3-F | 0.5 | |
| 14 | PUS-3-2 | 4.0 | |
| 15 | PCH-302 | 1.5 | |

Mixture Example S35 (Stabilised with Compound of Formula H-3-21)

A nematic LC mixture according to the invention is formulated as follows:

| Mixture M35 | 99.995 wt. - % |
|---|---|
| Compound of Formula H-3-21 | 50 ppm |

Addition of 50 ppm of the compound of the Formula H-3-21 significantly improves the $VHR_{100}$ after UV exposure compared to the non-stabilized mixture M35, without affecting the remaining physical properties of the mixture M35.

H-3-20

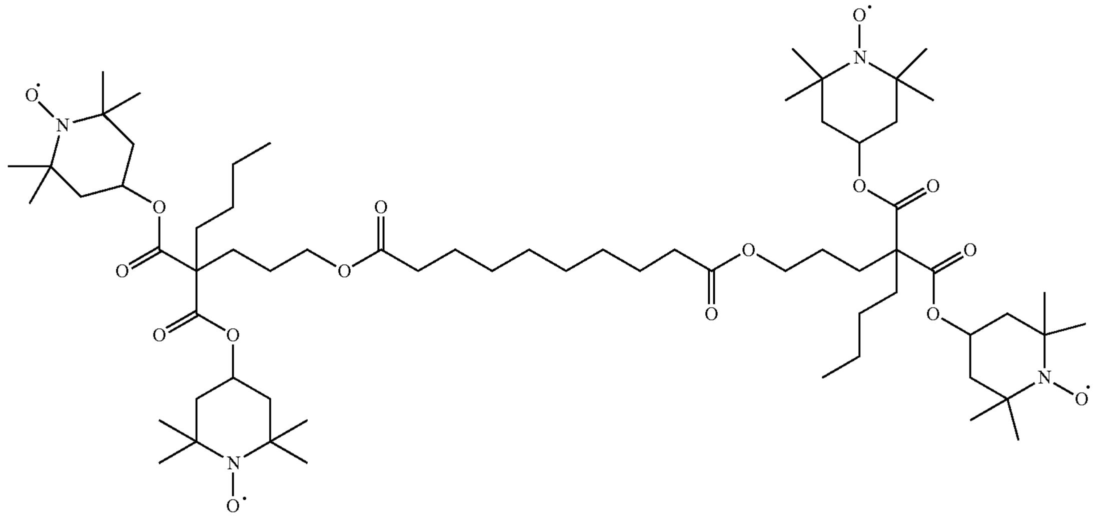

H-3-21

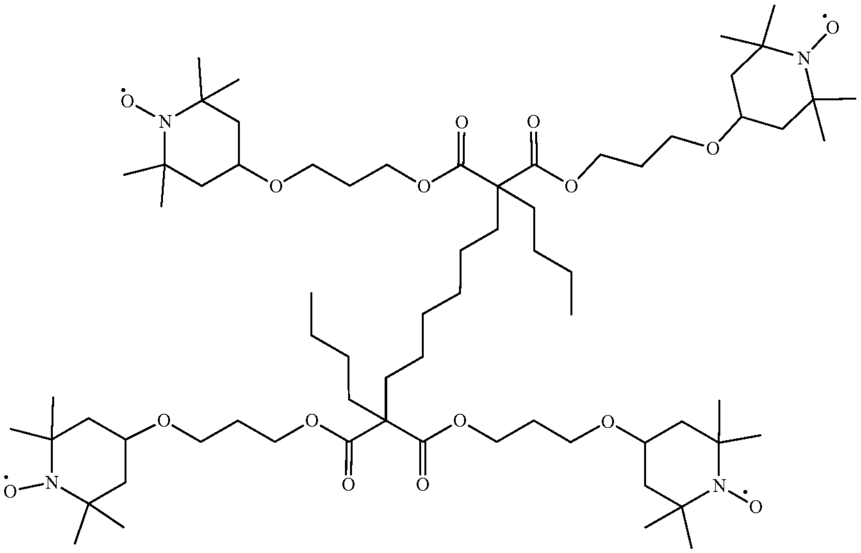

Example M36 (Inventive)

A nematic LC medium is formulated as follows:

| Composition | | | |
|---|---|---|---|
| Nr. | Comp. | Conc., wt. - % | Properties |
| 1 | B(S)-2O-O5 | 3.0 | T(N, I) = 105° C. |
| 2 | CC-3-V | 36.0 | Δn (20° C., 589 nm) = 0.1047 |
| 3 | CC-3-V1 | 6.0 | $n_e$ (589 nm, 20° C.) = |
| 4 | CC-4-V1 | 2.5 | $n_o$ (589 nm, 20° C.) = |
| 5 | CCGU-3-F | 1.5 | Δε (20° C., 1 kHz) = 3.94 |
| 6 | CCP-V-1 | 14.5 | $\varepsilon_{\|\|}$ (20° C., 1 kHz) = |
| 7 | CCP-V2-1 | 5.0 | $\varepsilon_{\perp}$ (20° C., 1 kHz) = |
| 8 | CCVC-3-V | 4.5 | $\gamma_1$ (20° C.) = 87.7 mPa · s |
| 9 | CDUQU-3-F | 7.0 | $K_1$ (20° C.) = 17.8 pN |
| 10 | CCEY-3-O2 | 2.5 | $K_3$ (20° C.) = 18.4 pN |
| 11 | DGUQU-4-F | 1.5 | |
| 12 | DLGU-3-F | 3.0 | |
| 13 | DPGU-4-F | 3.5 | |
| 14 | PGS-2-1 | 3.5 | |
| 15 | PPGU-3-F | 0.5 | |
| 16 | PUS-3-2 | 4.0 | |
| 17 | PCH-302 | 1.5 | |

Mixture Example S36 (Stabilised with Compounds of Formulae H-3-1 and ST-4-2)

A nematic LC mixture according to the invention is formulated as follows:

| Mixture M36 | 99.87 wt. - % |
|---|---|
| Compound of Formula H-3-1 | 800 ppm |
| Compound of Formula ST-4-2 | 500 ppm |

Addition of compounds of Formulae H-3-1 and ST-2-3 significantly improves the $VHR_{100}$ after UV exposure compared to the non-stabilized mixture M36, without affecting the remaining physical properties of the mixture.

Example M37 (Inventive)

A nematic LC medium is formulated as follows:

| Composition | | | |
|---|---|---|---|
| Nr. | Comp. | Conc., wt. - % | Properties |
| 1 | B(P)-2O-O4 | 3.0 | T(N, I) = 106° C. |
| 2 | CC-3-V | 36.0 | Δn (20° C., 589 nm) = 0.1062 |
| 3 | CC-3-V1 | 6.0 | $n_e$ (589 nm, 20° C.) = |
| 4 | CC-4-V1 | 2.5 | $n_o$ (589 nm, 20° C.) = |
| 5 | CCGU-3-F | 1.5 | Δε (20° C., 1 kHz) = 3.89 |
| 6 | CCP-V-1 | 14.5 | $\varepsilon_{\|\|}$ (20° C., 1 kHz) = |
| 7 | CCP-V2-1 | 5.0 | $\varepsilon_{\perp}$ (20° C., 1 kHz) = |
| 8 | CCVC-3-V | 4.5 | $\gamma_1$ (20° C.) = 87.8 mPa · s |
| 9 | CDUQU-3-F | 7.0 | $K_1$ (20° C.) = 17.7 pN |
| 10 | CLY-3-O2 | 2.5 | $K_3$ (20° C.) = 18.3 pN |
| 11 | DGUQU-4-F | 1.5 | |
| 12 | DLGU-3-F | 3.0 | |
| 13 | DPGU-4-F | 3.5 | |
| 14 | PGS-2-1 | 3.5 | |
| 15 | PPGU-3-F | 0.5 | |
| 16 | PUS-3-2 | 4.0 | |
| 17 | PCH-302 | 1.5 | |

B(P)-2O-O4

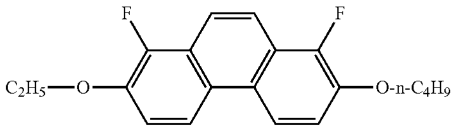

Mixture Example S37 (Stabilised with Compounds of Formulae H-3-2 and ST-4-2)

A nematic LC mixture according to the invention is formulated as follows:

| Mixture M37 | 99.934 wt. - % |
|---|---|
| Compound of Formula H-3-2 | 60 ppm |
| Compound of Formula ST-4-2 | 600 ppm |

Addition of compounds of Formulae H-3-2 and ST-4-2 significantly improves the $VHR_{100}$ after UV exposure compared to the non-stabilized mixture M37, without affecting the remaining physical properties of the mixture.

Example M38 (Inventive)

A nematic LC medium is formulated as follows:

| Nr. | Comp. | Conc., wt. - % | Properties |
|---|---|---|---|
| 1 | B(S)-4O-O1(c5) | 3.0 | T(N, I) = 104.8° C. |
| 2 | CC-3-V | 36.0 | Δn (20° C., 589 nm) = 0.1046 |
| 3 | CC-3-V1 | 6.0 | $n_e$ (589 nm, 20° C.) = |
| 4 | CC-4-V1 | 2.5 | $n_o$ (589 nm, 20° C.) = |
| 5 | CCGU-3-F | 1.5 | Δε (20° C., 1 kHz) = 3.81 |
| 6 | CCP-V-1 | 14.5 | $\varepsilon_{\parallel}$ (20° C., 1 kHz) = |
| 7 | CCP-V2-1 | 5.0 | $\varepsilon_{\perp}$ (20° C., 1 kHz) = |
| 8 | CCVC-3-V | 4.5 | $\gamma_1$ (20° C.) = 88 mPa · s |
| 9 | CDUQU-3-F | 7.0 | $K_1$ (20° C.) = 17.4 pN |
| 10 | CLY-3-O2 | 2.5 | $K_3$ (20° C.) = 18.0 pN |
| 11 | DGUQU-4-F | 1.5 | |
| 12 | DLGU-3-F | 3.0 | |
| 13 | DPGU-4-F | 3.5 | |
| 14 | PGS-2-1 | 3.5 | |
| 15 | PPGU-3-F | 0.5 | |
| 16 | PUS-3-2 | 4.0 | |
| 17 | PCH-302 | 1.5 | |

B(S)-4O-O1(c5)

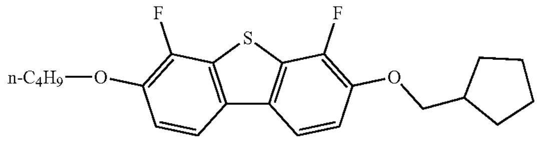

Mixture Example S38 (Stabilised with Compounds of Formulae H-3-1 and ST-2-3)

A nematic LC mixture according to the invention is formulated as follows:

| Mixture M38 | 99.89 wt. - % |
|---|---|
| Compound of Formula H-3-1 | 800 ppm |
| Compound of Formula ST-2-3 | 300 ppm |

Addition of compounds of Formulae H-3-1 and ST-2-3 significantly improves the $VHR_{100}$ after UV exposure compared to the non-stabilized mixture M38, without affecting the remaining physical properties of the mixture.

Example M39 (Inventive)

A nematic LC medium is formulated as follows:

| Nr. | Comp. | Conc., wt. - % | Properties |
|---|---|---|---|
| 1 | B(S)-2O-O1(c5) | 3.0 | T(N, I) = 104.8° C. |
| 2 | CC-3-V | 36.0 | Δn (20° C., 589 nm) = 0.1046 |
| 3 | CC-3-V1 | 6.0 | $n_e$ (589 nm, 20° C.) = |
| 4 | CC-4-V1 | 2.5 | $n_o$ (589 nm, 20° C.) = |
| 5 | CCGU-3-F | 1.5 | Δε (20° C., 1 kHz) = 3.81 |
| 6 | CCP-V-1 | 14.5 | $\varepsilon_{\parallel}$ (20° C., 1 kHz) = |
| 7 | CCP-V2-1 | 5.0 | $\varepsilon_{\perp}$ (20° C., 1 kHz) = |
| 8 | CCVC-3-V | 4.5 | $\gamma_1$ (20° C.) = 88 mPa · s |
| 9 | CDUQU-3-F | 7.0 | $K_1$ (20° C.) = 17.4 pN |
| 10 | CLY-3-O2 | 2.5 | $K_3$ (20° C.) = 18.0 pN |
| 11 | DGUQU-4-F | 1.5 | |
| 12 | DLGU-3-F | 3.0 | |
| 13 | DPGU-4-F | 3.5 | |
| 14 | PGS-2-1 | 3.5 | |
| 15 | PPGU-3-F | 0.5 | |
| 16 | PUS-3-2 | 4.0 | |
| 17 | PCH-302 | 1.5 | |

B(S)-2O-O1(c5)

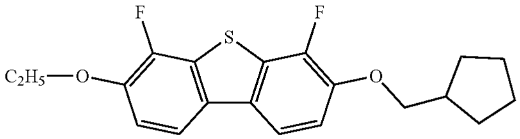

Mixture Example S39 (Stabilised with Compounds of Formulae H-3-4 and ST-2-3)

A nematic LC mixture according to the invention is formulated as follows:

| Mixture M39 | 99.972 wt. - % |
|---|---|
| Compound of Formula H-3-4 | 80 ppm |
| Compound of Formula ST-2-3 | 200 ppm |

Addition of compounds of Formulae H-3-4 and ST-2-3 significantly improves the $VHR_{100}$ after UV exposure compared to the non-stabilized mixture M39, without affecting the remaining physical properties of the mixture.

Base Mixture M40

A nematic LC mixture is formulated as follows:

| Nr. | Compound | Concentration, wt. - % | Properties |
|---|---|---|---|
| 1 | CC-3-2V1 | 4 | T(N, I) = 85.5° C. |
| 2 | CC-3-V | 34.5 | $n_e$ [589 nm, 20° C.]: = 1.6291 |
| 3 | CC-3-V1 | 8 | $n_o$ [589 nm, 20° C.]: = 1.4939 |
| 4 | CPP-3-2V1 | 3.5 | Δn [589 nm, 20° C.]: = 0.1352 |
| 5 | CLP-3-T | 7 | $\varepsilon_{\parallel}$ [1 kHz, 20° C.]: = 6.5 |
| 6 | CLP-V-1 | 7 | $\varepsilon_{\perp}$ [1 kHz, 20° C.]: = 2.6 |
| 7 | PGP-1-2V | 4 | Δε [1 kHz, 20° C.]: = 3.8 |
| 8 | PGUQU-3-F | 4 | $\gamma_1$ [mPa s, 20° C.]: = 67 |
| 9 | PGUQU-4-F | 3 | $K_1$ [pN, 20° C.]: = 19.9 |

-continued

| Composition | | | |
|---|---|---|---|
| Nr. | Compound | Concentration, wt. - % | Properties |
| 10 | PGUQU-5-F | 3 | $K_3$ [pN, 20° C.]: = 17.3 |
| 11 | PP-1-2V1 | 10 | |
| 12 | PPGU-3-F | 0.5 | |
| 13 | PGS-3-F | 3.5 | |
| 14 | PUS-3-2 | 8 | |

Mixture Example S40 (Stabilised with Compounds of Formulae H-3-1 and ST-1-3)

A nematic LC mixture according to the invention is formulated as follows:

| Mixture M40 | 99.89 wt. - % |
|---|---|
| Compound of Formula H-3-1 | 800 ppm |
| Compound of Formula ST-1-3 | 300 ppm |

Addition of compounds of Formulae H-3-1 and ST-1-3 significantly improves the $VHR_{100}$ after UV exposure compared to the non-stabilized mixture M40, without affecting the remaining physical properties of the mixture.

The invention claimed is:

1. A liquid-crystalline medium having a positive dielectric anisotropy, comprising one or more compounds of Formula G

G

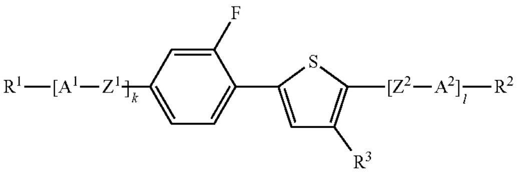

and one or more compounds of Formula U

U

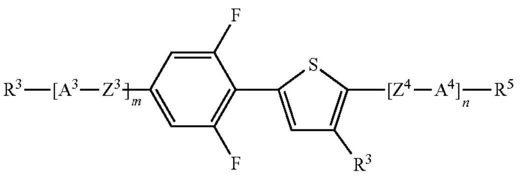

in which the individual substituents have the following meanings:

$R^1$, $R^2$, each, independently of one another, denote a H atom, $R^4$ and $R^5$ an alkyl or an alkoxy group having 1 to 12 C atoms or an alkenyl or an alkenyloxy group having 2 to 12 C atoms in which one or more non-adjacent $CH_2$ groups are optionally substituted by —C≡C—, —$CF_2O$—, —$OCF_2$—, —CH═CH—,

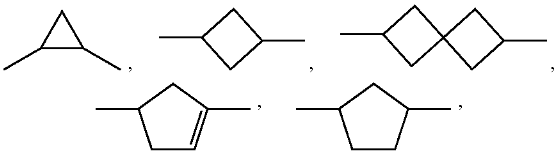

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms;

$R^3$ and $R^6$ each, independently of one another, denote a H atom, an alkyl group having 1 to 3 C atoms or an alkenyl group having 2 to 3 C atoms in which one or more non-adjacent $CH_2$ groups are optionally substituted by —C≡C—, —$CF_2O$—, —$OCF_2$—, —CH═CH—, —O—, —CO—O— or —O—CO— in such a way that O atoms are not linked directly to one another;

$A^1$ to $A^4$ each, independently of one another, denote phenylene-1,4-diyl, in which, in addition, one or two CH groups may be replaced by N and one or more H atoms may be replaced by halogen, CN, $CH_3$, $CHF_2$, $CH_2F$, $CF_3$, $OCH_3$, $OCHF_2$ or $OCF_3$, cyclohexane-1,4-diyl, in which, in addition, one or two non-adjacent $CH_2$ groups may be replaced, independently of one another, by O and/or S and one or more H atoms may be replaced by F, cyclohexene-1,4-diyl, bicyclo[1.1.1]pentane-1,3-diyl, bicyclo[2.2.2]octane-1,4-diyl, spiro-[3.3]heptane-2,6-diyl, tetrahydropyran-2,5-diyl or 1,3-dioxane-2,5-diyl;

$Z^1$ to $Z^4$ each, independently of one another, denote —$CF_2O$—, —$OCF_2$—, —$CH_2O$—, —$OCH_2$—, —CO—O—, —O—CO—, —$C_2H_4$—, —$C_2F_4$—, —$CF_2CH_2$—, —$CH_2CF_2$—, —CFHCFH—, —$CFHCH_2$—, —$CH_2CFH$—, —$CF_2CFH$—, —$CFHCF_2$—, —CH═CH—, —CF═CH—, —CH═CF—, —CF═CF—, —C≡C— or a single bond; and k, l, m, n each, independently of one another, denote 0, 1, 2 or 3; and one or more compounds selected from the group consisting of the following formulae:

II

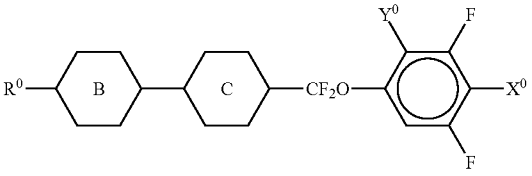

III

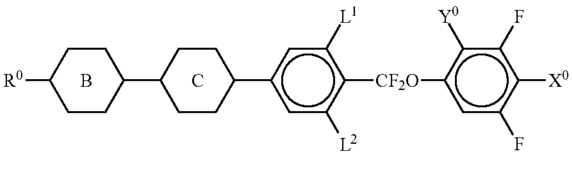

in which the individual substituents have the following meanings:

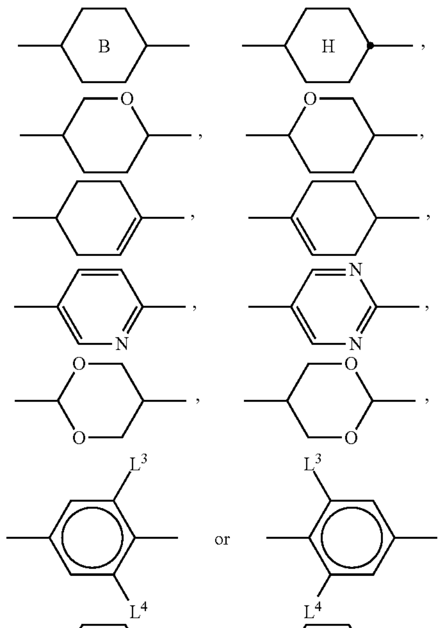

or

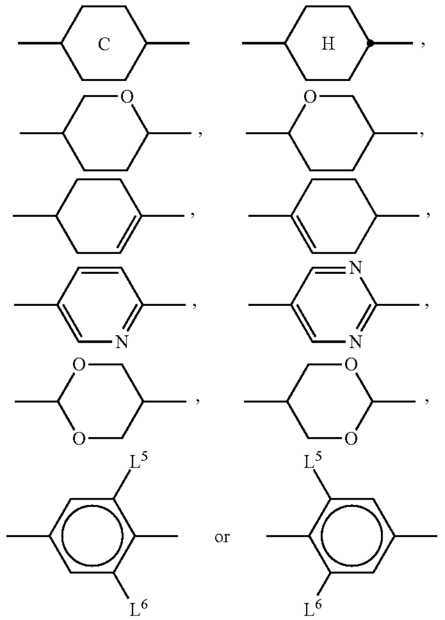

or in which the individual substituents have the following meanings:

$R^0$ denotes a H atom, a halogen atom, —CN, —SCN, —NCS, an alkyl of an alkoxy group having 1 to 12 C atoms or an alkenyl or an alkenyloxy group having 2 to 12 C atoms in which one or more non-adjacent $CH_2$ groups are optionally substituted by —C≡C—, —$CF_2O$—, —$OCF_2$—, —CH═CH—,

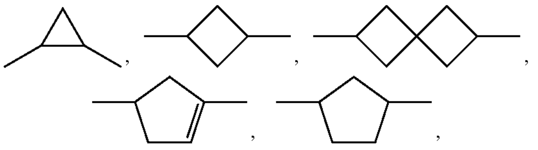

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms, in which one or more H atoms may be replaced by a halogen atom;

$X^0$ denotes F, Cl, a halogenated alkyl group, a halogenated alkenyl group, a halogenated alkoxy group or a halogenated alkenyloxy group having up to 6 C atoms;

$L^1$ to $L^6$ each, independently of one another, denote H, F or Cl; and $Y^0$ each, independently of one another, denote H or $CH_3$.

2. The medium according to claim 1, wherein in the Formulae G and U $A^1$ and $A^3$ each, independently of one another, denote phenylene-1,4-diyl, cyclohexane-1,4-diyl, cyclohexene-1,4-diyl, tetrahydropyran-2,5-diyl or 1,3-dioxane-2,5-diyl;

$Z^1$ and $Z^3$ each, independently of one another, denote a single bond k and m each, independently of one another, denote 1; and l and n each, independently of one another, denote 0.

3. The medium according to claim 1, wherein the compounds of Formula G are selected from the group consisting of the following compounds:

G-1

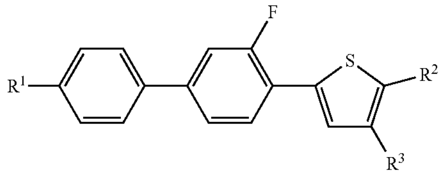

G-2

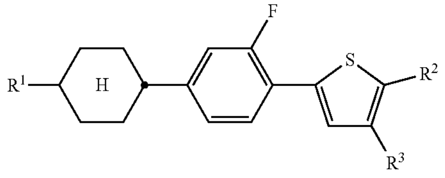

G-3

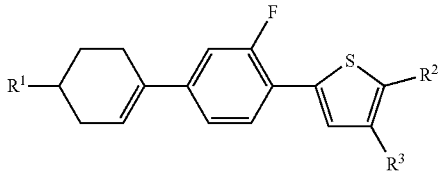

G-4

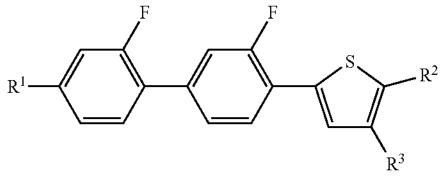

G-5

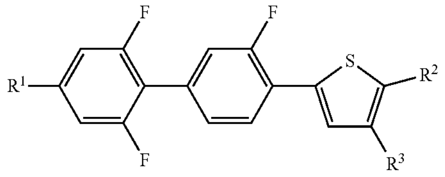

-continued
G-6
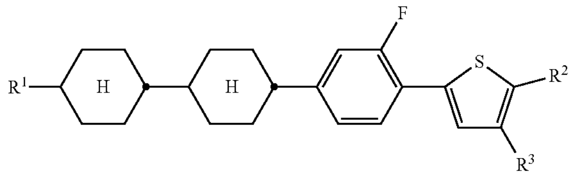
G-7
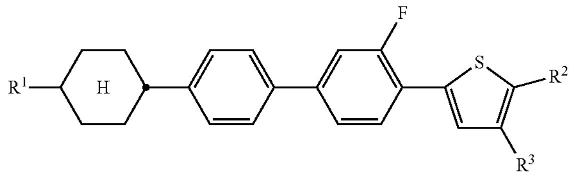
G-8
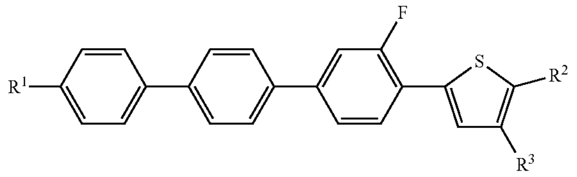
G-9
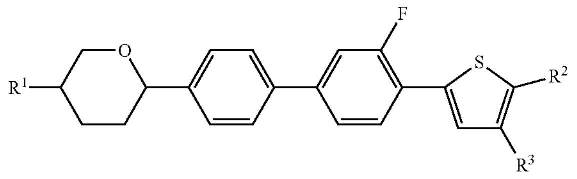
G-10
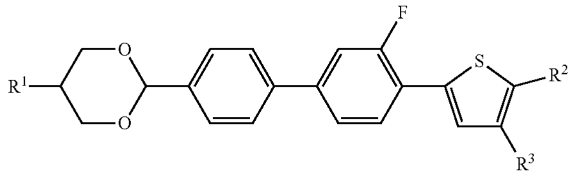
G-11
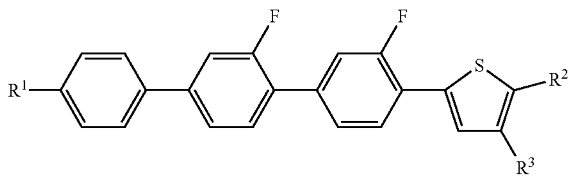
G-11
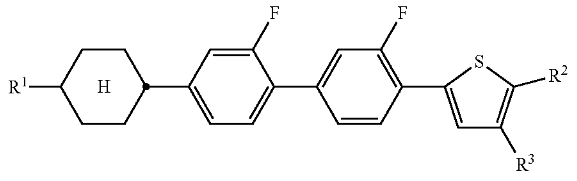
and the compounds of Formula U are selected from the group consisting of the following compounds:
U-1
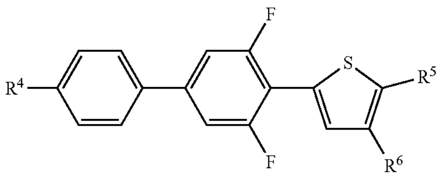
U-2
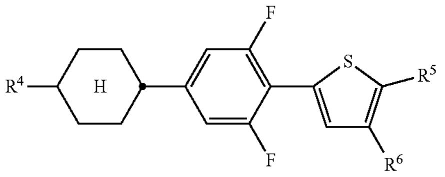
U-3
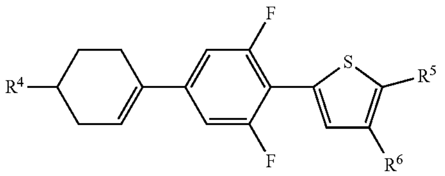
U-4
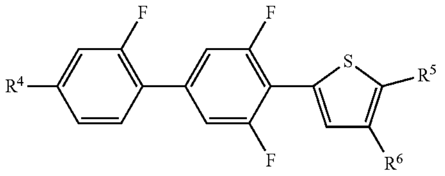
U-5
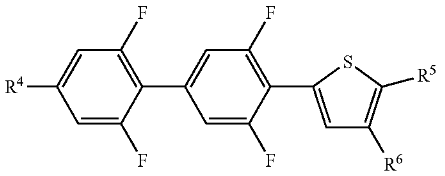
U-6
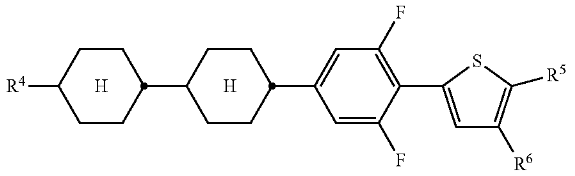
U-7
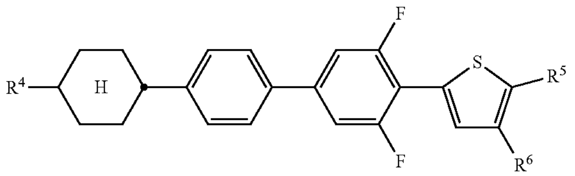
U-8
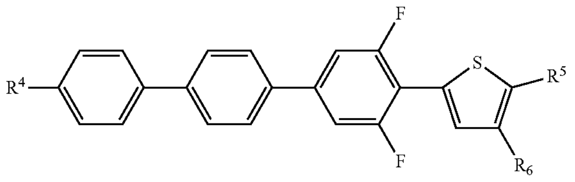

-continued

U-9

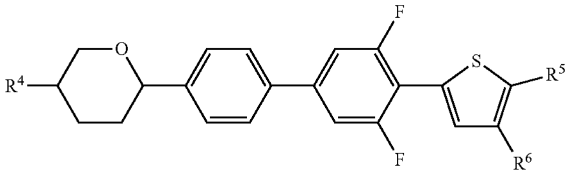

U-10

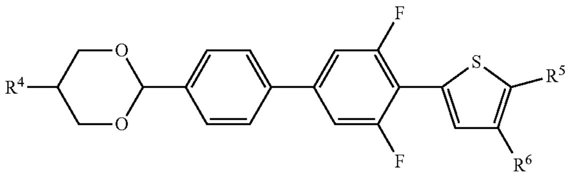

U-11

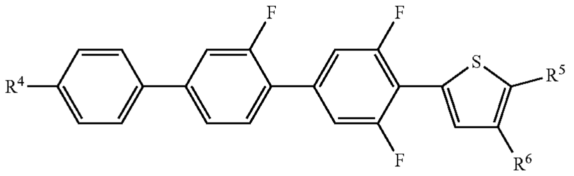

U-12

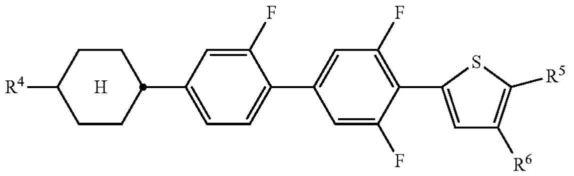

in which the individual substituents have the following meanings:

$R^1$, $R^2$, each, independently of one another, denote a H atom, $R^4$ and $R^5$, an alkyl or an alkoxy group having 1 to 12 C atoms or an alkenyl or an alkenyloxy group having 2 to 12 C atoms in which one or more non-adjacent $CH_2$ groups are optionally substituted by —C≡C—, —$CF_2O$—, —$OCF_2$—, —CH═CH—,

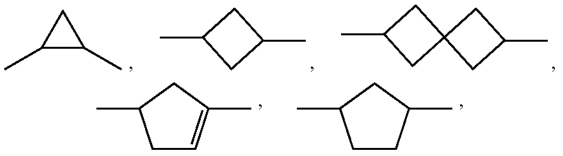

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms;

$R^3$ and $R^6$ each, independently of one another, denote a H atom, an alkyl group having 1 to 3 C atoms or an alkenyl group having 2 to 3 C atoms in which one or more non-adjacent $CH_2$ groups are optionally substituted by —C≡C—, —$CF_2O$—, —$OCF_2$—, —CH═CH—, —O—, —CO—O— or —O—CO— in such a way that O atoms are not linked directly to one another.

4. The medium according to claim 1, wherein the one or more compounds of Formula II are selected from the following subformulae:

II-1

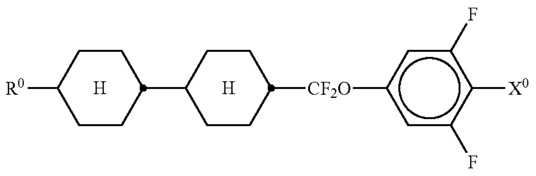

II-2

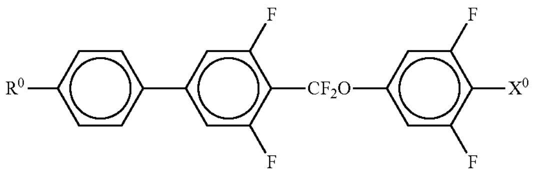

II-3

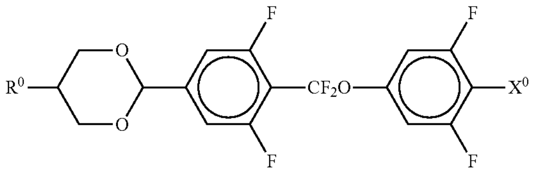

II-4

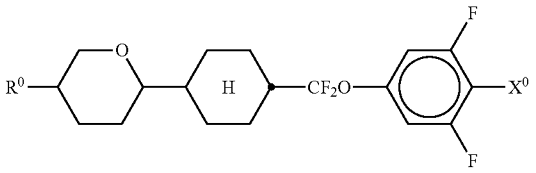

II-5

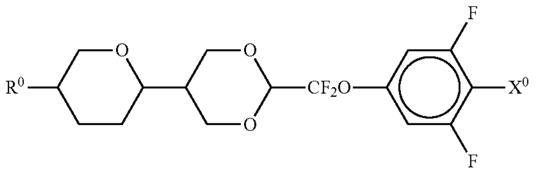

II-6

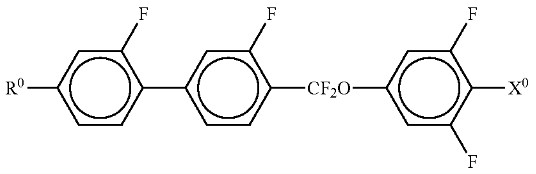

II-7

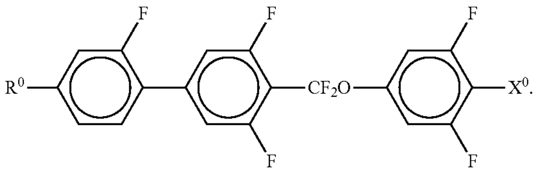

in which the individual substituents have the following meanings:

$R^0$ denotes a H atom, a halogen atom, —CN, —SCN, —NCS, an alkyl or an alkoxy group having 1 to 12 C atoms or an alkenyl or an alkenyloxy group having 2 to 12 C atoms in which one or more non-adjacent $CH_2$ groups are optionally substituted by —C≡C—, —$CF_2O$—, —$OCF_2$—, —CH═CH—,

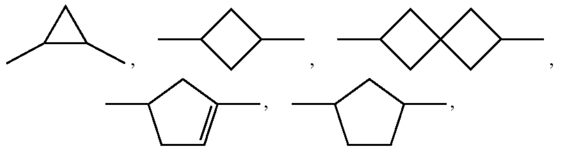

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms, in which one or more H atoms may be replaced by a halogen atom;

$X^0$ denotes F, Cl, a halogenated alkyl group, a halogenated alkenyl group, a halogenated alkoxy group or a halogenated alkenyloxy group having up to 6 C atoms.

5. The medium according to claim 1, wherein the one or more compounds of Formula III are selected from the following subformulae:

III-1

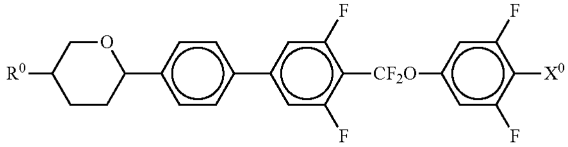

III-2

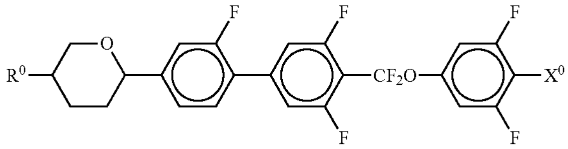

III-3

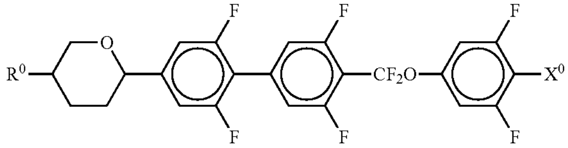

III-4

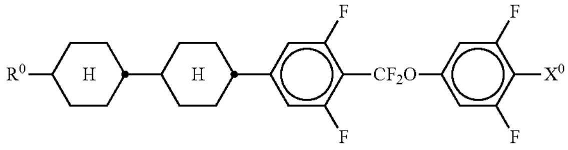

III-5

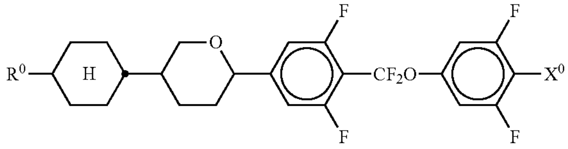

III-6

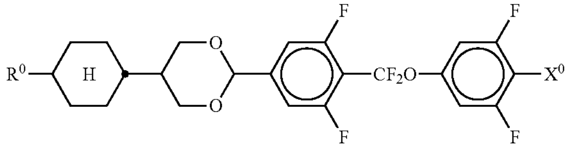

-continued

III-7

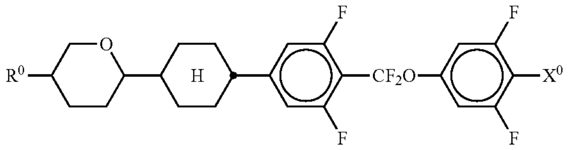

III-8

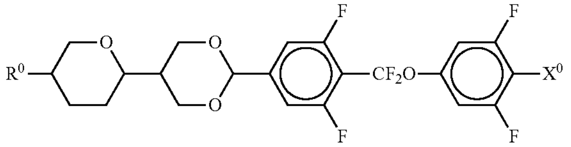

III-9

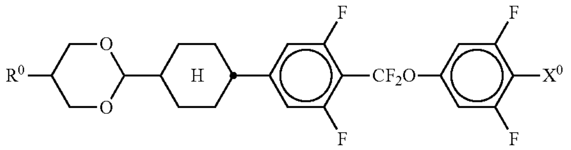

III-10

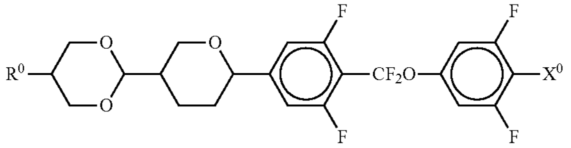

III-11

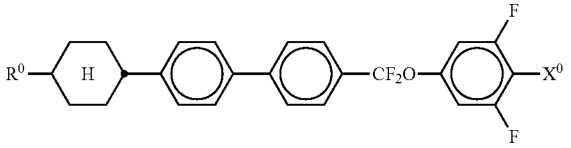

III-12

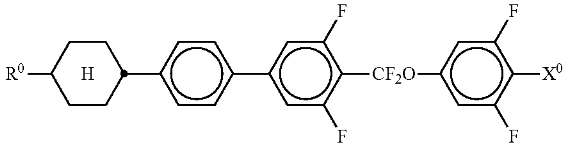

III-13

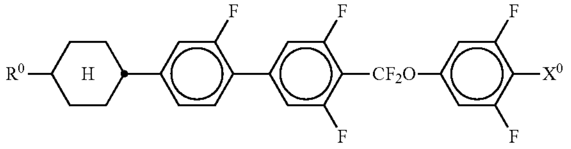

III-14

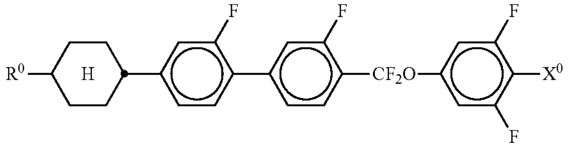

III-15

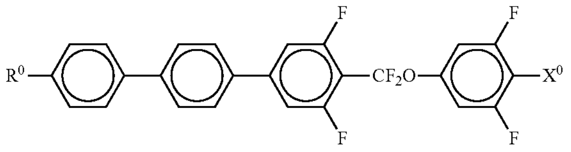

-continued

III-16

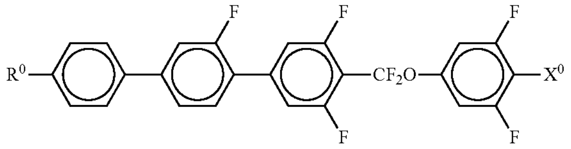

III-17

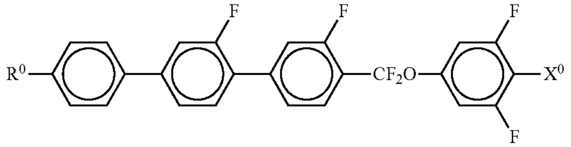

III-18

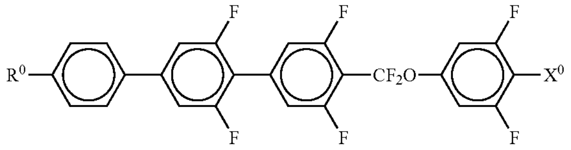

III-19

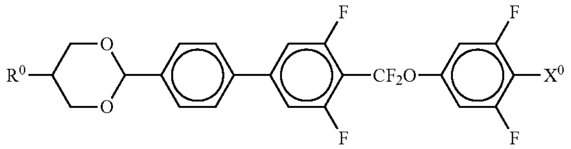

III-20

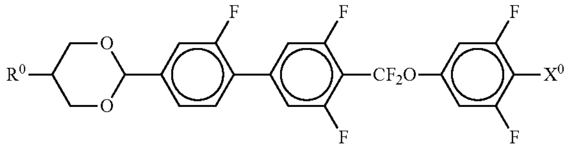

III-21

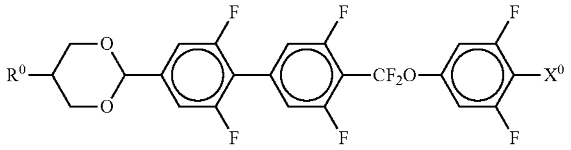

III-22

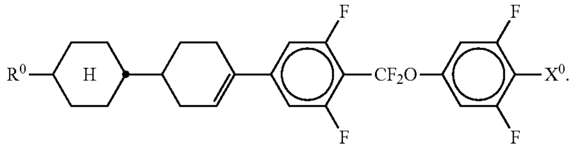

in which the individual substituents have the following meanings:

$R^0$ denotes a H atom, a halogen atom, —CN, —SCN, —NCS, an alkyl or an alkoxy group having 1 to 12 C atoms or an alkenyl or an alkenyloxy group having 2 to 12 C atoms in which one or more non-adjacent $CH_2$ groups are optionally substituted by —C≡C—, —$CF_2O$—, —$OCF_2$—, —CH═CH—,

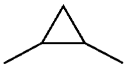, 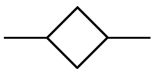, 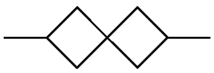,

-continued

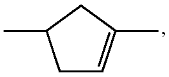, 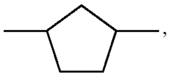,

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms, in which one or more H atoms may be replaced by a halogen atom;

$X^0$ denotes F, Cl, a halogenated alkyl group, a halogenated alkenyl group, a halogenated alkoxy group or a halogenated alkenyloxy group having up to 6 C atoms.

6. The medium according to claim 1, further comprising one or more compounds selected from the group consisting of the following formulae:

IV

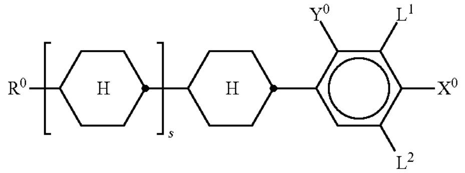

V

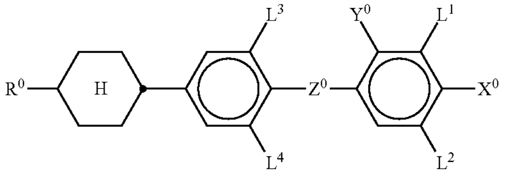

VI

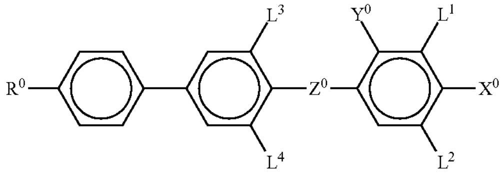

VII

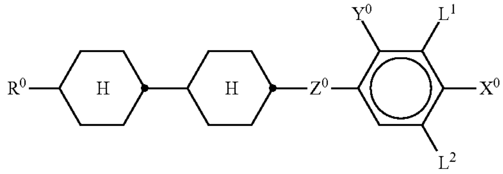

VIII

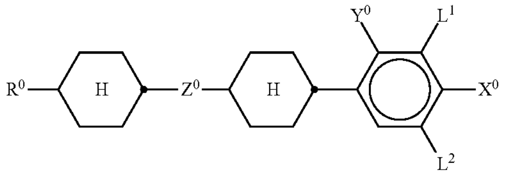

in which:

$R^0$ denotes a H atom, a halogen atom, —CN, —SCN, —NCS, an alkyl or an alkoxy group having 1 to 12 C atoms or an alkenyl or an alkenyloxy group having 2 to 12 C atoms in which one or more non-adjacent $CH_2$ groups are optionally substituted by —C≡C—, —$CF_2O$—, —$OCF_2$—, —CH═CH—,

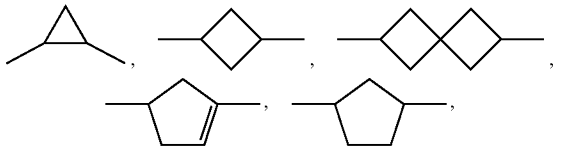

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms, in which one or more H atoms may be replaced by a halogen atom;

$X^0$ denotes F, Cl, a halogenated alkyl group, a halogenated alkenyl group, a halogenated alkoxy group or a halogenated alkenyloxy group having up to 6 C atoms;

$L^1$ to $L^6$ each, independently of one another, denote H, F or Cl; and $Y^0$ each, independently of one another, denote H or $CH_3$ $L^3$ and $L^4$ each, independently of one another, have the meanings given for $L^1$:

$Z^0$ denotes $—C_2H_4—$, $—(CH_2)_4—$, —CH═CH—, —CF═CF—, $—C_2F_4—$, $—CH_2CF_2—$, $—CF_2CH_2—$, $—CH_2O—$, $—OCH_2—$, —COO—, $—CF_2O—$, or $—OCF_2—$, in the Formulae V and VI also a single bond; and S denotes 0 or 1.

7. The medium according to claim 1, further comprising one or more compounds selected from group consisting of the following formulae:

Z1

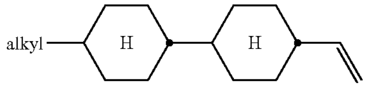

Z2

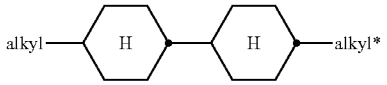

Z2′

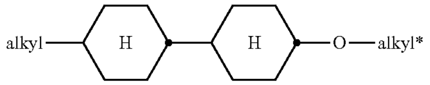

Z3

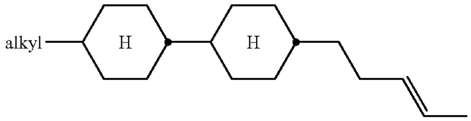

Z3′

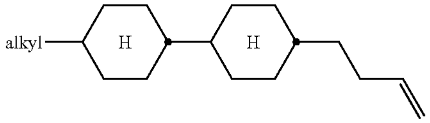

Z4

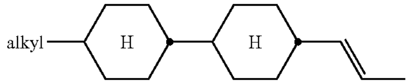

Z5

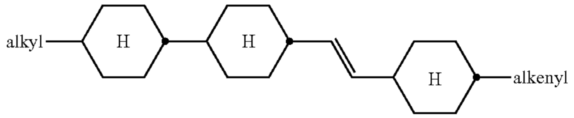

-continued

Z6

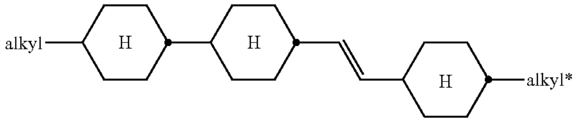

Z7

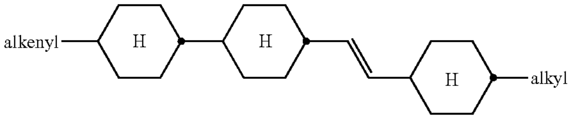

Z8

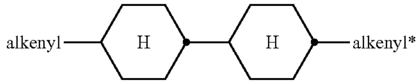

Z9

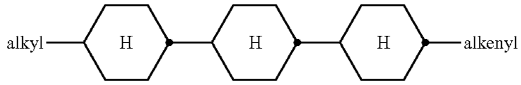

Z10

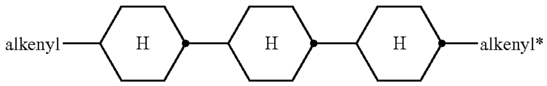

in which the individual substituents have the following meanings:

"alkyl" and "alkyl*" each, independently from one another, denote an alkyl group having 1 to 6 C atoms; and "alkenyl" and "alkenyl*" each, independently of one another, denote an alkenyl group having 2 to 6 C atoms.

8. The medium according to claim 1, further comprising one or more compounds selected from the group consisting of the following formulae:

XII

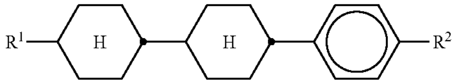

XIII

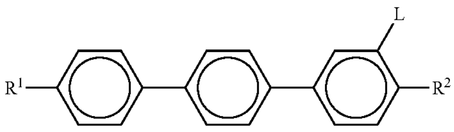

XIII′

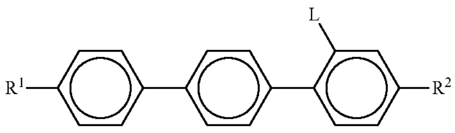

XIV

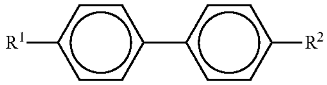

XVI

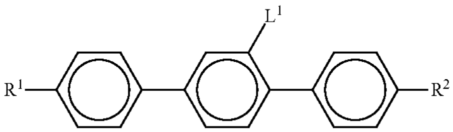

-continued

XVIIa

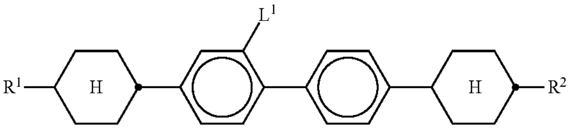

XVIIb

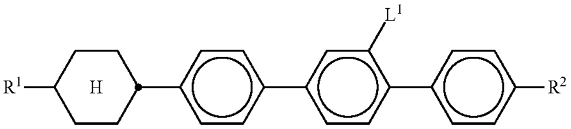

XVIIc

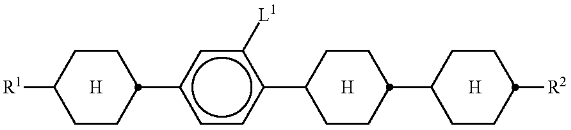

in which $R^1$ and $R^2$ each, independently of one another, denote alkyl, alkoxy, oxaalkyl or fluoroalkyl, each having 1 to 6 C atoms or alkenyl having 2 to 6 C atoms; and $L^1$ and L each, independently of one another, denote H, F or Cl.

9. The medium according to claim 1, further comprising one or more compounds selected from those of Formulae LP1 and LP2:

LP1

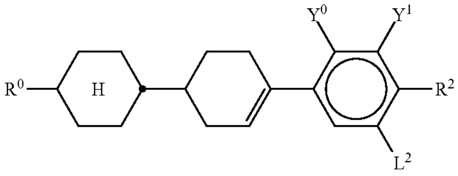

LP2

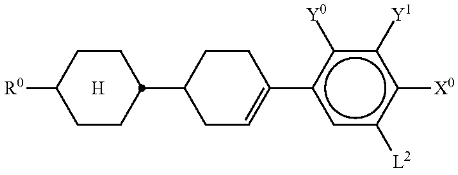

in which the individual substituents have the following meanings:

$R^0$ and $R^2$ each, independently of one another, denote a H atom, a halogen atom, —CN, —SCN, —NCS, an alkyl or an alkoxy group having 1 to 12 C atoms or an alkenyl or an alkenyloxy group having 2 to 12 C atoms in which one or more non-adjacent $CH_2$ groups are optionally substituted by —C≡C—, —$CF_2O$—, —$OCF_2$—, —CH═CH—,

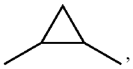, 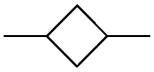, 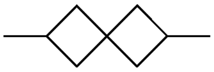,

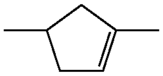, 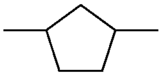,

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms, in which one or more H atoms may be replaced by a halogen atom;

$L^1$ and $L^2$ each, independently of one another, denote H, F or Cl;

$Y^0$ has one of the meanings given in for $R^3$ and $R^6$ in the Formulae U and G; and $X^0$ denotes a F atom, CN, SCN, NCS or an alkyl or an alkoxy group having 1 to 6 C atoms or an alkenyl or an alkenyloxy group having 2 to 6 C atoms in which one or more H atoms are replaced by a F atom.

10. The medium according to claim 1, further comprising one or more compounds selected from the group consisting of the following formulae

XVIII

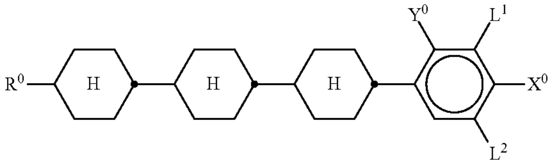

XIX

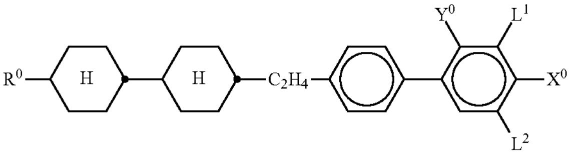

XX

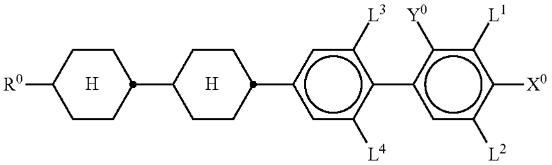

XXI

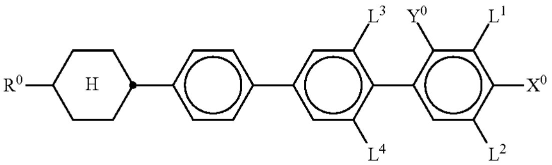

XXII

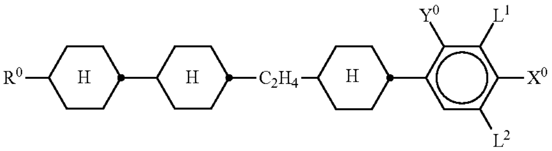

XXIII

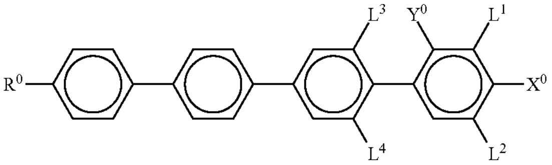

in which:

$R^0$ denotes a H atom, a halogen atom, —CN, —SCN, —NCS, an alkyl or an alkoxy group having 1 to 12 C atoms or an alkenyl or an alkenyloxy group having 2 to 12 C atoms in which one or more non-adjacent $CH_2$ groups are optionally substituted by —C≡C—, —$CF_2O$—, —$OCF_2$—, —CH═CH—,

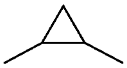, 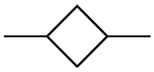, 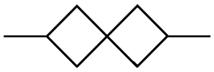, 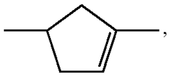, 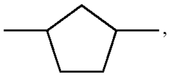,

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms, in which one or more H atoms may be replaced by a halogen atom;

$X^0$ denotes F, Cl, a halogenated alkyl group, a halogenated alkenyl group, a halogenated alkoxy group or a halogenated alkenyloxy group having up to 6 C atoms;

$L^1$ to $L^4$ each, independently of one another, denote H, F or Cl; and $Y^0$ each, independently of one another, denote H or $CH_3$.

11. The medium according to claim 1, further comprising one or more compounds selected from the group consisting of the following formulae:

XXVII

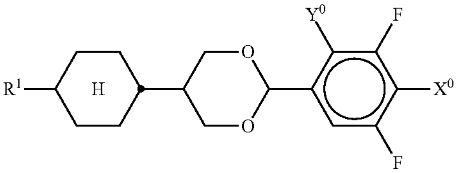

XXVIII

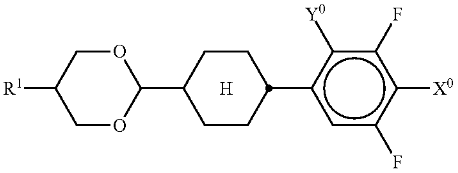

XXIX

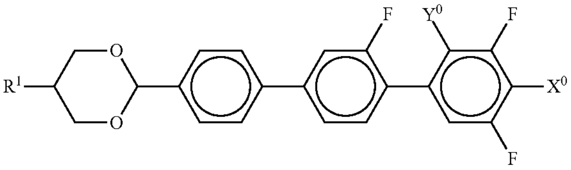

-continued

XXX

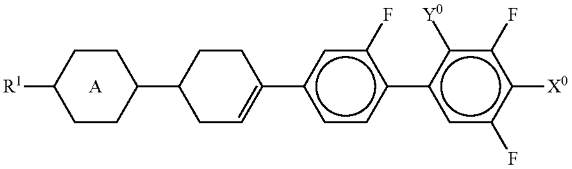

in which

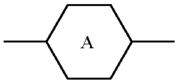 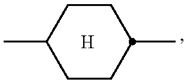, 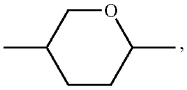, 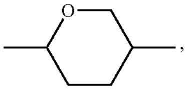, 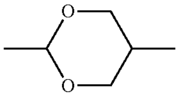 or 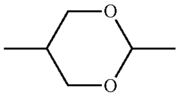

and $R^1$ denotes a H atom, a halogen atom, —CN, —SCN, —NCS, an alkyl or an alkoxy group having 1 to 12 C atoms or an alkenyl or an alkenyloxy group having 2 to 12 C atoms in which one or more non-adjacent $CH_2$ groups are optionally substituted by —C≡C—, —$CF_2O$—, —$OCF_2$—, —CH═CH—,

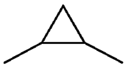, 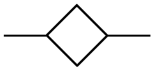, 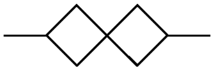, 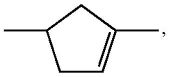, 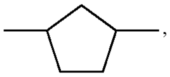,

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms, in which one or more H atoms may be replaced by a halogen atom;

$X^0$ denotes F, Cl, a halogenated alkyl group, a halogenated alkenyl group, a halogenated alkoxy group or a halogenated alkenyloxy group having up to 6 C atoms; and $Y^0$ each, independently of one another, denote H or $CH_3$.

12. The medium according to claim 1, further comprising one or more compounds of the Formula H

H

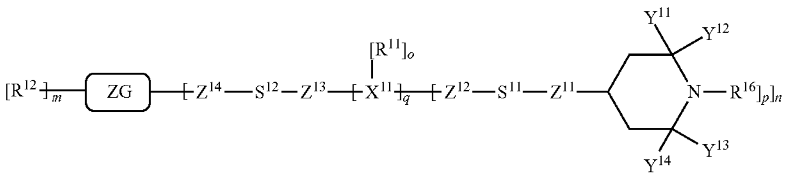

in which $R^{11}$ each, independently of one another, denotes a H atom, F, an alkyl group having 1 to 20 C atoms, in which one —$CH_2$— group or, if present, a plurality of —$CH_2$— groups may be replaced by —O— or —C(═O)—, but two adjacent —$CH_2$— groups cannot be replaced by —O—, and one or, if present, a plurality of —$CH_2$— groups may be replaced by —CH═CH— or —C≡C—, and in which one H atom or a plurality of H atoms may be replaced by F, $OR^{13}$, $N(R^{13})(R^{14})$ or $R^{15}$, $R^{12}$ each, independently of one another, denotes a H atom, an alkyl group having 1 to 20 C atoms, in which one —$CH_2$— group or a plurality of —$CH_2$— groups may be replaced by —O— or —C(═O)—, but two adjacent —$CH_2$— groups cannot be replaced by —O—, a hydrocarbon radical which contains a cycloalkyl or alkylcycloalkyl unit and in which one —$CH_2$— group or a plurality of —$CH_2$— groups may be replaced by —O— or —C(═O)—, but two adjacent —$CH_2$— groups cannot be replaced by —O—, and in which one H atom or a plurality of H atoms may be replaced by F, $OR^{13}$, $N(R^{13})(R^{14})$ or $R^{15}$, or an aromatic or heteroaromatic hydrocarbon radical, in which one H atom or a plurality of H atoms may be replaced by $OR^{13}$, $N(R^{13})(R^{14})$ or $R^{15}$, $R^{13}$ and $R^{14}$ each, independently of one another, denotes an alkyl or acyl group having 1 to 10 C atoms or an aromatic hydrocarbon or carboxylic acid radical having 6 to 12 C atoms, $R^{15}$ each, independently of one another, denotes an alkyl group having 1 to 10 C atoms, in which one —$CH_2$— group or a plurality of —$CH_2$— groups may be replaced by —O— or —C(═O)—, but two adjacent —$CH_2$— groups cannot be replaced by —O—, $R^{16}$ each, independently of one another denotes a H atom, an alkyl group or an alkoxy group having 1 to 10 C atoms, O-cycloalkyl group having 3 to 12 C atoms, O· or OH, $S^{11}$ and $S^{12}$ each, independently of one another, denote an alkylene group having 1 to 20 C atoms, in which one —$CH_2$— group or, if present, a plurality of —$CH_2$— groups may be replaced by —O— or —C(═O)—, but two adjacent —$CH_2$— groups cannot be replaced by —O—, and in which one H atom or a plurality of H atoms may be replaced by F, $OR^{13}$, $N(R^{13})(R^{14})$ or $R^{15}$, or denote a single bond, $Y^{11}$ to $Y^{14}$ each, independently of one another, denote methyl or ethyl, $X^{11}$ denotes C, $Z^{11}$ to $Z^{14}$ each, independently of one another, denote —O—, —(C═O)—, —O—(C═O)—, —(C═O)—O—, —O—(C═O)—O—, —(N—$R^{13}$)—, —N—$R^{13}$—(C═O)— or a single bond if $S^{11}$ is a single bond; both $Z^{11}$ and $Z^{12}$ do not simultaneously denote —O—; if $S^{12}$ is a single bond, both $Z^{13}$ and $Z^{14}$ do not simultaneously denote —O—; and, if q denotes 0, both $Z^{12}$ and $Z^{13}$ do not simultaneously denote —O—, p denotes 1 or 2, q denotes 0 or 1, o denotes (3-p), n denotes an integer from 1 to 10, m denotes an integer from 0 to 8, wherein n*p denotes an integer from 1 to 10, preferably from 3 to 8, and

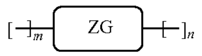

denotes an organic moiety having (m+n) bonding sites.

13. The medium according to claim 1, further comprising one or more compounds of the Formula ST:

ST

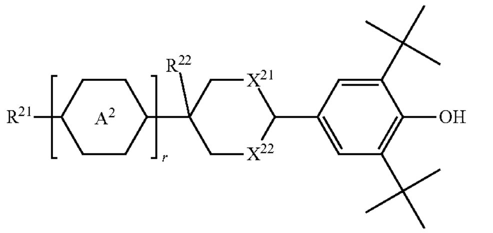

in which the individual substituents have the following meanings:

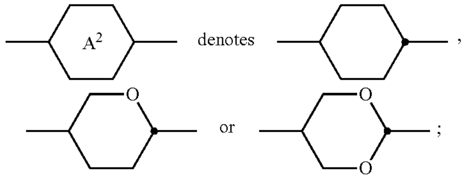

$X^{21}$, $X^{22}$ each, independently of one another, —O—, —$CH_2$—, —$CHR^{23}$— or —N—$R^{23}$—, $R^{21}$ and $R^{22}$ each, independently of one another, a H atom or an alkyl- or alkoxy group having 1 to 12 C atoms, an alkenyl, alkinyl, alkenyloxy or alkoxyalkyl group having 2 to 12 C atoms or a cycloalkyl group having 3 to 12 C atoms, in which one or more non-adjacent $CH_2$ groups are optionally substituted by —C≡C—, —$CF_2$O—, —O$CF_2$—, —CH═CH—,

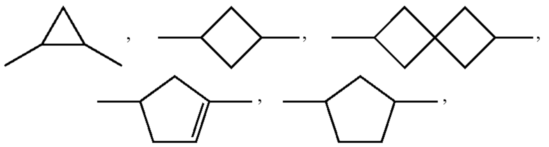

—O—, —CO—O— or —O—CO— in such a way that O atoms are not linked directly to one another, and in which one or more H atoms may be replaced by a halogen atom or a cycloalkyl or a cycloalkoxy group having 3 to 12 C atoms, in which one or more H atoms may be replaced by a halogen atom, $R^{23}$ denotes a H atom, an alkyl or alkoxy group having 1 to 10 C atoms, and r denotes 0 or 1.

14. The medium according to claim 1, comprising one or more additives selected from polymerisation initiators, inhibitors, surface-active substances, light stabilisers, antioxidants, microparticles, free-radical scavengers, nanoparticles, pleochroic dyes and chiral dopants.

15. A process for the preparation of a liquid-crystalline medium according to claim 1, comprising mixing one or more compounds of the Formula G and one or more compounds of the Formula U with one or more mesogenic compounds and optionally one or more polymerizable compounds and/or one or more additives.

16. An electro-optical device comprising a liquid-crystalline medium according to claim 1.

17. An electro-optical liquid crystal display or an AR/VR headset containing a liquid-crystalline medium according to claim 1.

18. The electro-optical liquid-crystal display according to claim 17, comprising a TN, PS-TN, STN, TN-TFT, OCB, IPS, PS-IPS, FFS, HB-FFS, XB-FFS, PS-HB-FFS, PS-XB-FFS, SA-HB-FFS, SA-XB-FS, polymer stabilised SA-HB-FFS, polymer stabilised SA-XB-FFS, positive VA or positive PS-VA display.

19. The electro-optical liquid-crystal display according to claim 17, comprising an FFS, HB-FFS, XB-FFS, PS-HB-FFS, PS-XB-FFS, IPS or PS-IPS display.

* * * * *